(12) United States Patent
Ebrahimi Afrouzi et al.

(10) Patent No.: US 12,092,467 B1
(45) Date of Patent: Sep. 17, 2024

(54) SIMULTANEOUS COLLABORATION, LOCALIZATION, AND MAPPING

(71) Applicants: Ali Ebrahimi Afrouzi, Henderson, NV (US); Lukas Robinson, York (CA); Chen Zhang, Redmond, WA (US); Brian Highfill, Castro Valley, CA (US); Amin Ebrahimi Afrouzi, Berkeley, CA (US)

(72) Inventors: Ali Ebrahimi Afrouzi, Henderson, NV (US); Lukas Robinson, York (CA); Chen Zhang, Redmond, WA (US); Brian Highfill, Castro Valley, CA (US); Amin Ebrahimi Afrouzi, Berkeley, CA (US)

(73) Assignee: AI Incorporated, Toronto (CA)

( * ) Notice: Subject to any disclaimer, the term of this patent is extended or adjusted under 35 U.S.C. 154(b) by 194 days.

(21) Appl. No.: 17/720,040

(22) Filed: Apr. 13, 2022

Related U.S. Application Data

(63) Continuation of application No. 16/418,988, filed on May 21, 2019, now Pat. No. 11,340,079.

(60) Provisional application No. 62/746,688, filed on Oct. 17, 2018, provisional application No. 62/740,580, filed on Oct. 3, 2018, provisional application No. 62/740,573, filed on Oct. 3, 2018, provisional application No. 62/688,497, filed on Jun. 22, 2018, provisional application No. 62/674,173, filed on May 21, 2018.

(51) Int. Cl.
*G01C 21/32* (2006.01)
*G06F 16/29* (2019.01)
*G06T 7/70* (2017.01)
*G06V 20/56* (2022.01)

(52) U.S. Cl.
CPC ............ *G01C 21/32* (2013.01); *G06F 16/29* (2019.01); *G06T 7/70* (2017.01); *G06V 20/56* (2022.01); *G06T 2207/30244* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 2018/0074508 A1* | 3/2018 | Kleiner | A47L 9/2894 |
| 2018/0344116 A1* | 12/2018 | Schriesheim | A47L 9/2857 |
| 2019/0015984 A1* | 1/2019 | Kim | B25J 9/0003 |
| 2019/0212752 A1* | 7/2019 | Fong | G06V 10/764 |

(Continued)

*Primary Examiner* — Adam D Tissot
*Assistant Examiner* — Garrett F Evans

(57) ABSTRACT

Provided is a medium storing instructions that when executed by a processor of a first wheeled device effectuates operations including: capturing sensor readings of an environment; finding a position of the first wheeled device within a map of the environment based on at least some of the sensor readings; and generating a new map of the environment when the processor is unable to load the previously generated map or cannot find the position of the first wheeled device within the previously generated map; wherein: the map is previously generated with the processor of the first wheeled device or a processor of a second wheeled device; the map is loaded into a memory of the first wheeled device at a beginning of each work session; and the processor of the first wheeled device iteratively tracks the position of the first wheeled device while performing a task.

19 Claims, 105 Drawing Sheets

(56) References Cited

U.S. PATENT DOCUMENTS

2020/0033865 A1\* 1/2020 Mellinger, III ...... G05D 1/0246
2020/0331148 A1\* 10/2020 Zhang .................... B25J 13/089

\* cited by examiner

Total Cost: 122

Total Cost: 104

Total Cost: 106

Total Cost: 104

Total Cost: 104

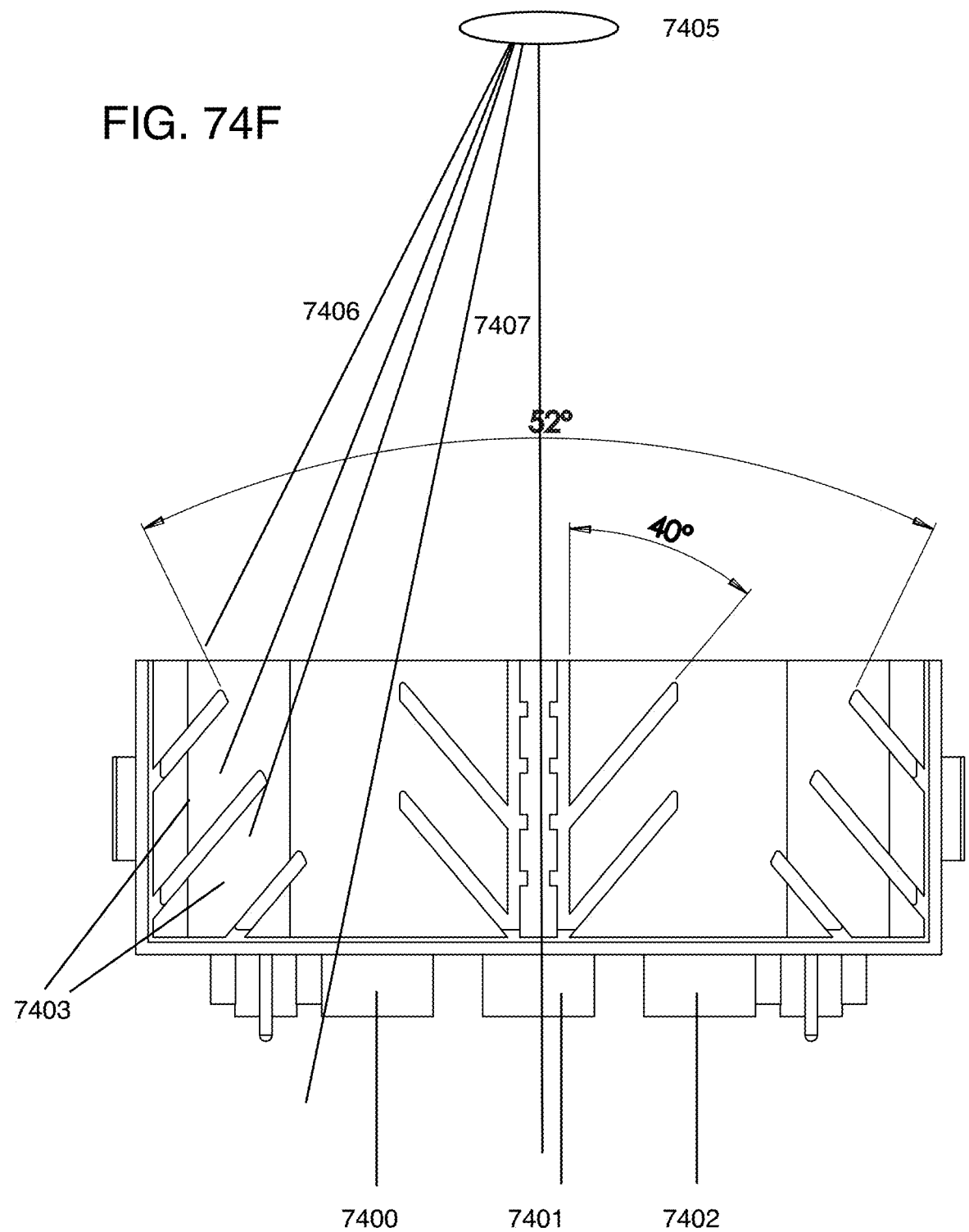

SIMULTANEOUS COLLABORATION, LOCALIZATION, AND MAPPING

CROSS-REFERENCE TO RELATED APPLICATIONS

This application is a Continuation of Non-Provisional patent application Ser. No. 16/418,988, filed May 21, 2019, which claims the benefit of Provisional Patent Application Nos. 62/674,173, filed May 21, 2018, 62/688,497, filed Jun. 22, 2018, 62/740,573, filed Oct. 3, 2018, 62/740,580, filed Oct. 3, 2018, and 62/746,688, filed Oct. 17, 2018, each of which is hereby incorporated by reference.

In this patent, certain U.S. patents, U.S. patent applications, or other materials (e.g., articles) have been incorporated by reference. Specifically, U.S. Patent Application Nos. 62/746,688, 62/674,173, 62/688,497, 62/740,573, 62/740,580, 16/048,179, 16/048,185, 16/163,541, 16/163,562, 16/163,508, 16/185,000, 62/681,965, 16/041,286, 15/406,890, 14/673,633, 16/297,508, 62/740,573, 62/740,580, 14/817,952, 16/198,393, 62/740,558, 15/981,643, 16/230,805, 16/353,019, 15/272,752, 15/949,708, 15/243,783, 15/954,335, 15/954,410, 15/257,798, 15/674,310, 15/224,442, 15/683,255, 15/447,122, 16/393,921, 15/955,480, 15/425,130, and 15/955,344 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The disclosure relates to autonomous robotic devices.

BACKGROUND

Artificial intelligence (AI) robots have become increasingly used for carrying out routine tasks. For a task to be completed more efficiently, a network of AI robots may share their intelligence with one another and collaborate to complete the task. AI robots may also share their intelligence to enhance their situational awareness in order to more effectively collaborate by, for example, delegating tasks in the most efficient manner. For example, with collaborative AI, two robotic security devices operating to secure an environment may autonomously communicate to divide an area to be monitored between the two of them to efficiently secure the environment based on various factors such as security capabilities of each robotic security device, security level required for different areas, etc. In one example, autonomous robotic taxis may collaborate to determine which robotic taxis should respond to a request depending on various factors such as, battery level, travel distance to pick up location, travel time to pick up location, etc. In another example, an autonomous robotic device uses a map of its immediate surroundings as it operates to navigate from a current location to a final destination and to avoid obstacles while travelling to the final destination. However, two autonomous robotic devices may share their observed environmental data to generate a map that extends beyond the immediate surroundings of each robotic device to further optimize their performance. For example, an autonomous automobile entering a parking lot limited to observing a 360-degrees field of view extending to a first set of obstacles is restricted to its observation of the parking lot area and a parking spot available and located in a blind spot of the autonomous automobile is left unnoticed as the autonomous automobile has no way of observing the area beyond its immediate field of view in which the parking spot is located. With an extended field of view all or more open parking spaces are observable. In a further example, an autonomous cleaning robotic device performing work in an airport only capable of discovering its immediate working area and the area where its charging station is located has no ability of finding a charging station closer to its location than its own charging station when charging is required. In yet another example, an autonomous robotic device with a 360-degrees LIDAR performing work in a warehouse is restricted to observing the isle within which the robot is located. Due to this restriction, it has no method of knowing how to travel to the other side of the warehouse without traveling to those areas and discovering them itself. In these instances, an extended map of the environment may improve efficiency of the autonomous vehicle as it operates.

Therefore, a method for dynamic collaboration between multiple AI robots by transmitting, receiving and processing wireless signals among one another is required. In prior art, hierarchical structure wherein a control device directs multiple robots working on a common task is known, however the method does not allow autonomous collaboration between robotic devices. For example, a mobile robot hybrid communication link consisting of a remote unit with transmitter for an operator to remotely send command signals to robots or a mobile communication network to operate a robot remotely. Such methods do not provide autonomous collaboration between robotic devices as an operator uses a control unit to transmit and receive signals to and from robotic devices. In the defense industry, LINK-16, a secure way of communication exchange and situational awareness between military equipment is known. LINK-16 introduces different aspects of a communication line which establish a secure network between engaged units to exchange tactical information that may be used by automated systems or operatives. While LINK-16 provides a method for secure data exchange between engaged units, it does not provide a method for autonomous collaboration for completion of a task. In the mobile computing industry, a collaborative intelligence system whereby individual social users input their data, which is thereby processed and an action is offered to users based on the data is known. The method however requires user input and may not be adapted to allow for autonomous dynamic connection and collaboration between AI robots wherein AI robots may autonomously create and terminate connections with one another based on outcome of collaborations.

SUMMARY

The following presents a simplified summary of some embodiments of the present techniques. This summary is not an extensive overview of the invention. It is not intended to limit the invention to embodiments having any described elements or to delineate the scope of the invention. Its sole purpose is to present some embodiments of the invention.

Provided is a first wheeled device, including: a chassis; a set of wheels coupled to the chassis; one or more electric motors to rotate the set of wheels; a wireless card for wirelessly connecting to internet; a plurality of sensors; a processor electronically coupled to the plurality of sensors; and a tangible, non-transitory, machine readable medium storing instructions that when executed by the processor of the first wheeled device effectuates operations including: capturing, with at least one exteroceptive sensor disposed on the first wheeled device, sensor readings of an environment of the first wheeled device; obtaining, with the processor of the first wheeled device, the sensor readings; finding, with the processor of the first wheeled device, a position of the first wheeled device within a map of the environment based on at least some of the sensor readings; and generating, with the processor of the first wheeled device, a new map of the environment when the processor is unable to load the previously generated map or when the processor cannot find the position of the first wheeled device within the previously generated map; and wherein: the map is previously generated with the processor of the first wheeled device during a previous work session or with a processor of a second wheeled device configured to collaborate with the first wheeled device; the second wheeled device includes: a chassis; a set of wheels coupled to the chassis; one or more electric motors to rotate the set of wheels; a wireless card for wirelessly connecting to internet; a plurality of sensors; a processor electronically coupled to the plurality of sensors; and a tangible, non-transitory, machine readable medium storing instructions that when executed by the processor of the second wheeled device effectuates operations including: generating, with the processor of the second wheeled device, the map of the environment; the map is loaded into a memory of the first wheeled device at a beginning of each work session; and the processor of the first wheeled device iteratively tracks the position of the first wheeled device while performing at least one task.

Provided is a tangible, non-transitory, machine readable medium storing instructions that when executed by a processor of a first wheeled device effectuates operations including: capturing, with at least one exteroceptive sensor disposed on the first wheeled device, sensor readings of an environment of the first wheeled device; obtaining, with the processor of the first wheeled device, the sensor readings; finding, with the processor of the first wheeled device, a position of the first wheeled device within a map of the environment based on at least some of the sensor readings; and generating, with the processor of the first wheeled device, a new map of the environment when the processor is unable to load the previously generated map or when the processor cannot find the position of the first wheeled device in the previously generated map; and wherein: the map is previously generated with the processor of the first wheeled device during a previous work session or with a processor of a second wheeled device configured to collaborate with the first wheeled device; the second wheeled device includes: a chassis; a set of wheels coupled to the chassis; one or more electric motors to rotate the set of wheels; a wireless card for wirelessly connecting to internet; a plurality of sensors; a processor electronically coupled to the plurality of sensors; and a tangible, non-transitory, machine readable medium storing instructions that when executed by the processor of the second wheeled device effectuates operations including: generating, with the processor of the second wheeled device, the map of the environment; the map is loaded into a memory of the first wheeled device at a beginning of each work session; and the processor of the first wheeled device iteratively tracks the position of the first wheeled device while performing at least one task.

Included is a method for operating a first wheeled device, including: capturing, with at least one exteroceptive sensor disposed on the first wheeled device, sensor readings of an environment of the first wheeled device; obtaining, with a processor of the first wheeled device, the sensor readings; finding, with the processor of the first wheeled device, a position of the first wheeled device within a map of the environment based on at least some of the sensor readings; and generating, with the processor of the first wheeled device, a new map of the environment when the processor is unable to load the previously generated map or when the processor cannot find the position of the first wheeled device in the previously generated map; and wherein: the map is previously generated with the processor of the first wheeled device during a previous work session or with a processor of a second wheeled device configured to collaborate with the first wheeled device; the second wheeled device includes: a chassis; a set of wheels coupled to the chassis; one or more electric motors to rotate the set of wheels; a wireless card for wirelessly connecting to internet; a plurality of sensors; a processor electronically coupled to the plurality of sensors; and a tangible, non-transitory, machine readable medium storing instructions that when executed by the processor of the second wheeled device effectuates operations including: generating, with the processor of the second wheeled device, the map of the environment; the map is loaded into a memory of the first wheeled device at a beginning of each work session; and the processor of the first wheeled device iteratively tracks the position of the first wheeled device while performing at least one task; the first wheeled device is wirelessly connected to an application of a communication device configured to: display the map and debris accumulation within the map; and receive at least one input designating an addition, a deletion, or a modification of a perimeter line within the map; an addition, a deletion, or a modification of a zone within the map; a schedule of the first wheeled device; a cleaning intensity; an instruction to navigate to a user-identified location; a label of a zone within the map; and an addition, a deletion, or a modification of a virtual boundary the first wheeled device is to avoid crossing; and at least some of the operation of the first wheeled device is determined based on a presence or an absence of a user within the environment, wherein the first wheeled device operates during absence of the user.

BRIEF DESCRIPTION OF THE DRAWINGS

FIGS. 74A-74F illustrate an example of a mechanical filter for a light source, according to some embodiments.

DETAILED DESCRIPTION OF SOME EMBODIMENTS

Figure 1A:
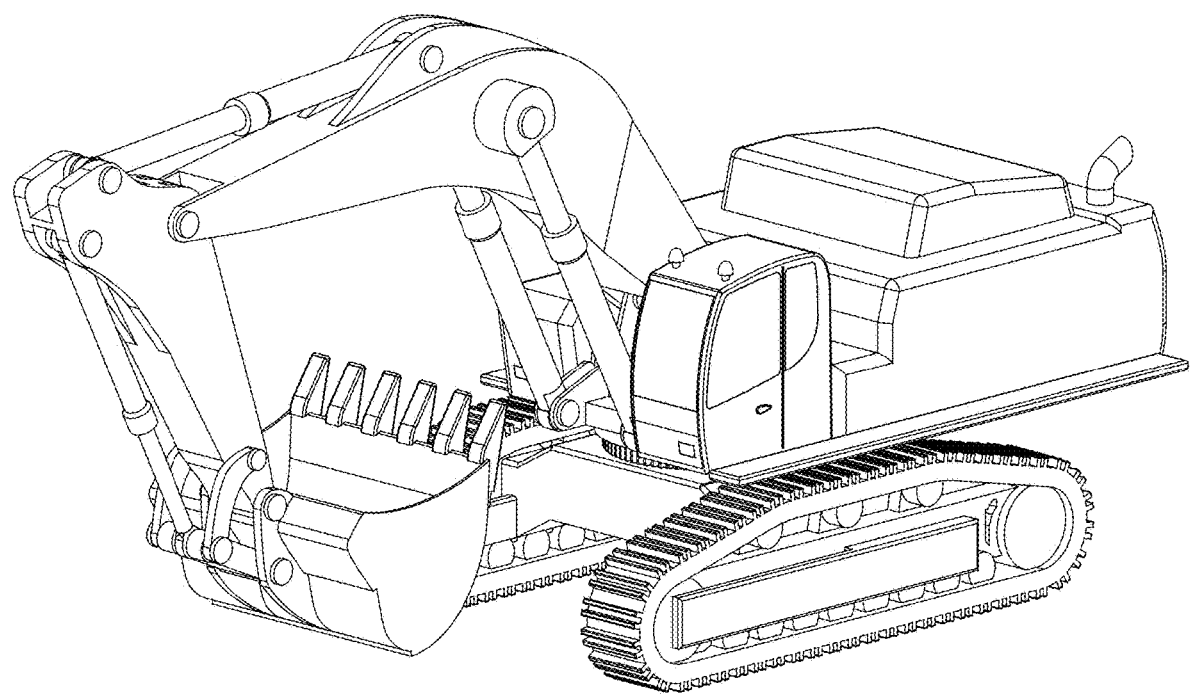
FIGS. 1A and 1B illustrate an example of a robotic excavator, according to some embodiments.

The present techniques will now be described in detail with reference to a few embodiments thereof as illustrated in the accompanying drawings. In the following description, numerous specific details are set forth in order to provide a thorough understanding. It will be apparent, however, to one skilled in the art, that the present techniques may be practiced without some or all of these specific details. In other instances, well known process steps and/or structures have not been described in detail in order to not unnecessarily obscure the present techniques. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments include one or more robotic devices including, but not limited to, wheels, motors, a power source, internal and external sensors, processors, controllers, mapping capabilities including area division, localization capabilities, and path planning capabilities. In some embodiments, sensors include one or more of, but are not limited to, sonar sensors, light detection and ranging (LIDAR) sensors, laser detection and ranging (LADAR) sensors, cameras, stereo and structured light sensors, time-of-flight sensors, TSSP sensors, infrared (IR) sensors, tactile sensors, ultrasonic sensors, depth sensing cameras, optical flow sensors, IR illuminators, light transmitters and receivers, odometry sensors, optical encoder, inertial measurement units (IMU), global positioning systems (GPS), structure from motion sensors and gyroscopes. In some embodiments, the power source is a rechargeable battery that is recharged using electricity or solar energy. In some embodiments, the one or more robotic devices include a battery rechargeable by electricity and solar powered battery. In other embodiments, the robotic devices operate using fuel or a combination of fuel and electricity. The one or more robotic devices may further include network capabilities such as Wi-Fi™ or Bluetooth capability and USB ports. Other types of robotic devices with other configurations are possible.

In some embodiments, two or more robotic devices collaborate by sharing intelligence to accomplish a task together. For example, two or more of robotic dump trucks and robotic excavators (e.g., one robotic dump truck and one robotic excavator, or three robotic dump trucks and two robotic excavators) collaborate to seamlessly excavate a mine and transport the excavated soil to one or more soil dump locations. In some embodiments, robotic excavators dig up soil and empty robotic dump trucks form a line and the robotic excavators fill the dump trucks with excavated soil from one or more areas of a mine. The filled robotic dump trucks transport the soil to one or more soil dump locations. In some embodiments, the robotic dump trucks and robotic excavators collaborate to generate a map of the environment, localize themselves within the environment, and make decisions (e.g., tasks to be assigned to each robotic dump truck and robotic excavator based on factors such as battery or fuel level, physical characteristics such as size, specifications such as maximum speed, etc.). In some embodiments, simultaneous collaboration, localization, and mapping is otherwise known as Quantum SLAM.

Figure 1B:
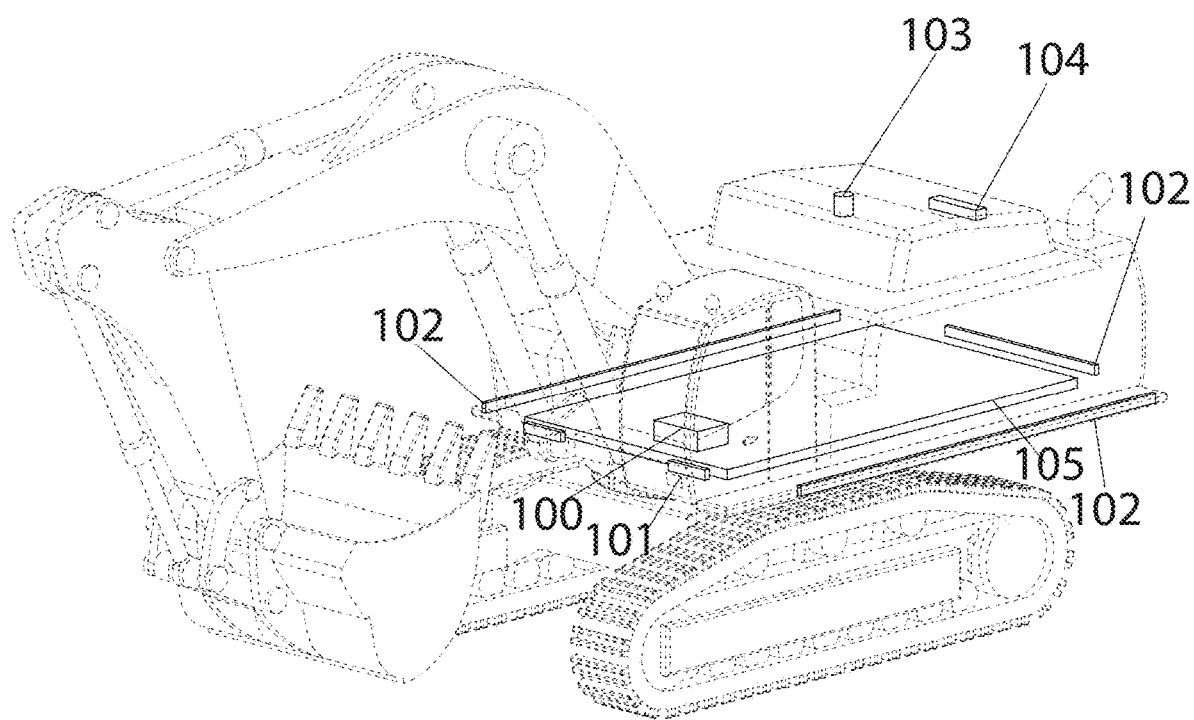
Figure 1C:
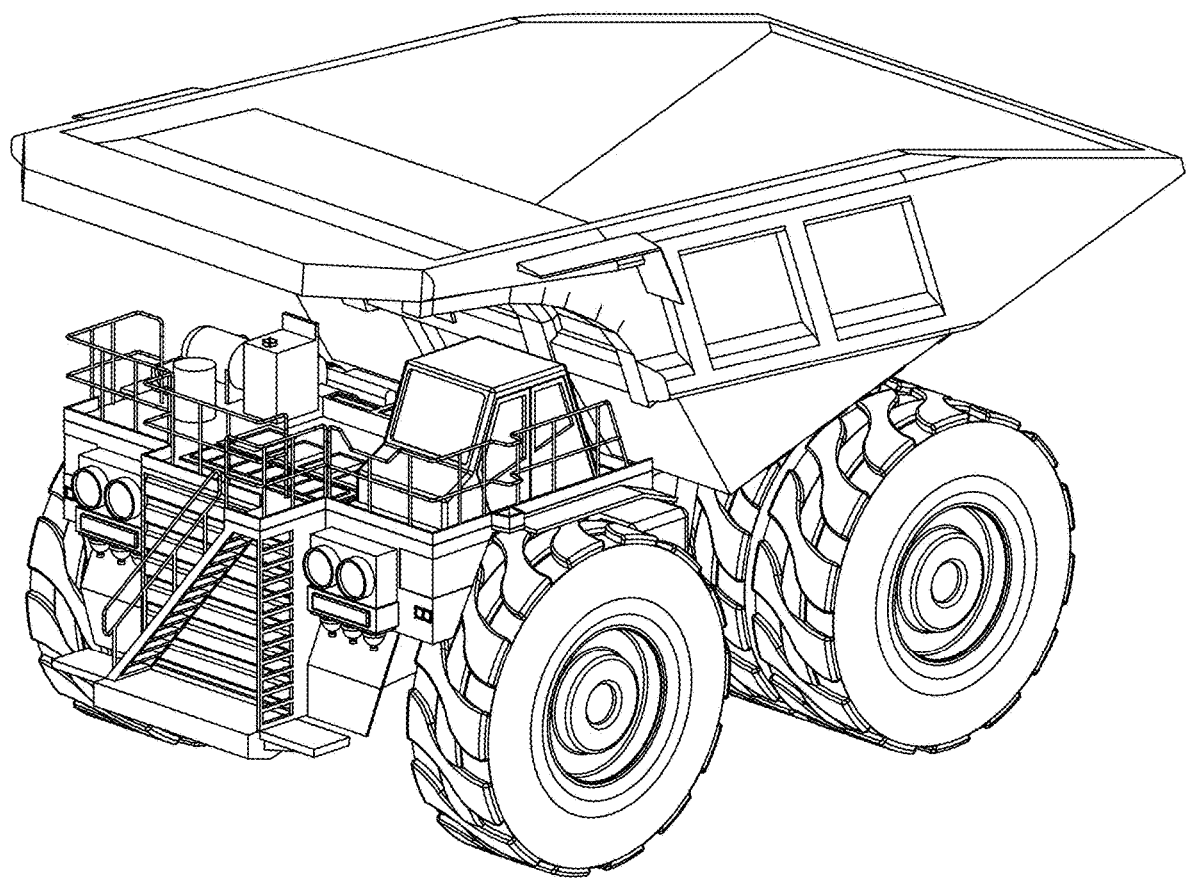
FIGS. 1C and 1D illustrate an example of a robotic dump truck, according to some embodiments.
Figure 1D:
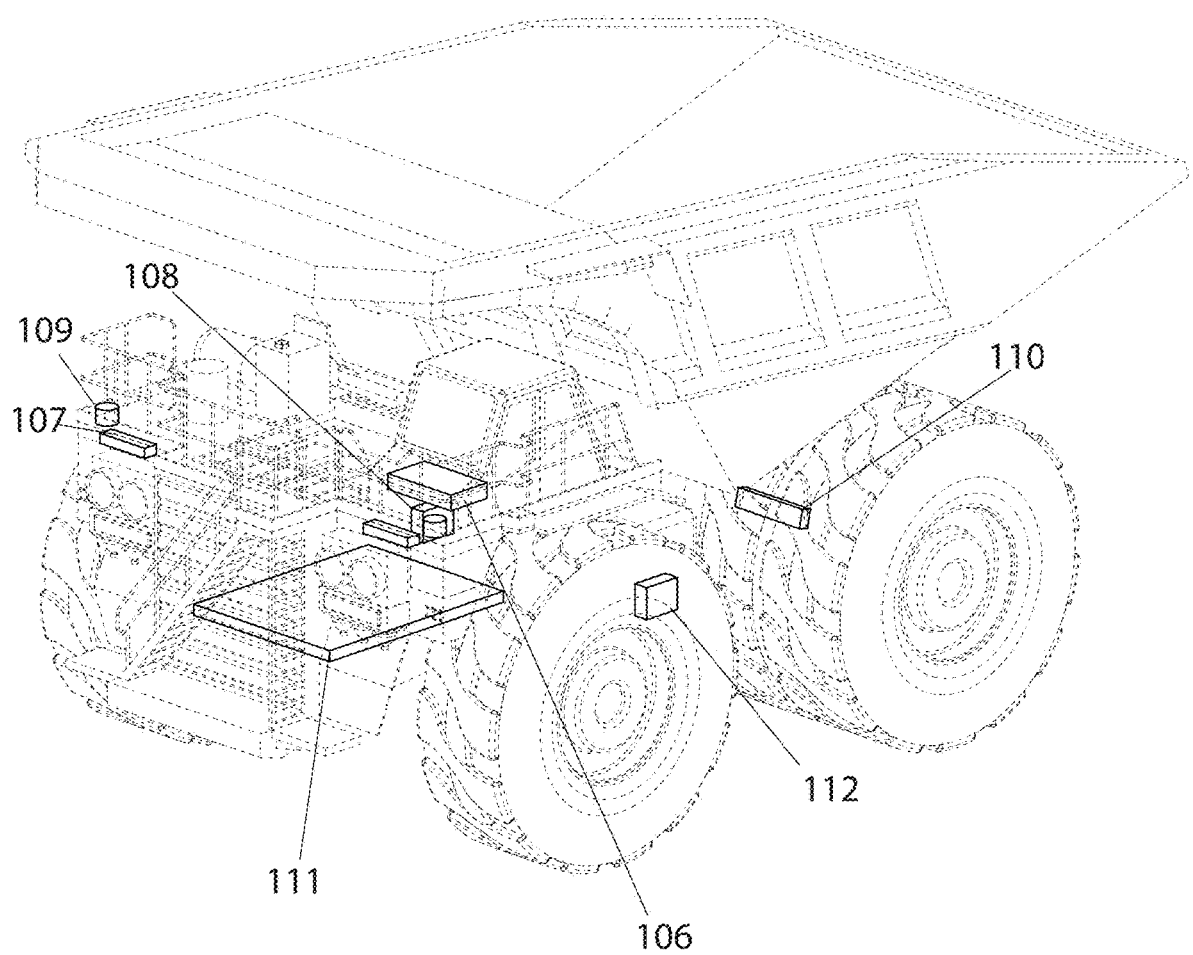

FIG. 1A illustrates an example of a robotic excavator. FIG. 1B illustrates some components of the robotic excavator including a compartment 100 including a processor, memory, network card, and controller, a camera 101 (the other is unlabeled due to spacing), sensor arrays 102 (e.g., TOF sensors, sonar sensors, IR sensors, etc.), a LIDAR 103, rear rangefinder 104, and battery 105. FIG. 1C illustrates an example of a robotic dump truck. FIG. 1D illustrates some components of the robotic dump truck including a compartment 106 including a processor, memory, and controller, a camera 107 (the other is unlabeled due to spacing), sensor array 108 (e.g., TOF sensors, sonar sensors, IR sensors, etc.), a LIDAR 109, rear rangefinder 110, battery 111, and movement measurement device 112. The robotic excavator and robotic dump truck may further include movement measuring devices (e.g., odometer, gyroscope, etc.) and network capabilities for wireless connection with other external devices. In some embodiments, the robots may include the features of a robot described herein. In some embodiments, program code stored in the memory and executed by the processor may effectuate the operations described herein.

In some embodiments, the two or more of robotic dump trucks and robotic excavators (or other robotic machinery) collaborate and share intelligence using a data transfer channel (DTC) link. In some embodiments, the DTC link may be, for example, a secure wireless connection (e.g. Wi-Fi or RF) between the first and second robot. In some embodiments, collaborating robots, such as robotic dump trucks and robotic excavators, are actuators that take action or observers that observe the surroundings. In some embodiments, the DTC link is between two actuators, two observers or an actuator and an observer. In some embodiments, the processor of a robot establishes more than one DTC link. Different configurations of connections between collaborating robots may exist. For example, connection between two robots, connection from one robot to multiple robots, connection from multiple robots to one robot, etc. In some embodiments, DTC links are one-way connections wherein transfer of information is unidirectional, are two-way wherein information is bidirectional, or are more complex. In some embodiments, the processor of a robot assigns a measure of strength to a DTC link with another collaborating robot (e.g., a DTC link between two robotic excavators). In some embodiments, the processor adjusts the measure of strength based on the outcome of the collaboration. For example, if the shared intelligence between two robotic excavators results in reduced time to excavate an area, the respective processors increase the strength of the DTC link. In some embodiments, the measure of strength of the DTC link is a probability of the action resulting in a maximum reward. In some embodiments, the DTC link is a vector with magnitude and direction. The absolute value of the magnitude denotes the strength of the link and represents a probability between 0 and 1 of the action or collaboration resulting in a maximum reward, wherein a value of 1 signifies a very strong link. If the collaboration between robots is useful for both robots then the respective processors increase the strength of the DTC link as well as the level of confidence in the information received from the collaborating robot. If the exchange of information is useless to the collaborating robots, the respective processors reduce strength of DTC link and, if collaboration is repeatedly useless, the shared information may eventually be discarded and the link terminated by the respective processors. For example, if sensor measurements of the environment from a first robotic dump truck indicates a road way that allows a second robotic dump truck to reach its soil dump destination faster and the second robotic dump truck with whom the information has been shared travels to the road way and finds it is blocked, then the exchange of information was not helpful and the strength of the link is decreased by the processor of the first robotic dump truck as well as the level of confidence of the information received from the second robotic dump truck.

As a further example, consider the environment of robotic excavators K and L represented by a grid world and described by a m×n matrix G comprising all state spaces available to the robotic excavators. In a two-dimensional world, each entry of the matrix may represent a cell of the grid world and have a value (x, y). Robotic excavator K may be considered an observer while robotic excavator L may be considered an actuator. Robotic excavators K and L may understand the environment based on environment matrices $G_k$ and $G_L$, respectively. Coverage matrices $C_k$ and $C_L$ may correspond to environment matrices $G_k$ and $G_L$, respectively, and may be used to indicate excavating coverage of the mining site. Each entry of a coverage matrix C may correspond to an entry of an environment matrix G such that each time a cell of the environment in matrix G is excavated, a corresponding entry in the coverage matrix C is increased by a value of 1, with all entries of the coverage matrix initially having a value of 0. As such, the coverage matrices may allow the processors of the robotic excavators to keep track of excavated areas of the mining site. Initially, each robotic excavator may begin excavating the environment individually. At some point, robotic excavators K and L may meet and establish a DTC link such that the processor of robotic excavator K, the observer, may share its excavating coverage matrix $C_k$ with the processor of robotic excavator L, the actuator. The processor of robotic excavator L may convolve coverage matrices $C_k$ and $C_L$ to combine areas already excavated by both robotic excavators. Since this is an example of cooperative game theory, the processor of robotic excavator L may devise a policy that distributes excavation of the remaining uncovered cells among the two robotic excavators considering the maximum reward it may receive itself and the maximum reward it may leave for robotic excavator K to collect. In some embodiments, wherein the DTC is a two-way link between robotic devices, messages may be exchanged back and forth to ensure the reward function, accounting for the reward received by both robots, is maximized. The uncovered cells of the mining site, when divided for excavating coverage by robotic excavators K and L, may reduce excavating time of the mining site and thereby increase the reward received, assuming the reward is dependent on excavating time. Further, if total excavating time of the mining site is reduced as a result of collaboration with robotic excavator K, the processor of robotic excavator L may reinforce the strength of the DTC link with robotic excavator K. In some embodiments, wherein non-cooperative game theory is applied and the processors of robotic excavators K and L each attempt to maximize their own reward individually at the expense of one another, Nash equilibrium may apply. When each robotic excavator has chosen a strategy and no robotic excavators can benefit by changing strategies while all other robotic excavators keep their strategies unchanged, then the current set of strategies and corresponding payoffs constitute a Nash equilibrium. For example, robotic excavators K and L are in Nash equilibrium if the processor of robotic excavator K chooses the best strategy to execute for excavation coverage of the mining site, taking into account the policy chosen by the processor of robotic excavator L and the processor of robotic excavator L chooses the best policy to execute for excavation coverage of the mining site, taking into account the strategy chosen by the processor of robotic excavator K. In other instances, this same example may be applied to robotic surface cleaners that collaborate to cover an area for cleaning more efficiently by dividing the surface area for cleaning and avoiding repeat coverage by sharing their respective coverage matrices.

In some embodiments, the processor of a robot may form, strengthen, weaken or terminate DTC links with other robots, with the goal of forming coalitions that maximize the reward. For example, for a DTC link between an observer and actuator, the strength of the DTC link may be reinforced by the processor when $\exists o(t) \in O \wedge \exists a(t) \in A, a(t)|o(t-1) \Rightarrow P[r^*(t) > r(t)]$, wherein $o(t)$ is an observation within the set of observations O, $a(t)$ is an action within the set of actions A, and $r^*(t)$ is the optimal reward compared to all rewards in $\{r\}$, $\forall r \in \{r\} IP[r^* > r]$. For two actuators with actions $a_1$ and $a_2$, $\exists a_1(t) \in U \wedge \exists a_2(t) \in A$ wherein maximum reward may be assigned by the processor by, for example, saving time. The sum of the reward of $r_1$ and $r_2$ at time t is larger than the sum of $r_1$ at time t+1 and $r_2$ at time t+1, i.e., $(r_1+r_2)(t)|(a_1+a_2)(t)>r_1(t)+r_2(t+1)|(a_1(t)+a_2(t+1))$. For two observers, maximum reward may be assigned by the processor for, for example, useful information gain. This may be quantified by the processor using conditional entropy $H(O_1|O_2)=H(O_1|O_2)-H(O_1)+H(O_2)$, wherein the combination of observations $O_1$ and $O_2$ should reduce the entropy H of observation $O_1$ given its combination with observation $O_2$ for useful information gain. For example, the data captured from a sensor of a robotic dump truck and a sensor of a robotic excavator may be combined with one another to produce a higher resolution image or portion of an image. In some embodiments, the DTC link may be terminated by the processor if the strength of the DTC link is below a predetermined threshold. The goal is to form relationships that provide the most reward and hence have the strongest DTC links.

In some embodiments, a Markov Decision Process (MDP) may be used by the processor of robots to learn with which robots a strong DTC link may be formed and hence with which robots may the most useful coalitions be formed. A MDP consists of a sequence of states and actions followed by rewards. For example, an action may be to combine sensor data from one robot with sensor data from a second robot. If the action of combining the sensor data results in readings with higher confidence level, a reward with greater value may be assigned as compared to the value of the reward assigned if the combination of sensor data results in readings with lower confidence level. A greater reward assigned by the processors of collaborating robots as a result of collaboration between the robots may translate to a stronger DTC link between the two. For example, the magnitude of a DTC link between an observer and actuator with an absolute value of 1 may signify a strong link given that the actions taken by the actuator given the observations from the observer generate maximum reward with a probability of 1. Actions may be taken by a robot to transition from one state to another and after transitioning to each new state a reward may be assigned by the processor of the robot. For two collaborating robots, for example, both may transition to a new state after taking an action to collaborate. The reward may be assigned to both collaborators by their respective processors in one embodiment or may be provided to one robot by its processor and back propagated to the other robot. In some embodiments, the reward may be divided unevenly between collaborating robots.

A MDP includes a sequence of observed states s and actions a followed by rewards r, i.e., $s_t, a_t, r_{t+1}, s_{t+1}, a_{t+1}, r_{t+2}, s_{t+2}, a_{t+2}, r_{t+3}, \ldots a_T, r_T, S_T$. The goal of the robot is to maximize the net reward R, to be expected in the future. The net reward $R_T=r_{t+1}+\gamma^1 r_{t+2}+\ldots+\gamma^{T-t-1} r_T$ is the sum of the rewards received for the sequence of states and actions experienced beginning from state $s_t$ and ending with terminal state $S_T$, wherein $\gamma$ is a discount factor applied with value $0 \leq \gamma < 1$. In some embodiments, the MDP may be solved by the processor using Q-Learning, a method based on estimating the expected total net reward in the future of each state-action pair. The expected net reward for the execution of a sequence of states and actions may be given by a state-action value function. In some embodiments, the goal is for the processor to find optimal state-action value function by identifying sequence of states and actions with highest net reward. Since multiple actions may be taken from each state, over time as the number of states experienced, actions, and transitions increase, the goal of the processor is to also find an optimal policy which contains the action from each state with highest reward value. The value of a state-action pair $Q(s, a)=E[R_T|s_t=s, a_t=a]$, also known as the Q-function, may be defined as equivalent to the expected net reward $R_T$ for the sequence of states and actions beginning with state $s_t$ and action $a_t$ and ending with terminal state $s_T$. By finding the sequence of states and actions which maximize the state-action value function Q (s, a), the optimal value function $Q^*(s, a)=\max E[R_T|s_t=s, a_t=a]$ may be identified by the processor. And the optimal policy for each state $\pi^*(s)=\mathrm{argmax}\ Q^*(s, a)$ may be derived by the processor by identifying the highest valued action that may be taken from each state. To iteratively calculate the state-action value function for a given state s and action a, the Bellman Optimality equation may be applied. The optimal value function obeys Bellman Optimality equation $Q^*(s, a)=E[r+\gamma \max Q^*(s', a')]$. The equation expresses that the value for a given state s and action a is dependent on the current reward r observed at state s and the maximum discounted $\gamma$ future reward for the next state s' the robotic device would end up in. This equation may be used by the processor to iteratively calculate the state-action value for a given state s and action a using $Q_{i+1}(s, a)=E[r+\gamma \max Q_i(s', a')]$ as the sequence of states and actions are executed. i is the iteration number and begins at i=0, with $Q_0(s', a')$ being initially guessed. In this particular context, the sequence of states and actions may correspond to the states visited and actions taken during a work session or over some time period. Over time, as more states are visited and different actions from each state are evaluated by the processor, the system converges to find the most optimal action to take from each state thereby forming an optimal policy. Further, as different sequences of states and actions are evaluated over time, the system converges to the most optimal sequence of states and actions. This process may be known as Q-Learning.

For two or more robots, the problem of reinforcement learning (RL) may become more complex. In some embodiments, RL such as Q-Learning, may be combined with deep learning (DL). RL may be used to define the objectives while DL may learn the complex representations to achieve such objectives. DL is a general framework for learning the representation of complex models and may be composed of linear transformations, convolution operations, non-linear activation functions, such as ReLU, and loss functions such as, mean square error and log likelihood. The combination of RL and DL may be known as Deep Reinforcement Learning (DRL). In instances wherein Q-Learning is used, the process may be known as Deep Q-Learning (DQL) wherein deep neural networks represent the state-action value function (or Q-function) Q(s, a; w). For example, a Deep Q-Network (DQN) may be a combination of convolutional neural network (CNN) for learning feature representations with Q-Learning algorithm. The DQN may represent the state-action value function Q (s, a; w) wherein w is the network parameters. Given that the optimal value function $Q^*(s, a; w)=E[r+\gamma \max Q^*(s', a'; w')]$ obeys Bellman Optimality equation, a loss function $L(w)=[r+\gamma \max Q^*(s', a'; w')-Q(s, a; w)]^2$ may be defined. The MSE of loss function L(w) may be minimized by gradient descent in the DQN to find the optimal state-action value function by the processor. In some embodiments, a separate target network with parameters w', as above, may be used by the processor in estimating the maximum state-action value function. In some embodiments, exploitation of current optimal policy and exploration of potentially better policies may be balanced by the processor by employing a greedy approach that ensures the robot samples a random action some percentage of the time. In some embodiments, experience replay may be employed wherein all experiences (s, a, r, s') may be stored in a replay memory and random mini-batches from the replay memory may be used by the processor instead of the most recent transition when training the network. This provides stability as RL may be unstable when a nonlinear function, such as a neural network, is used to approximate the value function.

In some embodiments, the processor uses Hebbian Learning to measure the strength of the DTC link W using W'(OA, AA)=W+η(R'−R), wherein W is the strength of the link before collaboration, W' is the strength of the link after collaboration, η is the learning rate, R' is the reward received as a result of collaboration and R is an integration of previous rewards or the expected reward had collaboration between robots not occurred. In some embodiments, there may be noise in the data of the observer and the action taken by the actuator. For example, there may be a chance that the observation of the observer is the wrong observation or that the action taken by the actuator is not executed as expected. Therefore, in some embodiments, the processor determines a probability $$P(AA \mid OA) = \frac{P(OA \mid AA)P(AA)}{P(OA)}$$

for the accuracy of observation of the observer (OA) and the action of the actuator (AA) when determining the expected reward. P(OA|AA) is the probability of the OA making an observation given that the AA executes a particular action, P(AA) is the probability of the AA taking a particular action independent of the observation, and P(OA) is the probability of the OA having made an observation.

In some embodiments, the processor balances exploration of new DTC links and exploitation of existing DTC links. For example, actuators may be encouraged to find better sources of information, such as robots with better sensors or ideally positioned sensors, and observers may be encouraged to find actuators that have better use of their information. In some embodiments, the processor uses a regret analysis when determining exploration or exploitation. For example, the regret function $$\rho = T\mu^* - \sum_{t=1}^{T} r_t$$

is the difference between the reward sum associated with an optimal policy and the sum of the collected rewards. ρ is the regret after T rounds, $r_t$ is the reward in round t and $\mu^*$ is the maximum reward mean. In some embodiments, the processor minimizes the regret by defining a cost function and minimizing the function using gradient descent. In this way, at each state, a policy that has a state-action value function at least equal to the previous state is chosen by the processor.

In some embodiments, the processor uses Monte Carlo Tree Search (MCTS) to maximize the reward. MCTS uses a statistics tree comprised of nodes connected by branches wherein value of nodes are given. Nodes of highest value are of top priority. Nodes may represent different states. The tree begins at the root node, then connects to child nodes and further onwards leaf nodes. The path from the root to a leaf node may represent, for example, states visited and actions taken to transition between states. There are four main steps in MCTS comprising selection, expansion, play-out and backpropagation. The processor may iteratively choose different paths and determine associated rewards. In some embodiments, the processor may use Lehmer random number generator to randomize actions chosen. The processor may backpropagate the result of each path in the tree to reflect the outcome of the actions taken. In some embodiments, the processor may simulate possible actions from a state and choose the action that results in a reward equal to or greater than the previous states.

In some embodiments, robots are distributed over a network, such as a network in the cloud, such that they may be present at various locations. In such cases of remote collaborative intelligence parameters such as latency may be considered. For example, latency may be considered when using satellite images to locate a moving autonomous vehicle. In some embodiments, there may be a threshold latency time after which the information may be rendered useless by the processor of a robot.

In some embodiments, robots may have active or passive status, wherein during active status the transmitter of the robot may broadcast its presence and capabilities to other robots while during passive status the receiver of the robot may monitor and the transmitter respond to broadcasts from other robots. Robots may alternate between active and passive statuses, wherein for example, robots may be active or passive at different times or robots may become active when links weaken or robots may become passive or active depending on the number of DTC links that have been formed.

In some embodiments, information shared between processors of autonomous robots may be time stamped and contain a header with an identifier of the robot sharing the information. In some instances, wherein the information is passed between multiple robots, the processor of each robot sharing the information may add their identifier to the header. This may be used to prevent information looping, wherein a processor of a robot may disregard incoming information if the header contains their identifier. In some embodiments, intermediary robots may be bypassed. For example, an actuator connected to an observer directly and also indirectly through an intermediary observer may discard the indirect connection with the observer. As a further example, an actuator connected indirectly to a first observer through an intermediary second observer may broadcast and request direct connection to the first observer in instances where, for example, the actuator is often receiving useful information from the first observer.

In some embodiments, the processor determines a probability of termination of a DTC link using the Gittins index. The Gittins index is a value associated to the state of a stochastic process with a reward function and probability of termination. The Gittins index is a measure of the reward that may be achieved by a random process with a termination state and evolving from its present state, with the option of terminating the process at every later stage with the accrual of the probabilistic expected reward from that stage up to the termination state.

In some embodiments, the processor of the robot may keep track of the other robots within their vicinity, including information on the model, type, functionality, capability, role, operating system, security privileges and approximate proximity of the other robots.

Figure 2:
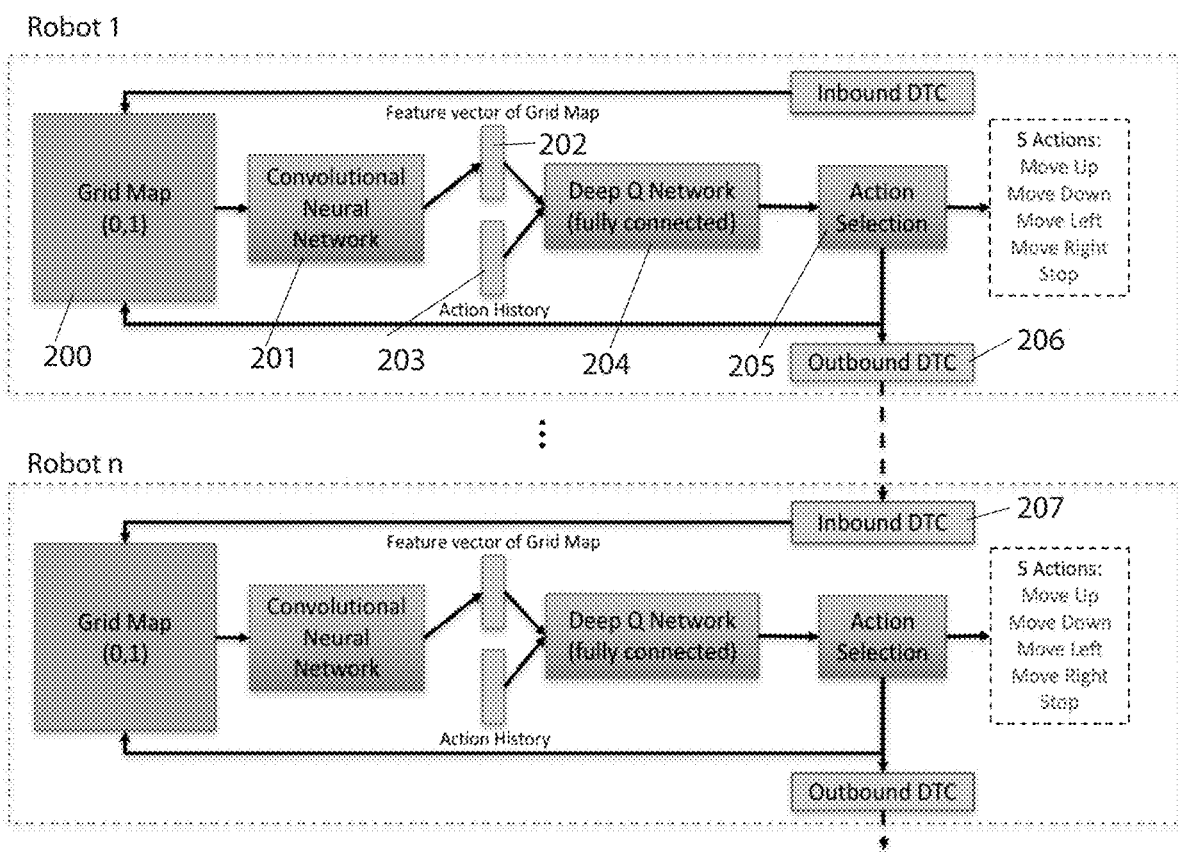
FIG. 2 illustrates an example of collaborative intelligence of robotic devices, according to some embodiments.

In some embodiments, the processors of collaborating robots employ a Deep Collaborative Reinforcement Learning framework for collaborative intelligence, the framework being a combination of deep convolutional neural network (CNN) and DQN for action and communication selection. For example, for collaborative robotic dump trucks and excavators, the input of the CNN may be a grid map of a mining site wherein excavated cells have a value of 1, unexcavated cells have a value of 0, and cells on which soil is dumped have a value of 2, and the output a feature vector. The grid map may be in the form of an array. The output of the CNN may be merged with a feature of action history and used as input to the DQN. The output of the DQN may be possible actions of the robotic dump truck and robotic excavator, such as, move forwards, move backwards, move right, move left, stop, dig, dump, etc. Followed by each action, the grid map may be updated and the updated information shared with all cooperative robots. FIG. 2 illustrates an example of a Deep Collaborative Reinforcement Learning framework employed in the processor of robotic devices wherein grid map 200 is input into CNN 201. Output feature vector of grid map 202 and action history 203 are input into DQN 204 which outputs action 205. Action 205 is passed to outbound DTC 206 which may then be shared with collaborating robots receiving the information through an inbound DTC, such as inbound DTC 207, to update their grid map accordingly. In some embodiments, decentralized learning may be used by the processor wherein each robot learns its own Q-network parameters, treating the other robots as part of the environment, thereby using the environment as the sole source of interaction between robots. Another variant trains a single network whose parameters are shared among all robots. However, execution remains decentralized, at which point robots receive different observations leading to different behavior. In some embodiments, centralized learning may be used by the processor wherein information may be passed between robots. As a result, gradients may be pushed through DTC links, yielding a system that is end-to-end trainable, even across robots.

In some embodiments, control systems of AI agents employ collaborative intelligence and artificial intelligence. In some embodiments, collaborative intelligence may include AI agents learning from one another and artificial intelligence may include the control system of an AI agent learning from the environment (e.g., user feedback). For instance, a home control unit (e.g., voice assistant, home assistant, etc.) capable of learning preferences of a user (e.g. home temperature, music genre and schedule, cleaning schedule, alarm setting, etc.) from their actions over time is an example of artificial intelligence. Based on the preferences of the user learned over time, the control system of the home control unit may therefore, play a specific genre of music or set the shower to a specific temperature. If a second home control unit was introduced into the home, the control system of the first home control unit may share its intelligence with the control system of the second home control unit such that the control system of the second home control unit may learn the preferences of the user from the control system of the first home control unit, which may be considered collaborative intelligence. In some embodiments, the control system of each AI agent operating within the environment may learn from the environment (e.g., user feedback) and in some embodiments, may share their learned intelligence with the control systems of other AI agents to complete tasks more efficiently. For example, the control system of the second home control unit may learn from the control system of the first home control unit that the user prefers playing jazz music in the evening while the control system of the first home control unit may learn from the control system of the second home control unit what time the user prefers to wake up. In some embodiments, the control systems of AI agents may autonomously split tasks. For example, the control system of one home control unit may control home temperature while the control system of the other home control unit may control lighting in the home. In another example, a control system of a first surface cleaning robot shares its intelligence with a control system of a second surface cleaning robot and vice versa. In particular, the control system of the first surface cleaning robot may share with the control system of the second surface cleaning robot that the user likes the house cleaned at 8:00 AM and may learn from the control system of the second surface cleaning robot that its user prefers the house cleaned at 8:00 PM. By sharing such intelligence, both robots may autonomously collaborate with one another to schedule cleaning and determine, for example, cleaning location, cleaning time, and task allocation of each robot. In this way, multiple AI agents may collaborate to complete tasks by making decisions themselves without requiring user input to control their actions. In one example, the control system of a first robot learns that user A prefers a home temperature of 75° F. while the control system of a second robot learns that a user B prefers the home temperate at 73° F. The control systems of the robots may autonomously share intelligence and collaborate and may infer based on shared intelligence that a home temperature of 74° F. is best when both users are present and to set the temperature to the preferred temperature of each individual user when they are only present. In some instances, a user may choose AI agent settings. For example, control systems of two cleaning robots introduced into a same environment and with separate user preferences stored may share their respective stored user preferences with one another, however, a user may choose the new preferences if preferences chosen by the collaborating robots are not desired. The control systems of the robots may then learn the new user preferences for the future. In some embodiments, the control system of the robots may store the shared information and the user may choose preferences or settings. For example, a user of a first robotic cleaner may prefer that the robotic vacuum clean at 8:00 AM while a user of a second robotic cleaner, introduced into a same house, may prefer the robotic cleaner to clean at 8:00 PM. The control systems of the robots may share the cleaning preferences of their respective users with one another and may store the information online. A user may select a preferred time for cleaning by the robotic cleaners if the user does not want the robotic cleaners to clean the house more than once a day. The user may select that the robotic cleaners only clean at 8:00 AM or 8:00 PM rather than twice a day. The control systems of the robots may store this information and may share it as a user preference in the future. In some embodiments, information may be stored online, such as on the cloud, or may be stored on an external device.

In some embodiments, the control system of an AI agent may provide suggestions to a user based on learned preferences of the user. For example, a control system of a robot may combine music preferences of a large group of individuals attending an event and suggest songs to play. In another example, control systems of housekeeping robots working at separate locations of a hotel chain may learn room preferences of an individual that often travels for work and stays within the same hotel chain and may prepare the room for the individual based on statistical information and probabilities from data previously collected or may provide suggestions to the user. For instance, the control system of a robot may decide to turn on a warm shower for the user at 6:15 AM based on previous intelligence on the time the user woke up and the temperature of the shower the user used. Or the control system of the robot may provide the user with a suggestion to set the alarm for 6:15 AM based on previous intelligence on the time the user woke up.

Further methods of collaborative intelligence are described in U.S. patent application Ser. No. 15/981,643, the entire contents of which is hereby incorporated by reference.

In some embodiments, the two or more robotic devices, such as two or more of robotic dump trucks and robotic excavators, collaborate to generate a map of the environment (e.g., mining site in the case of robotic dump trucks and robotic excavators). In some embodiments, the robotic dump trucks and robotic excavators use distance sensors (e.g., LIDAR, sonar, depth camera, etc.) to measure the distance to objects within the environment within their respective fields of view. A processor of each robotic dump truck and excavator share their respective distance measurement with all or a select group of other robotic dump trucks and excavators operating within the same environment with whom a wireless DTC is established. In some embodiments, other or additional sensor data is shared among the processors of the robots (e.g., odometry data). In some embodiments, the processor of each robotic dump truck and excavator adjusts the distance data received from a remote source based on the location of the remote source with respect to the location of the robot receiving the distance data. To form a larger field of view, the processor of each robotic dump truck and excavator stores at least a portion of local and remote (i.e., from other robotic devices) measurements and uses them to create a larger field of view of the map by combining overlapping measurements taken within separate fields of view, using overlapping readings as attachment points. In some embodiments, at least a portion of measurement are stored in temporary memory such that the measurements are only available during an operational session or in more permanent forms of memory such that the measurements are available at the next session or startup. In other embodiments, the processor stores at least a portion of measurements remotely on an external device or the cloud. The method of sharing and combining local and remote readings taken by sensing devices mounted on various robotic dump trucks and robotic excavators operating within the same environment is repeated, such that processors may construct an extended map of the environment by combining readings collected locally and remotely by multiple sensing devices positioned at different locations throughout the environment, allowing the robots to see beyond the surroundings it has discovered itself. In some embodiments, the map of the environment is constructed using data collected locally and/or remotely from at least one sensing device. In some embodiments, the at least one sensing device is of the same type or of different types. In some embodiments, the data is collected over a period of time.

In some embodiments, processors of fixed sensing devices monitoring the environment (e.g., closed circuit television camera) and sensory devices that have previously operated within the same environment (e.g., data collected by sensors of a dump truck that previously worked within the environment six months ago) may also share their sensor readings. In some embodiments, a processor of one or more robotic devices shares data from a previously constructed map of the environment. In some embodiments, sensors mounted on the robotic dump trucks and robotic excavators move independently of the respective robot. In such cases, the processor receiving the sensor data uses the position of its mounted sensor in relation to the position of the remote mounted sensor to adjust the readings received.

In some embodiments, sensors take measurements within a 360-degree field of view of a two-dimensional plane or take measurements within a limited field of view of a two-dimensional plane, such as a 90-degree or 180-degree field of view. In some embodiments, sensors take measurements in three-dimension. In some embodiments, the line of sight of the distance sensor (or other types of sensors) is parallel to the plane on which the robot moves and in other embodiments, the line of sight of the distance sensor is at an angle to the plane on which the robot moves. In some embodiments, the processor constructs the map in a horizontal and/or vertical direction as measurements are combined. The direction in which the map expands depends on the field of view of the sensing devices by which the measurements to be combined were taken. For example, a processor that combines visual readings captured by a camera mounted on a first robotic excavator with a line of sight parallel to the plane on which the robot operates with overlapping visual readings captured by a camera mounted on a second robotic excavator with a line of sight at an angle to the plane on which the robotic excavators operate expands the map in a vertical direction. If the lateral edges of the fields of view of both cameras do not align perfectly, then the map also expands in a horizontal direction. In some embodiments, the environment is represented by a map constructed of plotted measurements or an ordered list of readings. In another embodiment, the environment is represented by a matrix, wherein every cell within the matrix is a coordinate representing an area within the environment. Other suitable forms of representing the environment are used in other cases.

In some embodiments, the processor identifies overlap by comparing the measurements from a first field of view with measurements from a second field of view (e.g., evaluates a plurality of candidate overlaps between two fields of view). In some embodiments, the processor identifies overlap when a number of consecutive (e.g., adjacent in pixel or spatial space) measurements from the first and second fields of view are equal or close in value to within a tolerance range, by recognizing similar patterns, by detecting similar features, by detecting similar objects using thresholding, and/or by using a convolution. For instance, if two separate types of distance sensors from different sources measure similar distance to within a tolerance range, the processor infers that the distances measured were to the same objects and combines the two sets of measurements using the similar measurements as connecting points. In another example, if the processor identifies the same sequence of pixel values in two depth images, the processor infers that both images captured the same location within the environment and combines them at overlapping points. In some embodiments, the processor identifies patterns by taking the rate of change of measurements for both sets of data and comparing them to find similar patterns in the rate of change. For example, if the processor compares the color depth of two images and they are both observed to have the greatest rates of change in similar locations, the processor hypothesizes that the two images have overlapping data points. In another example, the processor identifies the area of overlap between two sets of readings by detecting a sudden increase then decrease in the values of two sets of measurements. Examples include applying an edge detection algorithm (like Haar or Canny) to measurements from the different fields of view and aligning edges in the resulting transformed outputs. Other patterns, such as increasing values followed by constant values or constant values followed by decreasing values or any other pattern in the values of the measurements, may also be used to estimate the area of overlap. In another example, if the processor detects a unique sign in two images the processor infers that both images were taken at the same place and overlap. In some embodiments, the processor uses features such as edges, circles, curves, lines or other shapes to identify overlap between features captured in images. For instance, a sign captured in an image from two different perspectives contains enough overlapping features to combine the two images and create a 3D field of view. In some cases, the processor uses a convoluted neural network to identify certain features in an image and connecting points between multiple images. This is particularly useful when, for example, images are captured from different distances causing the environment to appear differently in each of the images captured. In another example, the processor uses thresholding to identify the area of overlap between two sets of data by detecting similar areas or objects of interest within two images as areas or objects having high range of intensity may be separated from a background having low range of intensity wherein all pixel intensities below a certain threshold are discarded or segmented, leaving only the pixels of interest. In yet another example, the processor implements a kernel function that determines an aggregate measure of differences (e.g., a root mean square value) between some or all of a collection of adjacent measurements in one data set relative to a portion of the other data set to which the kernel function is applied, determines the convolution of the kernel function over the other data set (e.g., for images, in some cases with a stride of greater than one pixel value), and selects a minimum value of the convolution as an area of identified overlap that aligns the portion of the data set from which the kernel function was formed with the data set to which the convolution was applied. In some embodiments, the processor identifies overlap using several different methods to increase the probability of a hypothesized overlap. In some embodiments, the processor uses each additional overlapping set of data to qualify or disqualify the hypothesized overlap between two sets of data. In some embodiments, the processor expands the area of overlap to include a number of data points immediately before and after (or spatially adjacent) the data points within the identified overlapping area. Once an area of overlap is identified (e.g., as a bounding box of pixel positions or threshold angle of a vertical plane at which overlap starts in each field of view).

In some embodiments, the processor uses a Jacobian and Hessian matrix to identify similarities between different sets of measurements. In some embodiments, the processor uses a metric, such as the Szymkiewicz-Simpson coefficient, to indicate how good of an overlap there is between two sets of data. In some embodiments, the processor uses the hamming distance between two sets of data to indicate confidence level of overlap between two sets of data. The hamming distance between two sets of data of equal length is the number of positions at which the corresponding readings from the two sets of data are different. For example, given one set of readings [12, 18, 22, 11] and a second set of readings [12, 16, 22, 13], the hamming distance is 2 as there are two positions between the two sets of data where corresponding readings are different. In some embodiments, the two sets of data are from two different sensing devices or are from the same sensing device and captured at different times. As the hamming distance between two sets of data decreases, the confidence level that the two sets of data overlap increases. In some embodiments, the processor determines the confidence level of overlap between data from two separate sensing devices by considering the past confidence level of overlap between previous data from the two sensing devices and the rate of change of error between data from the two sensing devices over time. In some embodiments, the processor assigns a level of confidence to overlap between two sets of data from two different sensors, one set being from a first sensor and the other set being from a second sensor, the sensors being different sensing devices. Over time the sets of data combined change, but they remain from the same first and second sensors. A high confidence level indicates a high confidence in overlap between sets of data from the first and second sensors. In some embodiments, one set of data (X) from a first sensor and another set of data (Y) from a second sensor may be used by the processor. Given that both sets of data are of equal length, the processor calculates the absolute difference between data X and data Y as the error, error=|X−Y|. This provides the processor with an indication of the level of confidence for overlap between the two sets of data presently considered. However, the processor considers previous levels of confidence in overlap between previous sets of data from the first and second sensors when determining the level of confidence for overlap between the two sets of data presently considered by calculating the error sum, $$\text{error sum} = \int_0^t \text{error } dt.$$

In some embodiments, the processor assigns the integral a limit such that only a limited portion of the history is considered. In some embodiments, the processor calculates a derivative $$D = \frac{\Delta \text{error}}{\Delta \text{time}}$$

and uses it in gauging the level of confidence in overlap between the two sets of data presently considered, wherein a large rate of change in the error decreases the level of confidence in overlap. In some instances, the processor uses the derivative as a best estimate of the future trend of the error in the overlap between a set of data from the first sensor and a set of data from the second sensor given the errors current rate of change.

In some embodiments, there are discrepancies between the values of overlapping measurements from two fields of view due to measurement noise. In some embodiments, the processor calculates new measurements, or selects some of the measurements as more accurate than others. For example, the processor combines the overlapping measurements from two or more fields of view using a moving average (or some other measure of central tendency, like a median or mode) and adopts them as the new measurements for the area of overlap. In some embodiments, the processor uses minimum sum of errors to adjust and calculate new measurements for the overlapping area to compensate for the lack of precision between overlapping measurements. In some embodiments, the processor uses the minimum mean squared error to provide a more precise estimate of measurements within the overlapping area. In other embodiments, the processor uses other mathematical methods to further process the sensor data within the area of overlap, such as split and merge algorithm, incremental algorithm, Hough Transform, line regression, Random Sample Consensus, Expectation-Maximization algorithm, or curve fitting, for example, to estimate more accurate measurements within the overlapping area. In another embodiment, the processor uses the k-nearest neighbors algorithm where each new measurement is calculated as the average of the values of its k-nearest neighbors.

In some embodiments, the processor implements DBSCAN on sensor data, e.g., in a vector space that includes both depths and pixel intensities corresponding to those depths, to determine a plurality of clusters, each corresponding to measurements of the same feature of an object. In some embodiments, the processor executes a density-based clustering algorithm, like DBSCAN, to establish groups corresponding to the resulting clusters and exclude outliers. To cluster according to, for example, depth vectors and related values like pixel intensity, some embodiments iterate through each of the depth vectors and designate a depth vector as a core depth vector if at least a threshold number of the other depth vectors are within a threshold distance in the vector space (which may be higher than three dimensional in cases where pixel intensity is included). In some embodiments, the processor then iterates through each of the core depth vectors and create a graph of reachable depth vectors, where nodes on the graph are identified in response to non-core corresponding depth vectors being within a threshold distance of a core depth vector in the graph, and in response to core depth vectors in the graph being reachable by other core depth vectors in the graph, where to depth vectors are reachable from one another if there is a path from one depth vector to the other depth vector where every link and the path is a core depth vector and is it within a threshold distance of one another. The set of nodes in each resulting graph, in some embodiments, may be designated as a cluster, and points excluded from the graphs may be designated as outliers that do not correspond to clusters. In some embodiments, the processor then determines the centroid of each cluster in the spatial dimensions of an output depth vector for constructing maps. In some cases, all neighbors have equal weight and in other cases the weight of each neighbor depends on its distance from the depth considered or (i.e., and/or) similarity of pixel intensity values.

In some embodiments, the processor uses a modified RANSAC approach where any two points, one from each data set, are connected by a line. The processor defines a boundary with respect to either side of the line. The processor considers any points from either data set beyond the boundary outliers and excludes them. The processor repeats the process using another two points. The process is intended to remove outliers to achieve a higher probability of the measurement being true. Consider an extreme case where a moving object is captured in two frames overlapping with several frames captured without the moving object. The processor uses the approach described or RANSAC method to reject data points corresponding to the moving object. This method or a RANSAC method may be used independently or combined with other processing methods described above.

In some embodiments, the processor fixes a first set of measurements and uses it as a reference while transforming the second set of measurements, overlapping with the first set of measurements, to match the fixed reference. In one embodiment, the processor combines the transformed set of measurements with the fixed reference and uses the combination as the new fixed reference. In another embodiment, the processor only uses the previous set of measurements as the fixed reference. In some embodiments, the processor iteratively revises the initial estimation of a transformation function to align the newly read data to the fixed reference to produce minimized distances from the newly read data to the fixed reference. The transformation function may be the sum of squared differences between matched pairs from the newly read data and prior readings from the fixed reference. For example, in some embodiments, for each value in the newly read data, the processor finds the closest value among the readings in the fixed reference. In a next step, the processor uses a point to point distance metric minimization technique such that it will best align each value in the new readings to its match found in the prior readings of the fixed reference. The processor may use a point to point distance metric minimization technique that estimates the combination of rotation and translation using a root mean square. The processor iterates the process to transform the newly read values using the obtained information. In some embodiments, the processor uses these methods independently or combines them to improve accuracy. In one embodiment, the processor applies the adjustment applied to overlapping measurements to other measurements beyond the identified area of overlap, where the new measurements within the overlapping area are considered ground truth when making the adjustment.

In some instances where linear algebra is used, the processor implements Basic Linear Algebra Subprograms (BLAS) to carry out operations such as vector addition, vector norms, scalar multiplication, matrix multiplication, matric transpose, matrix-vector multiplication, linear combinations, dot products, cross products, and the like.

In some embodiments, where images of the environment are captured, the processor stitches images together at overlapping features or pixels of a pixmap of the images. In some embodiments, the processor preprocesses images before determining overlap. For example, the processor may infer an amount of displacement of a depth camera between captured images, e.g., by integrating readings from an inertial measurement unit or odometer (in some cases after applying a Kalman filter), and then transform the origin for vectors in one image to match an origin for vectors in the other image based on the measured displacement, e.g., by subtracting a displacement vector from each vector in the subsequent image. In some embodiments, the processor reduces the resolution of images to afford faster matching, e.g., by selecting every other, every fifth, or more or fewer vectors, or by averaging adjacent readings to form two lower-resolution versions of the images to be aligned, then applies the resulting alignment to the two higher resolution images.

In some embodiments, the processor considers multiple variations of combinations when checking for overlap, each combination having different overlap, in order to filter through the data, determine if and where there is overlap, and if so, the combination which results in measurements with the highest confidence level. In some embodiments, the confidence level of the measurements from a local source have higher confidence level than readings received from remote sources or vice versa. In some embodiments, the processor assigns readings from different sources different confidence levels. In some embodiments, the processor implements a combination which results in measurements with higher confidence level into the map, otherwise the processor stores the (local or remote) data for future combinations. For example, if the processor of a robotic dump truck receives a set of readings from a remote source, such as a robotic excavator, which has a number of consecutive readings with values similar to the same number of consecutive readings within the map of the robotic dump truck, the processor combines the readings and if their combination results in readings with a higher confidence level the processor implements the combination into the map. If a third set of readings happens to overlap with the two sets of readings as well, the processor considers multiple variations of combinations between the three sets of data, and if the processor finds a combination which results in readings with higher confidence level than what is currently in the map, the processor will implement it into the map. In some embodiments, the processor calculates a probability of overlap between the two or more sets of data for multiple versions of combination between the two or more sets of data, each combination having a different area of overlap between the sets of data and uses the overlap with highest probability of overlap for stitching the two or more sets of data together. In some embodiments, two or more sets of data having a probability of overlap below a specified threshold are not combined.

In some embodiments, the processor replaces local measurements with low confidence level or noise with measurements observed remotely with higher confidence level and vice versa. For example, a processor replaces measurements of an area obstructed by a moving object by measurements from a fixed monitoring device, such as a CCTV camera, observing the same area as that captured in the obstructed frame. In some embodiments, the processor associates confidence level with resolution of a sensor, rate of capturing data, speed of transfer, time stamp, time-to-live, the number of hops of the information, etc.

In some embodiments, the processor assigns a weight to measurements taken by different sensing devices as certain sensing devices are more accurate than others under particular circumstances, such as weather conditions, geographical location, acoustic conditions, and the like. In some embodiments, the processor ignores readings if the weight of measurements taken by a specific sensing device is less than a predetermined threshold. For example, the readings from LIDAR sensors, cameras and sonar sensors each have different weight depending on the environmental conditions. Assuming the processor determines the weight based on weather conditions and geographical location, data collected from cameras for example, have a low weight under snowy conditions due to poor visibility while data collected from sonar sensors have a higher weight as sonar sensor measurements aren't as affected by snow. Under thunderstorm conditions or in areas with poor acoustics, for example, data collected by sonar sensors have lower weight as their performance is affected. In some embodiments, the processor compares measurements from different sensors and considers measurements from a sensor to be an outlier if they are significantly different from measurements taken by the other sensors, and consequently ignores them. In other embodiments, the processor ignores all or some measurements from a sensor if multiple measurements taken by the same sensor are not consistent. In some embodiments, if similarity in measurements taken by different sensors is observed, the processor assigns those measurements a higher weight and considers them to be more accurate.

In some embodiments, the confidence level of measurements within the map fluctuate. As the number of sets of overlapping measurements increases, the confidence level of overlapping measurements increases. However, since the confidence level of measurements decrease with motion, the confidence levels of the measurements within the map continuously fluctuate. For example, dead reckoning is used to calculate position, wherein each estimate of position is relative to the previous position. If displacement is measured using wheel rotation for example, displacement measurements have discrepancies due to slip and surface irregularities and since each estimate of position is relative to the previous position, confidence level decreases with motion as errors are cumulative.

In some embodiments, the methods and techniques described herein do not assume an inherent superiority in locally captured data versus remotely captured data. In some embodiments, the methods and techniques described herein rely on the degree of alignment between sets of data, as opposed to the source of the data. Furthermore, the methods and techniques described herein do not assume inherent superiority in the time stamp of captured data. For example, if a set of data captured by a remote sensor at time t produces higher confidence level than a set of data within the same field of view captured by a local sensor at some other time t', the processor replaces the data from the local sensor by those captured by the remote sensor. Some embodiments consider the time stamp of data as less important than the alignment between the data. For example, consider a robot moving in a one-dimensional world along a straight line in the x direction with constant positive or negative speed. At time $t_0$ the robot is at position $x_0$ and at time $t_1$, the robot is at position $x_1$, continuing along, at time $t_5$ the robot is at position $x_5$. To move the robot back to position $x_4$, the speed can acquire a negative value or time can be reversed and moved one step backwards to time $t_4$. Expanding the latter concept to a multidimensional day-to-day life where robotic devices have a state space of (x, y, θ) with the constraint of a static environment, there is no theoretical difference between, for example, robotic device A observing a feature $f_1(z)$ at state $(x_1, y_1, \theta_1)$ today and robotic device B observing the same feature $f_1(z)$ at state $(x_1, y_1, \theta_1)$ yesterday. In this example, time is irrelevant and data from the past, present, and future are considered by the processor when attempting to find the best alignment between sets of data. In one embodiment, the processor combines time stamps with state space to form a space-time framework with a given origin.

Construction of the map may be thought of as a puzzle, where each set of data is a piece belonging to the puzzle. Initially pieces considered are pieced together based on commonalities between puzzle pieces, such as shape and color, with some level of certainty. In the case of sensor data available to the processor, the processor pieces them together based on commonalities such as values of data or patterns in the data or similar features. As new puzzle pieces are considered over time, previously considered puzzle pieces are displaced if a new puzzle piece has a better fit in its position. In the same way, as new puzzle pieces are added previously considered puzzle pieces can find a better fit at another position with another puzzle piece. Therefore, pieces in the puzzle are constantly moving as new pieces are added in order for each piece to find its best fit within the entire puzzle. This is the same for sensor data used in constructing the map, where the processor is constantly moving sets of data based on achieving the best alignment and highest confidence level in measurements possible. Therefore, the processor is continuously evolving the map and the confidence levels of measurements are continuously fluctuating.

In some embodiments, the processor processes and translates sensor data into distance measurements and uses them to construct a map as described above. In some embodiments, the processor provides the distance measurements in a standardized measurement unit, such as millimeter or inches, for visualization purposes, or provides them in non-standard units. The processor may measure (or otherwise perceive or infer) distance in various ways. For example, the processor infers distance based (e.g., exclusively based on or in combination with other inputs) on pixel intensities from a depth image captured by a depth camera. Or the processor infers distances from the time it takes an infrared light (or sound) transmitted by a sensor to reflect off of an object and return back to the sensor or by a variety of other techniques. For example, using a time-of-flight camera, a processor estimates distance based on the time required for light transmitted from the camera to reflect off of an object and return to a camera, or using an ultrasonic sensor, the processor estimates distance based on the time required for a sound pulse transmitted from an ultrasonic transducer to reflect off of an object and return to the sensor. In some embodiments, one or more IR (or with other portions of the spectrum) illuminators (such as those mounted on a robot) projects light onto objects (e.g., with a spatial structured pattern (like with structured light), or by scanning a point-source of light), and the resulting projection is sensed with one or more cameras (such as robot-mounted cameras offset from the projector in a horizontal direction). In resulting images from the one or more cameras, the processor uses position of pixels with high intensity to infer distance (e.g., based on parallax, based on distortion of a projected pattern, or both in captured images).

In some embodiments, the processor uses raw data (e.g., sensed information from which distance has not been inferred), such as time required for a light or sound pulse to reflect off of an object or pixel intensity directly (e.g., without first inferring distance) in creating a map of an environment, which is expected to reduce computational costs, as the raw data does not need to be first processed and translated into distance values, e.g., in metric or imperial units. By directly using raw data of a sensor extra steps are bypassed and raw values and relations between the raw values may be used to perceive the environment and construct the map without converting raw values to distance measurements with metric or imperial units, for example. For example, the processor may use raw pixel intensity values to determine area of overlap between data captured within overlapping fields of view to combine data and construct a map of the environment. In the case of two overlapping images, the area in which the two images overlap contain similar arrangement of pixel intensities in at least a portion of the digital image. The processor detects this similar arrangement of pixels and stitches the two overlapping images at overlapping points to create a segment of the map of the environment without processing the raw data into distance measurements. In a further example, the processor raw time-of-flight data measured for multiple points within overlapping fields of view to find overlapping points between captured data without translating the raw times into distance measurements, and in some cases, without first triangulating multiple distance measurements from different poses to the same object to map geometry of the object. The processor identifies the area of overlap by recognizing matching patterns among the raw data from the first and second fields of view, such as a pattern of increasing and decreasing values. The processor detects matching patterns by using similar methods as those discussed above for detecting matching patterns in distance or sensor values taken within two overlapping fields of views. The processor combines overlapping raw data in a similar manner as that described above for combing overlapping distance or sensor measurements.

In some embodiments, maps are three dimensional maps, e.g., indicating the position of objects such as buildings, roads, walls, furniture, doors, and the like in an environment being mapped. In some embodiments, maps are two dimensional maps, e.g., point clouds or polygons or finite ordered list indicating objects at a given height (or range of height) above the driving surface. In some embodiments, the processor constructs two dimensional maps from two dimensional data or from three dimensional data where data at a given height above the driving surface is used and data pertaining to higher features are discarded. In some embodiments, maps may be encoded in vector graphic formats, bitmap formats, or other formats.

In some embodiments, the processor uses the constructed map to autonomously navigate the environment during operation, e.g., accessing the map to determine that a candidate movement path is blocked by an obstacle denoted in the map, to select a movement path with a movement path-finding algorithm from a current point to a target point, or the like. For example, robotic dump truck and robotic excavators collaboratively construct a map of the mining site and use the map to navigate around the mining site when the robotic excavators excavate soil and dump it into the robotic dump trucks and when the robotic dump trucks transport the soil to a soil dump site. In some embodiments, the processor constructs a new map at each use, or updates an extant map based on newly acquired data. Some embodiments reference previous maps during subsequent mapping operations. For example, embodiments apply Bayesian techniques to simultaneous localization and mapping and update priors in existing maps based on mapping measurements taken in subsequent sessions. Some embodiments reference previous maps and classify objects in a field of view as being moveable objects upon detecting a difference of greater than a threshold size.

In some embodiments, processors of robotic devices, such as robotic dump trucks, robotic excavators, and other large robotic machinery, operating within the same environment share their maps with each other using an established DTC link. In some embodiments, the processor of each robotic machinery merges two maps using different methods, such as the intersection or union of two maps. For example, in some embodiments, the processor applies the union of two maps to create an extended map of the environment with areas which may have been undiscovered in one of the two maps. In some embodiments, the processor creates a second map or places an existing (local or remote) map on top of a previously created map in a layered fashion, resulting in additional areas of the environment which may have not been recognized in the original map. Such methods may be used, for example, in cases where areas are separated by movable objects that may have prevented sensors from determining a portion of the map of the environment. For example, a large piece of machinery parked temporarily at a mine site may be a movable object that appears as a static object in one map. In this case, the processor creates a second map or places a local or remote second map on top of the previously created first map in a layered fashion to add areas to the original map which may have not been previously discovered. The processor then recognizes (e.g., determines) the area on which the large machinery was located may be important (e.g., warrant adjusting a movement path based on) in completing an assigned task.

Figure 3:
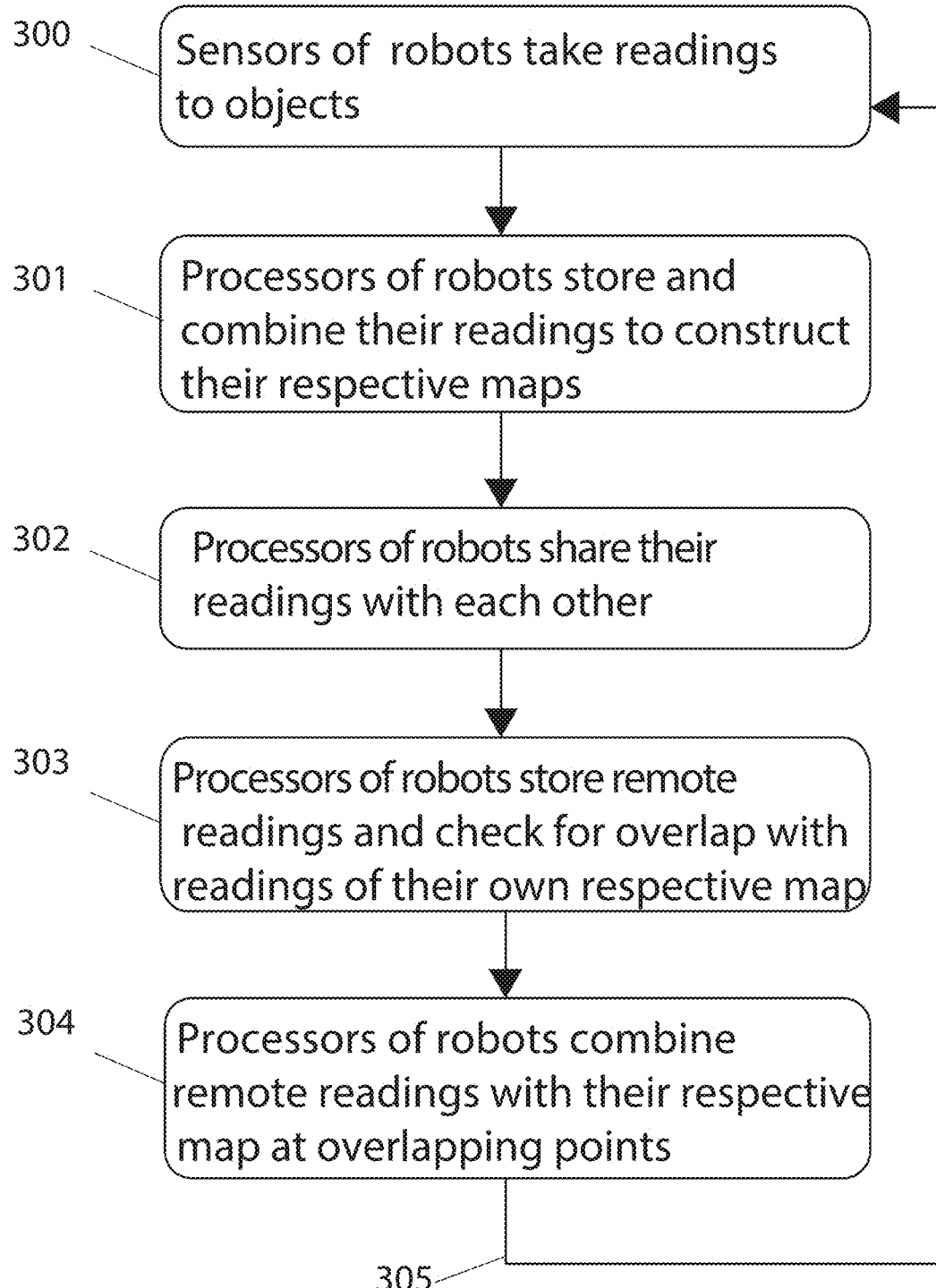
FIG. 3 illustrates a flowchart describing an example of a method for collaborative mapping, according to some embodiments.

FIG. 3 illustrates a flowchart describing a simple example of a method for collaboratively constructing a map of an environment. In a first step 300, a first sensor of a robotic dump truck and second sensor of a robotic excavator, both operating within the same environment, take measurements to objects within their respective fields of view. In a second step 301, a processor of each robotic device stores their local measurements in a memory and combines overlapping measurements to construct a map of the environment. In a third step 302, the processors of each robotic device share their measurements with one another using an established DTC. In a fourth step 303, the processor of each robotic device stores the measurements received from the remote source in their respective memories and checks if the remote measurements received overlap with any measurements within their respective maps. In a fifth step 304, the processor of each robotic device combines remote measurements overlapping with measurements within their respective map, using overlapping measurements as attachment points as described above. In a sixth step 305, the process is repeated as processors of the robotic devices operating within the same environment continue to share their measurements with one another, such that each processor may construct a map that provides knowledge of areas beyond those discovered by each processor itself. In some embodiments, the processor of a single robotic device generates a map of the environment individually using only their own data from their local sensors to create the map of the environment as described above.

Some embodiments additionally include user device having a touchscreen with a software application coupled to the robotic device. In some embodiments, the map of the area, including but not limited to doorways, subareas, perimeter openings, and information such as coverage pattern, room tags, order of rooms, etc. may be available to the user through a graphical user interface (GUI) such as a smartphone, computer, tablet, dedicated remote control, or any device that may display output data from the robotic device and receive inputs from a user. The map may be generated by data from sensors on the robotic device. Through the GUI, a user may review, accept, decline, or make changes to, for example, the environmental representation and settings and operations of the robotic device within the environment, which may include, but are not limited to, type of coverage algorithm of the entire area or each subarea, correcting or adjusting map boundaries and the location of doorways, creating or adjusting subareas (which in some instances are divided using doorways), order of cleaning subareas, scheduled cleaning of the entire area or each subarea, and activating or deactivating tools such as UV light, suction and mopping. In some embodiments, some segments within the map may correspond to virtual boundaries designated by a user. User inputs are sent from the GUI to the robotic device for implementation. Data may be sent between the robotic device and the user interface through one or more network communication connections. Any type of wireless network signals may be used, including, but not limited to, radio signals, Wi-Fi signals, or Bluetooth signals.

In some embodiments, the user assigns unique tags to each subarea, and embodiments receive this input and associate the unique tag (such as a human-readable name of a room, like "kitchen") with the area in memory. Some embodiments may receive instructions that map tasks to areas by these unique tags, e.g., a user may input an instruction to the robot in the form of "vacuum kitchen," and the robot may respond by accessing the appropriate map in memory that is associated with this label to effectuate the command. In some embodiments, the robotic device assigns unique tags to each subarea.

In some embodiments, the movement pattern of the robotic device during the mapping process is a boustrophedon movement pattern. This can be advantageous for mapping the environment. For example, if the robotic device begins in close proximity to a wall of which it is facing and attempts to map the environment by rotating 360 degrees in its initial position, areas close to the robotic device and those far away may not be observed by the sensors as the areas surrounding the robotic device are too close and those far away are too far. Minimum and maximum detection distances may be, for example, 30 and 400 centimeters, respectively. Instead, in some embodiments, the robotic device moves backwards (i.e., opposite the forward direction as defined below) away from the wall by some distance and the sensors observe areas of the environment that were previously too close to the sensors to be observed. The distance of backwards movement is, in some embodiments, not particularly large, it may be 40, 50, or 60 centimeters for example. In some cases, the distance backward is larger than the minimal detection distance. In some embodiments, the distance backward is more than or equal to the minimal detection distance plus some percentage of a difference between the minimal and maximal detection distances of the robot's sensor, e.g., 5%, 10%, 50%, or 80%.

The robotic device, in some embodiments, (or sensor thereon if the sensor is configured to rotate independently of the robot) then rotates 180 degrees to face towards the open space of the environment. In doing so, the sensors observe areas in front of the robotic device and within the detection range. In some embodiments, the robot does not translate between the backward movement and completion of the 180 degree turn, or in some embodiments, the turn is executed while the robot translates backward. In some embodiments, the robot completes the 180 degree turn without pausing, or in some cases, the robot may rotate partially, e.g., degrees, move less than a threshold distance (like less than 10 cm), and then complete the other 90 degrees of the turn.

The robotic device, in some embodiments, then moves in a forward direction (defined as the direction in which the sensor points, e.g., the centerline of the field of view of the sensor) by some first distance allowing the sensors to observe surroundings areas within the detection range as the robot moves. The processor, in some embodiments, determines the first forward distance of the robotic device by detection of an obstacle by a sensor, such as a wall or furniture, e.g., by making contact with a contact sensor or by bringing the obstacle closer than the maximum detection distance of the robot's sensor for mapping. In some embodiments, the first forward distance is predetermined or in some embodiments the first forward distance is dynamically determined, e.g., based on data from the sensor indicating an object is within the detection distance.

The robotic device, in some embodiments, then rotates another 180 degrees and moves by some second distance in a forward direction (from the perspective of the robot), returning back towards its initial area, and in some cases, retracing its path. In some embodiments, the processor may determine the second forward travel distance by detection of an obstacle by a sensor, such moving until a wall or furniture is within range of the sensor. In some embodiments, the second forward travel distance is predetermined or dynamically determined in the manner described above. In doing so, the sensors observe any remaining undiscovered areas from the first forward distance travelled across the environment as the robotic device returns back in the opposite direction. In some embodiments, this back and forth movement described is repeated (e.g., with some amount of orthogonal offset translation between iterations, like an amount corresponding to a width of coverage of a cleaning tool of the robot, for instance less than 100% of that width, 95% of that width, 90% of that width, 50% of that width, etc.) wherein the robotic device makes two 180 degree turns separated by some distance, such that movement of the robotic device is a boustrophedon pattern, travelling back and forth across the environment. In some embodiments, the robotic device may not be initially facing a wall of which it is in close proximity with. The robotic device may begin executing the boustrophedon movement pattern from any area within the environment. In some embodiments, the robotic device performs other movement patterns besides boustrophedon alone or in combination.

Further examples of mapping methods are described in U.S. patent application Ser. Nos. 16/048,179, 16/048,185, 16/163,541, 16/163,562, 16/163,508, 16/185,000, and 62/681,965, the entire contents of which are hereby incorporated by reference.

While the disclosure describes particular types of robotic devices, such as robotic dump trucks and robotic excavators, the methods and techniques described herein may be applied to various different types of robotic devices. For example, luggage robots, vacuum robots, mopping robots, robotic towing devices, robotic refuse container, robotic trash can, robotic food delivery device, robotic platform for transporting items, robotic hospital bed, first aid robots, robotic fire extinguisher, autonomous vehicles, and the like.

In some embodiments, the processor of the one or more robotic devices generates a movement path in real-time based on the observed environment. In some embodiments, processors of robotic devices, such robotic dump trucks and excavators, collaborating with one another, determine a movement path for each of the robots in real-time based on sensor observations captured by sensors of the collaborating robots. In some embodiments, a topological graph represents the movement path and is described with a set of vertices and edges, the vertices being linked by edges. Vertices may be represented as distinct points while edges may be lines, arcs or curves. The properties of each vertex and edge may be provided as arguments at run-time based on real-time sensory input of the environment. The topological graph may define the next actions of the robotic device as it follows along edges linked at vertices. While executing the movement path, in some embodiments, rewards may be assigned by the processor as the robotic device takes actions to transition between states and uses the net cumulative reward to evaluate a particular movement path comprised of actions and states. A state-action value function may be iteratively calculated during execution of the movement path based on the current reward and maximum future reward at the next state. One goal is to find optimal state-action value function and optimal policy by identifying the highest valued action for each state. As different topological graphs including vertices and edges with different properties are executed over time, the number of states experienced, actions taken from each state, and transitions increase. The path devised by the processor of the robotic device iteratively evolves to become more efficient by choosing transitions that result in most favorable outcomes and by avoiding situations that previously resulted in low net reward. After convergence, the evolved movement path is determined to be more efficient than alternate paths that may be devised using real-time sensory input of the working environment. In some embodiments, the reward is determined individually for the robotic device, or the reward is a cumulative reward of each of the two or more robotic devices collaborating with another. For example, the movement path chosen for each of the two or more robotic dump trucks and robotic excavators collectively maximizes the cumulative reward. Further, the states, actions, and outcomes experienced by one robotic device may be shared with other robotic devices operating within the same environment such that actions that resulted in poor outcome may be avoided. For example, if one robotic dump truck finds that the action of transitioning to a particular state results in the robotic dump truck becoming stuck on the way to dump excavated soil, this information is shared with other processors of robotic dump trucks such that they may avoid that particular action.

In some embodiments, the properties of the vertices and edges of the topological graph describing the movement path of the robotic device may be provided at run-time as an argument based on sensory input of the robotic device or other collaborating robotic devices. A property of a vertex may be, for example, its position and the number and position of vertices linked via edges. A property of an edge may be, for example, edge type such as a line or arc, edge length or radius depending on edge type, angular orientation and connecting vertices. In some embodiments, vertices and edges may also include other properties such as driving surface type (e.g., gravel, paved, hard wood floor, carpet, tile, etc.), area identifier (e.g., excavation area, soil dump site, parking lot, highway, bedroom, kitchen, etc.) and/or driving conditions (e.g., maximum speed). In some embodiments, the number of roots or nodes of the topological graph is limited to one. A vertex designated as a root within the topological graph by the processor of the robotic device is capable of reaching the whole graph from the designated vertex, i.e. there is a path from the root to all other vertices and edges within the graph.

As the processor receives sensory input (from a local or remote source), in some embodiments, it creates a representation of the map in a taxicab coordinate system and begins to devise a topological path within discovered areas, i.e. areas for which sensory input has been collected, the edges of the path being lines following along the gridlines of the taxicab coordinate system. Sensory input may be, for example, a collection of distance measurements. In some embodiments, distance measurements may be taken using distance measurement devices such as LIDAR, camera, laser, sonar, ultrasonic, stereo vision, structured light vision devices or chip-based depth sensors using CMOS or CCD imagers, IR sensors, and such. In some embodiments, other sensory input may be used, for example, data indicating driving surface type or obstacle detection. For example, optical driving surface sensors may detect a pattern of reflected light emitted onto the driving surface, which upon multiple stages of signal processing and machine learning embodiments may determine to a degree of certainty the type of driving surface upon which the robotic device drives. As a further example, obstacles may be detected by embodiments based on a sensed reflection of emitted light from an obstacle sensor. Tactile sensors may also be used by embodiments to provide sensory input to the processor when physical contact is made with an object. The devised topological path may be based on estimates of suitable properties for vertices and edges based on sensory input received. The next action or movement of the robotic device may be along a path defined by the estimated properties of the vertices and edges. As the robotic device executes the action, it transitions from its current state to a new state. After completing each action and transitioning to a new state, in embodiments, a reward may be assigned by the processor and a state-action value function may be iteratively calculated based on the current reward and the maximum future reward at the next state. In some embodiments, e.g., where time is not considered discrete, the value of the reward may be dependent on sequential time required to complete the action and transition to the new state, where a greater negative reward is assigned for longer times. As such, in some embodiments, the robotic device incurs a negative reward at all times. Since the robotic device is penalized for time, any event that may reduce the efficiency of the robotic device in terms of time to complete its task increases its overall penalty. These events may include collisions with obstacles, number of U-turns, repeat actions, driving distance, and driving on particular types of driving surfaces. In some embodiments, the processor uses these events to directly assign negative reward thereby acting as optimization factors themselves. In some embodiments, the processor uses other efficiency metrics, such as percentage or level of task completion. Once the robotic device completes its task and hence the topological movement path required to complete the task, a positive reward value (e.g., predetermined or dynamically determined) may be assigned. A net reward value for the executed movement path, consisting of a sequence of states and actions, may then be calculated as the sum of the cumulative negative reward from the multiple actions taken while transitioning from one state to another and the positive reward upon completion of the task. In some embodiments, the state is a collection of current states of the two or more robotic devices collaborating with one another and the reward is a cumulative reward of each of the two or more robotic devices collaborating.

As multiple work sessions are executed over time, in embodiments, optimal state-action value function and optimal policy from which actions from different states are selected may be determined. From a single state, there may be several actions that may be executed. The sequence of states and actions that result in the maximum net reward, in some embodiments, provides the optimal state-action value function. The action from a state which results in the highest reward provides the optimal policy for the given state. As different movement paths are executed over time, the number of states experienced, actions taken from each state, and transitions increase. In some embodiments, the processor devises a path for the robotic device iteratively over multiple work sessions, evolving to become more efficient by choosing transitions that result in most favorable outcomes and by avoiding situations that previously resulted in low net reward. In some embodiments, properties for each movement path are selected within an assigned work cycle such that the cumulative penalty value for consecutive work cycles have a lowering trend over time. In some embodiments, convergence to a particular movement path may be executed by the processor of the robotic device when the reward is maximized or a target reward is achieved or a period of time has passed after which the processor may converge the movement path to the path with highest reward. After convergence, assuming the system did not fall into a local minimum or is able to get out of a local minimum, the evolved movement path may be deemed by the processor of the robotic device to likely be more efficient than alternate paths that may possibly be devised using real-time sensory input of the working environment. For example, processors of multiple robotic dump trucks and robotic excavators collaborate with one another to determine the movement path of each of the robotic dump trucks and robotic excavators that minimizes the time required for the excavators to excavate the soil and load it into the robotic dump trucks and for the robotic dump trucks to dump the soil at the soil dump site and return empty for another load of excavated soil, resulting in maximum reward for the system of robotic dump trucks and excavators collaborating with each other.

In some embodiments, the processor may avoid falling into a local minimum using techniques such as random restarts, simulated annealing and tabu search. For example, in employing random restarts technique, the processor may randomly restart the process of searching for a candidate solution starting at a new random candidate after a certain amount of time, while still saving in memory previous candidate solutions. In some embodiments, wherein simulated annealing technique is used, the processor replaces a current candidate solution when a better solution is found but may also probabilistically replace the current candidate solution with a worse solution. In some embodiments, using tabu search technique, the processor refuses to return back to recently considered candidate solutions until they are sufficiently in the past. This is expected to provide a more reliable and efficient method for a robotic device to devise path plans as their movements are evaluated and optimized in real-time, such that the most efficient movements are eventually executed and factors reducing efficiency, including but not limited to, repeat coverage, collisions with obstacles, particular types of driving surfaces and U-turns, are reduced with the fine-tuning of properties over time.

The states and actions of the robotic device (or of multiple robotic devices) devising and executing the movement path may be represented by a Markov Chain comprised of a sequence of random variables $s_1$, $s_2$, $s_3$, . . . . The random variables are states the robotic device may experience and form a set S called the state space. The topological graph defining the movement path of the robotic device may therefore be thought of as a sequence of states s E S, where states are connected by paths and are each defined with a discrete time stamp t E T. For the robotic device to transition from a current state s to next state s the robotic device performs an action a E A over a time span of t to t', displacing a distance d along an edge of the topological graph. When the state space is defined by a taxicab coordinate system, the distance d is given by the rectilinear distance or L1 norm and displacement is along a line. For a Markov chain, having Markov property, the probability of moving to a next state $P(s'|s)$. is dependent only on the present state. A Markov chain may, therefore, be represented by a topological graph, where the edges of graph t are labelled by the probabilities of transitioning from one state at time t to another at time t'. A Markov chain may be extended to a Markov Decision Process (MDP) through the addition of actions (choices) and rewards (motivation), such that there are multiple actions that may be chosen from a single state and a different reward associated with each action. MDP is a five-tuple comprising a finite set of states S, a finite set of actions A, the probability that action a will lead to state s' at time t' given by $P(s'|s)$, the immediate reward after transitioning from state s to state s' given by r, and the discount factor $\gamma$, representing the difference in importance between future and present rewards. The goal of the MDP is to find an optimal state-action value function by identifying sequence of states and actions with highest net reward. Since multiple actions may be taken from each state, the goal is to also find an optimal policy that indicates the action from each state with the highest reward value. Given that the MDP is explained above, the implementation of the MDP by the processor is not repeated for this particular application. In the particular application of determining optimal movement path, the sequence of states and actions corresponds to the states visited and actions taken while executing the movement path from start to finish, where actions are defined by the properties of vertices and edges chosen based on sensory input from sensors of the robotic device or sensors of other robotic devices or fixed sensing devices. Over time, as more states are visited and different actions from each state are evaluated the system will converge to find the most optimal action to take from each state thereby forming an optimal policy. Further, as different sequences of states and actions, i.e. movement paths, are evaluated over time, the system will converge to the most optimal sequence of states and actions.

In some embodiments, the processor of the robotic device may employ topological geometry to spatially relate objects. In some embodiments, the processor of the robotic device may use topological geometry to perform transformation of objections, such as, translation, rotation, reflection, stretching, bending and twisting, but neighborhoods, i.e. spatial relations, may remain preserved. For example, a circular curve centered within a larger circular curve contains a point P between the two circular curves and a point Q within the smaller circular curve. After transformation, the smaller circular curve has been stretched and bent to become a rectangular slit but remains within the larger circular curve. To preserve neighborhoods, the point P must remain between the two curves while the point Q must remain within the inner curve. In some embodiments, the topological graph is similar to a Euclidean graph, such that the movement path described by the graph consists of a set of vertices and edges. However, in a Euclidean graph the edges are limited to being lines and the lines connecting vertices are equal to the Euclidean distance. This means the path between two vertices is always equal to the shortest path between them. In topological geometry, the edge may be a line, arc, or curve, hence the path between two vertices may not necessarily be the shortest path as in Euclidean geometry. Further, with topological graph, the elements of the graph, namely vertices and edges, may be deformed by means of variation in assigned properties. With topological geometry, any movement path may be devised with path elements, such as vertices, edges, and their associated properties. For example, a boustrophedon movement path, characterized by back and forth movement, may be considered equivalent to a set of vertices linked by edges, the vertices having properties defining position and angular orientation of linked vertices and the edges having properties defining edge type, such as a line, with given length, angular orientation and connecting vertices. As a further example, a spiraling movement path may be defined by a set of vertices linked by edges having edge type property of an arc, the radius of the arc increasing linearly at each step to achieve the spiraling movement.

In some embodiments, the processor implements the movement path within a taxicab coordinate system thereby reducing the dimensionality of the topological graph. In taxicab geometry, all paths follow along gridlines of the coordinate system, thereby limiting edge type to a line. Further, the distance metric between vertices is the rectilinear distance or L1 norm $$d(p, q) = |p - q| = \sum_{i=1}^{n} |p_i - q_i|,$$

wherein (p, q) are vectors $p=(p_1, p_2, \ldots, p_n)$ and $q=(q_1, q_2, \ldots, q_n)$. With taxicab geometry, the rectilinear distance between the two points is independent of the structure of the path following along the gridlines of the taxicab coordinate system.

In some embodiments, sensory data is assumed to be independent and identically distributed (IID), where each observation has the same probability distribution as all other observations and all observations are mutually independent. If observations are defined to assume values in $\mathbb{I} \subseteq R$, then two random variables X and Y are identically distributed if and only if $P[x \geq X]=P[x \geq Y]$, $\forall x \in \mathbb{I}$ and are independent if and only if $P[y \geq Y]=P[y \geq Y|x \geq X] \wedge P[x \geq X]=P[x \geq X|y \geq Y]$, $\forall x, y \in \mathbb{I}$. In some embodiments, the sensory input may go through various layers of mathematical processing, such as feature scaling, Bayesian probabilistic methods, and the like. Sensory input may include distance measurements or other measurements from which distance of objects may be inferred, such as time-of-flight or pixmap. As the robotic device (or robotic devices in the case of collaborating robots) moves along the devised topological path, the processor of the robotic device continues to receive sensory data (either from a local or remote source). The sensory data is used to revise and expand the map as well as revise the properties of vertices and edges defining the topological path. As more sensor data is collected a better perception of the environment is revealed and the map becomes more accurate and inclusive of the area. The topological path may consist of any number of vertices and edges, depending on the shape, size, etc., of the area discovered, and may be arranged in any number of ways. Because of the stochastic nature of the work place and partial observability, despite the efforts of processor to propose an optimal path, there may exist better paths which were not obvious to the processor at the time of decision making. However, over time the topological path is optimized by, for example, combining vertices by passing or eliminating an edge, removing or adding vertices, and/or edges and changing the direction or position of vertices and/or edges. In embodiments, the robotic device may begin to start performing work before exploration of the entire area is complete. In such cases, the processor is likely to choose movements that are locally optimal but not globally optimal.

In some embodiments, the processor of the robotic device (or processors of robotic devices, in case of multiple robotic devices collaborating to complete a task) evaluates different movement paths while offline (e.g., between work sessions, such as between excavating sessions for robotic dump trucks and robotic excavators) using sensory input of the working environment previously collected and stored in memory of, or otherwise accessible to, the robotic device. Or in some cases, such processing may be offloaded to a remote application, e.g., a processor in a charging state or cloud-based infrastructure. In some embodiments, the processor of robotic device experiments with (e.g., simulates and determines outcomes from) previously executed and new movement paths. Properties of vertices and edges are inferred from previously collected sensory input. In some embodiments, the processor of the robotic device is able to enhance and fine-tune movement paths while offline (or some embodiments may perform these actions online). The estimated time required to complete a task (e.g., cleaning a room with greater than threshold area coverage) is used to calculate a theoretical net reward value. The movement path with the greatest theoretical net reward value may be executed at the next cleaning cycle and based on measured performance (e.g., time to clean) the true net reward value may be determined. Some embodiments may determine a difference between estimated and measured performance and adjust model parameters to reduce the difference.

Figure 4:
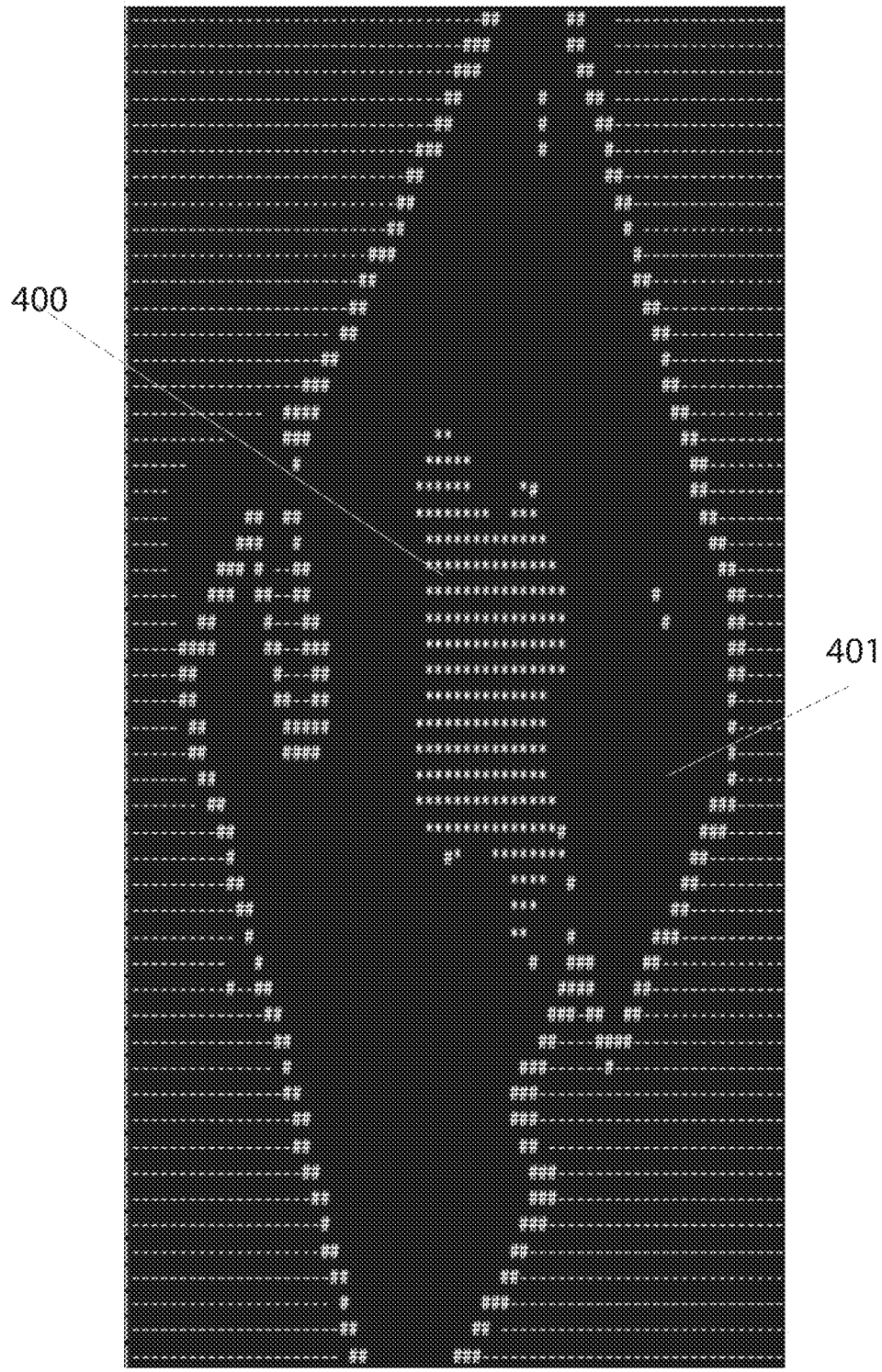
FIG. 4 illustrates an example of a map including high and low obstacle density areas, according to some embodiments.

In some embodiments, the processor instructs the robotic device to avoid entering and working in areas with high density of obstacles until finishing work in other areas such that the robotic device can finish majority of the work before potentially becoming stuck. FIG. 4 illustrates an example of a map wherein area 400 is an area of high obstacle density. For a robotic cleaner, for example, this may be where several pieces of furniture are located. The processor instructs the robotic cleaner to clean areas 401 with low obstacle density before cleaning area 400 to avoid getting stuck in the high obstacle density area 400 before the majority of the area is cleaned.

Figure 5:
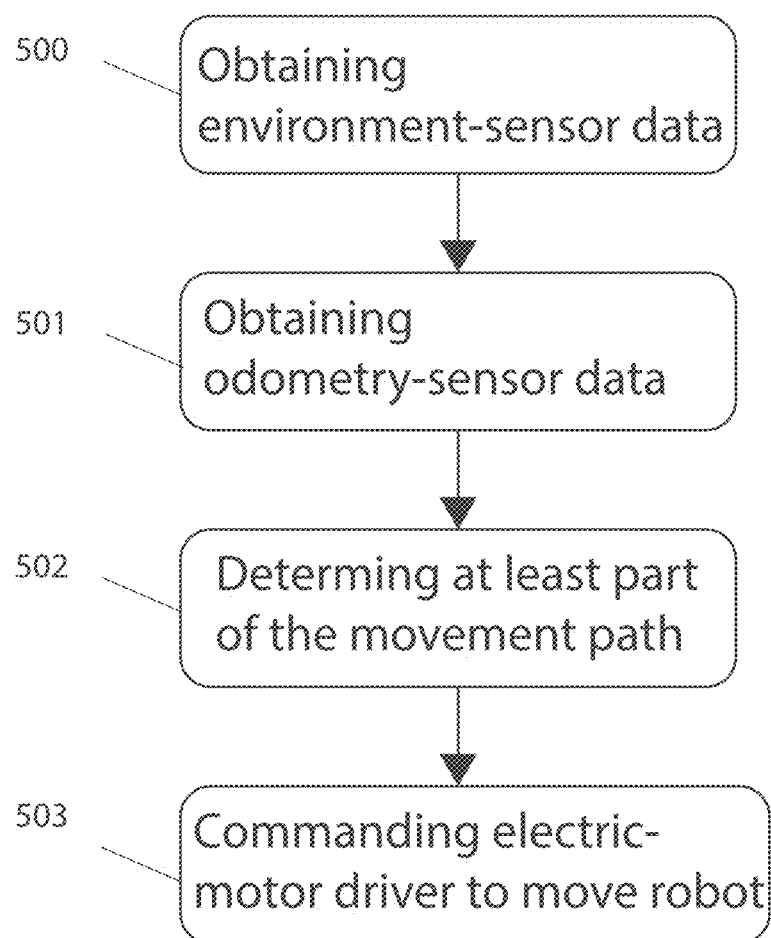
FIG. 5 illustrates a flowchart describing an example of a path planning method, according to some embodiments.

FIG. 5 illustrates a flowchart describing an example of a path planning method of a robotic device including steps 500, 501, 502, and 503. In a first step 500, the processor obtains environment-sensor data. In a second step 501, the processor obtains odometry-sensor data. In a third step 502, the processor determines at least a part of the movement path based on the sensor data. And, in a fourth step 502, the processor commands the electric-motor drive to move the robot along the at least the port of the movement path. Other path planning methods are described in U.S. patent application Ser. Nos. 16/041,286, 15/406,890, and 14/673,633, the entire contents of which are hereby incorporated by reference.

In some embodiments, the processor of the robotic device (or processors of robots collaborating with one another to complete a task) may determine an optimal (e.g., locally or globally) coverage of the environment by minimizing a cost function or by maximizing a reward function. For example, processors of robotic dump trucks and robotic excavators collaborating with one another determine an optimal excavating plan of a mining site such that excavation of soil by the robotic excavators, alignment of the robotic dump trucks for receiving excavated soil, placement of the excavated soil into the dump trucks by the robotic excavators, and transportation of the excavated soil to a soil dump site by the robotic dump trucks is as efficient as possible. The processor of the robotic device may divide a environment A into n zones $A_1, A_2, \ldots, A_n \subset A$ wherein the index indicates the order of coverage of the zones. For example, the robotic excavators may first excavate zone $A_1$, followed by zone $A_2$, and so on. Or a first robotic excavator may excavate zone $A_1$ and second excavator may excavate zone $A_2$, and so on, dividing the areas to be excavated between the collaborating robotic excavators to complete the task more efficiently. In some embodiments, zones $A_1, A_2, \ldots, A_n$ may overlap. For example, there may be indices i and j, for which $i \neq j$ and $A_i \cap A_j \neq 0$. In some embodiments, zones $A_1, A_2, \ldots, A_n$ may not collectively represent the entire area of environment A, wherein the condition $U_i A_i = A$ may not be fulfilled. In some embodiments, the overall cost function C of a zone or an environment may be calculated by the processor of a robotic device based on a travel and operation cost K and coverage L. In some embodiments, other factors may be inputs to the cost function. For example, the processor may use $C = \omega_1 K - \omega_2 L$ to determine cost, wherein weights $\omega_1, \omega_2 \geq 0$ may be used to adjust importance of travel and operation cost and coverage. The processor attempts to minimize the travel and operation cost K and maximize coverage L. In some embodiments, the processor determines the travel and operation cost K by computing individual cost for each zone and adding the required driving cost between zones. The driving cost between zones may depend on where the robot ended coverage in one zone, and where it begins coverage in a following zone. An operating cost function F for a zone $A_i$ may be specified, such that given zone $A_i$ and starting position $g_i$ of the robotic device, the processor may compute operation cost $h_i$ and final position $f_i$ of the robotic device using $h_i, f_i = F(A_i, g_i)$. The operation cost $h_i$ may be dependent on factors such as the movement path of the robotic device, coverage time, etc. Upon completion of coverage of zone $A_i$, the processor may actuate the robotic device to move towards the closest position $g_{i+1}$ within the next zone $A_{i+1}$ to be covered, i.e., $$g_{i+1} = \underset{g \in A_{i+1}}{\operatorname{argmin}} D(f_i, g).$$

The function $D(f_i, g)$ may be used by the processor to determine distance from final position $f_i$ to every possible position $g \in A_{i+1}$. In some embodiments, the processor uses a travel cost function $T(f_i, g_{i+1})$ for driving from final position $f_i$ of zone $A_i$ to starting position $g_{i+1}$ of zone $A_{i+1}$ given final position $f_i$ and starting position $g_{i+1}$ to determine travel cost $p_{i+1} = T(f_i, g_{i+1})$. Therefore, the processor determines the travel and operation cost $K_i$ for a zone $A_i$ using $K_i = h_i + p_i$. And, the processor determines the total travel and operation cost for all zones $A_1, A_2, \ldots, A$, of environment A using $$K = \sum_{i=1}^{n} K_i = \sum_{i=1}^{n} h_i + p_i.$$

In some embodiments, the processor determines the coverage for the environment using $L = \|U_i A_i\|$, wherein the norm may refer to the square meters of area covered (or otherwise area operated on) by the robotic device.

Figure 6A:
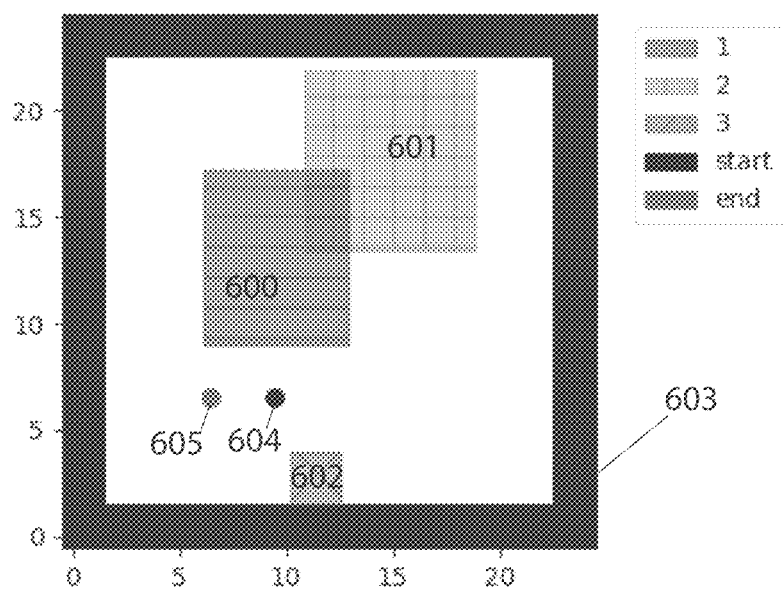
FIGS. 6A-6C illustrate embodiments of a method for optimizing surface coverage of a continuous space with rectangular zones, embodying features of the present techniques and executed by some embodiments.
Figure 6B:
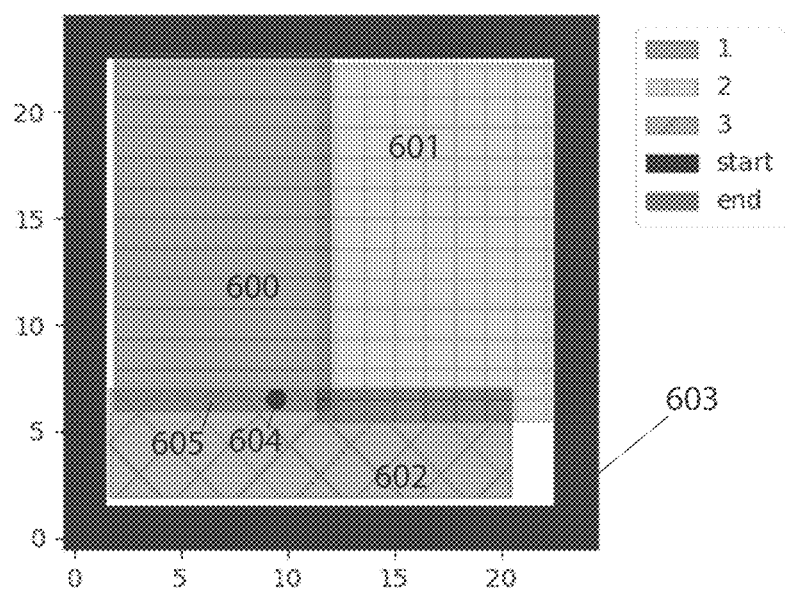
Figure 6C:
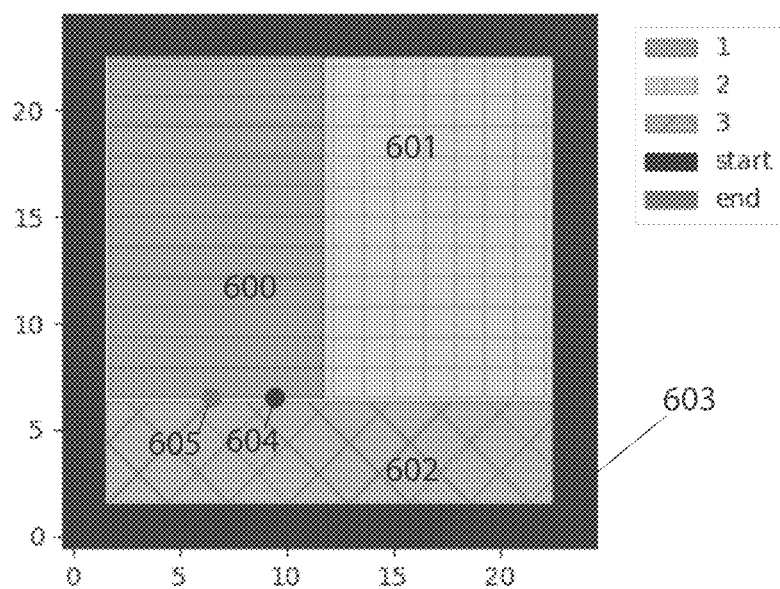

In some embodiments, the processor of the robotic device minimizes the total cost function $C = \omega_1 K - \omega_2 L$ by modifying zones of environment A by, for example, removing, adding, shrinking, expanding, moving and switching the order of coverage of zones. For example, in some embodiments the processor may restrict zones to having rectangular shape, allow the robotic device to enter or leave a zone at any surface point and permit overlap between rectangular zones to determine optimal zones of a environment. In some embodiments, the processor includes or excludes additional conditions. Since a rectangle may be defined by x, y coordinates of its center, its width and its height, the processor defines zones of a environment using an n×4 array of floating point numbers. The processor may initially create and order rectangular zones for coverage by the robotic device (or multiple robotic devices in the case of collaboration among multiple AI robots, for example rectangular zones of areas to be excavated by collaborating robotic excavator and robotic dump trucks). In some embodiments, the processor uses gradient descent to compute the division of zones (i.e. size, location) that results in minimal cost, as defined by the cost function C, by iteratively modifying division of zones based on a partial derivative of the cost function with respect to each respective parameter defining the zones. The processor determines gradient descent for a zone $A_i$ using $$A_i = A_i - h \frac{\partial c}{\partial A_i},$$

wherein h is the step size of the gradient descent. In some embodiments, the processor determines derivatives of the cost function C with respect to each of the four variables defining the rectangle by using, in some embodiments, a finite difference approximation. FIGS. 6A-6C illustrate an implementation of gradient descent. In FIG. 6A rectangular zones 600, 601 and 602 of environment 603 are shown.

Units along the x- and y-axis may be feet or other unit of measurement. A robotic device begins at point 604 then sequentially covers zones 600, 601, and 602 and ends at point 605. The initial coverage is not ideal. To improve coverage, the processor applies gradient descent. Since the cost function is based on coverage, the zones may be expanded by embodiments in the direction of uncovered areas and avoid overlap. For instance, embodiments may determine partial derivative of the cost function with respect to parameters of the zones that indicate such an adjustment will tend to reduce the cost locally. To lower traveling cost, the proximity of zones with respect to other zones to be covered immediately before and after is increased (i.e. distance between sequentially ordered zones is reduced) by the processor. FIGS. 6B and 6C illustrate the steps in an iterative process of gradient descent and optimization of coverage. Some embodiments may iteratively adjust until a stopping condition is reached, e.g., until there is less than a threshold amount of change between sequential iterations in cost. FIG. 6B illustrates expansion of rectangular zones 600, 601, and 602 to improve coverage while FIG. 6C illustrates further optimization of coverage and traveling cost by the processor such that there is no overlap between zones 600, 601, and 602 and the border of each zone is adjacent to the border of those zones to be covered immediately before and after.

Figure 7A:
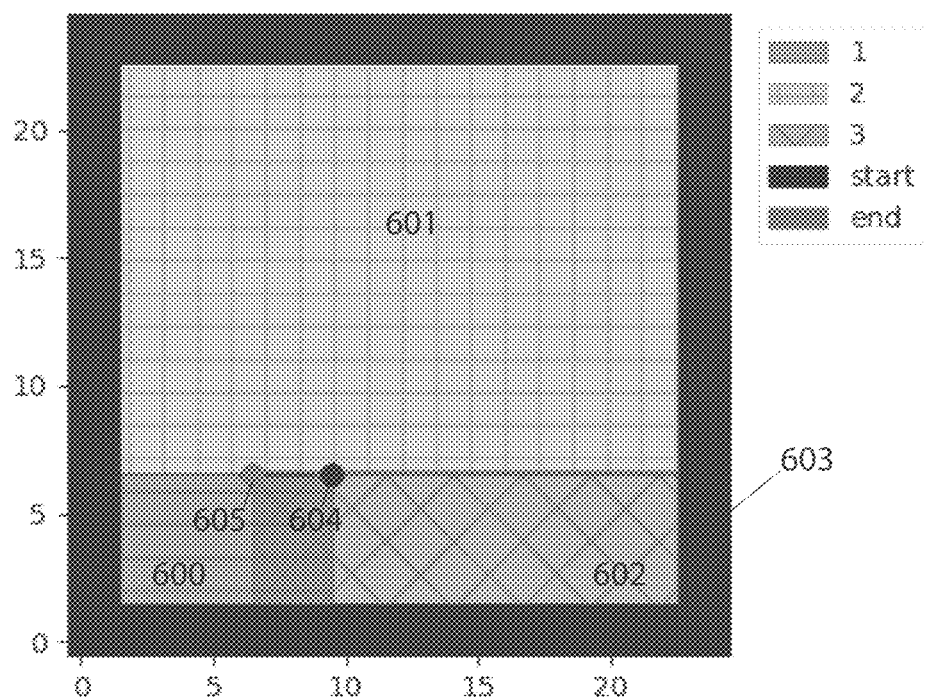
FIGS. 7A and 7B illustrate an example of deadlock encountered during optimizing surface coverage of a workspace.
Figure 7B:
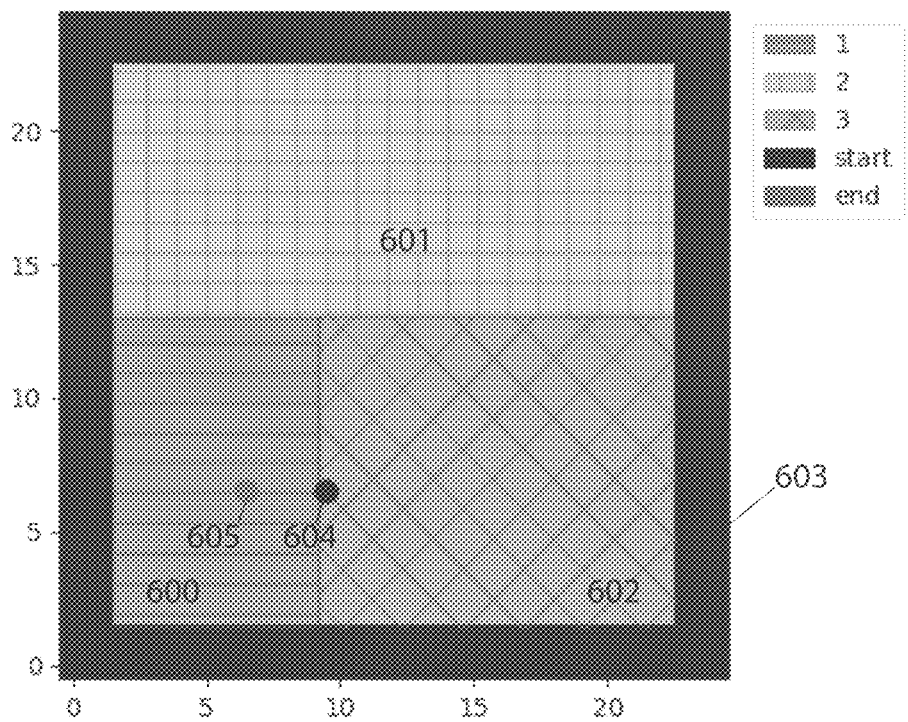

In some embodiments, the processor may use various functions to further improve optimization of coverage of the environment. These functions may include, a discover function wherein a new small zone may be added to large and uncovered areas, a delete function wherein any zone with size below a certain threshold may be deleted, a step size control function wherein decay of step size in gradient descent may be controlled, a pessimism function wherein any zone with individual operating cost below a certain threshold may be deleted, and a fast grow function wherein any space adjacent to a zone that is predominantly unclaimed by any other zone may be quickly incorporated into the zone. In some embodiments, deadlocking may occur when, for example, stuck in local maximum or minimum or when driving distance measure fails to account for perimeters (e.g., walls, buildings, or other areas the robot cannot travel). Some embodiments may implement stochastic gradient descent to reduce the effects of local minima or maxima. Another example of deadlock is illustrated in FIG. 7A between zones 600 and 602 as they are both competing for the same area with the same priority. Zone 600 desires expansion towards starting point 604 as coverage begins in zone 600 and zone 603 desires expansions towards ending point 605 as coverage ends in zone 603. Such a situation may be avoided by beginning coverage in zone 603 and ending in zone 600. Alternatively, the weights in the cost function for coverage and travel and operating cost may be adjusted. For example, if more weight is given to travel and operating cost, zones 600, 601 and 603 may be as illustrated in FIG. 7B wherein overlap between zones 601 and 603 is observed as traveling distance between zones results in larger penalty than overlap between zones.

In some embodiments, the cost accounts for additional features other than or in addition to travel and operating cost and coverage. Examples of features that may be inputs to the cost function may include, coverage, size, and area of the zone, zone overlap with perimeters (e.g., walls, buildings, or other areas the robot cannot travel), location of zones, overlap between zones, location of zones and shared boundaries between zones. In some embodiments, a hierarchy may be used by the processor to prioritize importance of features (e.g., different weights may be mapped to such features in a differentiable weighted, normalized sum). For example, tier one of a hierarchy may be location of the zones such that traveling distance between sequential zones is minimized and boundaries of sequential zones are shared, tier two may be to avoid perimeters, tier three may be to avoid overlap with other zones and tier four may be to increase coverage.

In some embodiments, the cost function may be integrated with MDP wherein the processor of the robotic device finds the division of zones, order of coverage of zones, movement path, etc. that minimizes the cost function, thereby maximizing the reward of the MDP.

Figure 8A:
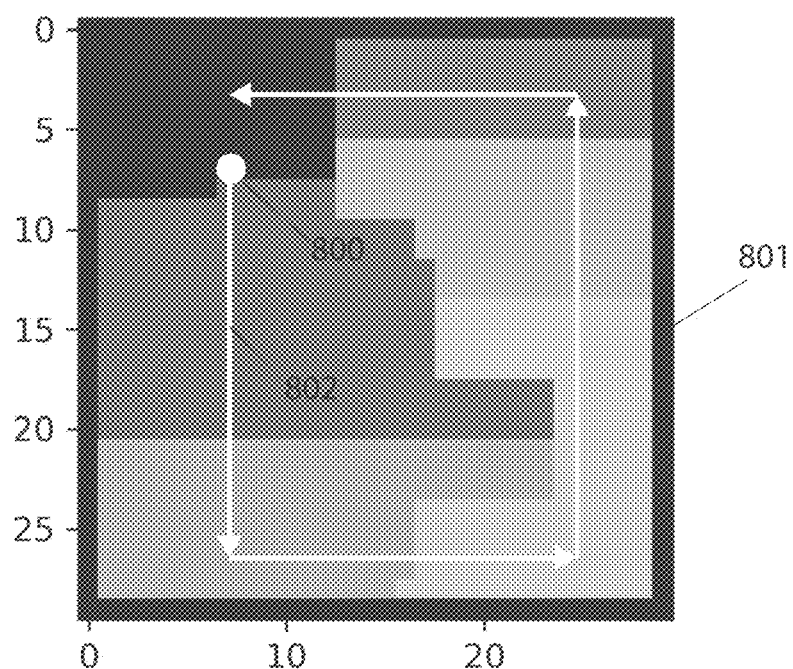
FIGS. 8A and 8B illustrate patterns followed by embodiments implementing a method for optimizing surface coverage of a discrete space with rectangular zone, according to some embodiments.
Figure 8B:
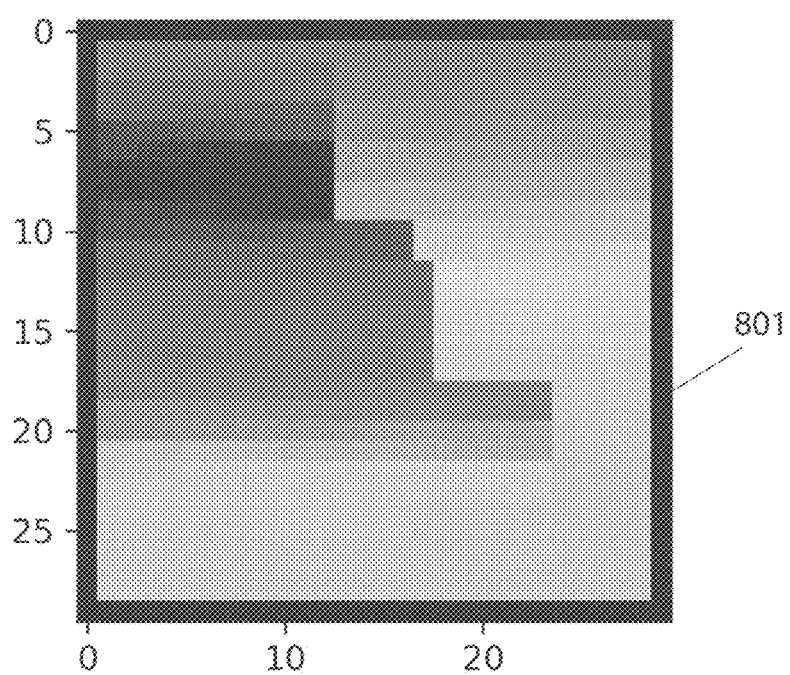
Figure 9:
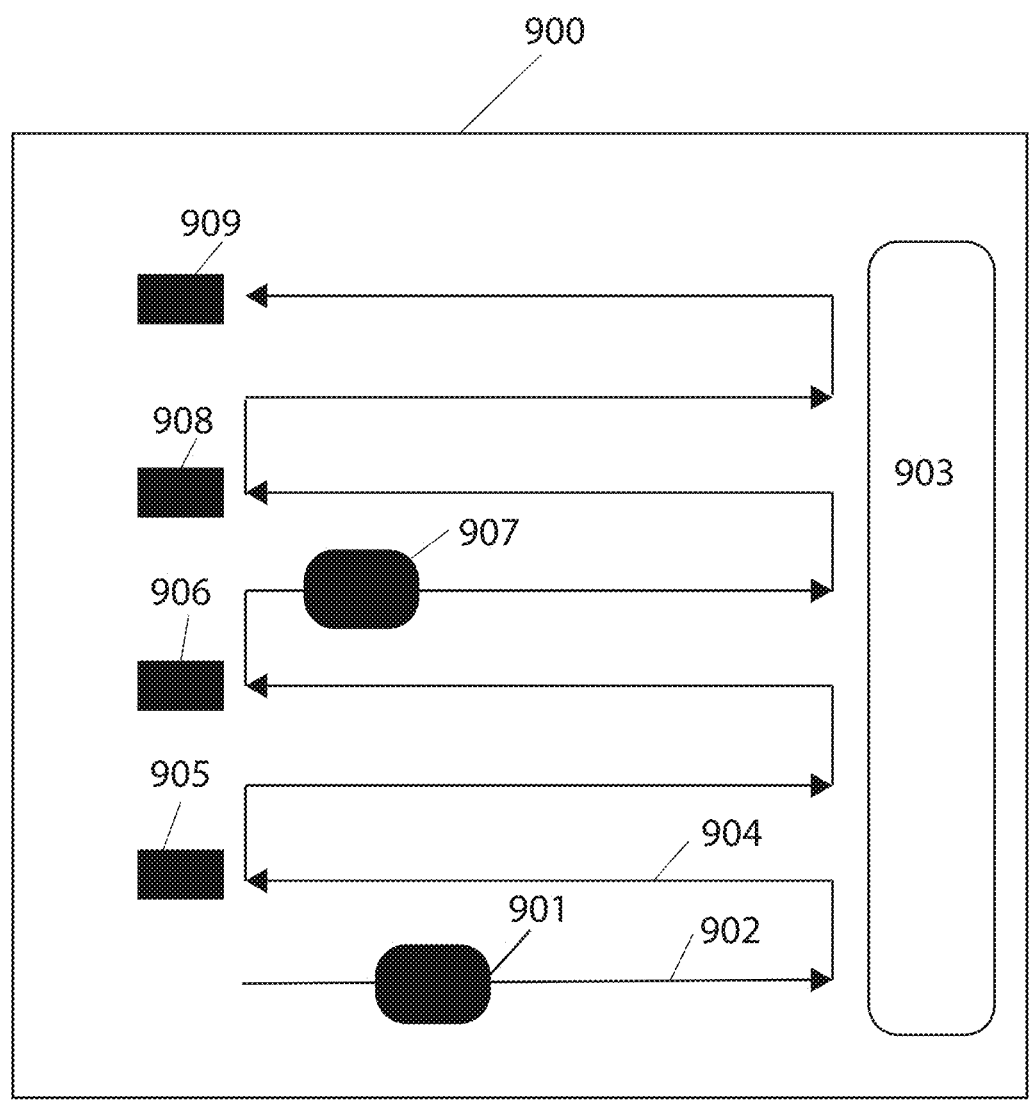
FIG. 9 illustrates an example of a boustrophedon movement pattern with a zone, according to some embodiments.

In some embodiments, the processor represents the environment using a coordinate map including a collection of cells, and zones may have the form of any connected component on the coordinate map. In such embodiments, the coordinate map of the environment is represented using a matrix wherein each entry corresponds to a coordinate cell of the environment and zones may be represented using a matrix corresponding to a portion of the coordinate cells of the environment. In some embodiments, each cell of the environment can only belong to a single zone, overlap between zones is avoided by construction. Entries in the matrices of zones may have a value of zero if the corresponding cell of the environment is empty or may have a value of one if the cell is occupied by, for example, a wall or building or static object. Zones may initially be created and ordered for coverage by the processor of the robotic device. In some embodiments, to optimize division of zones of an environment, the processor proceeds through the following iteration for each zone of a sequence of zones, beginning with the first zone: expansion of the zone if neighbor cells are empty, movement of the robotic device to a point in the zone closest to the current position of the robotic device, addition of a new zone coinciding with the travel path of the robotic device from its current position to a point in the zone closest to the robotic device if the length of travel from its current position is significant, execution of a coverage pattern (e.g. boustrophedon) within the zone, and removal of any uncovered cells from the zone. In some embodiments, additional steps may be included in the iteration or certain steps described may be omitted, which is not to suggest that any other process herein is not also amenable to such variation. In some embodiments, additional functionalities may be used by the processor such as, placement of a new zone in any large, uncovered areas to increase discovery speed, deletion of areas with size below a certain threshold and aggressive growth of efficient zones wherein efficiency may be measured by for example, coverage time or coverage path. FIG. 8A illustrates zone segmentation resulting from execution of some examples of the iteration described herein with coverage beginning and ending at point 800 of environment 801. Order of coverage is shown by arrow 802. FIG. 8B illustrates the boustrophedon pattern executed for coverage of environment 801 represented by the back and forth striations within each zone and leading from one zone into another. For example, in FIG. 9 the boustrophedon pattern in a zone 900 is the movement path of a first robotic excavator 901, traveling in a first direction 902 to excavate area 903, then travelling in a second direction 904 to dump the excavated soil in a first robotic dump truck 905, then traveling in the first direction again to excavate area 903, then travelling in the second direction again to dump the excavated soil in a second robotic dump truck 906, in front of the first robotic dump truck 905, and so on and so forth, with a second robotic excavator 907 following the same path ahead. Robotic excavators travel along boustrophedon movement path as they excavate area 903 and transport the excavated soil to lined up robotic dump trucks 905, 906, 908, and 909 in sequential order.

Figure 10A:
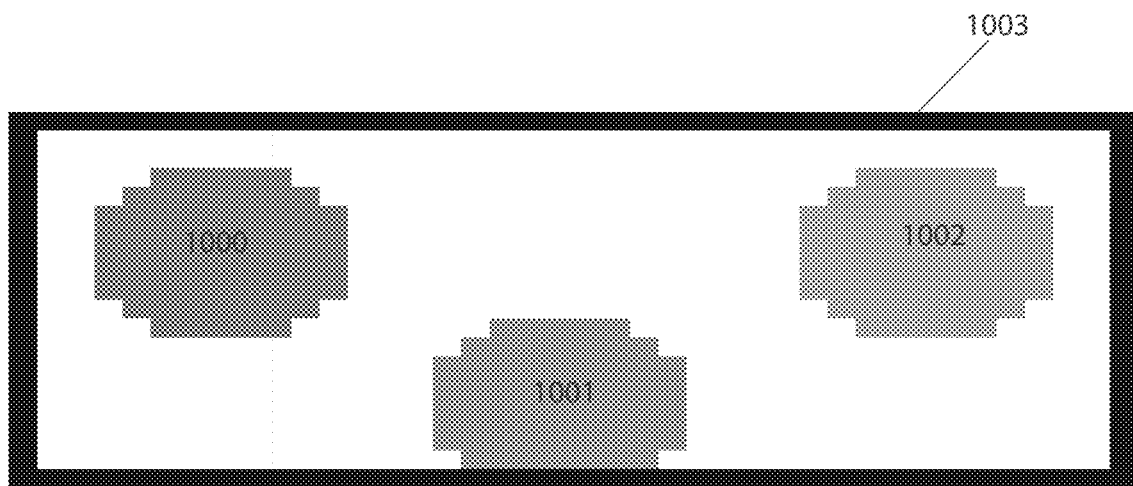
FIGS. 10A and 10B illustrate patterns followed by embodiments implementing a method for optimizing surface coverage of a discrete space with arbitrarily shaped zones, according to some embodiments.
Figure 10B:
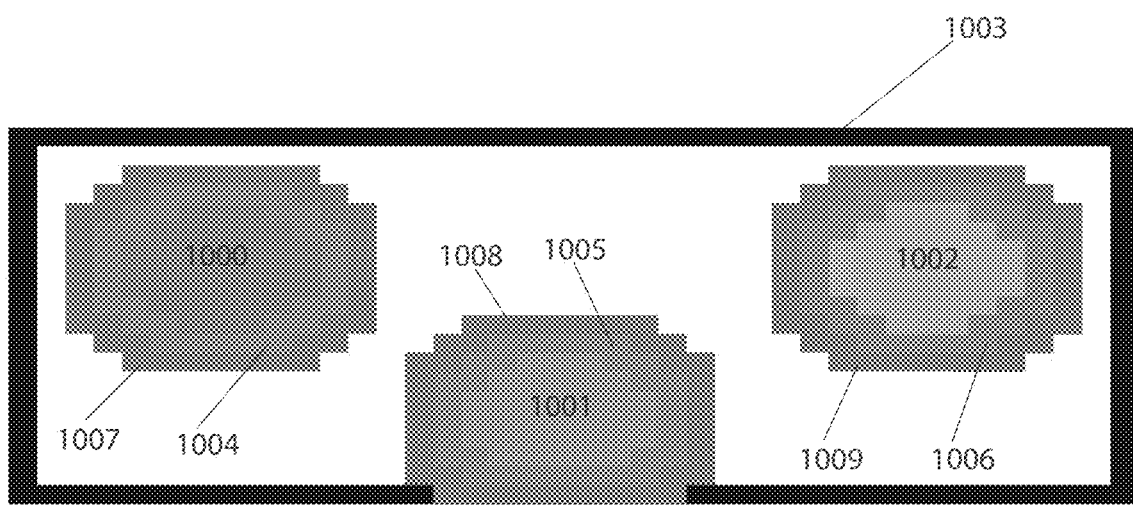

In some embodiments, the processor determines optimal division of zones of an environment by modeling zones as emulsions of liquid, such as bubbles. For instance, some embodiments may determine a Euclidean Steiner tree with Steiner vertices that define zone corners and correspond to obstacles. In some embodiments, the processor creates zones of arbitrary shape but of similar size, avoids overlap of zones with static structures of the environment and minimizes surface area and travel distance between zones. In some embodiments, behaviors of emulsions of liquid, such as minimization of surface tension and surface area and expansion and contraction of the emulsion driven by an internal pressure are used in modeling the zones of the environment. To do so, in some embodiments, the environment is represented by a grid map and divided into zones by the processor. In some embodiments, the processor converts the grid map into a routing graph G consisting of nodes N connected by edges E. The processor represents a zone A using a set of nodes of the routing graph wherein $A \subset N$. The nodes are connected and represent an area on the grid map. In some embodiments, the processor assigns a zone A a set of boundary edges E wherein a boundary edge $e=(n_1, n_2)$ connects a node $n_1 \in A$ with a node $n_2 \notin A$. Thus, the set of boundary edges clearly defines the set of boundary nodes $\partial A$, and gives information about the nodes, which are just inside zone A as well as the nodes just outside zone A. Boundary nodes in zone A may be denoted by $\partial A^{in}$ and boundary nodes outside zone A by $\partial A^{out}$. The collection of $\partial A^{in}$ and $\partial A^{out}$ together are all the nodes in $\partial A$. FIG. 10A illustrates zones 1000, 1001, and 1002 and wall 1003 of a environment. FIG. 10B illustrates zones 1000, 1001, and 1002 with $\partial A^{in}$ boundary nodes 1004, 1005, and 1006 and $\partial A^{out} \partial A$in boundary nodes 1007, 1008, and 1009, respectively. In some embodiments, the processor expands a zone A in size by adding nodes from $\partial A^{out}$ to zone A and reduces the zone in size by removing nodes in $\partial A^{in}$ from zone A, allowing for fluid contraction and expansion.

Figure 11A:
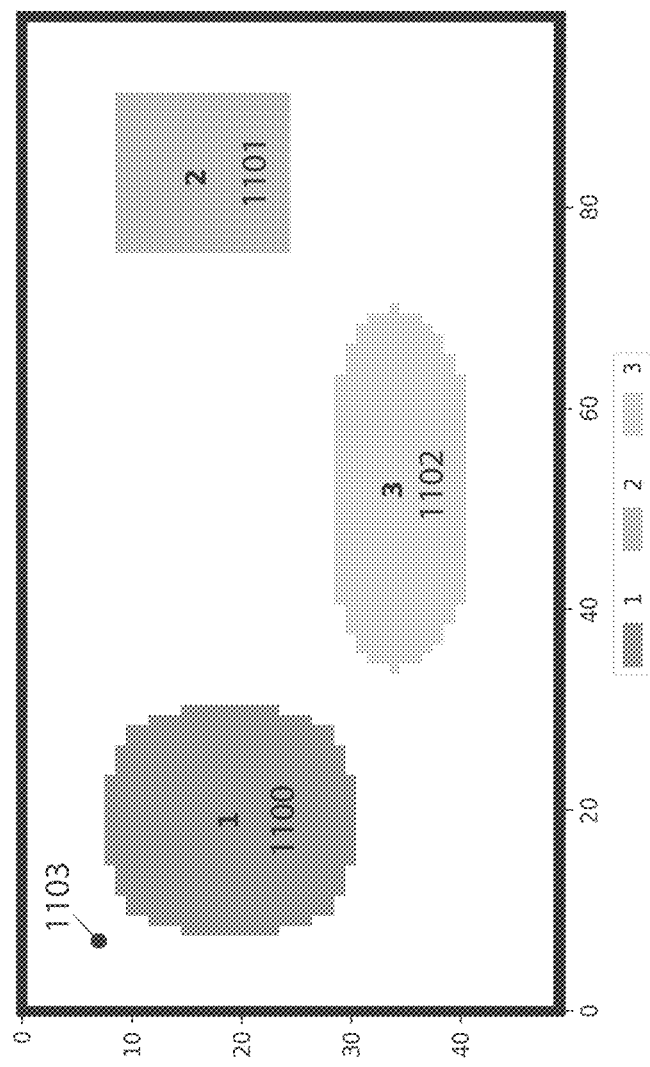
FIGS. 11A-11C illustrate example measures of area and distance from the center of a zone used in assigning a numerical value to boundary nodes of a zone, in accordance with some embodiments.
Figure 11B:
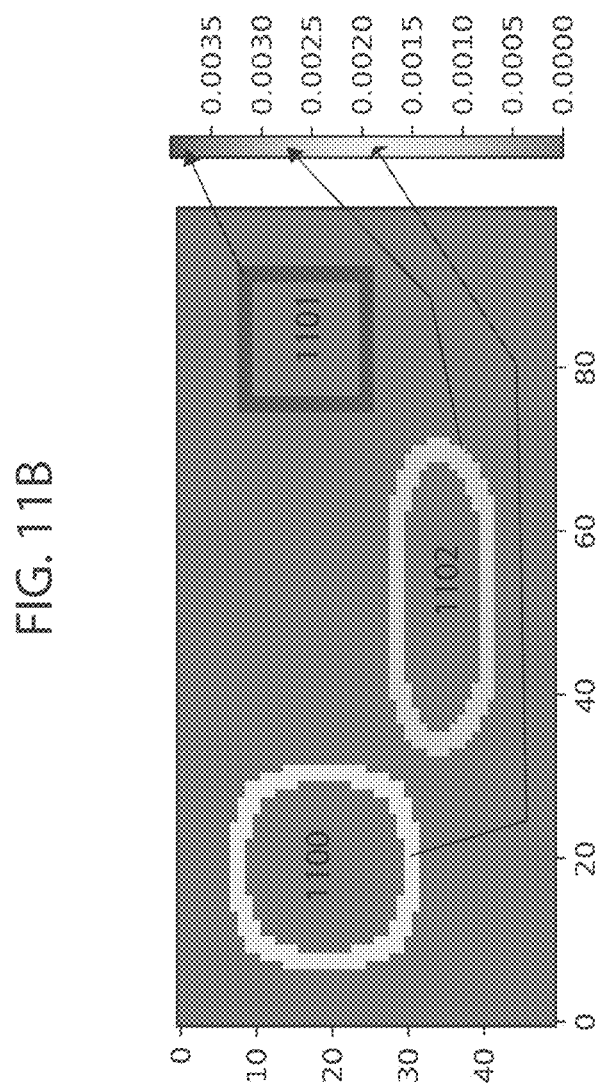

In some embodiments, the processor determines a numerical value to assign to each node in $\partial A$, wherein the value of each node indicates whether to add or remove the node from zone A. The processor may, for example, compute a numerical value for each node in $\partial A$ for each zone $A_1$, $A_2, \ldots, A_n$, of an environment. Depending on the value of each node in $\partial A$, each node is either removed from zone A, added to zone A or moved to another zone by the processor. In some embodiments, the numerical value computed may be dependent on growth (if the area is small) and decay (if the area is large) of the zone, distance of the node from the center of the zone, order of zone coverage, and a surface smoother score. For example, for a boundary node of a zone, the processor evaluates growth and decay of the zone and distance of the node from the center of the zone by using $$\frac{c_1}{a} + \frac{c_2}{d^2},$$

wherein a is area of the zone, d is the distance of the node from the center of the zone and $c_1$, $c_2$ are constants which dictate the importance of each term in the equation. FIG. 11A illustrates zones 1100, 1101, and 1102 with same start and end point 1103. In FIG. 11B values for $$\frac{1}{a}$$

are shown for boundary nodes of zones 1100, 1101 and 1102.

$$\frac{1}{a}$$

for each boundary node within the same zone is equal in value as indicated by the consistent color of boundary nodes in each zone. Arrows indicate approximate value of boundary nodes for each zone. In comparing boundary nodes from different zones, boundary nodes belonging to smaller zones result in a greater value for $$\frac{1}{a}$$

is indicated by the color of boundary nodes of different zones. Smaller areas with greater value for $$\frac{1}{a}$$

may indicate desired growth of the zone.

Figure 11C:
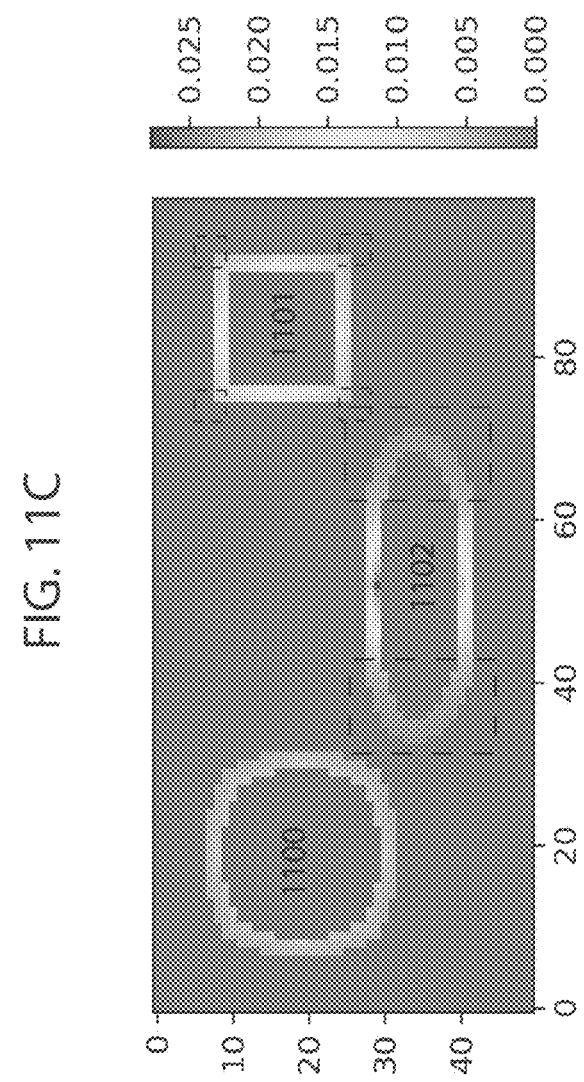

FIG. 11C illustrates values of $$\frac{1}{d^2}$$

for boundary nodes of zones 1100, 1101, and 1102. There is not significant difference in the value of $$\frac{1}{d^2}$$

for boundary nodes in zone 1100 as it is circular. For zone 1101 boundary nodes located at the corners, bounded by dashed lines, are further from the center and therefore have a smaller value for $$\frac{1}{d^2}$$

as compared to boundary nodes along the edges of zone 1102. This is indicated by the inconsistent color between boundary nodes further away from and closer to the center of the zone. Similarly, with zone 1102 being long and slender, boundary nodes located in the middle section are closer to the center of the zone and therefore have greater value for $$\frac{1}{d^2}$$

while boundary nodes on the ends of zones 1102, bounded by dashed lines, are further away and have smaller value for $$\frac{1}{d^2}.$$

In embodiments, wherein the processor of the robotic device uses the order of zone coverage to compute the numerical value of each node in ∂A, nodes closer to the previous or next zone to be covered increase the numerical value of each node in ∂A. In some embodiments, the processor calculates an order score using, for example, $$c\left(\frac{1}{az+1}+b\right)$$

wherein a, b, c are constants and $$z = \frac{x - x_{min}}{x_{max} - x_{min}}$$

wherein x is the distance between the boundary node of interest and the closest boundary node in the next zone to be covered, $x_{min}$ is the distance between the closest boundary nodes between the current zone and the next zone to be covered while $x_{max}$ is the distance between the furthest boundary nodes between the current zone and the next zone to be covered. In some embodiments, the order score is then computed by the processor, with z calculated using the current zone and previous zone covered and the order score calculated using the next zone to be covered and previous zone covered are combined by the processor. The constant a controls how sharp the drop of the function is between $x_{min}$ and $x_{max}$, b shifts the entire function along the y-axis such that the threshold for assigning negative score may be controlled and c scales the value of the function.

Figure 12:
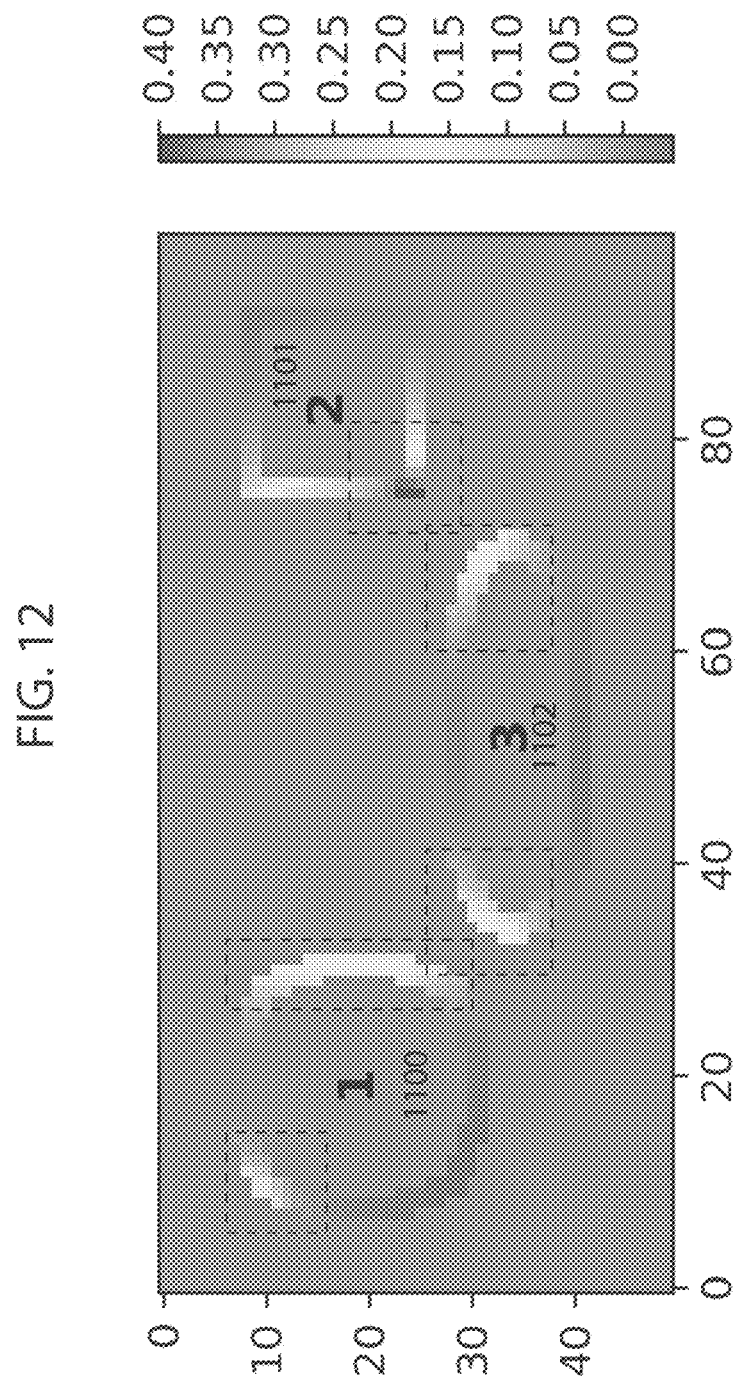
FIG. 12 illustrates an example measure for order of zone coverage used in assigning a numerical value to boundary nodes of a zone, according to some embodiments.

FIG. 12 illustrates the order score for boundary nodes of zones 1100, 1101, and 1102 with same start and end point 1103 (FIG. 11A). The constants used in the illustrated example are a=15, b=−0.2, c=0.1. Boundary nodes of each zone closer to the previous zone covered (or start point) and next zone to be covered (or end point), bounded by dashed lines, have greater score. In some embodiments, individual scores based on growth and decay of the zone, distance of the node from the center of the zone and order of zone coverage are combined by the processor to determine overall numerical value of each node in ∂A, wherein areas of zone A containing nodes with high numerical value indicate expansion while those containing nodes with low numerical value indicate contraction. However, in some embodiments the result produced by the processor may be segmented and have non-smooth borders. Therefore, in embodiments a surface smoother score may also be used by the processor in determining the numerical value of each node in ∂A. For each node in ∂A, the processor uses a local 3-by-3 grid, wherein for example, the node is at the center of the grid. In some embodiments, other grid sizes may be used. The number of nodes within the grid within the same area (e.g. inner or outer boundary areas) as the boundary node of interest may be counted by the processor and the overall score of the boundary node may be multiplied by the counted number in order to smoothen boundaries. In some embodiments, the processor of the robot may determine the numerical value of each node in ∂A of zone A by combining scores for growth and decay of the zone, distance of the node from the center of the zone, order of zone coverage and surface smoother.

Figure 13A:
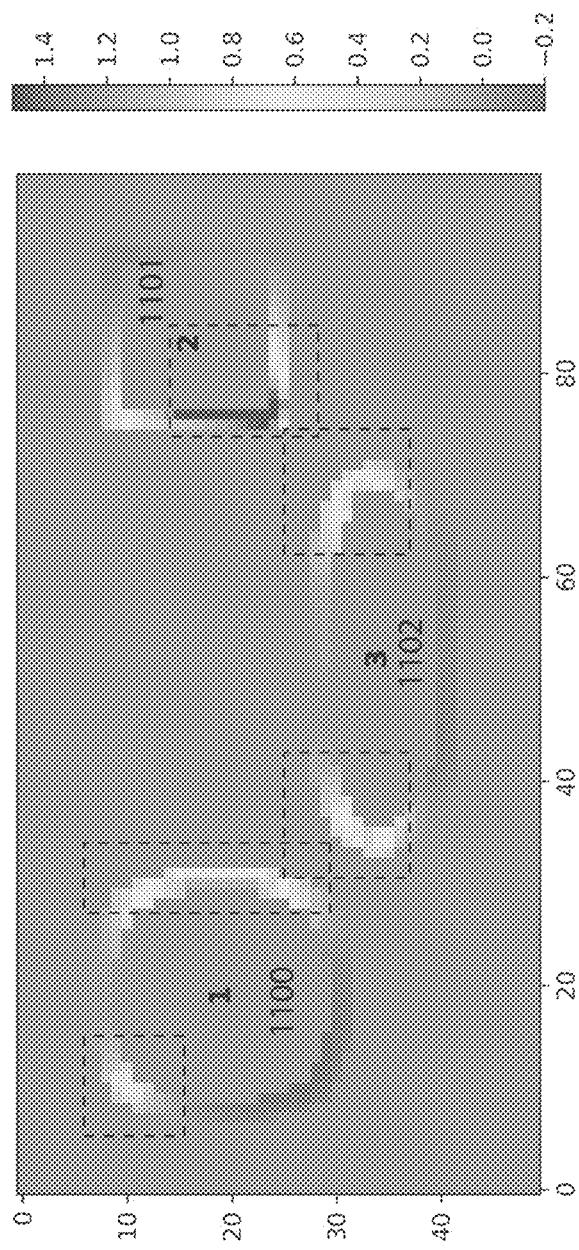
FIGS. 13A and 13B illustrate example numerical values of boundary nodes of zones and expansion/contraction of zones based on magnitude of numerical values of boundary nodes, according to some embodiments.

For example, FIG. 13A illustrates numerical values of boundary nodes for zones 1100, 1101 and 1102 with start and end point 1103 (FIG. 11A) computed by the processor by combining scores for growth and decay of the zone, distance of the node from the center of the zone, order of zone coverage and surface smoother. Areas of zones 1100, 1101, and 1102 containing nodes with high numerical value, bounded by dashed lines, indicate expansion while nodes in other areas with low numerical value indicate contraction. For example, boundary nodes with numerical value less than some value may be removed by the processor while those with numerical value above some value may be added. In this way, the processor may expand a zone A in size by adding nodes from $\partial A^{out}$ (outer boundary nodes) to zone A and may reduce its size by removing nodes in $\partial A^{in}$ (inner boundary nodes) from zone A. Some embodiments may iteratively make such adjustments until a stopping condition, such as an equilibrium, is detected.

Figure 13B:
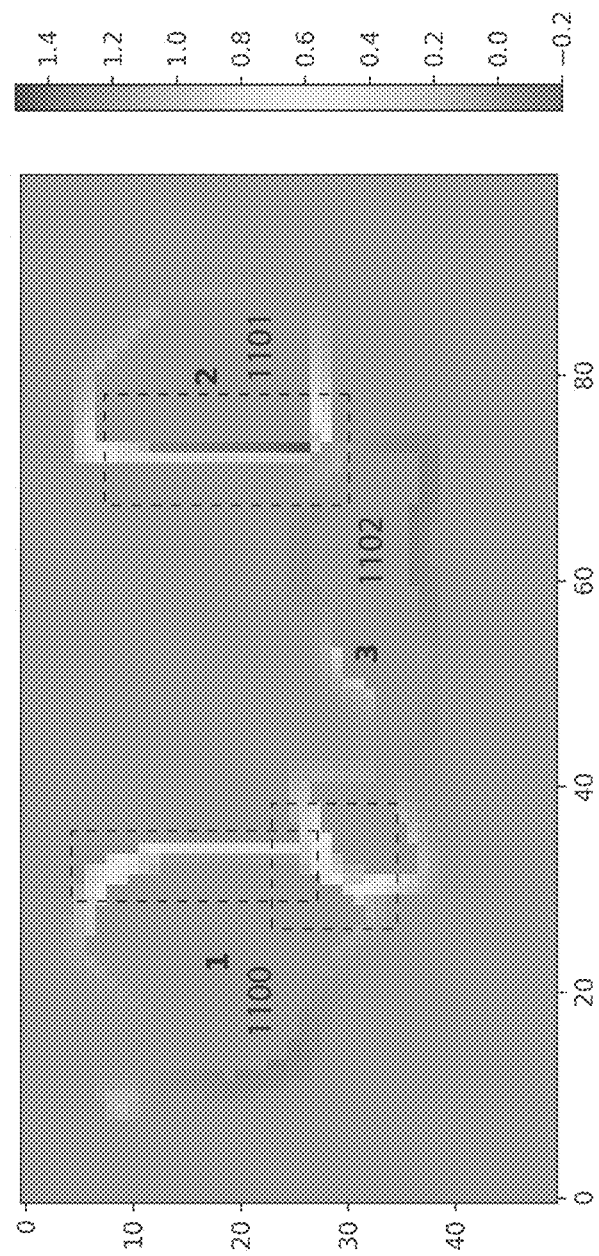

The expansion and contraction are depicted in FIG. 13B as areas of zone 1100, 1101, and 1102 containing nodes with high numerical values as shown in FIG. 13A have expanded after several iteration steps while those with low numerical values have contracted. This allows ordered zones to come closer together to reduce travel distance between sequentially ordered zones while expanding to cover more area of the environment. Areas of zones 1100, 1101, and 1102 bounded by dashed lines in FIG. 13B contain boundary nodes with high numerical value therefore the processor will continue to expand those areas with more iterations while areas with boundary nodes with low numerical value will contract. In embodiments, additional functions may be used by the processor to improve performance of zone optimization such as discover, delete and aggressive growth functions described earlier. Furthermore, additional features may be used in computing the numerical value of boundary nodes, which is not to suggest that other descriptions are limiting.

In some embodiments, the processor determines the best division of an environment by minimizing a cost function defined as the difference between theoretical (e.g., modeled with uncertainty) area of the environment and the actual area covered. The theoretical area of the environment may be determined by the processor using a map of the environment. The actual area covered may be determined by the processor by recorded movement of the robotic device using, for example, an odometer or gyroscope. For example, processors of robotic excavators use the map of the environment to determine theoretical area to be excavated and then determine the actual area excavated at the end of the work session. In some embodiments, the processor may determine the best division of the environment by minimizing a cost function dependent on a movement path taken by the robotic device comprising the movement paths taken within each zone and in between zones. The processor may restrict zones to being rectangular (or having some other defined number of vertices or sides) and may restrict the robotic device to entering a zone at a corner and to driving a serpentine routine (or other driving routine) in either x- or y-direction such that the trajectory ends at another corner of the zone. The cost associated with a particular division of an environment and order of zone coverage may be computed as the sum of the distances of the serpentine path travelled for coverage within each zone and the sum of the distances travelled in between zones (corner to corner).

Figure 14:
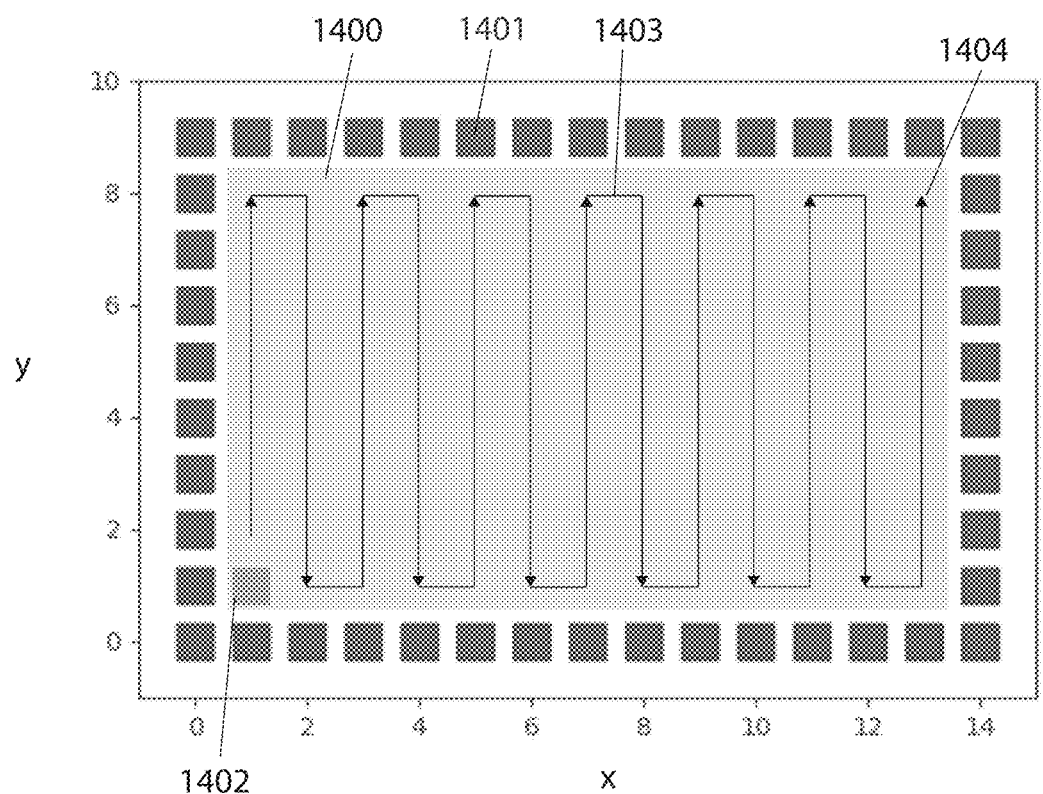
FIGS. 14, 15A-15C, 16, 17A, and 17B illustrate patterns followed by embodiments implementing a method for optimizing surface coverage of a workspace with rectangular zones, according to some embodiments.

For example, FIG. 14 illustrates an example of rectangular zone 1400 of the environment with perimeter 1401. Each square division may represent a single unit and may be used by the processor to compute distance travelled within the zone. From starting position 1402 at the lower left corner the robotic device may follow serpentine path 1403 to position 1404 at the top right corner of the zone. Assuming zone 1400 is the only zone of the environment, the robotic device returns back to initial position 1402. The processor computes the distance of serpentine path 1403 and the return path to position 1404 as 122 units and assigns the cost to this particular division of the environment and order of zone coverage. In some cases, a portion of the area of a zone is covered with a serpentine path, e.g., some embodiments may navigate around some or all of a perimeter of a zone before covering the interior with a serpentine path. To minimize cost function and improve coverage efficiency zones may be further divided, merged, reordered for coverage and entry/exit points of zones may be adjusted. In some embodiments, the processor of the robotic device may initiate these actions at random or may target them. In some embodiments, wherein actions are initiated at random (e.g., based on a pseudorandom value) by the processor, the processor may choose a random action such as, dividing, merging or reordering zones, and perform the action. The processor may then optimize entry/exit points for the chosen zones and order of zones. A difference between the new cost and old cost may be computed as $\Delta$=new cost–old cost by the processor wherein an action resulting in a difference <0 is accepted while a difference >0 is accepted with probability $\exp(-\Delta/T)$ wherein T is a scaling constant. Since cost, in some embodiments, strongly depends on randomly determined actions the processor of the robotic device, embodiments may evolve 10 different instances and after a specified number of iterations may discard a percentage of the worst instances.

Figure 15A:
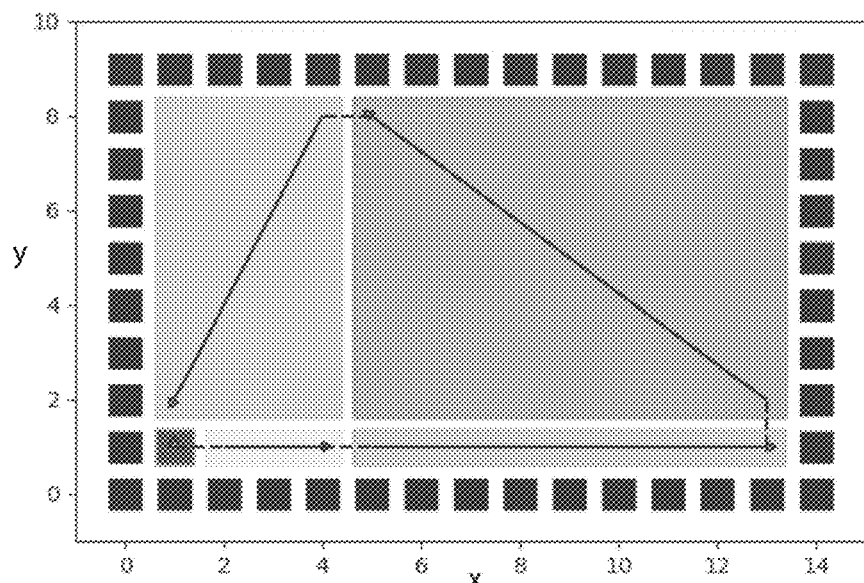
Figure 15B:
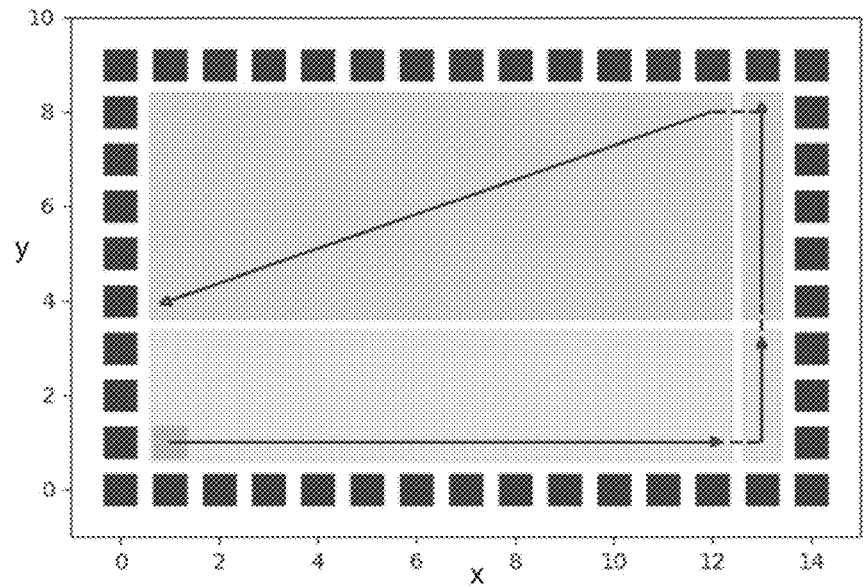
Figure 15C:
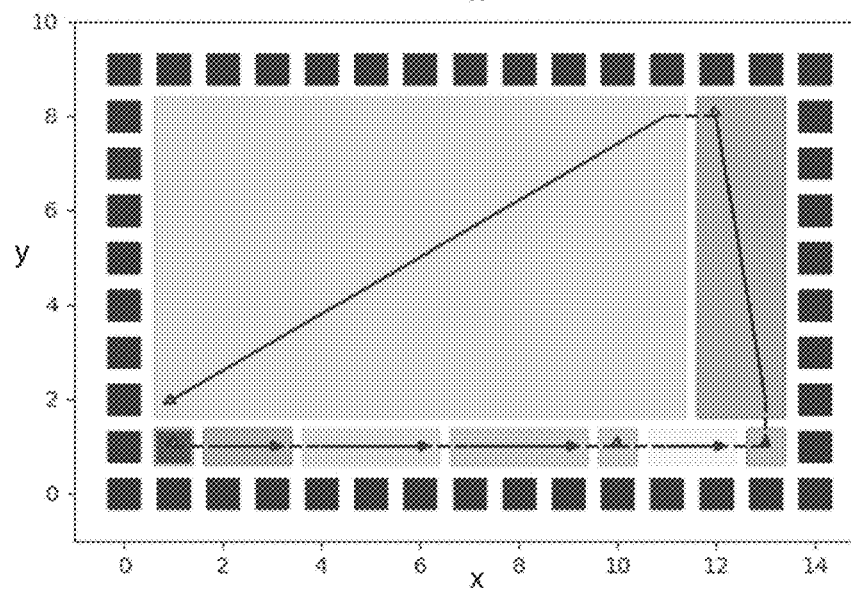
Figure 16:
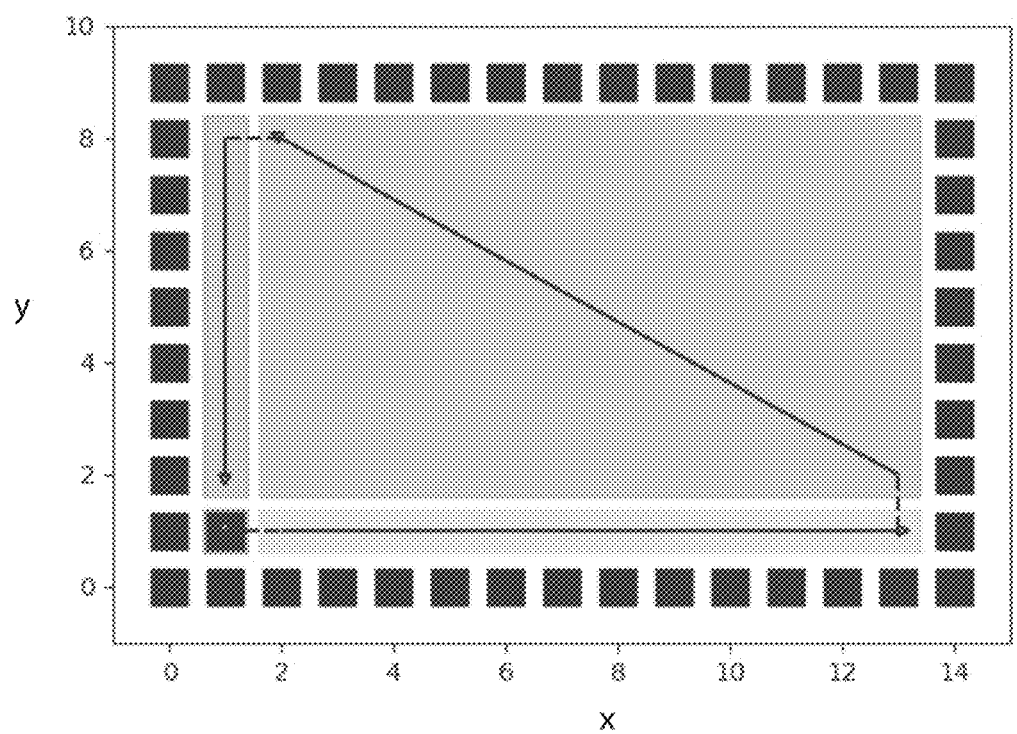
Figure 17A:
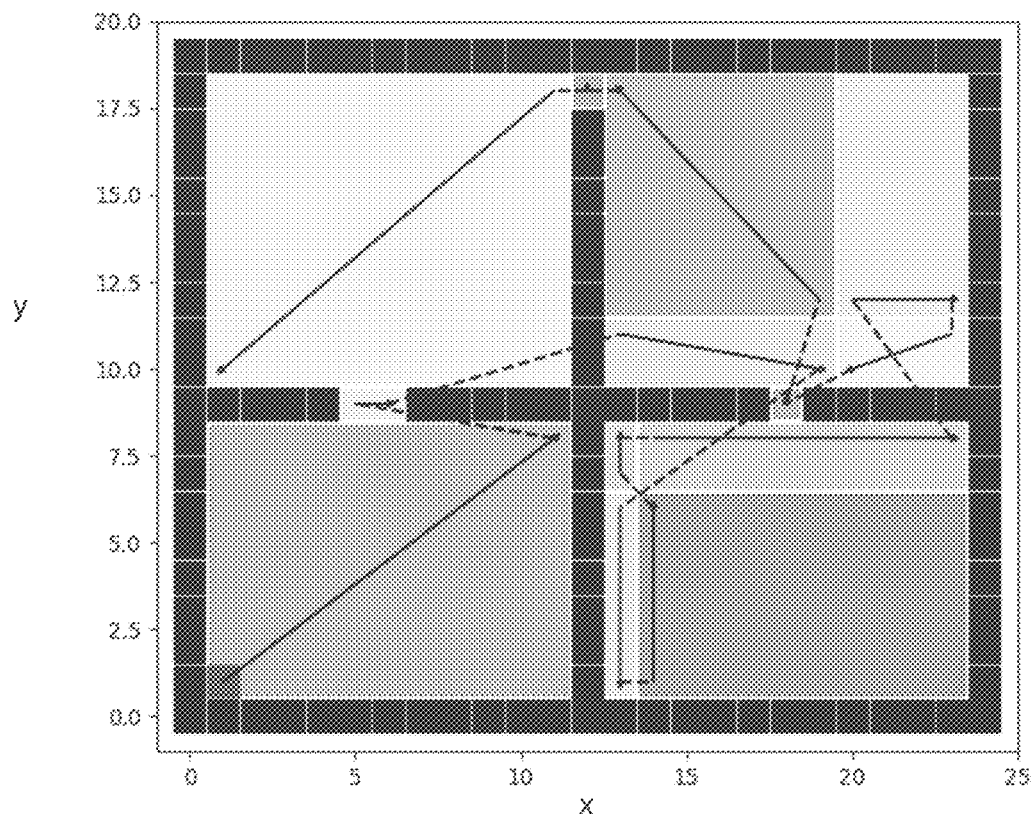
Figure 17B:
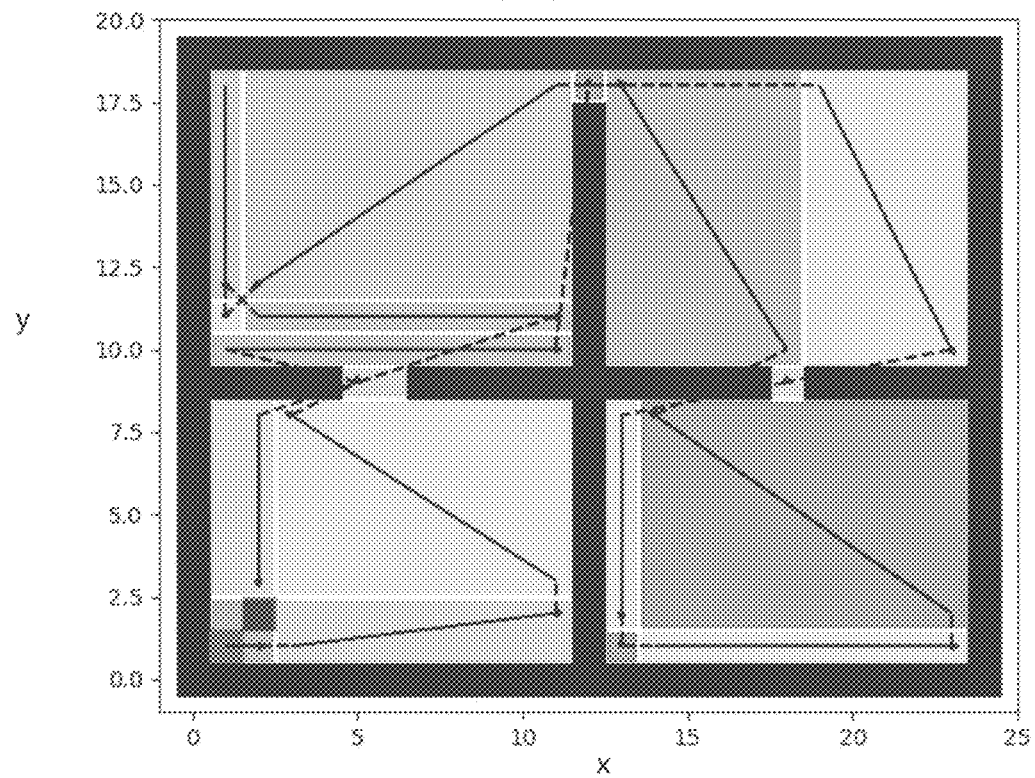

In some embodiments, the processor actuates the robotic device to execute the best or a number of the best instances and calculate actual cost. For example, FIG. 15A illustrates a random action approach to minimizing the cost function resulting in improved division and order of zones of the same environment shown in FIG. 14. Rectangular divisions indicate different zones and arrows indicate order of coverage of the zones as well as entry and exit points of each zone. Serpentine coverage of each zone is not shown, but may be implemented. The new cost is 104 as compared to 122 for the zone coverage in FIG. 14 and avoids repeat coverage of areas. FIGS. 15B and 15C illustrate other instances resulting from random action approach to minimizing the cost function, with cost 106 and 104, respectively. In embodiments, wherein actions are targeted, the processor may find the greatest cost contributor, such as the largest travel cost, and initiate a targeted action to reduce the greatest cost contributor. For example, FIG. 16 illustrates a targeted action approach to minimizing the cost function wherein greatest cost generator in FIG. 14, caused by travel distance from end point 1403 back to starting position 1401, is identified and eliminated by the processor resulting in improved division and order of zones of the same environment. The new cost is 104 as compared to 122 for zone coverage shown in FIG. 14 and avoids repeat coverage of areas. In embodiments, random and targeted action approaches to minimizing the cost function may be applied to workspaces comprising multiple rooms by the processor of the robotic device. For example, FIGS. 17A and 17B illustrate zone division and order of zone coverage of a environment comprising four rooms determined by the processor from minimizing the cost function by random and targeted action approaches, respectively. Arrows illustrate the order of zone coverage and entry/exit points of each zone. Serpentine paths within each zone are not illustrated. In embodiments, the processor may directly actuate the robotic device to execute coverage for a specific division of the environment and order of zone coverage without first evaluating different possible divisions and orders of zone coverage by simulation. In embodiments, the processor may determine the best division of the environment by minimizing a cost function comprising some measure of the theoretical area of the environment, the actual area covered, and the path taken by the robotic device within each zone and in between zones.

In some embodiments, the processor of the robotic device divides the map of the environment into zones wherein each zone is defined by a zone matrix including the respective portion of the cells of the map as entries. In some embodiments, the processor updates a coverage matrix of a zone corresponding to the zone matrix to indicate actual coverage or work completed. For a given zone, in some embodiments, each entry of its coverage matrix corresponds to an entry of its zone matrix and hence a cell of the environment. When a cell of a workspace is covered by the robotic device, the value of the corresponding entry in the coverage matrix is updated to indicate coverage or work completed. For example, each time a cell of a zone is covered, the value of the corresponding entry in the coverage matrix of the zone may be increased by one, with all entries beginning with a value of zero to indicate no coverage. (Or values may be decremented by some amount in systems in which reversed signs convey the sematic equivalent to that described herein-a qualification that applies generally to this document, e.g., discussion of maximizing a reward function should be read as indicating the inventors also contemplate minimizing a cost function). In some embodiments, the processor determines a reward and assigns it to a policy based on performance of coverage of the environment by the robotic device. In some embodiments, the policy may include the zones created, the order in which they were covered, and the movement (or coverage) path (i.e., it may include data describing these things). In some embodiments, the policy may include a collection of states and actions experienced by the robotic device during coverage of the environment as a result of the zones created, the order in which they were covered and movement path. In some embodiments, the reward is based on actual coverage, repeat coverage, total coverage time, travel distance between zones, etc. In some embodiments, the process may be iteratively repeated to determine the policy that maximizes the reward. In some embodiments, the processor determines the policy that maximizes the reward using a MDP as described above.

Figure 18A:
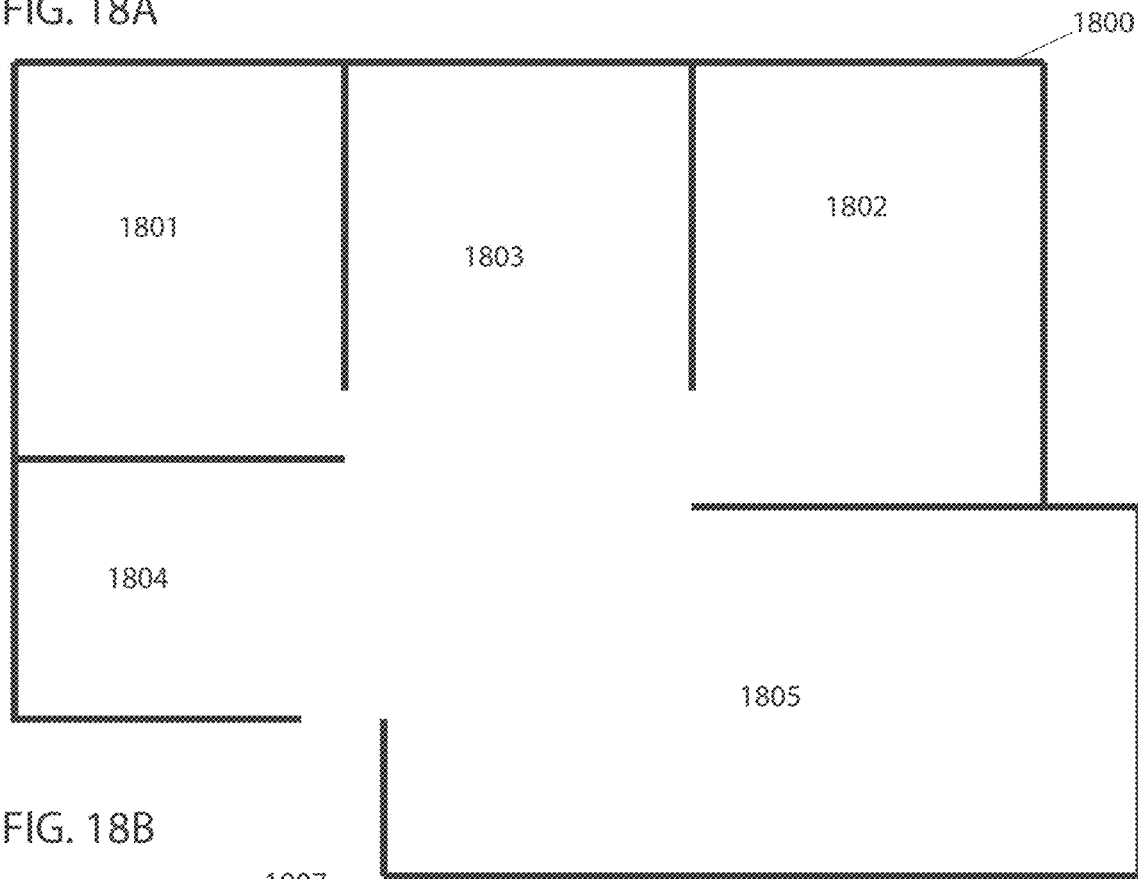
FIGS. 18A-18C illustrate optimization of zone division and order of zone coverage of a workspace, according to some embodiments.
Figure 18B:
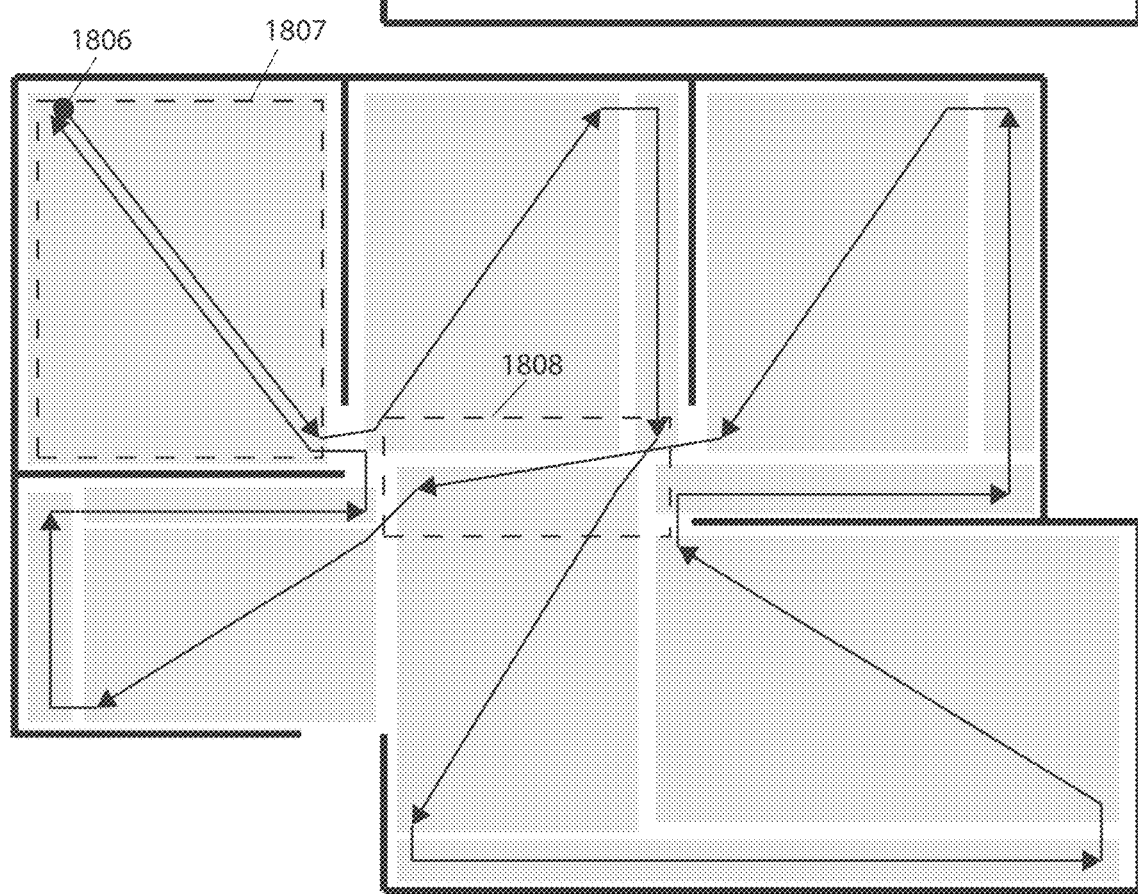

In some embodiments, a processor of a robotic device may evaluate different divisions of an environment while offline. For example, environment 1800 in FIG. 18A includes bedrooms 1801 and 1802, living room 1803, entry area 1804 and kitchen/dining area 1805. While offline, the processor may initially divide and order zones of environment 1800 for coverage as shown in FIG. 18B, wherein zones are shown by rectangular divisions and the order of zone coverage as well as entry/exit points of each zone is indicated by arrows with starting position 1806. Before starting coverage of environment 1800 the processor may iterate through divisions of the environment and order of zone coverage to find the division and order of zone coverage that optimizes (e.g., locally or globally) the movement path for an objective function like those described above.

Figure 18C:
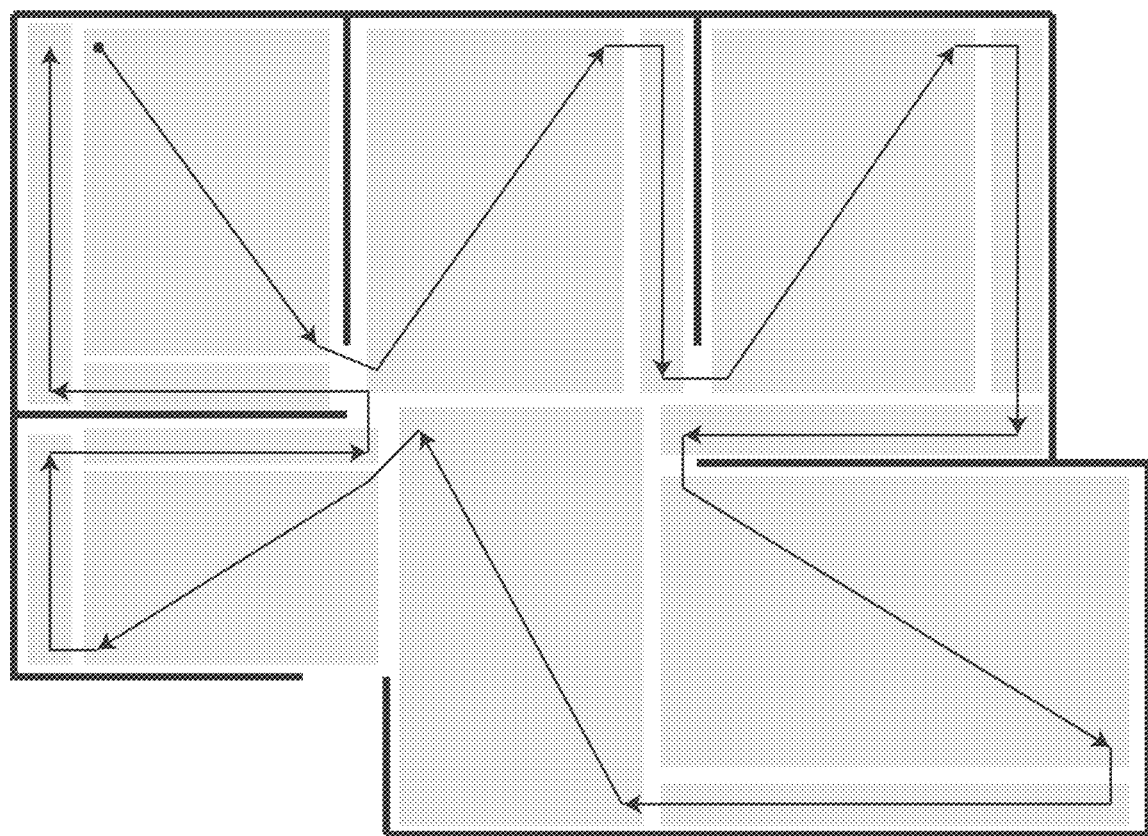

For example, the order of zone coverage in FIG. 18B is not efficient as the robotic device would need to back track resulting in repeat coverage in areas within dashed lines 1807 and 1808. The processor may iterate and divide and order zones of the environment for coverage as shown in FIG. 18C, wherein back tracking and hence repeat coverage of areas is minimized.

In some embodiments, the zone division methods and techniques described herein are applied by processors of robotic devices individually. In some embodiments, robotic devices collaborate to determine which zones will be covered by which robotic devices, then the processor of each robotic device individually determines further division of the zones they are assigned. In some embodiments, processors of robotic devices collaborate to determine the division of zones, coverage of zones, and in some cases, movement path within each zone. In other embodiments, processors of robotic devices individually determine their movement path within their assigned zones. For example, processors of dump trucks and excavators collaborating with another determine optimal division of a mining site into a plurality of excavating zones and a plurality soil dump zones, the order of excavating the excavating zones, the order of dumping excavated soil at the soil dump zones, and movement paths of the robotic dump trucks and robotic excavators (partially based on determining which robotic excavators dump excavated soil into which robotic dump trucks, which soil dump zones does each robotic dump truck go to, etc.). In another example, processors of robotic commercial cleaners collaborate to determine the most optimal division of zones, cleaning coverage of the zones, and movement path within the zones during cleaning. In some embodiments, values of various variables may be acquired by (e.g., sensed by) the processor and used by the processor to divide the workspace into zones, such as the strength of a wireless signal (such as WI-FI™ or other radio frequency (RF) signal), or the location of doors. For example, a door may be indicated in such signals and cause embodiments of the processor to divide an area into two zones, one on either side of the door. In some embodiments, division of the workspace into zones by the processor may be (partially or entirely) arbitrary or may depend on the layout of the workspace, where, for example, furniture of the workspace may be sensed by embodiments of the processor and cause those embodiments to divide the workspace, or the workspace may be divided into zones based on various other logic. Other methods for division of an environment into zones are described in U.S. patent application Ser. Nos. 14/817,952, 16/198,393, and 62/740,558, the entire contents of which are hereby incorporate by reference.

Some embodiments use path planning methods for planning coverage of zones, such as those described above. In another path planning example, the robotic device determines a movement path based on debris within the workspace. In some embodiments, the processor uses data from a debris sensor of the robotic device to determine which areas of the workspace have a higher likelihood of accumulating debris. In some embodiments, the processor associates a location of the robotic device with each reading of the debris sensor to determine to which area of the workspace the data belongs. In some embodiments, other information is associated with each debris sensor reading, such as date, time and type of debris (e.g., hair, food, dust, etc.). In some embodiments, the processor instructs the robotic device to perform cleaning in areas with higher levels of debris accumulation more frequently. In some embodiments, the frequency is proportional to the level of debris accumulation. In some embodiments, the processor may further infer the size and shape the debris collected. In some embodiments, the memory of the robotic device contains an internal database of types of debris likely to be encountered within the workspace. In some embodiments, the processor identifies the type of debris collected in the workspace by using the data of various sensors capturing the features of the debris (e.g., camera, pressure sensor, acoustic sensor, etc.) and comparing those features with features of different types of debris stored in the internal database. In some embodiments, the processor of the robotic device determines the likelihood of collecting a particular type of debris in different areas of the workspace based on, for example, current and historical data. In some embodiments, the processor determines if the type of debris encountered may be cleaned by the robotic device. In some embodiments, the processor of the robotic device incapable of cleaning the particular type of debris identified communicates with a processor or another robotic device capable of cleaning the debris. In some embodiments, the processor marks the level of debris accumulation expected in different areas of the workspace within the map based on, for example, current and historical data (e.g. sensor data, cleaning history, etc.). In some embodiments, the processor adjusts the level of debris marked within different areas of the map based on historical data on debris accumulation in the particular areas and/or cleaning history of particular areas (e.g., last time an area was cleaned). In some embodiments, the processor marks the type of debris expected in different areas of the workspace within the map based on, for example, current and historical data (e.g. sensor data, cleaning history, etc.). In some embodiments, the processor stores all or a portion of the data relating to debris accumulation collected and/or processed by the processor of the robotic device or processor of other robotic devices operating within the same workspace in the memory of the robotic device. In some embodiments, the processor determines a path and/or the order of areas to be cleaned and/or cleaning schedule and/or other instructions of the robotic device based on the estimated levels of debris accumulation in different areas of the workspace determined from all or a portion of the data relating to debris accumulation. In some embodiments, the processor prioritizes areas based on the type of debris. In instances wherein the cleaning time of the robotic device is limited, the processor of the robotic device prioritizes cleaning areas with higher levels of accumulated debris. In some embodiments, the processor determines the cleaning schedule based on the level of dust accumulation in different areas of the workspace. In some instances, the processor stores other information, such as, cleaning time, repeat coverage, date and time of cleaning an area, the number of times an area is cleaned, and the like, in the memory. In some embodiments, the processor uses such information to adjust the estimated level of dust accumulation or likelihood of different levels of dust accumulation in a particular area of the workspace. In some embodiments, the map includes information such as, likelihood of different levels of dust accumulation in different locations of the workspace, the likelihood of encountering different types of debris in different locations of the workspace, the frequency of encountering a particular level of debris accumulation and/or type of debris in different locations, and the date and/or time of encountering a particular level of debris accumulation and/or type of debris in different locations. In some embodiments, the map of is a grid map wherein the map is divided into cells, each cell representing a different area or location within the workspace. In some embodiments, the processor generates a new grid map with new debris-related information associated with each or a portion of the cells of the grid map at each work session. In some embodiments, the processor compiles the map generated at the end of a work session with an aggregate map comprised of a combination of maps generated during each or a portion of prior work sessions. In some embodiments, the processor uses information from the aggregate map when determining a cleaning path and/or work functions (or actions) and/or settings of the robotic device. Work functions (or actions) may include, but are not limited to, vacuuming, sweeping, mopping, UV treatment, etc. Settings may include, but are not limited to, speed of the robotic device, speed of brushes, speed of impeller, cleaning schedule, cleaning plan (e.g., which areas to clean), etc. In some embodiments, the processor or an application of a communication device instructs the robotic device to cover areas or cells with debris accumulation greater than a predetermined threshold one or more times during a cleaning session. In some embodiments, a robotic device may be controlled or directed to operate on a cell or in an area for a predetermined amount of time. In embodiments, the processor or an application of a communication device instructs the robotic device to operate on cells or areas of the workspace at a particular frequency (e.g., one, three, or five times a week).

For a robotic device to physically take action and move, the processor may actuate the wheels, tracks, or other actuated interfaces with the environment. This may be accomplished, in some embodiments, through three subsystem layers of the processor, which in some cases, is onboard the robot. In some embodiments, the first subsystem layer is the velocity controller, which receives requested linear and angular velocities and displacement from the navigation algorithm (e.g., in the processor, implementing the techniques above) after the next action of the robotic device is chosen. The velocity controller may set the linear and angular velocity in m/s and rad/s, respectively. Formally, a linear velocity in the x-direction of a coordinate system is represented by $V_x$ while an angular velocity is represented by $V_w$. The velocity controller may also be used to monitor the set velocity to increase the likelihood that the target value is reached and maintained and to read and return the linear and angular velocities from a platform layer. This first subsystem layer, in some embodiments, also comprises an emergency stop function, such that the velocity is set to 0 m/s in the case of an emergency. Further, the ramp up/down time for a desired speed may be set within the velocity controller, thereby controlling acceleration and deceleration of the robotic device. The gradual acceleration and deceleration protects the motor and gears as a sudden increase in speed imposes a large torque on the wheel motors thereby causing wear to the motor and gears. For an emergency situation, ramp down is set to 0 m/s, causing the robotic device to immediately stop.

In some embodiments, the second layer includes a differential drive controller responsible for converting velocity set in the velocity controller into actual velocity. The linear and angular velocity set by the velocity controller must be translated into a velocity for each wheel or another component that provides motion (e.g., tracks). The differential drive controller sets the values on each of the individual motors and at this layer polarity indicates direction. The third layer is the embedded motor driver. Details of its functions are hidden from higher level subsystems, such as the velocity controller and differential drive controller. This driver controls the direction that the motor spins by setting a value of 0, 1, or −1, where for example, 0 indicates no rotation, 1 indicates clockwise rotation, and −1 counter-clockwise rotation (in other instances, other values may be used). At an even lower level, the direction the motor spins may be controlled by applying a voltage of 0V, 5V or −5V (in other instances, other values may be used) to a general-purpose input/output (GPIO) pin on the integrated circuit (IC) or controller chip. The embedded motor driver also controls each motor individually by sending pulses of voltage to each motor. The number of voltage pulses per second controls the rotational speed of the motor while the value of voltage pulse controls the direction of rotation of the motor. Initially equal number of voltage pulses per second are sent to each of the motors of the robotic device. Since the motor is an analogue device and small variations exist in their wiring the number of rotations of each motor will not be exactly the same for every voltage pulse received. The gears and gear box also introduce some noise as they are slightly different from one another. Further, slippage adds to the unpredictability of the speed and/or displacement of each wheel. Therefore, the number of voltage pulses per second needs to adjusted based on such noise in order to achieve the target rotational speed and displacement over a period of time.

In some embodiments, the processor in each of the three layers described above has three modes: regular operational mode, in which the controller will accept velocity commands and check for safety events; safety mode, in which a safety event has occurred and the robotic device remains stopped until the event is acknowledged by the application layer; and recovery mode, in which a safety event is acknowledged by the application layer and corrective action is taken or the safety event is ignored. The three modes may have a mutex lock in relation to one another such that the robotic device cannot move if any of the processors of the three layers are in safety or recovery mode.

Due to imperfection in analog motors, gears, tiny spikes in voltage, measurement errors and such, a difference between the desired traveled distance and the actual traveled distance is expected. When the navigation algorithm (such as that above) determines the next action, in some embodiments, the corresponding linear and angular velocities and displacement requested to achieve said action is passed from the velocity controller, to the differential driver controller, then to the embedded motor driver to actuate movement of the wheels and complete the action. In some embodiments, an encoder measures the distance travelled by the robotic device. In addition to the encoder system, a gyroscope, such as L3GD20 gyroscope by STMicroelectronics, may also be used. The gyroscope may use an I²C (inter-integrated-circuit) interface with two pins or an SPI (serial peripheral interface) with four pins to communicate with the processor. The traveled distance measured may not necessarily be the same as the desired target displacement. In some embodiments, an adaptive processor is used to record the difference between the target value and actual value of the displacement over one time step, i.e. the absolute error error=|target value−actual value|. As the robotic device moves, the processor calculates the absolute error sum by summating the absolute error for each time step using $$\text{error sum} = \sum_{t=1}^{\infty} \text{error}_t.$$

In some embodiments, the processor of the robotic devices uses a control loop feedback mechanism to minimize the difference between the target value and actual value by correcting the future number of voltage pulses provided to each motor based on previous results, wherein the number of voltage pulses per second controls the rotational speed of the motor and hence measured displacement over one time step. In some embodiments, the future number of voltage pulses provided is corrected by using a proportional adjustment. For example, if a wheel is receiving 100 pulses per second and previously measured displacement is ten percent more than the target displacement desired, a proportional adjustment $P=K_p*$error is applied to the future number of voltage pulses such that 90 pulses per second are provided in order to attempt to achieve the target displacement, wherein $K_p$ is the proportional gain constant. This helps smoothen the trajectory of the robotic device, however since the adjustment is applied at a time when the wheel is already faster than desired, the initial velocity of the wheel prior to the adjustment still has an impact on the trajectory which is affected by the original overshoot. An integral $$I = K_i \int_0^T \text{error}\, dt$$

of past errors over time may be applied as a further correction to eliminate residual error, wherein $K_i$ is the integral gain constant. The processor determines the integral by summating the absolute error for each time step over a period of time. The integral correction helps reduce systematic errors, such as errors created due to, for example, a wheel being slightly larger or a motor being slightly more powerful or a motor receiving slightly higher voltage than expected. The integral may have a limit, where only a limited portion of the history is considered. The processor may also determine a derivative $$D = K_d \frac{\Delta \text{error}}{\Delta \text{time}}$$

to apply a correction to the variable controlling the target value in order to reduce the error, wherein $K_d$ is the derivative gain constant. The derivative is the best estimate of the future trend of the error based on its current rate of change. The three constants $K_p$, $K_i$, and $K_d$ may be tuned to the specific application such that the difference between the target value and actual value is minimized. The proportional, integral and derivative corrections may be combined by the processor to produce an output=P+I+D which may be applied as a correction to the variable controlling the desired outcome in order to reduce the overall error. In this case, for example, the correction may be applied to the number of voltage pulses per second provided to the motor in order to achieve the desired displacement and thereby reduce the error between target and actual displacement. At startup, the accumulated error is reduced by the gradual acceleration of the robotic device. This allows the displacement and corresponding adjustment of the motor speed to be applied before the robotic device reaches maximum speed resulting in smaller displacements while only limited feedback is available.

The implementation of a feedback processor is beneficial in some cases as a differential drive mechanism, comprised of two independently driven drive wheels mounted on a common axis, used by robotic devices may be highly sensitive to slight changes in velocity in each of the wheels. The small errors in relative velocities between the wheels may affect the trajectory of the robotic device. For rolling motion the robotic device rotates about an instantaneous center of curvature (ICC) located along the common axis. To control the trajectory of the robotic device the velocities of the two wheels may be varied. The angular velocity ω about the ICC may be related to the velocities $v_l$ and $v_r$ of the left and right wheels by the processor using $$\omega\left(R + \frac{l}{2}\right) = v_r$$

and $$\omega\left(R - \frac{l}{2}\right) = v_l,$$

wherein l is the length of the axle connecting the two wheels and R is the distance from the ICC to the midpoint of the axle connecting the two wheels. If $v_l = v_r$, then there is only forward linear motion in a straight line. If $v_l = -v_r$, then the ICC is at the midpoint of the axle and there is only rotation in place. If $$v_l = 0\frac{m}{s},$$

then the ICC is at the left wheel, i.e. rotation is about the left wheel. The same applies for the right wheel if $$v_r = 0\frac{m}{s}.$$

To navigate the robotic device, assume the robotic device centered at the midpoint between the two wheels and is at a position (x, y), headed in a direction θ with respect to the horizontal x-axis. By adjusting $v_r$ and vrthe robotic device may move to different positions and orientations. The processor determines the position of the ICC using ICC=[$ICC_x$, $ICC_y$]=[x−R sin θ, y+R cos θ]. At time t+δt the pose of the robotic device $$(x', y', \theta') \text{ is } \begin{bmatrix} x' \\ y' \\ \theta' \end{bmatrix} = \begin{bmatrix} \cos(\omega\delta t) & -\sin(\omega\delta t) & 0 \\ \sin(\omega\delta t) & \cos(\omega\delta t) & 0 \\ 0 & 0 & 1 \end{bmatrix} \begin{bmatrix} x - ICC_x \\ y - ICC_y \\ \theta \end{bmatrix} + \begin{bmatrix} ICC_x \\ ICC_y \\ \omega\delta t \end{bmatrix}.$$

For a differential drive, the navigation strategy of the robotic device is to move in a straight line, rotate in place, then move in a straight line again in order to reach desired (x, y, θ). For motion in a straight line where $v_l = v_r = v$, the equation used by the processor to determine the pose of the robotic device reduces to $$\begin{bmatrix} x' \\ y' \\ \theta' \end{bmatrix} = \begin{bmatrix} x + v\cos\theta\delta t \\ y + \sin\theta\delta t \\ \theta \end{bmatrix}.$$

And for rotation in place where $v_l = -v_r$, the equation used by the processor to determine the pose of the robotic device reduces to $$\begin{bmatrix} x' \\ y' \\ \theta' \end{bmatrix} = \begin{bmatrix} x \\ y \\ \theta + \dfrac{2v\delta t}{l} \end{bmatrix}.$$

In some embodiments, an H bridge IC or driver, such as Quadruple Half-H bridge driver SN754410 by Texas Instruments or other similar bridge drivers, may be used to control DC motors. The H bridge is used to drive the motor's direction and regulate its speed. For example, Quadruple Half-H bridge driver SN754410 has 16 pins and is able to enable a pair of DC motors on each side of the IC using pins 1 and 9. These pins will run the motors by enabling them with a voltage generated by a battery connected to pin 16. The left motor leads connect to output pins 3 and 6 and right motor leads to output pins 11 and 14. Input pins 2, 7, 10, and 15 may be connected to a Beaglebone Black Board (BBB) from which input commands are sent. A BBB is a low-power open-source single-board computer. Pins 4, 5, 12 and 13 are connected to ground.

In some embodiments, the processor of the robotic device uses a motion model to predict the position of the robotic device within the environment. In some embodiments, the processor determines parameters of the motion model of the robotic device that improve predictions of the motion model. In some embodiments, the processor uses a parametrized model $\hat{y}_{t+1}$=model ($y_t$, $p_t$) to predict output $\hat{y}_{t+1}$ at time t+1 given observed output $y_t$ at time t and parameters $p_t$. In some embodiments, the processor estimates the parameters that minimize a prediction error $y_{t+1}-\hat{y}_{t+1}$, wherein $y_{t+1}$ is the actual observed output at time t+1. In some embodiments, the processor uses recursive estimation $p_{t+1}=p_t+K_{t+1}(y_{t+1}-\hat{y}_{t+1})$ to estimate parameter $p_{t+1}$ at time t+1. In some embodiments, the processor uses the gain $K_{t+1}$ to determine how much the current prediction error $y_{t+1}-\hat{y}_{t+1}$ affects the update of the parameter estimate. In some embodiments, the processor updates the parameter in the direction of the gradient of the error by, for example, $K_{t+1}=Q_{t+1}\psi_{t+1}$ with $Q_{t+1}$ suitably chosen, and the gradient $$\Psi_{t+1}^T = \frac{\partial \hat{y}_{t+1}}{\partial p_t},$$

wherein $Q_{t+1}$ is a weighting factor used to determine how much to correct the parameter estimate. In some embodiments, the processor uses tracking error gradient descent wherein $Q_{t+1}$=constant. In some embodiments, the processor uses tracking error gradient descent with normalized gradient wherein $$Q_{t+1} = \frac{\gamma}{\|\Psi_{t+1}\|^2 + \text{Bias}},$$

wherein $\gamma$ is a constant. In some embodiments, $Q_{t+1}$ is chosen as a forgetting factor. In some embodiments, $K_{t+1}$ is chosen as Kalman gain of a Kalman filter.

In some embodiments, the processor of the robotic device predicts where the robotic device is going to be positioned $\hat{x}_{t+1}$=model ($x_t$, $u_t$, $\Delta t$) at time t+1 given an input state $x_t$ (i.e., previous position estimate) and sensor measurements $u_t$ (e.g., wheel encoder) at time t and a time step $\Delta t$. In some embodiments, the processor implements the model in a Kalman filter and the prediction step is an explicit Euler step in time. In some embodiments, the processor receives feedback on the computed state estimate (e.g., through sensor pose updates) and corrects the pose to $x_{t+1}$ at time t+1. In some embodiments, the processor determines a tracking error using $e=x_{t+1}-\hat{x}_{t+1}$.

In some embodiments, the processor uses tracking error gradient descent to reduce the tracking error. In some embodiments, the processor adds parameters to the model $\hat{x}_{t+1}$=model ($x_t$, $u_t$, $\Delta t$, $p_t$) to improve the performance of the model. Examples of parameters include wheel radii, wheel distance, sensor position, etc. In some embodiments, the processor incrementally perturbs the parameters in the direction that reduces the tracking error the most, or otherwise in the direction of the descent on the tracking error function $$E = \frac{1}{2} e^T e.$$

In some embodiments, the processor updates the parameters using $$p_{t+1} = p_t + h\left(\frac{\partial \hat{x}_{t+1}}{\partial p_t}\right)^T e,$$

where h is a small step size. This is the same update rule as described above with $Q_{t+1}$=h and $$\Psi_{t+1}^T = \frac{\partial \hat{x}_{t+1}}{\partial p_t}.$$

In some embodiments, the processor uses hyperparameters for fine tuning the model. In some embodiments, the processor uses an adaptive step size h(t), wherein $$Q_{t+1} = \frac{\gamma}{\|\Psi_{t+1}\|^2 + \text{Bias}},$$

for example. In some embodiments, the processor models uncertainty by premultiplying Q with a matrix M to, for example, do larger updates in directions with higher certainty and smaller updates in directions of uncertainty, or by taking the Kalman update instead as it is already corrected by both covariance matrices. In some embodiments, the processor improves stability of the model by, for example, detecting outliers and eliminating them or by delayed updates, or by delayed updates on a separate set of parameters.

In some embodiments, the processor uses an extended Kalman filter with augmented state space in modeling the motion of the robotic device. In some embodiments, the processor uses the augmented state space $$\tilde{x}_t = \begin{pmatrix} x_t \\ p_t \end{pmatrix}$$

and applies the Kalman filter to $\tilde{x}$. In some embodiments, the parameters are taken as time-invariant and the processor models zero noise on the parameter portion of the state. Therefore, in some embodiments, the processor models dynamics using $$\hat{x}_{t+1} = \Phi(\ldots) = \begin{pmatrix} \text{model}(x_t, u_t, \Delta t, p_t) \\ p_t \end{pmatrix}.$$

In some embodiments, the processor updates the Jacobian F from the non-augmented Kalman process using $$\tilde{F} = \frac{\partial \Phi}{\partial \tilde{x}_t} = \begin{pmatrix} F & \Psi_{t+1}^T \\ 0 & I \end{pmatrix},$$

wherein $\Psi_{t+1}^T$ is the model derivative with respect to the parameters as defined above.

For example, in some embodiments, the processor models motion of the robotic device using $\dot{x} = v\cos\omega$; $\dot{y} = v\sin\omega$; $\dot{\theta} = \omega$, with initial conditions such as $x(t_0) = x_0$, and wherein v is translational velocity and $\omega$ is rotational velocity. In some embodiments, the processor uses a forward model including $x_{t+1} = x_t + v\Delta t\cos\theta_t$; $y_{t+1} = y_t + v\Delta t\sin\theta_t$; $\theta_{t+1} = \theta_t + \omega\Delta t$, to compute the motion of the robotic device. In some embodiments, the processor determines translational and rotational velocities v and $\omega$ based on observed right and left wheel velocities $\omega_R$ and $\omega_L$ of the robotic device using $$\begin{pmatrix} v \\ \omega \end{pmatrix} = J\begin{pmatrix} \omega_L \\ \omega_R \end{pmatrix}, \text{ wherein } J = \begin{pmatrix} r_L/2 & r_R/2 \\ -r_L/b & r_R/b \end{pmatrix}$$

and $r_R$ and $r_L$ are right and left wheel radii and b is the distance between the right and left wheels. In some embodiments, the processor uses wheel sizes as parameters $p_t = [r_L, r_R]^T$ and $J = J(p_t)$. In some embodiments, the processor estimates parameters p for observed left and right wheel velocities $u_t = [\omega_L, \omega_R]^T$ to improve the forward model. Given abbreviated state vector $$x_t = \begin{pmatrix} x_t \\ y_t \\ \theta_t \end{pmatrix},$$

the processor uses forward model $$\hat{x}_{t+1} = \text{model}(x_t, u_t, \Delta t, p_t) = \begin{pmatrix} x_t + v_t\Delta t\cos\theta_t \\ y_t + v_t\Delta t\sin\theta_t \\ \theta_t + \omega_t\Delta t \end{pmatrix}$$

with $$\begin{pmatrix} v_t \\ \omega_t \end{pmatrix} = J(p_t)u_t.$$

In some embodiments, the processor determines the gradient for a single time step in the direction of the model parameters using $$\Psi_{t+1}^T = \frac{\partial \hat{x}_{t+1}}{\partial p_t} = \frac{1}{2}\Delta t \begin{pmatrix} \omega_L\cos\theta_t & \omega_R\cos\theta_t \\ \omega_L\sin\theta_t & \omega_R\sin\theta_t \\ -2\omega_L/b & 2\omega_R/b \end{pmatrix}.$$

In some embodiments, the processor updates parameters $p_t$ in the direction of steepest descent of a single time step error function. In some embodiments, upon receiving a scan match the processor estimates the position of the robotic device using EKF before the scan match and the position of the robotic device based on the scan match. In some embodiments, the processor determines an error $e_{t+1}$ = pose from scan match − pose from EKF before scan match and uses the error to update the parameters $p_{t+1} = p_t + Q_{t+1}\Psi_{t+1}e_{t+1}$.

Figure 19A:
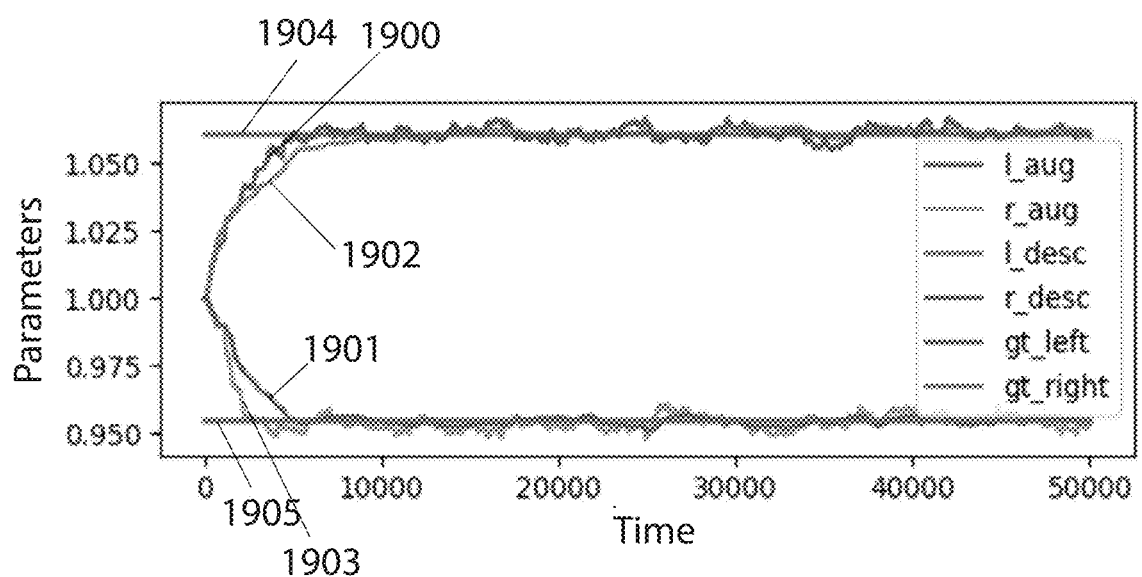
FIGS. 19A and 19B illustrate results of an exemplary method for estimating parameters of a motion model of a robotic device, according to some embodiments.
Figure 19B:
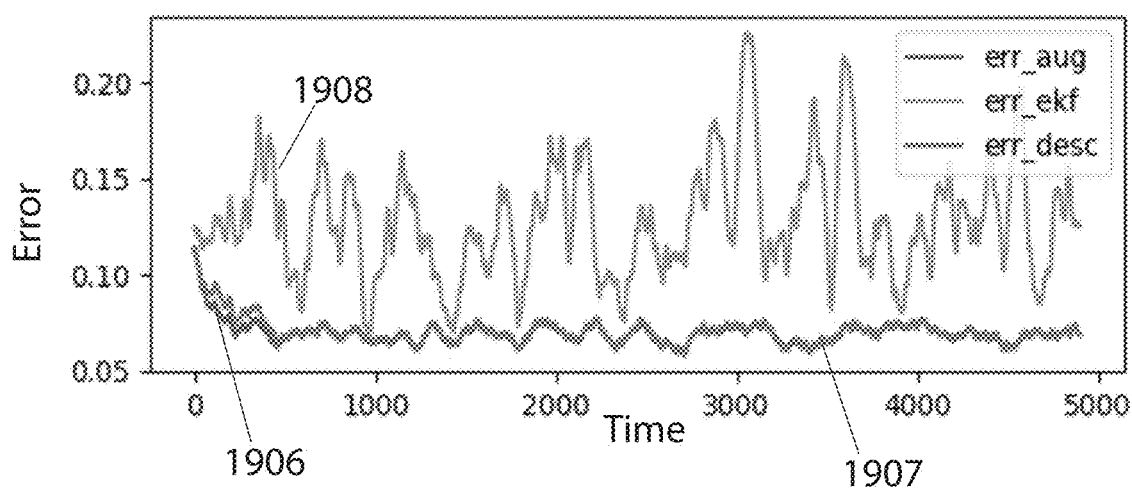
Figure 20A:
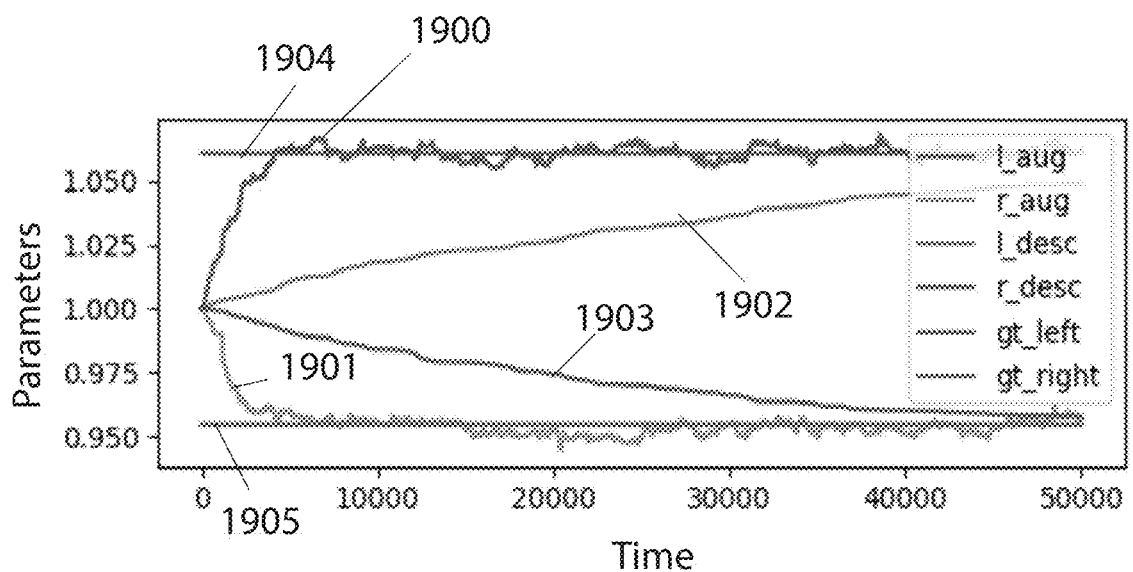
FIGS. 20A and 20B illustrate results of an exemplary method for estimating parameters of a motion model of a robotic device, according to some embodiments.
Figure 20B:
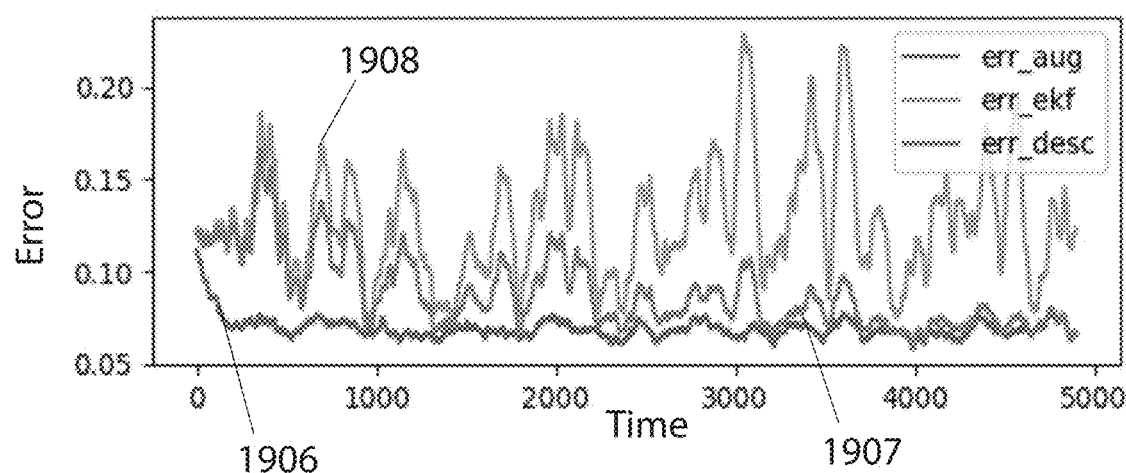
Figure 21A:
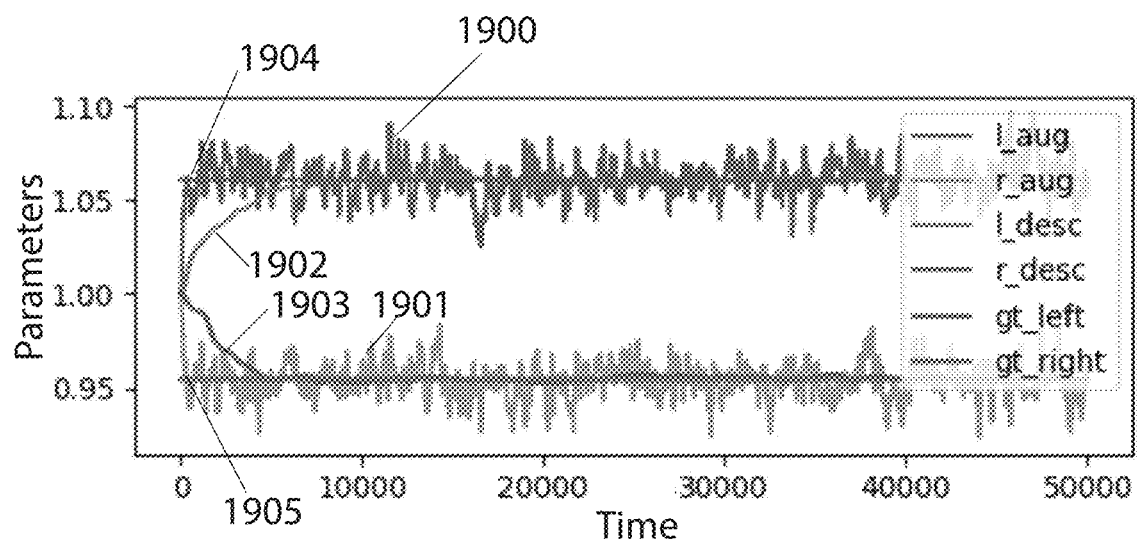
FIGS. 21A and 21B illustrate results of an exemplary method for estimating parameters of a motion model of a robotic device, according to some embodiments.
Figure 21B:
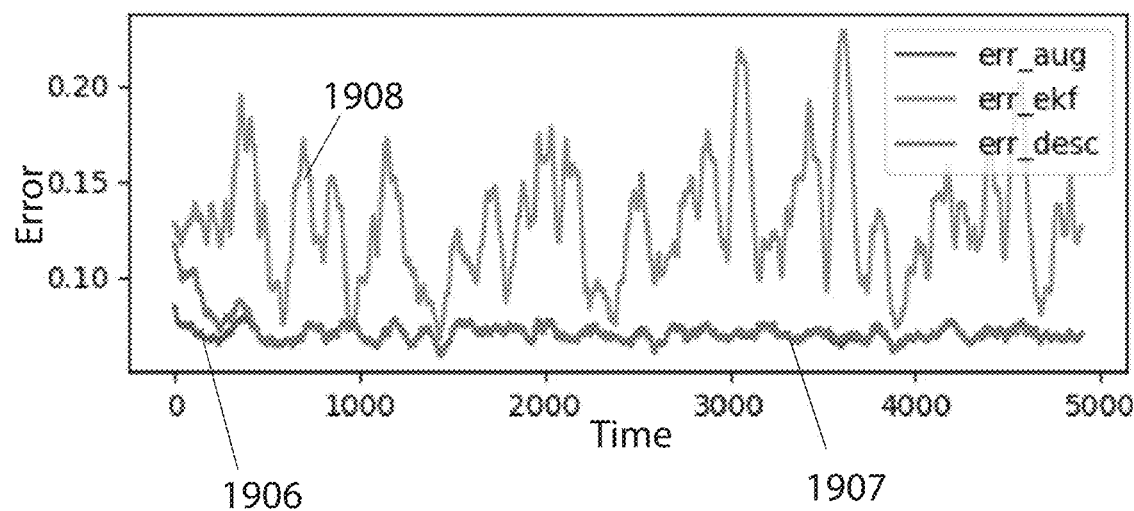
Figure 22A:
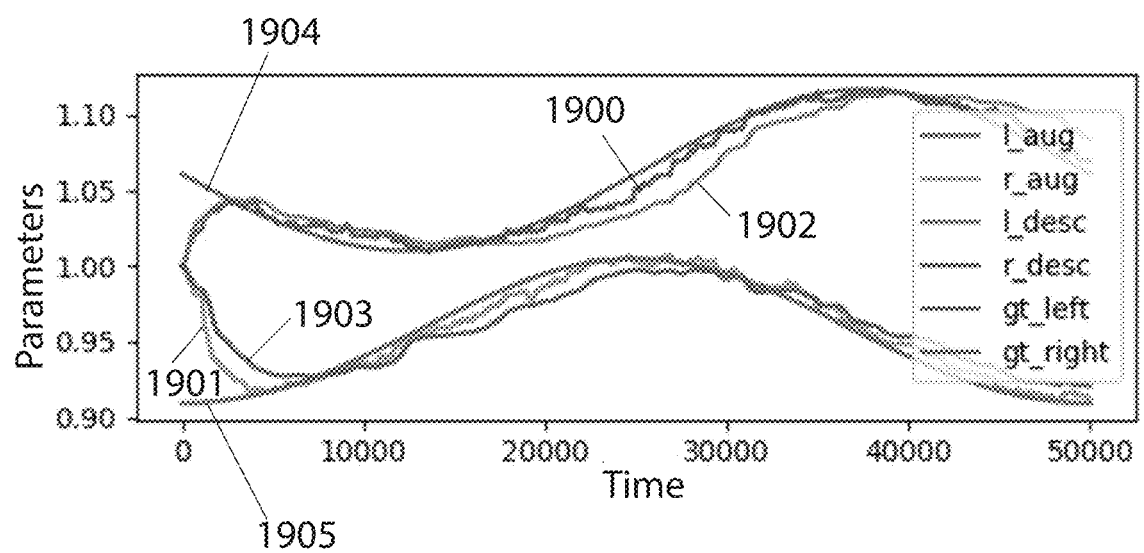
FIGS. 22A and 22B illustrate results of an exemplary method for estimating parameters of a motion model of a robotic device, according to some embodiments.
Figure 22B:
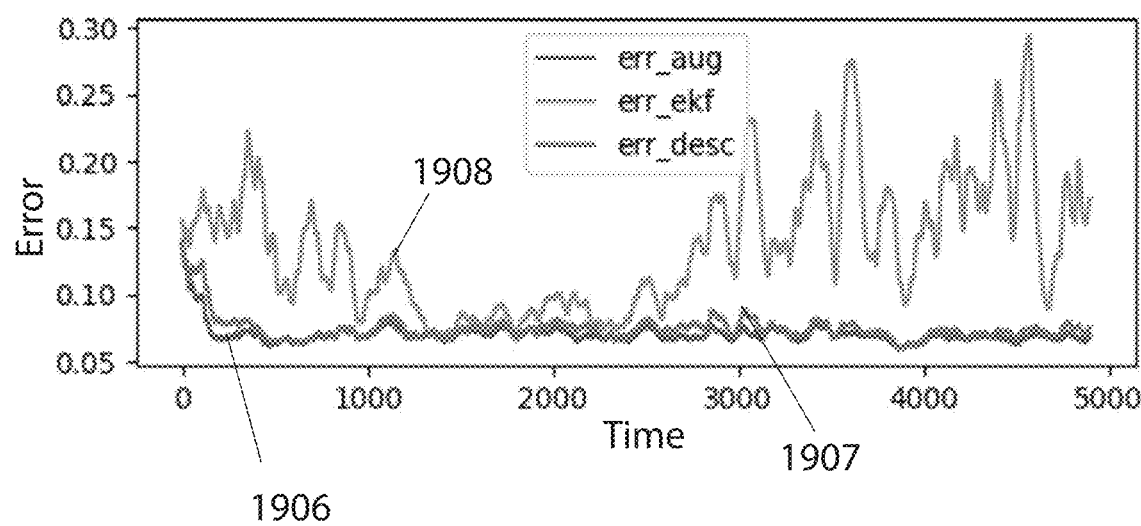
Figure 23A:
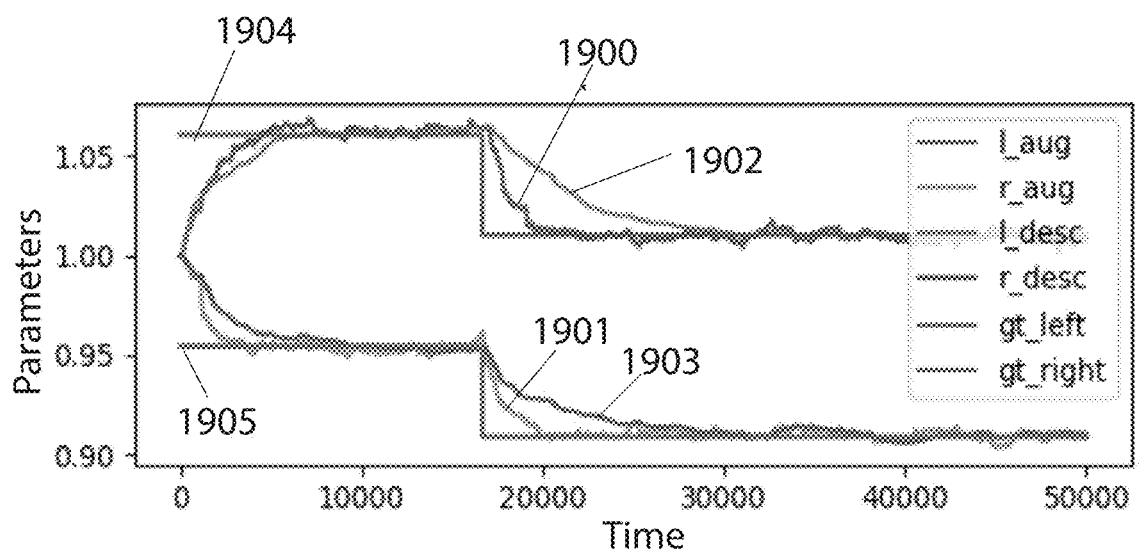
FIGS. 23A and 23B illustrate results of an exemplary method for estimating parameters of a motion model of a robotic device, according to some embodiments.
Figure 23B:
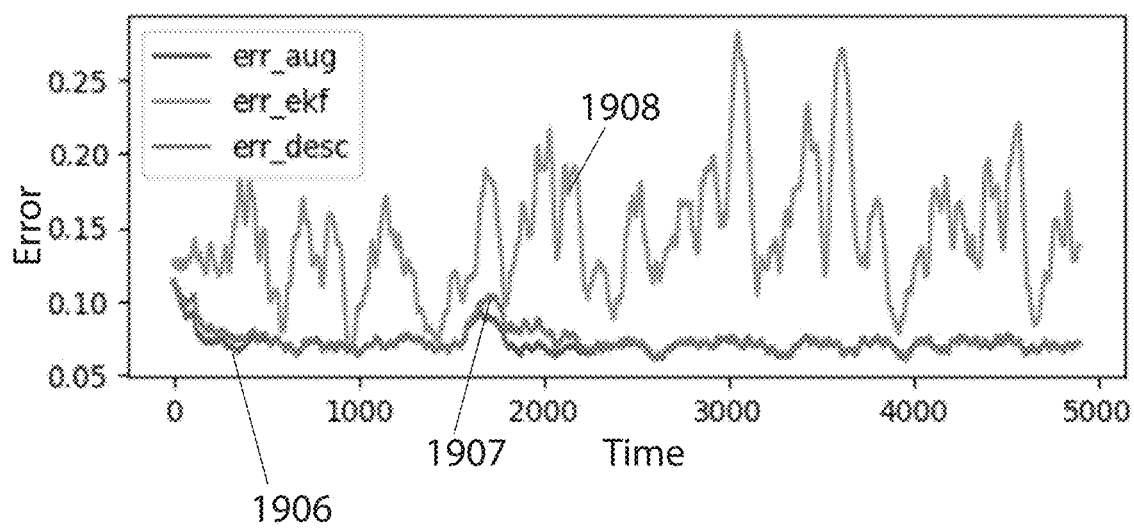

FIG. 19A illustrates estimated left and right wheel parameters for augmented Kalman filter 1900 and 1901 and tracking error gradient descent 1902 and 1903 based on simulated data with Gaussian noise. Ground truth of left and right wheel parameters 1904 and 1905 are also plotted. FIG. 19B illustrates the resulting error in pose for augmented Kalman filter 1906, tracking error gradient descent 1907, and classic Kalman filter 1908. Both augmented Kalman filter and tracking error gradient descent perform better than classic Kalman filter. FIGS. 20A and 20B are the same as FIGS. 19A and 19B, respectively, however a smaller step size is used for tracking error gradient descent. This is evident as left and right wheel parameters estimated using tracking error gradient descent 1902 and 1903 approach ground truth 1904 and 1905 much slower, which is reflected in the resulting error of tracking error gradient descent 1907. FIGS. 21A and 21B are the same as FIGS. 19A and 19B, respectively, however a higher noise for the left and right wheel parameter is adding in the augmented Kalman filter. This results in noisier parameter estimates for the augmented Kalman filter 1900 and 1901. FIGS. 22A and 22B are the same as FIGS. 19A and 19B, respectively, however time variant left and right wheel parameters are used. Both augmented Kalman filter parameter estimates 1900 and 1901 and tracking error gradient descent parameter estimates 1902 and 1903 tracked changes in left and right wheel parameters 1904 and 1905. FIGS. 23A and 23B are the same as FIGS. 19A and 19B, respectively, however a drop in left and right wheel parameter is added. Both augmented Kalman filter parameter estimates 1900 and 1901 and tracking error gradient descent parameter estimates 1902 and 1903 quickly accounted for the drop in left and right wheel parameter resulting in minimal jump in error 1906 and 1907 for augmented Kalman filter and tracking error gradient descent, respectively.

In some embodiments, the processor uses deep neural networks to learn complex, non-linear functions. In some embodiments, the deep neural networks recognize patterns by clustering and classifying data. In some embodiments, the neural networks establish correlations between the input data. In some embodiments, the processor uses feedforward networks to learn a motion model for the robotic device. In some embodiments, different hierarchy and training process are used to construct different possible motion models. For example, a first motion model uses previous pose and measure velocity to determine new pose. The first motion model takes position into account and is therefore capable of mapping coordinate dependent parameters (e.g., slightly tilted floor). In another example, a second motion model uses initial position and measured velocity to determine change in pose. The second motion model does not take position into account and therefore may only account for internal/general mismatches. Neither model 1 or 2 take previous velocities into account. In embodiments, previous velocities could be added but would increase the dimension of the neural network. While neural networks may be trained to a high degree of accuracy, they do not take previous measurements into account. Further, there is the challenge of online calibration with neural networks as calibration requires frequently running backpropagation. Depending on the size of the network, this may result in significant computational cost. Freezing the network and only updating the network with respect to a few parameters (e.g. additional tuning input parameters) may be considered conceptually similar to the methods described above.

Figure 24:
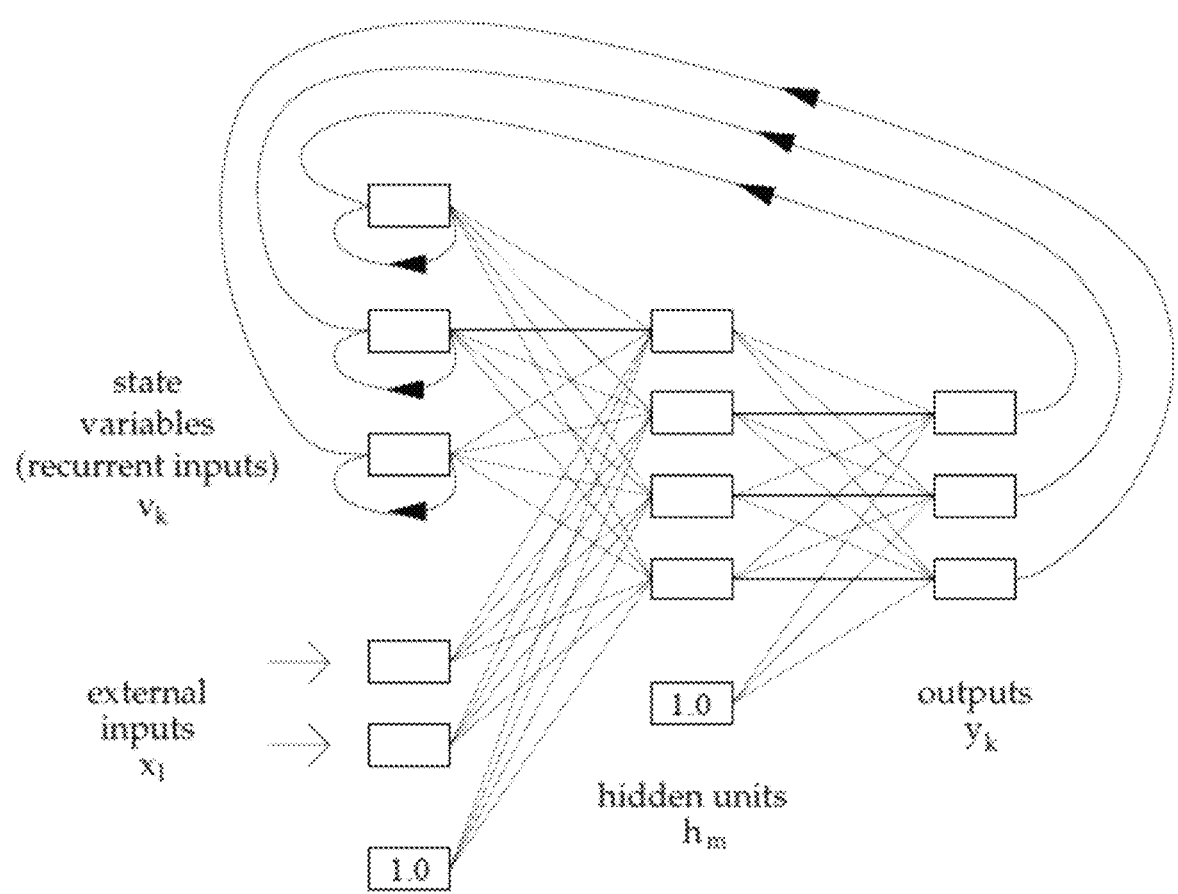
FIG. 24 illustrates an example hierarchy of a recurrent neural network, according to some embodiments.
Figure 25:
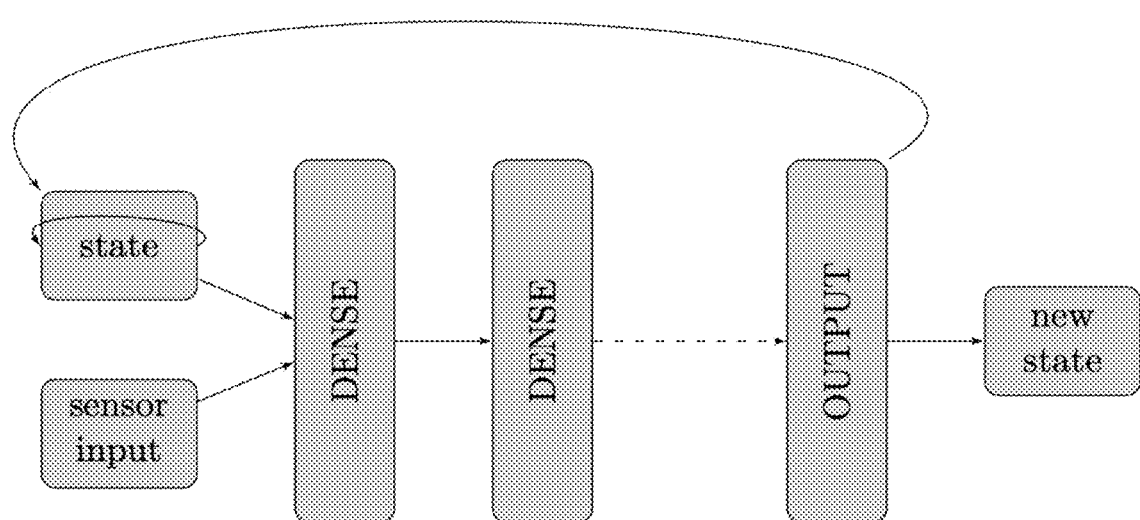
FIG. 25 illustrates an example of a motion model of a robotic device, according to some embodiments.

In some embodiments, the processor uses a recurrent neural network as it is a time-aware type of neural network. Recurrent neural networks are able to keep states hidden from time step to time step. In contrast to feedforward neural networks, the input of recurrent neural networks includes not only the current input but also information perceived in previous steps. Internally, recurrent units have an internal state. This internal state also influences the output. With each input, this hidden state is updated. This mechanism provides a feedback loop at every time step in the input series. In some embodiments, the processor uses continuous time recurrent neural networks to account for slight mismatch in sampling speed of velocities. Different recurrent neural network hierarchies for modeling dynamics of the robotic device may be used. In some embodiments, the recurrent neural network feeds back the output from one time step as input to the next time step. For example, FIG. 24 illustrates a recurrent neural network hierarchy wherein part of the output is fed back to the state variables (recurrent inputs). In some embodiments, the processor uses a time integration recurrent neural network to estimate a new state of the robotic device. In one embodiment, the recurrent neural network receives state and sensor measurements as input and outputs a new state and feeds back the output as the state input. This recurrent neural network is illustrated in FIG. 25. In another embodiment, the recurrent neural network outputs how much the state changed and the change is fed back and added to the state input. In some embodiments, the model is updated by backpropagating the error. In some embodiments, the error is backpropagated using iterative closest point matching.

Figure 26:
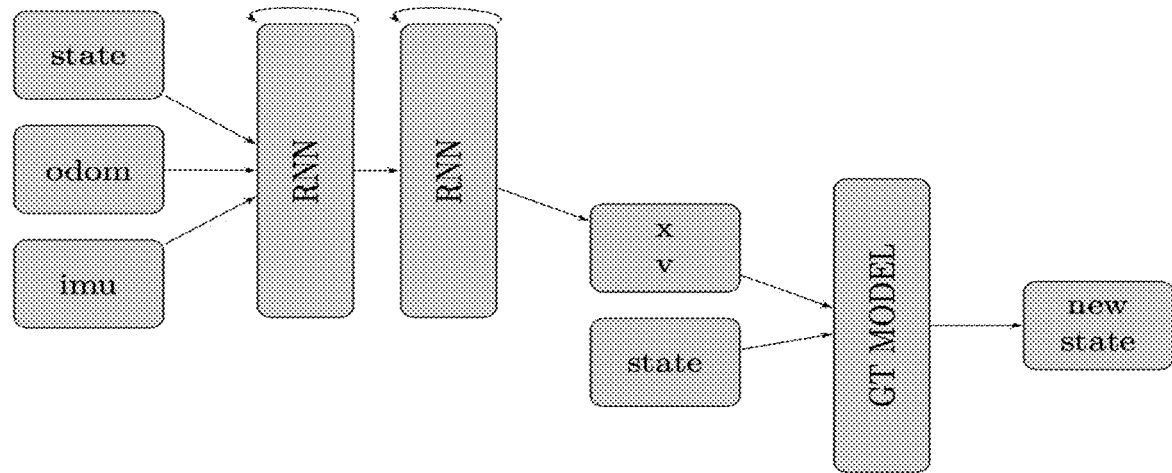
FIG. 26 illustrates an example of a motion model of a robotic device, according to some embodiments.

In some embodiments, the processor uses a modular structure to estimate a new state of the robotic device wherein the recurrent neural network receives state, odometer (odom) measurements and inertial measurement unit (IMU) readings as input and the output position (x) and velocity (v) of the recurrent neural network (RNN) is used input into a non-linear ground-truth (GT) model (e.g., classical motion model), in addition to state, describing physics of the robotic device. The GT model outputs a new state. This modular structure is illustrated in FIG. 26. In some embodiments, the processor updates the model by determining the hard-coded gradient of the ground truth model and directly backpropagating the gradient through the recurrent neural network.

Figure 27:
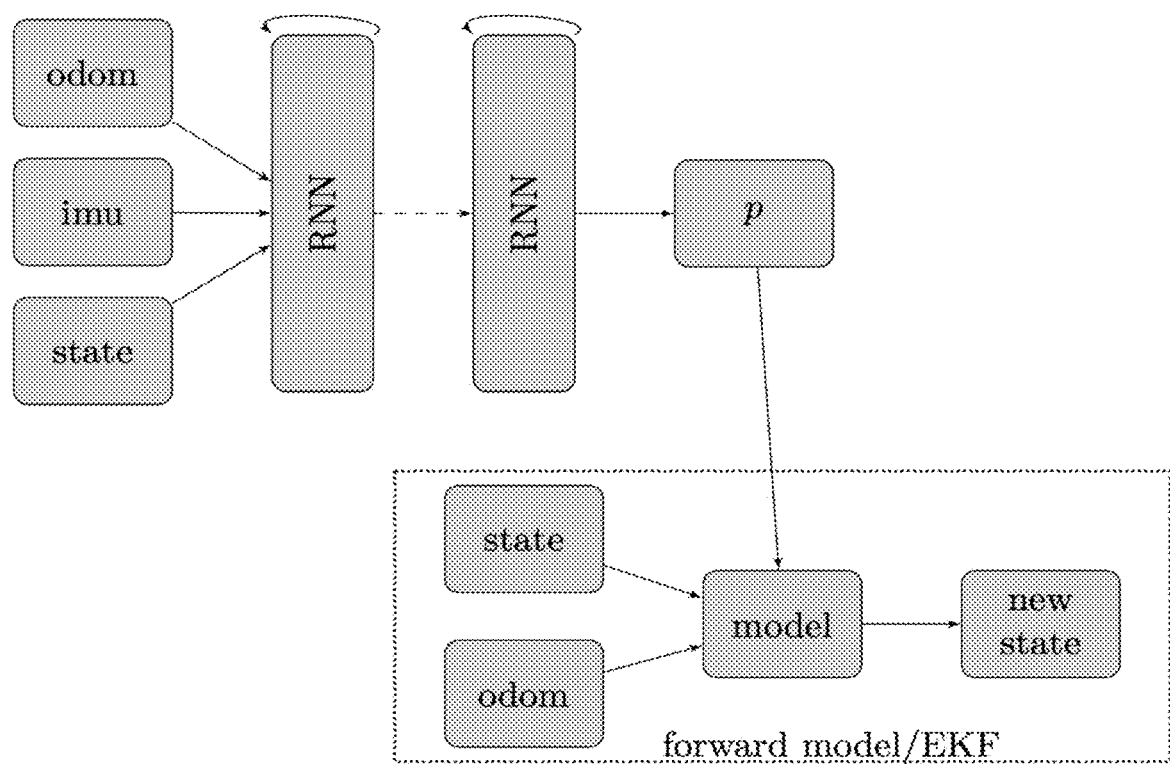
FIG. 27 illustrates an example of a motion model of a robotic device, according to some embodiments.

In some embodiments, the processor estimates a new state of the robotic device by learning to map observations to parameters p of a forward model (e.g., as described above). The recurrent neural network receives state, odometer (odom) measurements, and IMU readings as input and outputs parameters p, which are received as input into the forward model. The forward model also receives state and odometer measurements as input and outputs a new state. This is illustrated in FIG. 27. In some embodiments, the processor uses $p_{t+1}=p_t+Q_{t+1}\psi_{t+1}e_{t+1}$ as described above to determine parameters instead of the recurrent neural networks shown in FIG. 27. Further description of estimation of model parameters is provided in U.S. patent application Ser. Nos. 16/041,286 and 16/353,019, the entire contents of which are hereby incorporated by reference.

In some embodiments, the methods and techniques described herein are applied to different types of robotic devices. Examples of robotic devices on which the methods and techniques described herein may be implemented include a surface cleaning robot, a robotic commercial cleaner, a lawn mowing robot, a pizza delivery robot with an oven for baking the pizza in movement path, a grocery delivery robot, a shopping cart robot with a freezer compartment for frozen food, a fire proof first aid robot including first aid supplies, a defibrillator robot, a hospital bed robot, a pressure cleaner robot, a dog walking robot, a marketing robot, an airport luggage robot, an ATM machine robot, a snow plowing and salt spreading robot, a car washing robot, and a passenger transporting robot.

In some embodiments, the processor localizes the robotic device, such as a robotic dump truck and robotic excavator, within an environment represented by a phase space or Hilbert space. In some embodiments, the space includes all possible states of the robotic device within the space. In some embodiments, a probability distribution may be used by the processor of the robotic device to approximate the likelihood of the state of the robotic device being within a specific region of the space. In some embodiments, the processor of the robotic device determines a phase space probability distribution over all possible states of the robotic device within the phase space using a statistical ensemble including a large collection of virtual, independent copies of the robotic device in various states of the phase space. In some embodiments, the phase space consists of all possible values of position and momentum variables. In some embodiments, the processor represents the statistical ensemble by a phase space probability density function $\rho(p, q, t)$, q and p denoting position and velocity vectors. In some embodiments, the processor uses the phase space probability density function $\rho(p, q, t)$ to determine the probability $p(p, q, t)dq\,dp$ that the robotic device at time t will be found in the infinitesimal phase space volume dq dp. In some embodiments, the phase space probability density function $\rho(p, q, t)$ has the properties $\rho(p, q, t) \geq 0$ and $\int \rho(p, q, t)d(p, q)=1, \forall t\geq 0$, and the probability of the position q lying within a position interval a, b is $$P[a \leq q \leq b] = \int_a^b \int \rho(p, q, t)dpdq.$$

Similarly, the probability of the velocity p lying within a velocity interval c, d is $$P[c \leq q \leq d] = \int_c^d \int \rho(p, q, t)dqdp.$$

In some embodiments, the processor determines values by integration over the phase space. For example, the processor determines the expectation value of the position q by $\langle q \rangle = \int q\, p(p, q, t)d(p, q)$.

In some embodiments, the processor evolves each state within the ensemble over time t according to an equation of motion. In some embodiments, the processor models the motion of the robotic device using a Hamiltonian dynamical system with generalized coordinates q, p wherein dynamical properties are modeled by a Hamiltonian function H. In some embodiments, the function represents the total energy of the system. In some embodiments, the processor represents the time evolution of a single point in the phase space using Hamilton's equations $$\frac{dp}{dt} = -\frac{\partial H}{\partial q}, \frac{dq}{dt} = \frac{\partial H}{\partial p}.$$

In some embodiments, the processor evolves the entire statistical ensemble of phase space density function ρ(p, q, t) under a Hamiltonian H using the Liouville equation $$\frac{\partial \rho}{\partial t} = -\{\rho, H\},$$

wherein {•,•} denotes the Poisson bracket and H is the Hamiltonian of the system. For two functions $f$, g on the phase space, the Poisson bracket is given by $$\{f, g\} = \sum_{i=1}^{N} \left( \frac{\partial f}{\partial q_i} \frac{\partial g}{\partial p_i} - \frac{\partial f}{\partial p_i} \frac{\partial g}{\partial q_i} \right).$$

In this approach, the processor evolves each possible state in the phase space over time instead of keeping the phase space density constant over time, which is particularly advantageous if sensor readings are sparse in time.

In some embodiments, the processor evolves the phase space probability density function ρ(p, q, t) over time using the Fokker-Plank equation which describes the time evolution of a probability density function of a particle under drag and random forces. In comparison to the behavior of the robotic device modeled by both the Hamiltonian and Liouville equations, which are purely deterministic, the Fokker-Planck equation includes stochastic behaviour. Given a stochastic process with $dX_t = \mu(X_t, t)dt + \sigma(X_t, t)dW_t$, wherein $X_t$ and $\mu(X_t, t)$ are M-dimensional vectors, $\sigma(X_t, t)$ is a M×P matrix, and $W_t$ is a P-dimensional standard Wiener process, the probability density ρ(x, t) for $X_t$ satisfies the Fokker-Planck equation $$\frac{\partial \rho(x, t)}{\partial t} = -\sum_{i=1}^{M} \frac{\partial}{\partial x_i} [\mu_i(x, t)\rho(x, t)] + \sum_{i=1}^{M} \sum_{j=1}^{M} \frac{\partial^2}{\partial x_i \partial x_j} [D_{ij}(x, t)\rho(x, t)]$$

with drift vector $\mu = (\mu_1, \ldots, \mu_M)$ and diffusion tensor $$D = \frac{1}{2}\sigma\sigma^T.$$

In some embodiments, the processor adds stochastic forces to the motion of the robotic device governed by the Hamiltonian H and the motion of the robotic device is then given by the stochastic differential equation $$dX_t = \begin{pmatrix} dq \\ dp \end{pmatrix} = \begin{pmatrix} +\frac{\partial H}{\partial p} \\ -\frac{\partial H}{\partial q} \end{pmatrix} dt = \begin{pmatrix} 0_N \\ \sigma_N(p, q, t) \end{pmatrix} dW_t,$$

wherein $\sigma_N$ is a N×N matrix and $dW_t$ is a N-dimensional Wiener process. This leads to the Fokker-Plank equation $$\frac{\partial \rho}{\partial t} = -\{\rho, H\} + \nabla_p \cdot (D\nabla_p \rho),$$

wherein $\nabla_p$ denotes the gradient with respect to position p, ∇• denotes divergence, and $$D = \frac{1}{2}\sigma_N \sigma_N^T$$

is the diffusion tensor.

In other embodiments, the processor incorporates stochastic behaviour by modeling the dynamics of the robotic device using Langevin dynamics, which models friction forces and perturbation to the system, instead of Hamiltonian dynamics. The Langevian equations are given by M\ddot{q}=$-\nabla_q U(q)-\gamma p+\sqrt{2\gamma k_B T M}R(t)$, wherein (−γp) are friction forces, R(t) are random forces with zero-mean and delta-correlated stationary Gaussian process, T is the temperature, $k_B$ is Boltzmann's constant, γ is a damping constant, and M is a diagonal mass matrix. In some embodiments, the Langevin equation is reformulated as a Fokker-Planck equation $$\frac{\partial \rho}{\partial t} = -\{\rho, H\} + \nabla_p \cdot (\gamma p\rho) + k_B T \nabla_p \cdot (\gamma M \nabla_p \rho)$$

that the processor uses to evolve the phase space probability density function over time. In some embodiments, the second order term $\nabla_p \cdot (\gamma M \nabla_p \rho)$ is a model of classical Brownian motion, modeling a diffusion process. In some embodiments, partial differential equations for evolving the probability density function over time may be solved by the processor of the robotic device using, for example, finite difference and/or finite element methods.

Figure 28A:
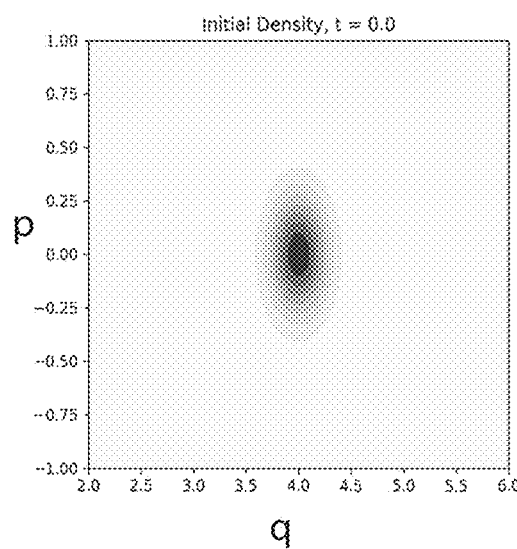
FIG. 28A illustrates an example of an initial phase space probability density of a robotic device, according to some embodiments.
Figure 28B:
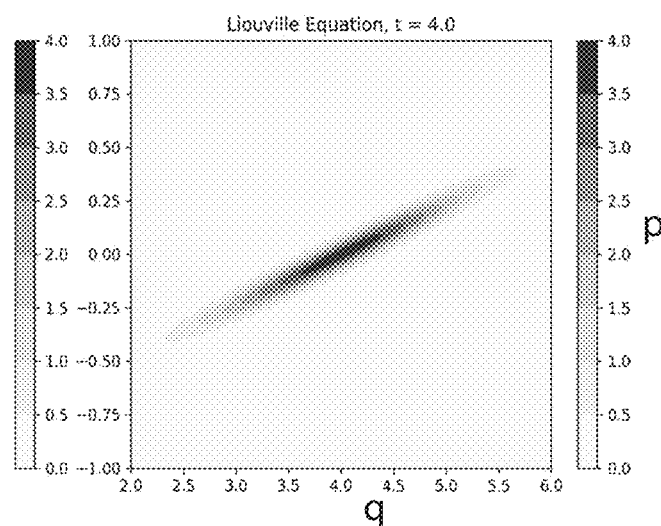
FIGS. 28B-28D illustrates examples of the time evolution of the phase space probability density, according to some embodiments.

FIG. 28A illustrates an example of an initial phase space probability density of a robotic device, a Gaussian in (q, p) space. FIG. 28B illustrates an example of the time evolution of the phase space probability density after four time units when evolved using the Liouville equation incorporating Hamiltonian dynamics, $$\frac{\partial \rho}{\partial t} = -\{\rho, H\}$$

with Hamiltonian $$H = \frac{1}{2}p^2.$$

Figure 28C:
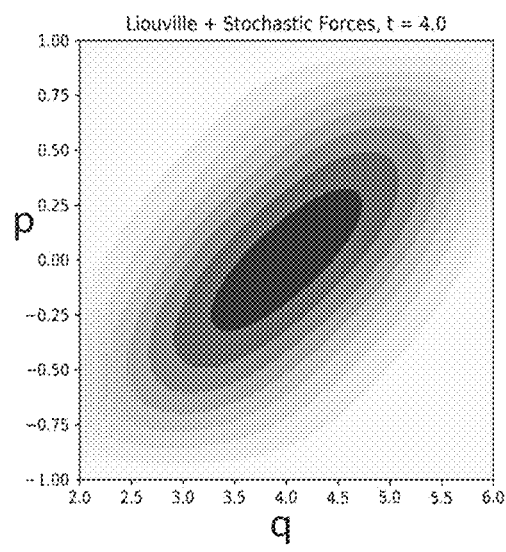
Figure 28D:
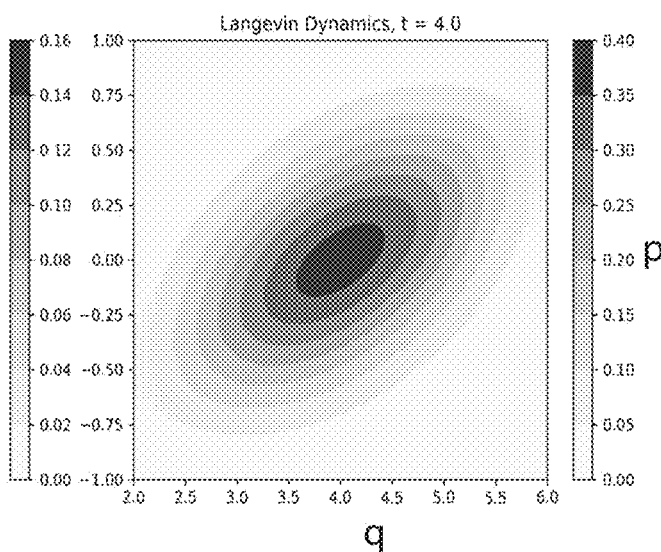

FIG. 28C illustrates an example of the time evolution of the phase space probability density after four time units when evolved using the Fokker-Planck equation incorporating Hamiltonian dynamics, $$\frac{\partial \rho}{\partial t} = -\{\rho, H\} + \nabla_p \cdot (D\nabla_p \rho)$$

with D=0.1. FIG. 28D illustrates an example of the time evolution of the phase space probability density after four time units when evolved using the Fokker-Planck equation incorporating Langevin dynamics, $$\frac{\partial \rho}{\partial t} = -\{\rho, H\} + \nabla_p \cdot (\gamma p \rho) + k_B T \nabla_p \cdot (\gamma M \nabla_p \rho)$$

with $\gamma=0.5$, $T=0.2$, and $k_B=1$. FIG. 28B illustrates that the Liouville equation incorporating Hamiltonian dynamics conserves momentum over time, as the initial density in FIG. 28A was only distorted in the q-axis (position). In comparison, FIGS. 28C and 28D illustrate diffusion along the p-axis (velocity) as well, as both evolution equations account for stochastic forces. With the Fokker-Planck equation incorporating Hamiltonian dynamics the density spread more equally (FIG. 28C) as compared to the Fokker-Planck equation incorporating Langevin dynamics where the density remained more confined (FIG. 28D) due to the additional friction forces.

In some embodiments, the processor of the robotic device may update the phase space probability distribution when the processor receives readings (or measurements or observations). Any type of reading that may be represented as a probability distribution that describes the likelihood of the state of the robotic device being in a particular region of the phase space may be used. Readings may include measurements or observations acquired by sensors of the robotic device or external devices such as a Wi-Fi™ camera. Each reading may provide partial information on the likely region of the state of the robotic device within the phase space and/or may exclude the state of the robotic device from being within some region of the phase space. For example, a depth sensor of the robotic device may detect an obstacle in close proximity to the robotic device. Based on this measurement and using a map of the phase space, the processor of the robotic device may reduce the likelihood of the state of the robotic device being any state of the phase space at a great distance from an obstacle. In another example, a reading of a floor sensor of the robotic device and a floor map may be used by the processor of the robotic device to adjust the likelihood of the state of the robotic device being within the particular region of the phase space coinciding with the type of floor sensed. In an additional example, a measured Wi-Fi™ signal strength and a map of the expected Wi-Fi™ signal strength within the phase space may be used by the processor of the robotic device to adjust the phase space probability distribution. As a further example, a Wi-Fi™ camera may observe the absence of the robotic device within a particular room. Based on this observation the processor of the robotic device may reduce the likelihood of the state of the robotic device being any state of the phase space that places the robotic device within the particular room.

In embodiments, the processor of the robotic device may update the current phase space probability distribution $\rho(p, q, t_i)$ by re-weighting the phase space probability distribution with an observation probability distribution $m(p, q, t_i)$ according to $$\bar{\rho}(p, q, t_i) = \frac{\rho(p, q, t_i) \cdot m(p, q, t_i)}{\int \rho(p, q, t_i) m(p, q, t_i) d(p, q)}.$$

Figure 29A:
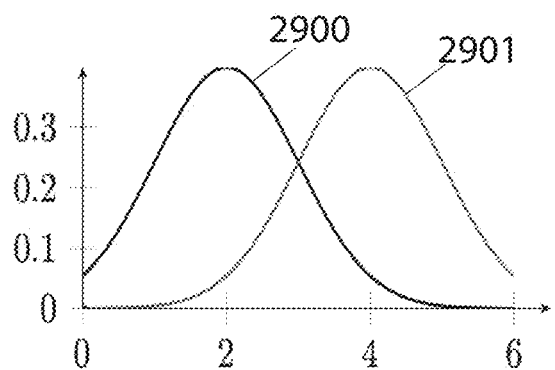
FIGS. 29A-29F illustrate examples of current probability distributions and observation probability distributions and the resulting updated probability distributions after re-weighting the current probability distributions with the observation probability distributions, according to some embodiments.
Figure 29B:
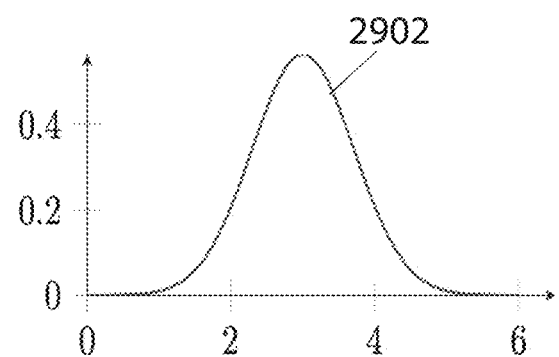
Figure 29C:
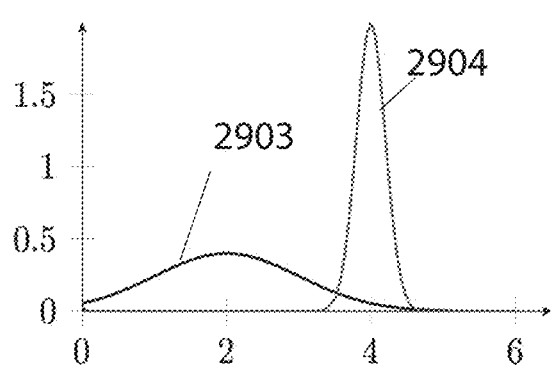
Figure 29D:
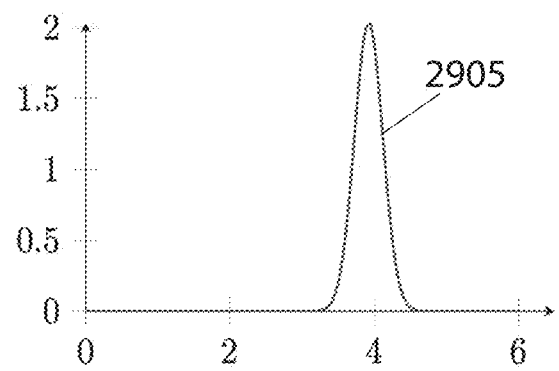
Figure 29E:
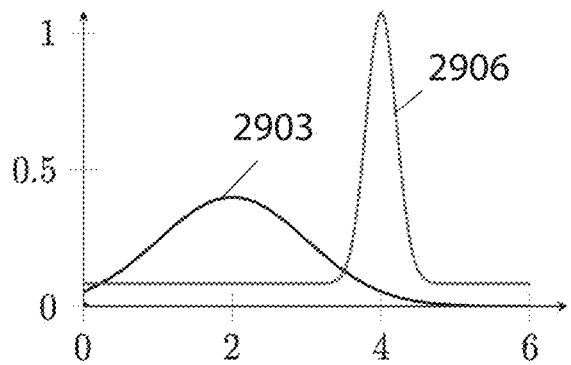
Figure 29F:
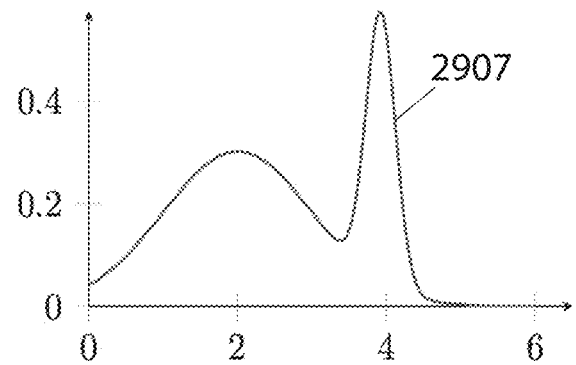

In some embodiments, the observation probability distribution may be determined by the processor of the robotic device for a reading at time $t_i$ using an inverse sensor model. In some embodiments, wherein the observation probability distribution does not incorporate the confidence or uncertainty of the reading taken, the processor of the robotic device may incorporate the uncertainty into the observation probability distribution by determining an updated observation probability distribution $$\hat{m} = \frac{1-\alpha}{c} + \alpha m$$

that may be used in re-weighting the current phase space probability distribution, wherein $\alpha$ is the confidence in the reading with a value of $0 \le \alpha \le 1$ and $c = \iint dp dq$. For example, FIG. 29A illustrates an example of a current probability distribution 2900 and an observation probability distribution 2901. FIG. 29B illustrates the updated probability distribution 2902 after re-weighting the current probability distribution 2900 with the observation probability distribution 2901. Similarly, FIG. 29C illustrates an example of a current probability distribution 2903 and an observation probability distribution 2904. FIG. 29D illustrates the updated probability distribution 2905 after re-weighting the current probability distribution 2903 with the observation probability distribution 2904. In this example, the observation probability distribution 2904 is very narrow with a standard deviation of 0.2, indicating high confidence in the observation which is reflected in the resulting re-weighted probability distribution 2905 as it predominantly reflects the observation probability distribution 2904. In FIG. 29E the same current probability distribution 2903 is shown, however, the observation probability distribution 2906 is more spread as compared to 2904, with a standard deviation of 0.5. The resulting update probability distribution 2907 is illustrated in FIG. 29F. At any given time, the processor of the robotic device may estimate a region of the phase space within which the state of the robotic device is likely to be given the phase space probability distribution at the particular time.

Figure 30A:
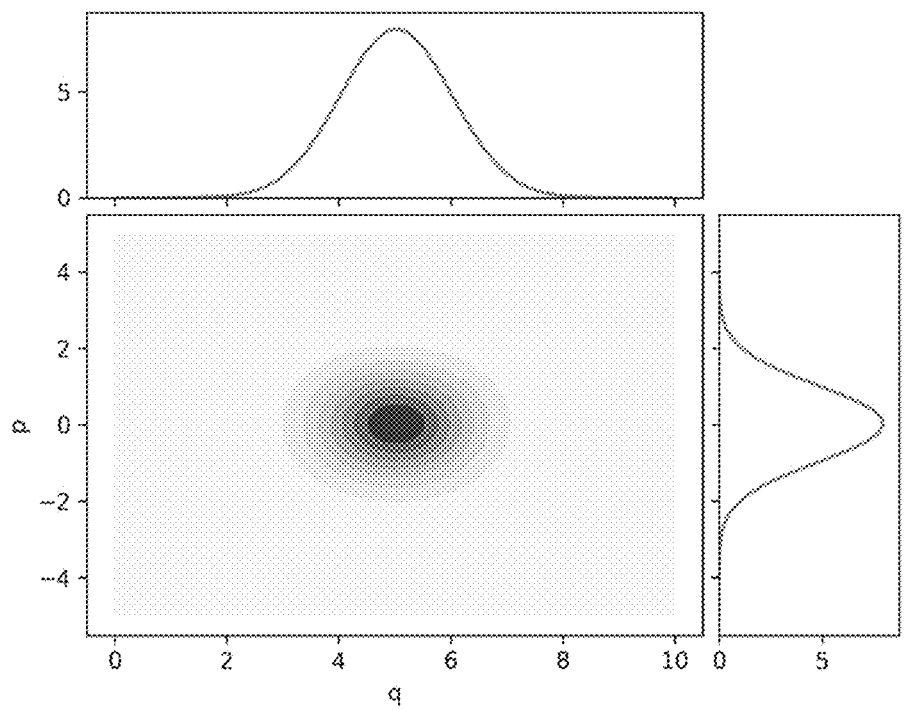
FIGS. 30A-30D illustrate examples of initial phase space probability distributions, according to some embodiments.
Figure 30B:
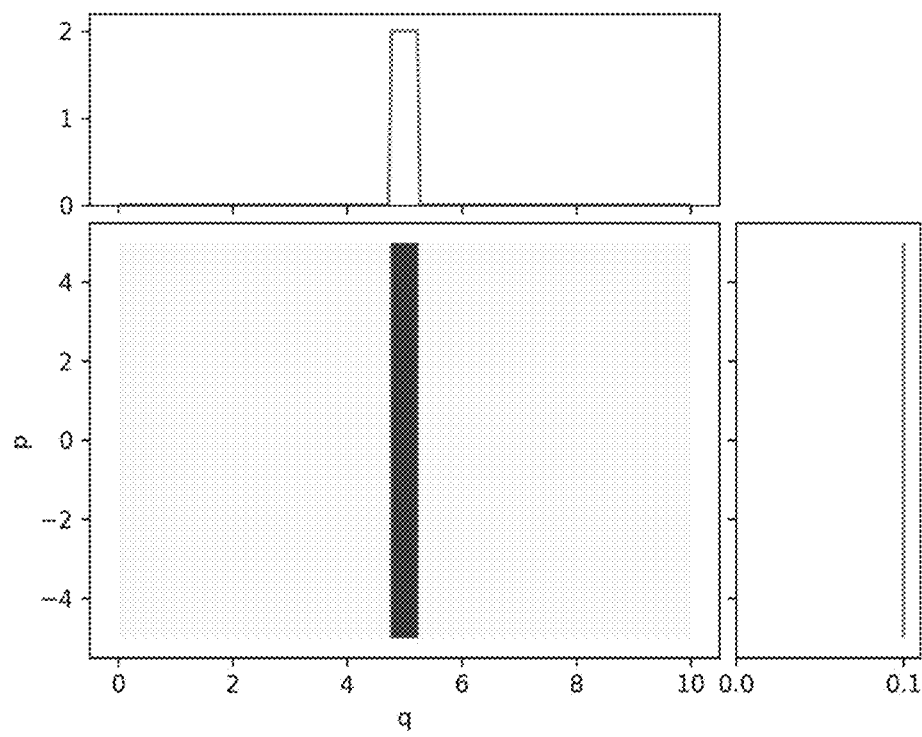
Figure 30C:
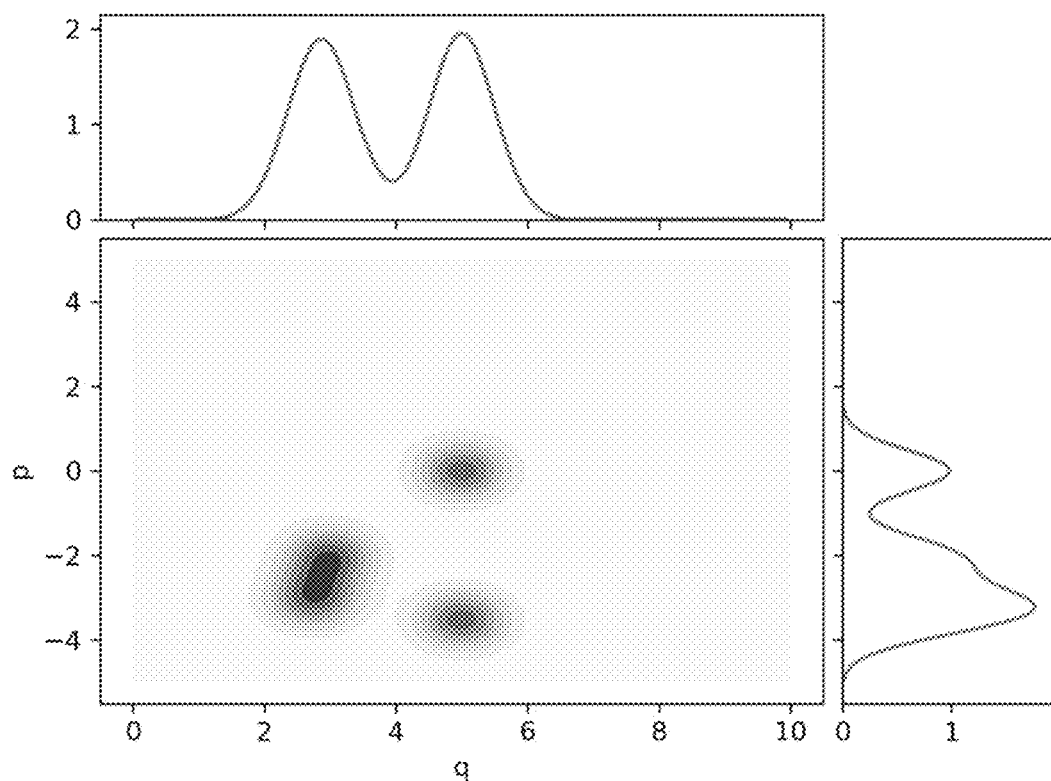
Figure 30D:
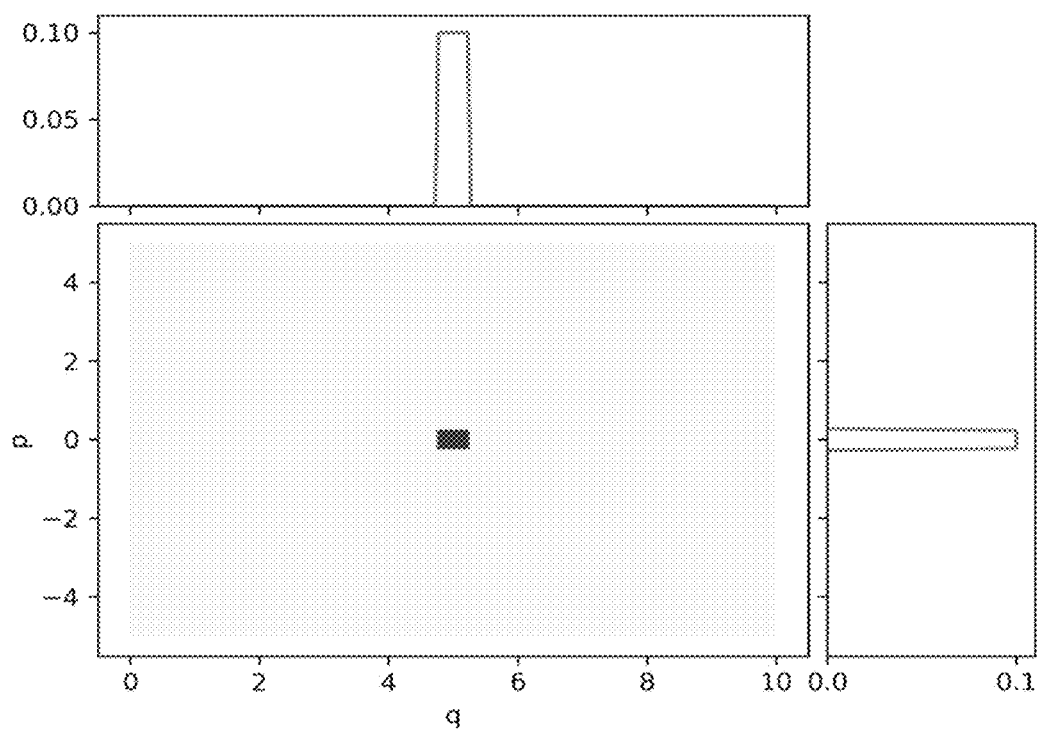

To further explain the localization methods described, examples are provided. In a first example, the processor uses a two-dimensional phase space of the robotic device, including position q and velocity p. The processor confines the position of the robotic device q to an interval [0, 10] and the velocity p to an interval [−5, +5], limited by the top speed of the robotic device, therefore the phase space (p, q) is the rectangle D=[−5, 5]×[0, 10]. The processor uses a Hamiltonian function $$H = \frac{p^2}{2m},$$

with mass m and resulting equations of motion $\dot{p}=0$ and $$\dot{q} = \frac{p}{m}$$

to delineate the motion of the robotic device. The processor adds Langevin-style stochastic forces to obtain motion equations $\dot{p}=-\gamma p+\sqrt{2\gamma m k_B T}R(t)$ and $$\dot{q} = \frac{p}{m},$$

wherein R(t) denotes random forces and m=1. The processor of the robotic device initially generates a uniform phase space probability distribution over the phase space D. FIGS. 30A-30D illustrate examples of initial phase space probability distributions the processor may use. FIG. 30A illustrates a Gaussian distribution over the phase space, centered at q=5, p=0. The robotic device is estimated to be in close proximity to the center point with high probability, the probability decreasing exponentially as the distance of the point from the center point increases. FIG. 30B illustrates uniform distribution for q∈[4.75, 5.25], p∈[−5, 5] over the phase space, wherein there is no assumption on p and q is equally likely to be in [4.75, 5.25]. FIG. 30C illustrates multiple Gaussian distributions and FIG. 30D illustrates a confined spike at q=5, p=0, indicating that the processor is certain of the state of the robotic device.

Figure 31A:
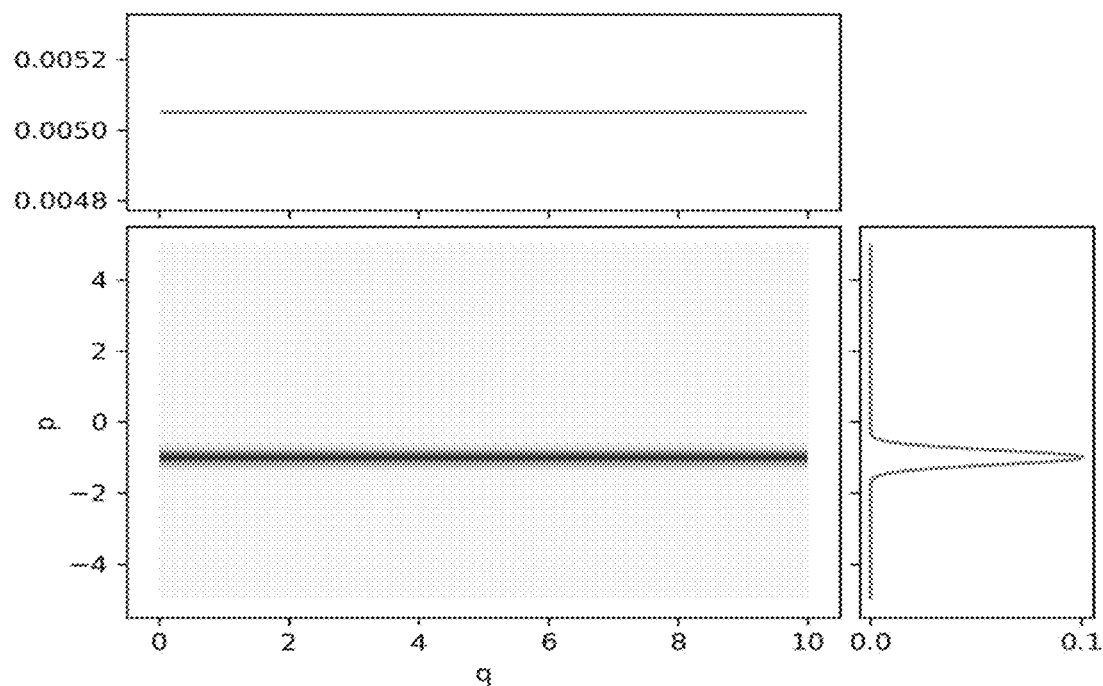
FIGS. 31A and 31B illustrate examples of observation probability distributions, according to some embodiments.
Figure 31B:
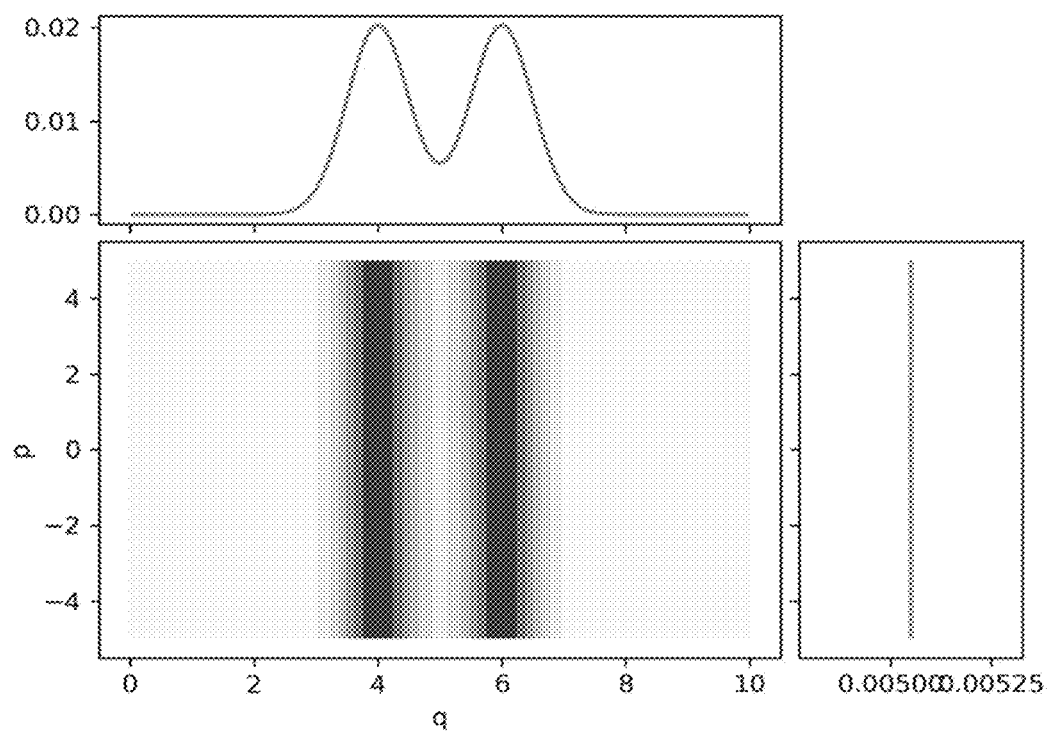

In this example, the processor of the robotic device evolves the phase space probability distribution over time according to Langevin equation $$\frac{\partial \rho}{\partial t} = -\{\rho, H\} + \left(\gamma \frac{\partial}{\partial p}\right) \cdot (p\rho) + \gamma k_B T \frac{\partial^2 \rho}{\partial p^2},$$

wherein $$\{\rho, H\} = p \frac{\partial \rho}{\partial q}$$

and m=1. Thus, the processor solves $$\frac{\partial \rho}{\partial t} = -p \frac{\partial \rho}{\partial q} + \gamma \left(\rho + p \frac{\partial \rho}{\partial p}\right) + \gamma k_B T \frac{\partial^2 \rho}{\partial p^2}$$

for t>0 with initial condition $\rho(p, q, 0)=\rho_0$ and homogenous Neumann boundary conditions. The boundary conditions govern what happens when the robotic device reaches an extreme state. In the position state, this may correspond to the robotic device reaching a wall, and in the velocity state, it may correspond to the motor limit. The processor of the robotic device updates the phase space probability distribution each time a new reading is received by the processor. FIGS. 31A and 31B illustrate examples of observation probability distributions for odometry measurements and distance measurements, respectively. FIG. 31A illustrates a narrow Gaussian observation probability distribution for velocity p, reflecting an accurate odometry sensor. Position q is uniform as odometry data does not indicate position. FIG. 31B illustrates a bimodal observation probability distribution for position q including uncertainty for an environment with a wall at q=0 and q=10. Therefore, for a distance measurement of four, the robotic device is either at q=4 or q=6, resulting in the bi-modal distribution. Velocity p is uniform as distance data does not indicate velocity. In some embodiments, the processor may update the phase space at periodic intervals or at predetermined intervals or points in time. In some embodiments, the processor of the robotic device may determine an observation probability distribution of a reading using an inverse sensor model and the phase space probability distribution may be updated by the processor by re-weighting it with the observation probability distribution of the reading.

Figure 32:
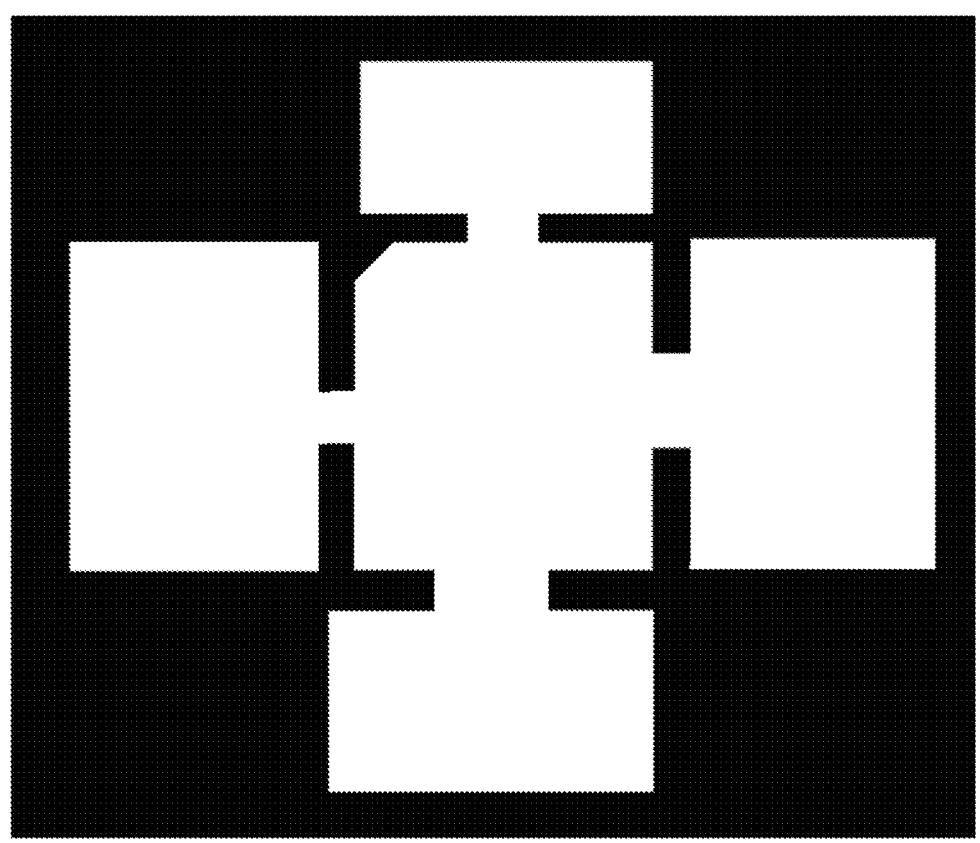
FIG. 32 illustrates an example of a map of an environment, according to some embodiments.
Figure 33A:
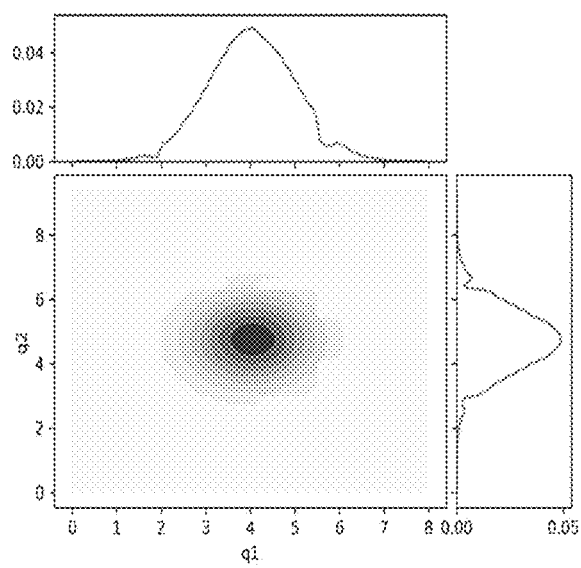
FIGS. 33A-33C illustrate an example of an evolution of a probability density reduced to the $q_1$, $q_2$ space at three different time points, according to some embodiments.
Figure 33B:
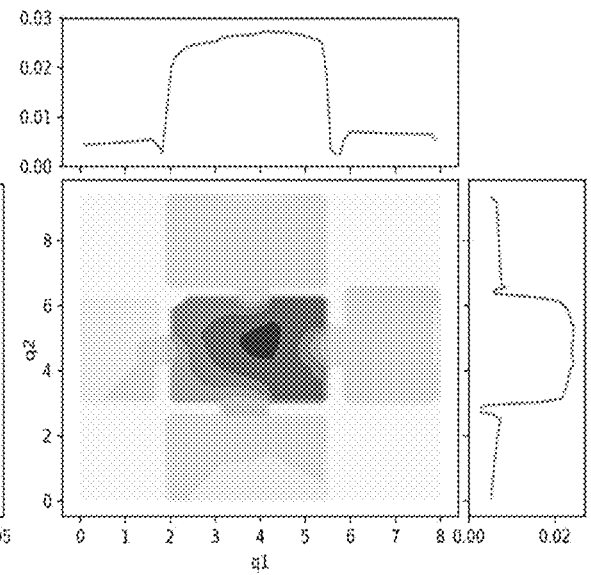
Figure 33C:
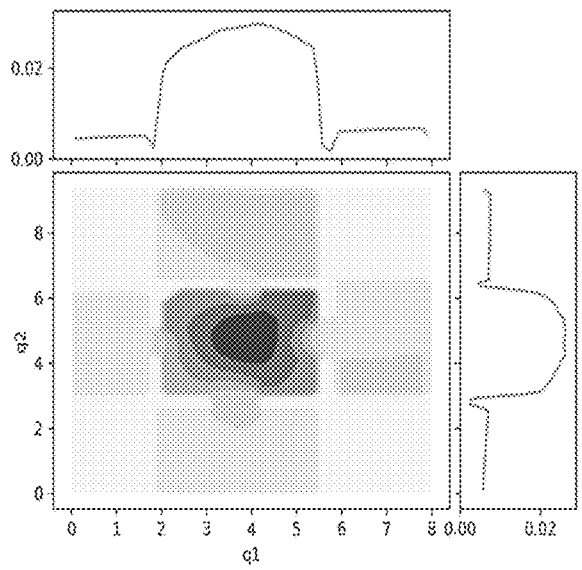
Figure 34A:
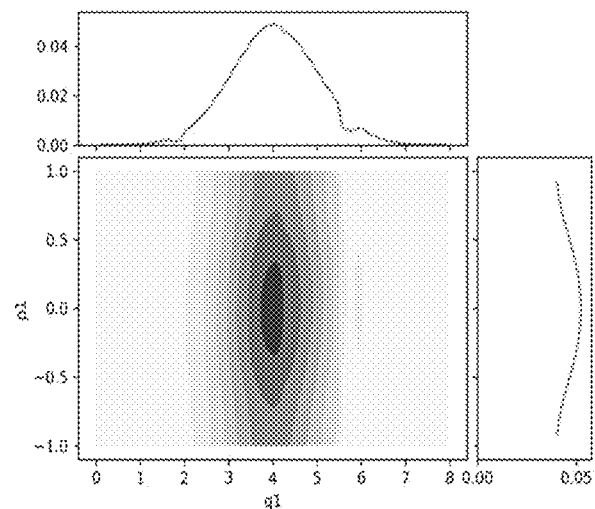
FIGS. 34A-34C illustrate an example of an evolution of a probability density reduced to the $p_1$, $q_1$ space at three different time points, according to some embodiments.
Figure 34B:
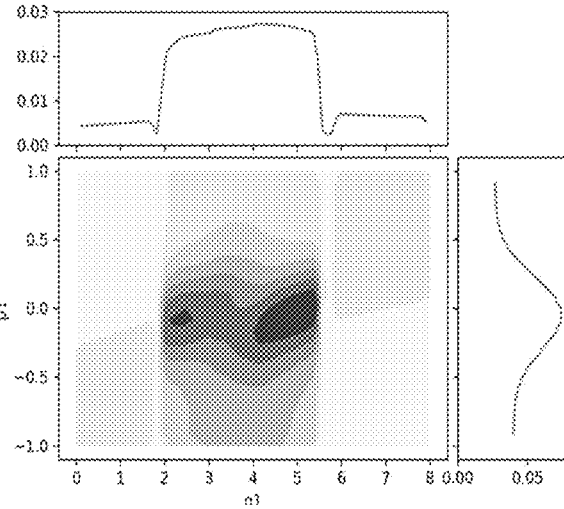
Figure 34C:
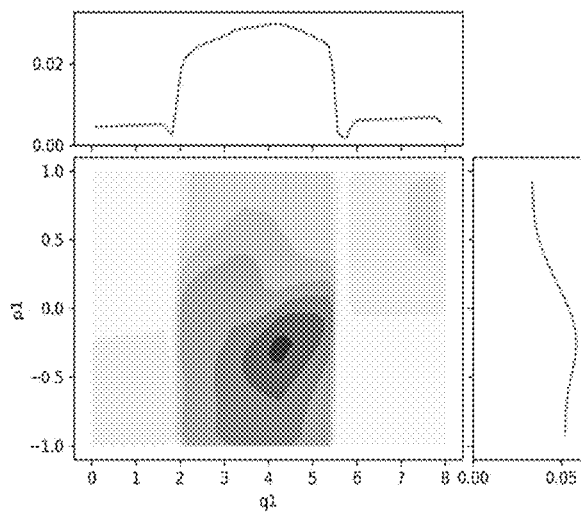
Figure 35A:
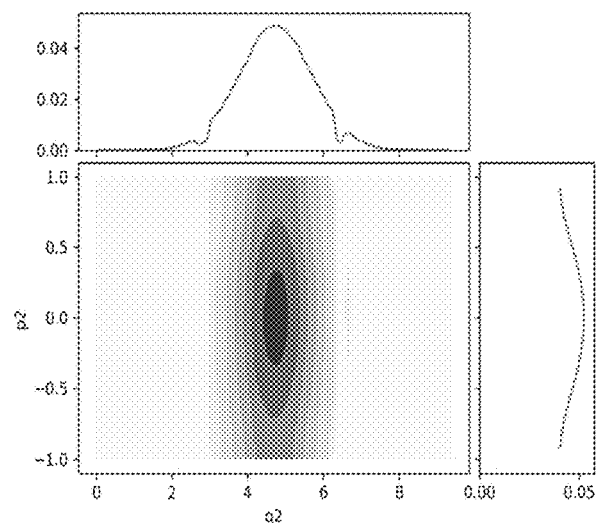
FIGS. 35A-35C illustrate an example of an evolution of a probability density reduced to the $p_2$, $q_2$ space at three different time points, according to some embodiments.
Figure 35B:
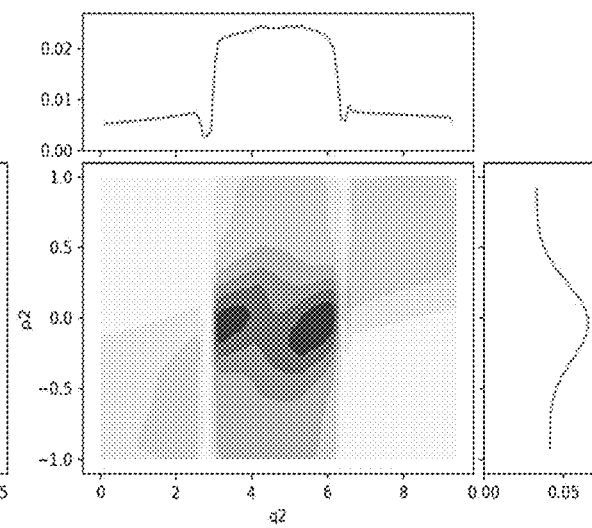
Figure 35C:
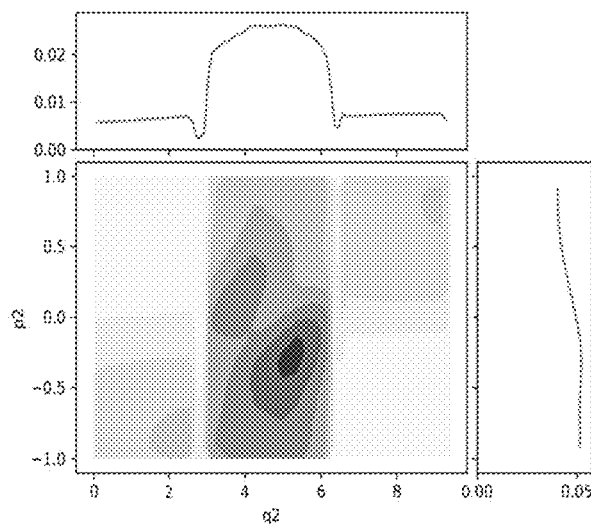
Figure 36:
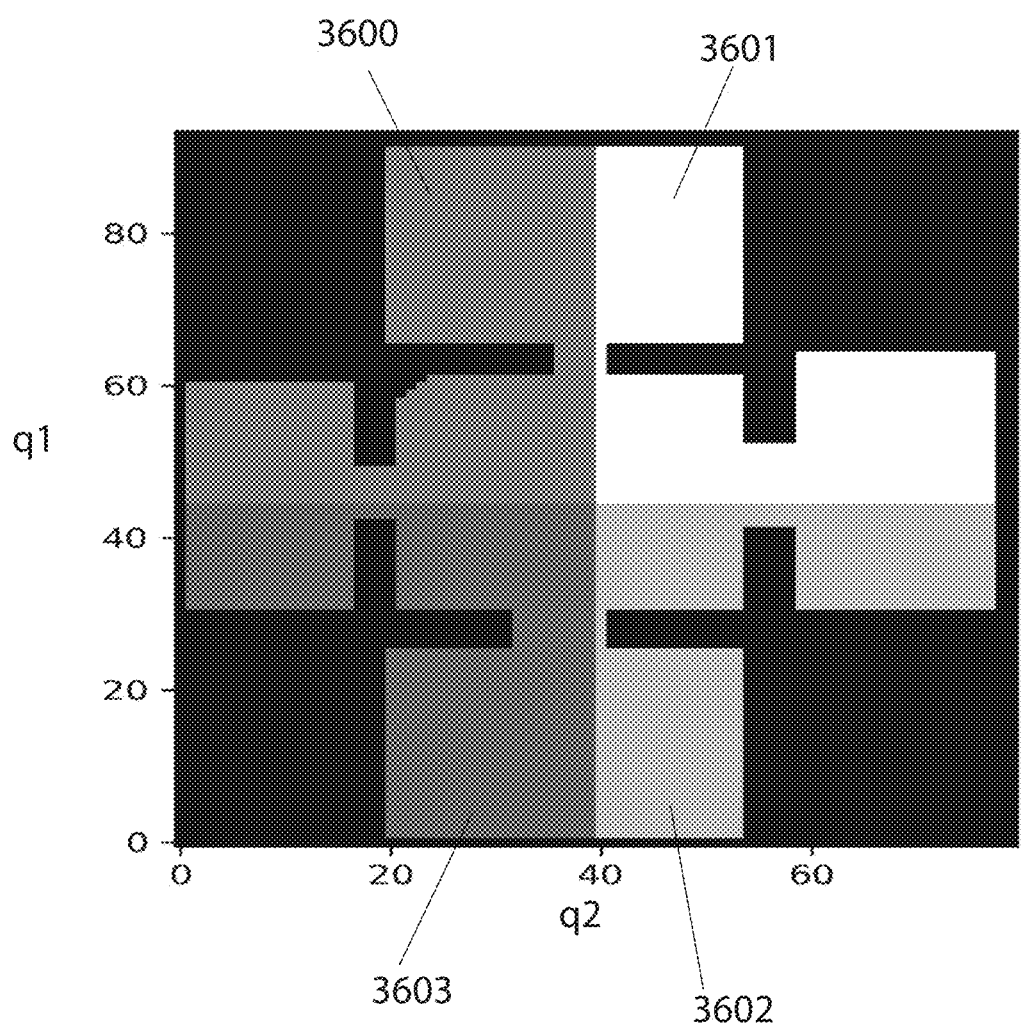
FIG. 36 illustrates an example of a map indicating floor types, according to some embodiments.

The example described may be extended to a four-dimensional phase space with position q=(x, y) and velocity p=($p_x$, $p_y$). The processor solves this four dimensional example using the Fokker-Planck equation $$\frac{\partial \rho}{\partial t} = -\{\rho, H\} + \nabla_p \cdot (\gamma p \rho) + k_B T \nabla_p \cdot (\gamma M \nabla_p \rho)$$

with M=$I_2$ (2D identity matrix), T=0.1, γ=0.1, and $k_B$=1. In alternative embodiments, the processor uses the Fokker-Planck equation without Hamiltonian and velocity and applies velocity drift field directly through odometry which reduces the dimension by a factor of two. The map of the environment for this example is given in FIG. 32, wherein the white space is the area accessible to the robotic device. The map describes the domain for $q_1$, $q_2$ ∈D. In this example, the velocity is limited to $p_1$, $p_2$ ∈[−1, 1]. The processor models the initial probability density ρ(p, q, 0) as Gaussian, wherein ρ is a four-dimensional function. FIGS. 33A-33C illustrate the evolution of p reduced to the $q_1$, $q_2$ space at three different time points (i.e., the density integrated over $p_1$, $p_2$, $\rho_{red}$=∫∫ρ($p_1$, $p_2$, $q_1$, $q_2$)$dp_1 dp_2$). It can be seen that with increased time, the initial density focused in the middle of the map starts to flow into other rooms. FIGS. 34A-34C illustrate the evolution of ρ reduced to the $p_1$, $q_1$ space and 35A-35C illustrate the evolution of p reduced to the $p_2$, $q_2$ space at the same three different time points to show how velocity evolves over time with position. The four-dimensional example is repeated but with the addition of floor sensor data observations. FIG. 36 illustrates a map of the environment indicating different floor types 3600, 3601, 3602, and 3603 with respect to $q_1$, $q_2$. Given that the sensor has no error, the processor may strongly predict the area within which the robotic device is located based on the measured floor type, at which point all other hypothesized locations of the robotic device become invalid. For example, the processor may use the distribution $$m(p_1, p_2, q_1, q_2) = \begin{cases} const > 0, & q_1, q_2 \text{ with the observed floor type} \\ 0, & \text{else} \end{cases}.$$

Figure 37:
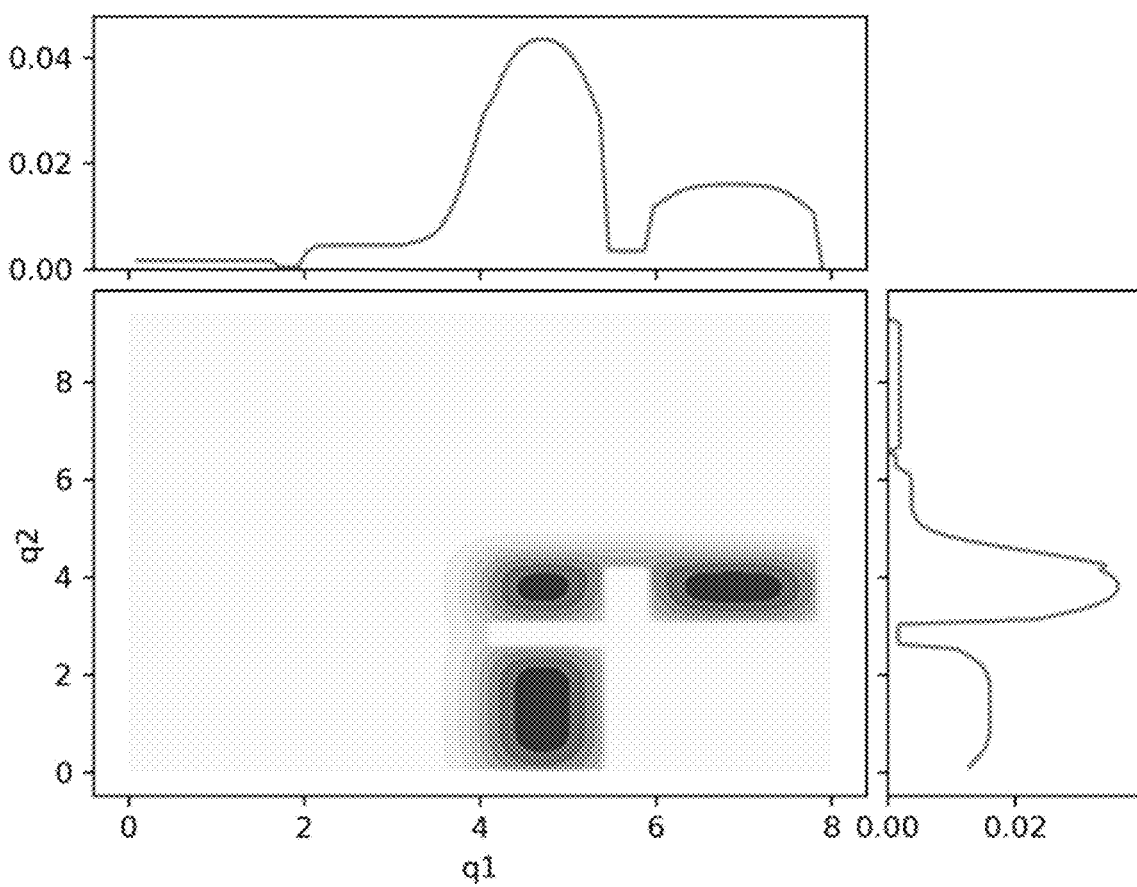
FIG. 37 illustrates an example of an updated probability density after observing floor type, according to some embodiments.
Figure 38:
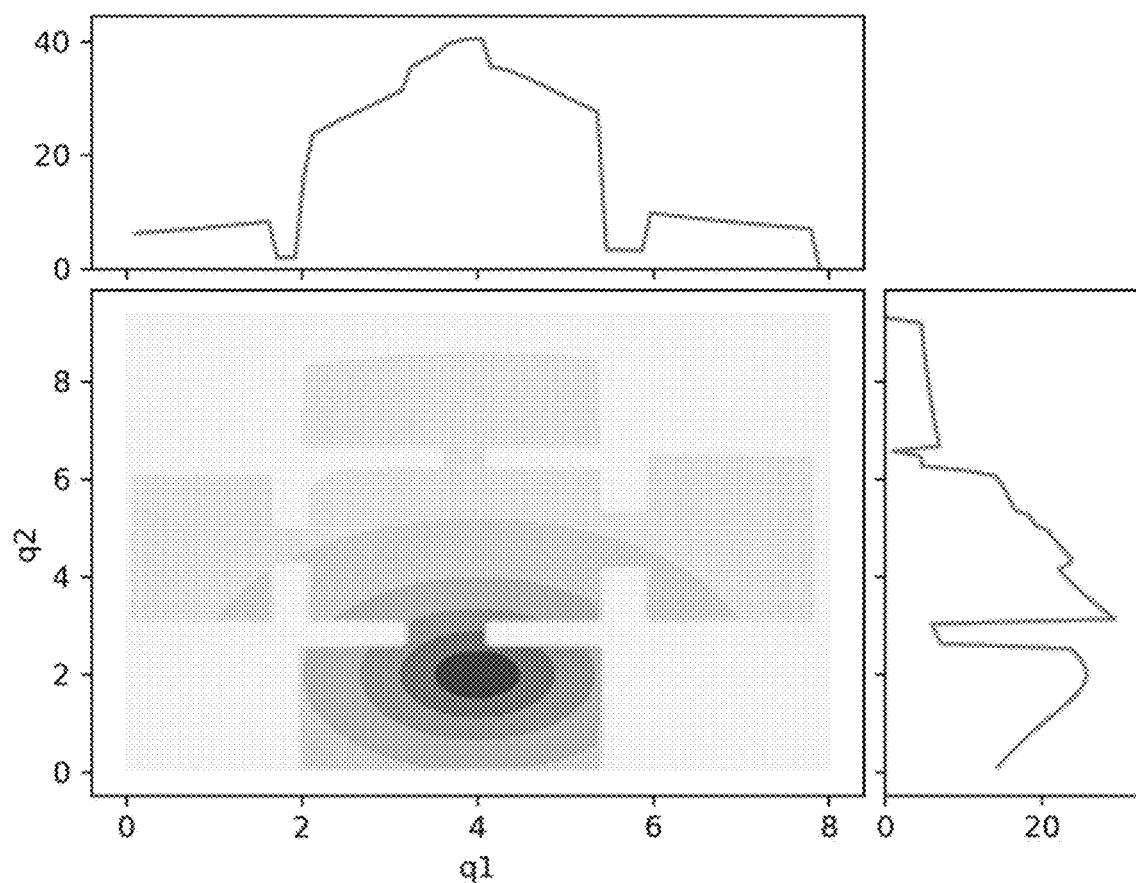
FIG. 38 illustrates an example of a Wi-Fi map, according to some embodiments.
Figure 39:
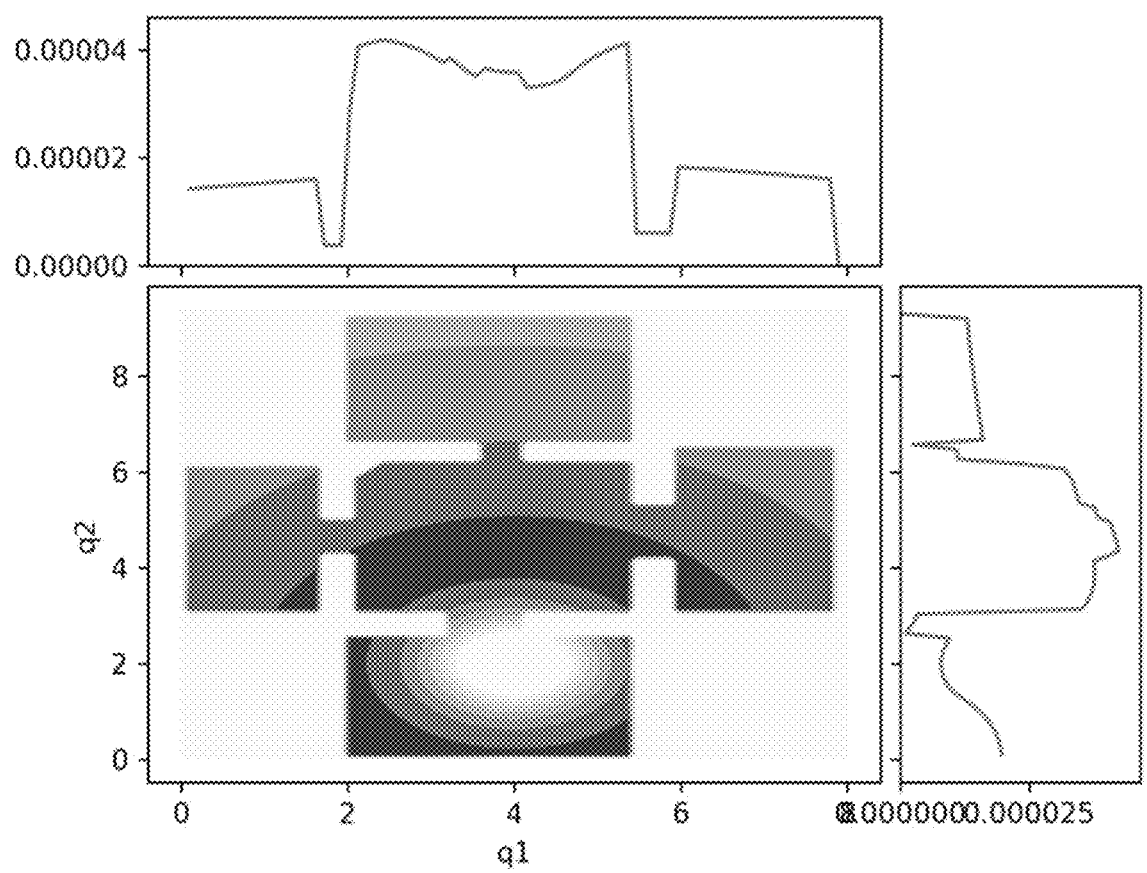
FIG. 39 illustrates an example of an updated probability density after observing Wi-Fi strength, according to some embodiments.
Figure 40:
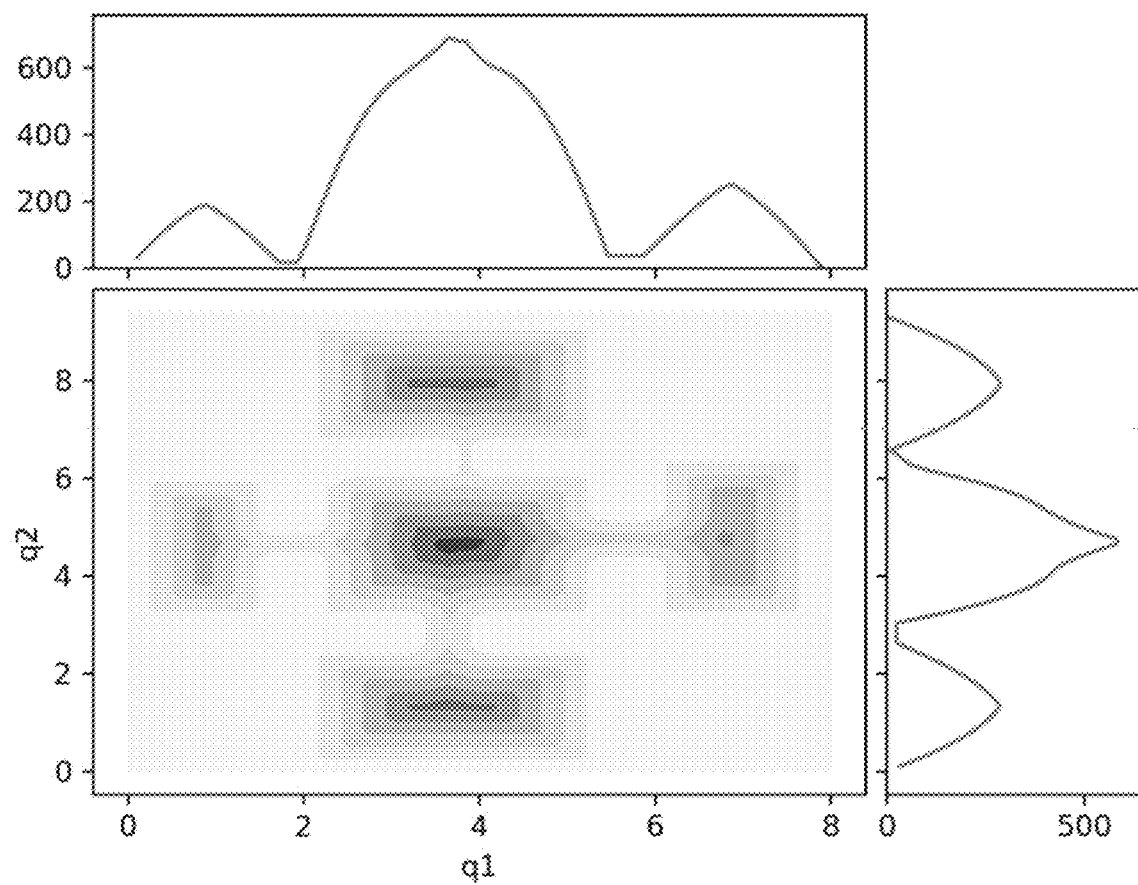
FIG. 40 illustrates an example of a wall distance map, according to some embodiments.
Figure 41:
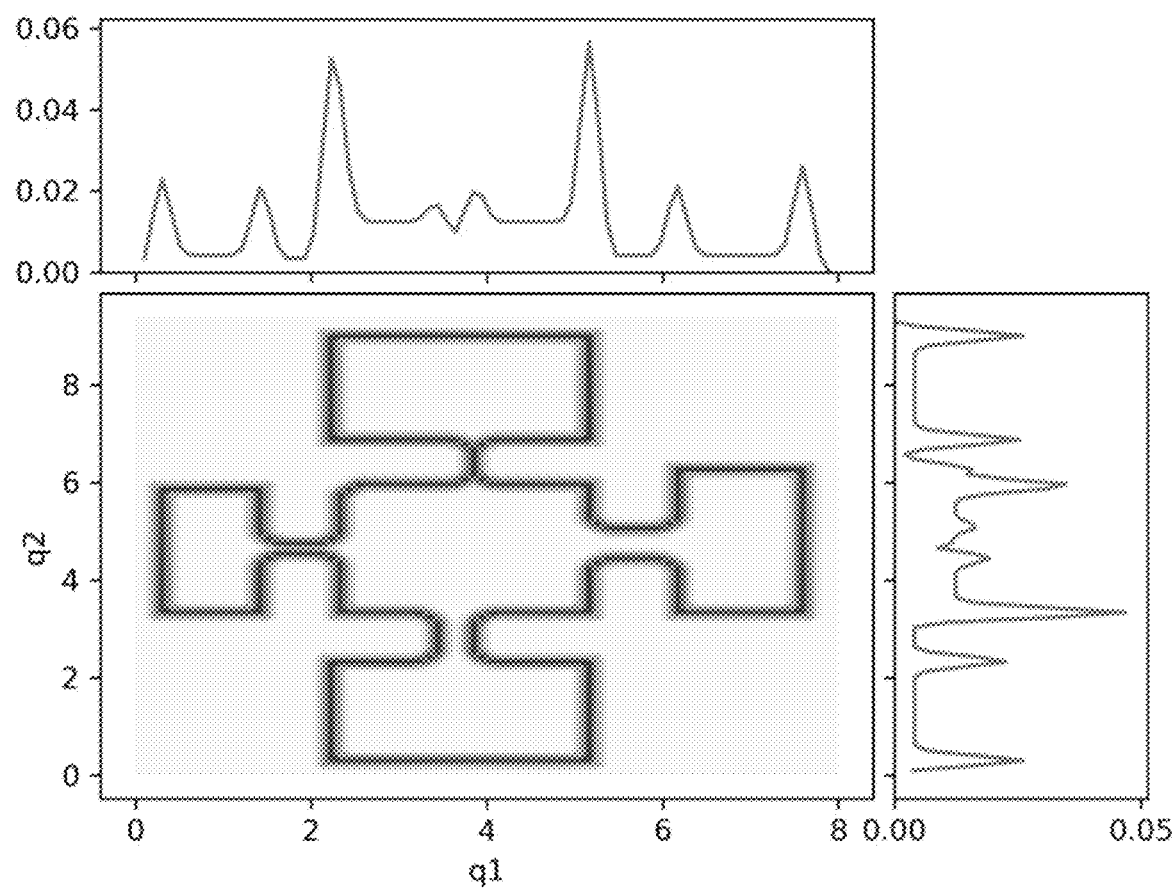
FIG. 41 illustrates an example of an updated probability density after observing distances to a wall, according to some embodiments.

If the sensor has an average error rate ∈, the processor may use the distribution $$m(p_1, p_2, q_1, q_2) = \begin{cases} c_1 > 0, & q_1, q_2 \text{ with the observed floor type} \\ c_2 > 0, & \text{else} \end{cases}$$

with $c_1$, $c_2$ chosen such that $\int_p \int_{D_{obs}} m d(q_1, q_2) d(p_1, p_2)=1-\epsilon$ and $\int_p \int_{D_{obs}^c} m d(q_1, q_2) d(p_1, p_2)=\epsilon$. $D_{obs}$ is the $q_1$, $q_2$ with the observed floor type and $D_{obs}^c$ is its complement. By construction, the distribution m has a probability 1−∈ for $q_1$, $q_2$ ∈ $Do_b$s and probability ∈ for $q_1$, $q_2$ ∈ $D_{obs}^c$. Given that the floor sensor measures floor type 3602, the processor updates the probability distribution for position as shown in FIG. 37. Note that the corners of the distribution were smoothened by the processor using a Gaussian kernel, which corresponds to an increased error rate near the borders of an area. Next, Wi-Fi signal strength observations are considered. Given a map of the expected signal strength, such as that in FIG. 38, the processor may generate a density describing the possible location of the robotic device based on a measured Wi-Fi signal strength. The darker areas in FIG. 38 represent stronger Wi-Fi signal strength and the signal source is at $q_1$, $q_2=4.0, 2.0$. Given that the robotic device measures a Wi-Fi signal strength of 0.4, the processor generates the probability distribution for position shown in FIG. 39. The likely area of the robotic device is larger since the Wi-Fi signal does not vary very much. For wall distance measurements, a wall distance map, such as that shown in FIG. 40 may be used by the processor to approximate the area of the robotic device given a distance measured. Given that the robotic device measures a distance of 3 distance units, the processor generates the probability distribution for position shown in FIG. 41. For example, the processor evolves the Fokker-Planck equation over time and as observations are successively taken, the processor re-weights the density function with each observation wherein parts that do not match the observation are considered less likely and parts that highly match the observations relatively increase in probability. An example of observations over time may be, t=1: observe $p_2=0.75$; t=2: observe $p_2=0.95$ and Wi-Fi signal strength 0.56; t=3: observe wall distance 9.2; t=4: observe floor type 2; t=5: observe floor type 2 and Wi-Fi signal strength 0.28; t=6: observe wall distance 3.5; t=7: observe floor type 4, wall distance 2.5, and Wi-Fi signal strength 0.15; t=8: observe floor type 4, wall distance 4, and Wi-Fi signal strength 0.19; t=8.2: observe floor type 4, wall distance 4, and Wi-Fi signal strength 0.19.

Figure 42:
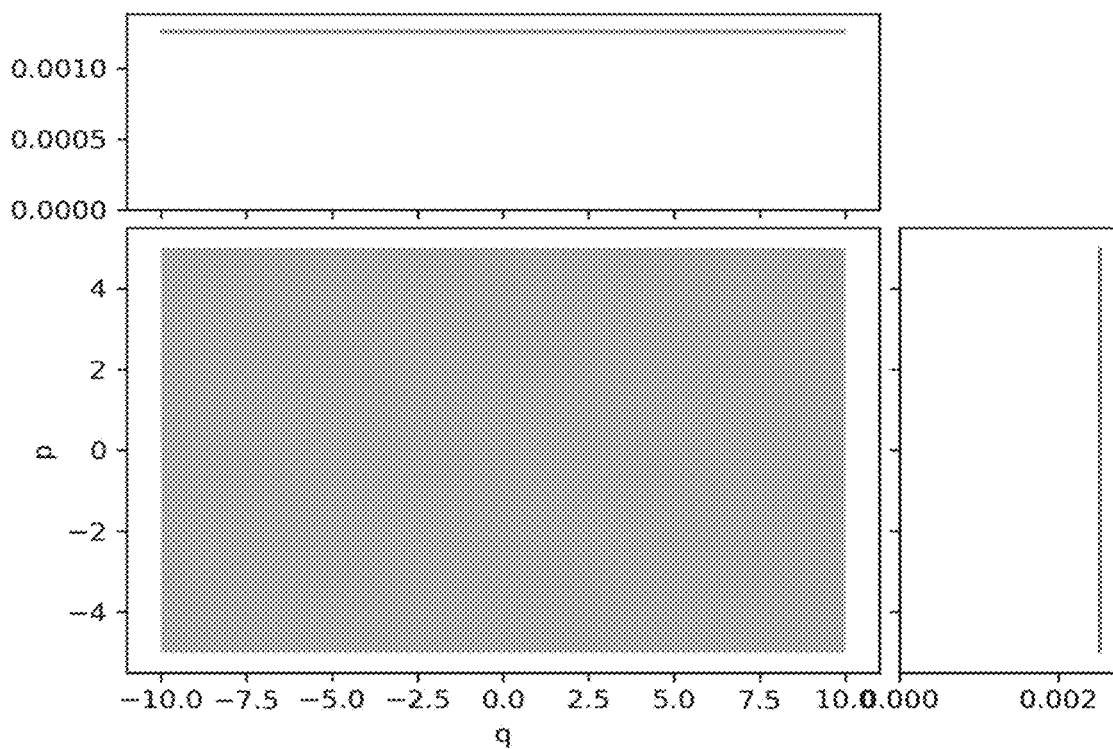
FIGS. 42-45 illustrate an example of an evolution of a probability density of a position of a robotic device as it moves and observes doors, according to some embodiments.
Figure 43:
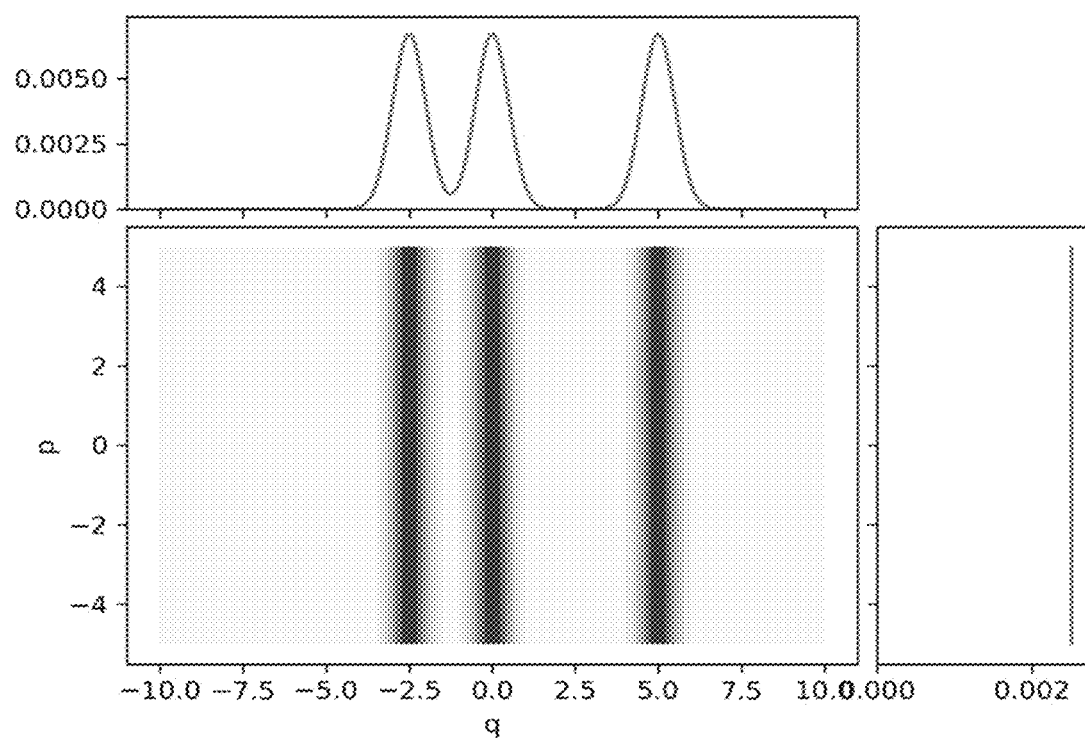
Figure 44:
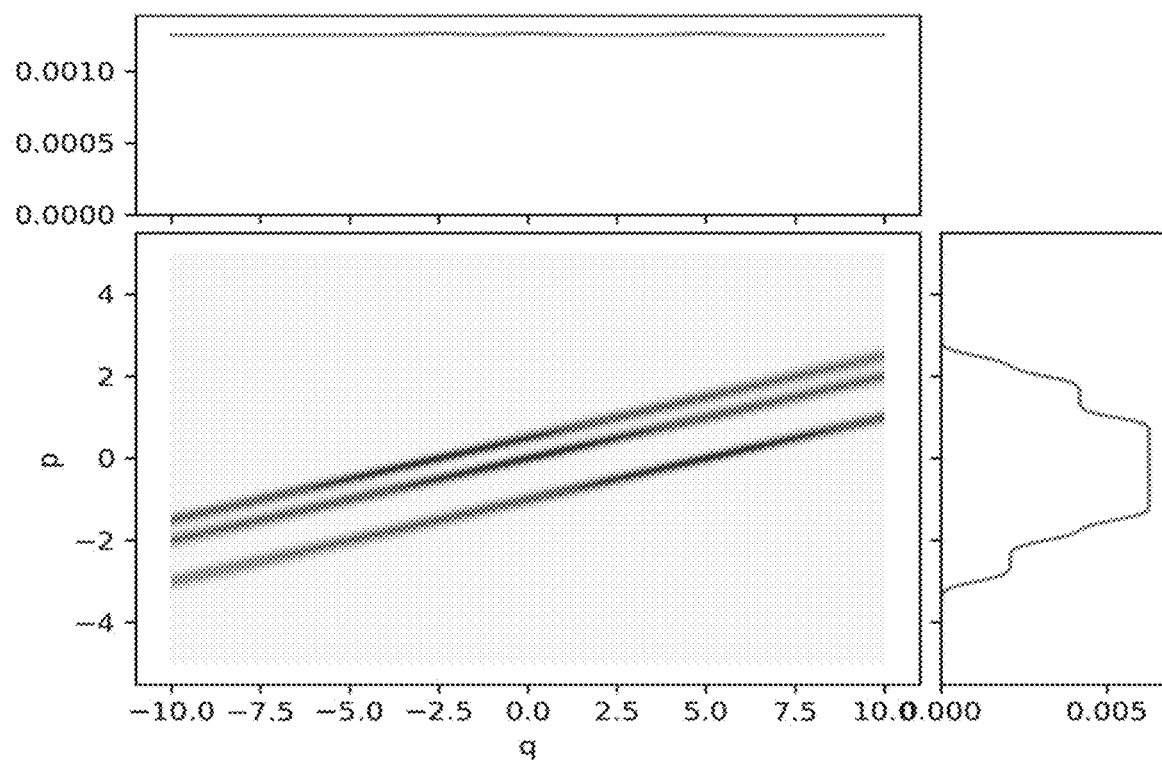
Figure 45:
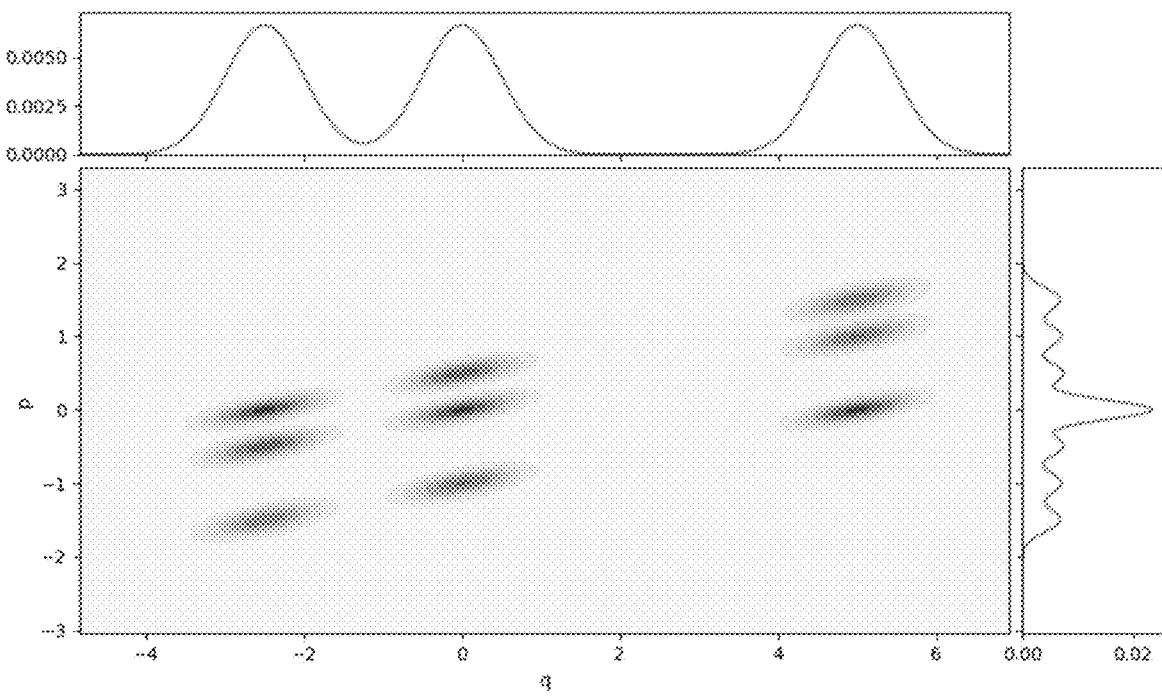

In another example, the robotic device navigates along a long floor (e.g., x-axis, one-dimensional). The processor models the floor using Liouville's equation $$\frac{\partial \rho}{\partial t} = -\{\rho, H\}$$

with Hamiltonian $$H = \frac{1}{2}p^2$$

wherein $q \in [-10, 10]$ and $p \in [-5, 5]$. The floor has three doors at $q_0=-2.5$, $q_1=0$, and $q_2=5.0$ and the processor of the robotic device is capable of determining when it is located at a door based on sensor data observed and the momentum of the robotic device is constant, but unknown. Initially the location of the robotic device is unknown, therefore the processor generates an initial state density such as that in FIG. 42. When the processor determines the robotic device is in front of a door, the possible location of the robotic device is narrowed down, but not the momentum. Therefore, the processor may update the probability density to that shown in FIG. 43. The processor evolves the probability density, and after five seconds the probability is as shown in FIG. 44, wherein the uncertainty in the position space has spread out again given that the momentum is unknown. However, the evolved probability density keeps track of the correlation between position and momentum. When the processor determines the robotic device is in front of a door again, the probability density is updated to FIG. 45, wherein the density has significantly narrowed down, indicating a number of peaks representing possible location and momentum combinations of the robotic device. For the left door, there is equal likelihood for p=0, p=−0.5, and p=−1.5. These momentum values correspond with the robotic device travelling from one of the three doors in five seconds. This is seen for the other two doors as well.

In some embodiments, the processor models motion of the robotic device using equations $\dot{x}=v \cos \omega$, $\dot{y}=v \sin \omega$, and $\dot{\theta}=\omega$, wherein v and ω are translational and rotational velocities, respectively. In some embodiments, translational and rotational velocities of the robotic device are computed using observed wheel angular velocities $\omega_l$ and $\omega_r$ using $$\begin{pmatrix} v \\ \omega \end{pmatrix} = J \begin{pmatrix} \omega_l \\ \omega_r \end{pmatrix} = \begin{pmatrix} r_l/2 & r_r/2 \\ -r_l/b & r_r/b \end{pmatrix},$$

wherein J is the Jacobian, $r_l$ and $r_r$ are the left and right wheel radii, respectively and b is the distance between the two wheels. Assuming there are stochastic forces on the wheel velocities, the processor of the robotic device evolves the probability density $\rho=(x, y, \theta, \omega_l, \omega_r)$ using $$\frac{\partial \rho}{\partial t} = -\begin{pmatrix} v \cos \theta \\ v \cos \theta \\ \omega \end{pmatrix} \cdot \nabla_q \rho + \nabla_p \cdot (D \nabla_p \rho)$$

wherein $$D = \frac{1}{2} \sigma_N \sigma_N^T$$

is a 2-by-2 diffusion tensor, $q=(x, y, \theta)$ and $p=(\omega_l, \omega_r)$. In some embodiments, the domain is obtained by choosing x, y in the map of the environment, $\theta \in [0, 2\pi)$, and $\omega_l$, $\omega_r$ as per the robotic device specifications. In some embodiments, solving the equation may be a challenge given it is five-dimensional. In some embodiments, the model may be reduced by replacing odometry by Gaussian density with mean and variance. This reduces the model to a three-dimensional density $\rho=(x, y, \theta)$. In some embodiments, independent equations may be formed for $\omega_l$, $\omega_r$ by using odometry and inertial measurement unit observations. For example, taking this approach reduces the system to one three-dimensional partial differential equation and two ordinary differential equations. The processor then evolves the probability density over time using $$\frac{\partial \rho}{\partial t} = -\begin{pmatrix} \bar{v} \cos \theta \\ \bar{v} \cos \theta \\ \bar{\omega} \end{pmatrix} \cdot \nabla \rho + \nabla \cdot (D \nabla \rho), t > 0$$

wherein $$D = \begin{pmatrix} dv^2 \cos^2 \theta & dv^2 \sin \theta \cos \theta & 0 \\ dv^2 \sin \theta \cos \theta & dv^2 \sin^2 \theta & 0 \\ 0 & 0 & d\omega^2 \end{pmatrix},$$

$\bar{v}$, $\bar{\omega}$ represent the current mean velocities, and dv, dω the current deviation. In some embodiments, the processor determines $\bar{v}$, $\bar{\omega}$ from the mean and deviation of the left and right wheel velocities $\omega_L$ and $\omega_R$ using $$\begin{pmatrix} \bar{v} \\ \bar{\omega} \end{pmatrix} = J \begin{pmatrix} \omega_L \\ \omega_R \end{pmatrix}.$$

In some embodiments, the processor uses Neumann boundary conditions for x, y and periodic boundary conditions for θ.

Figure 46:
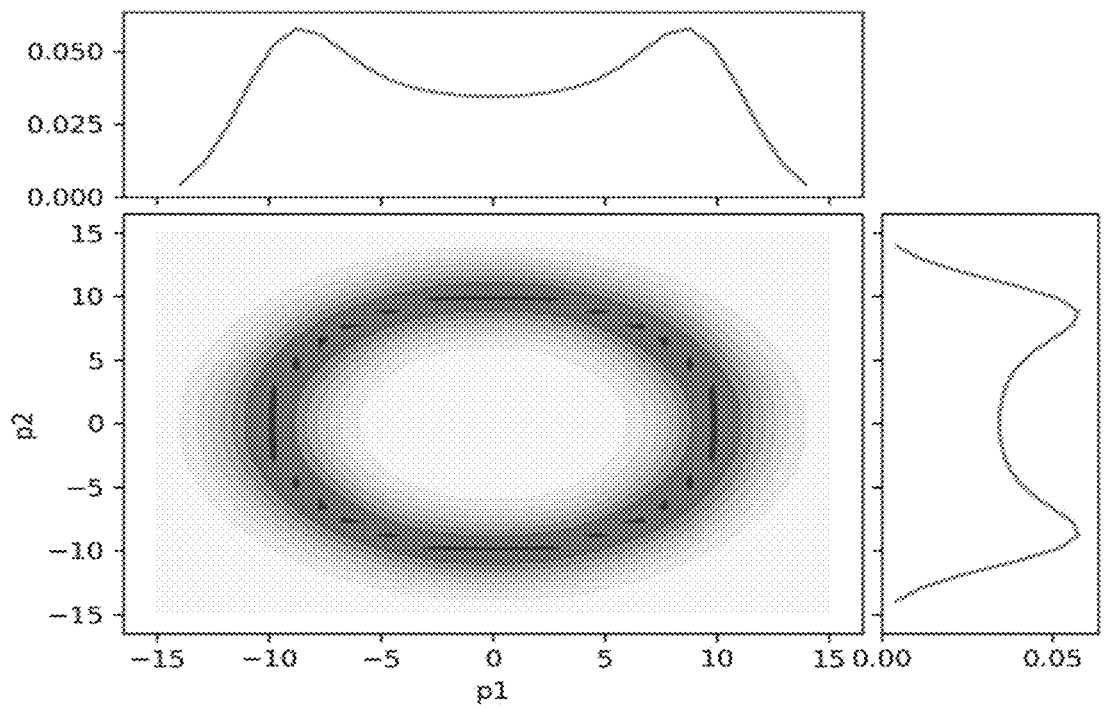
FIG. 46 illustrates an example of a velocity observation probability density, according to some embodiments.
Figure 47:
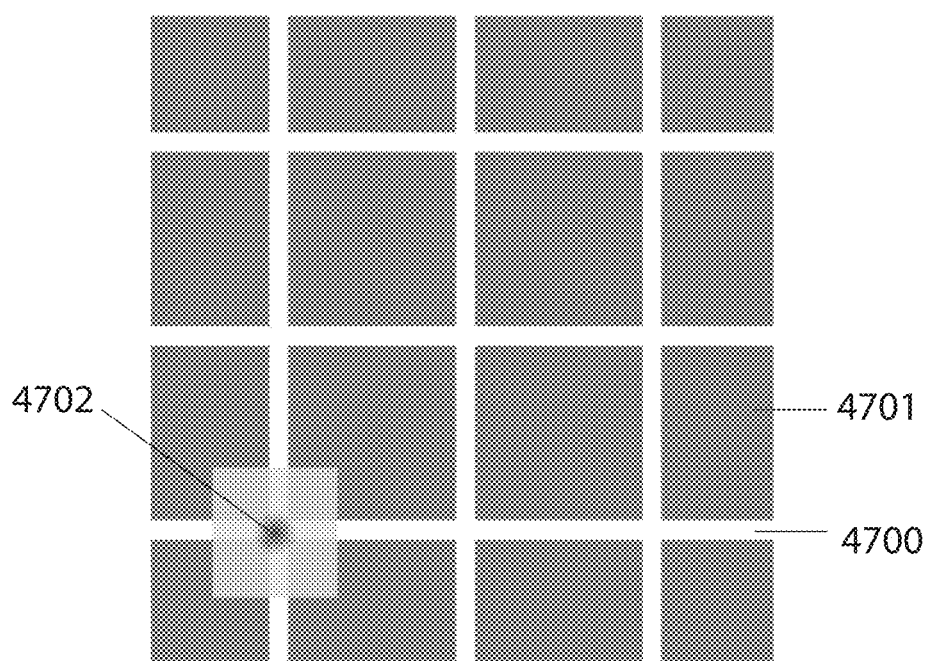
FIG. 47 illustrates an example of a road map, according to some embodiments.

In some embodiments, localization is applied to vehicles. For example, the processor localizes a vehicle with position coordinate q=(x, y) and momentum coordinate p=($p_x$, $p_y$). For simplification, the mass of the vehicle is 1.0, the earth is assumed to be planar, and q is a position with reference to some arbitrary point and distance. Thus, the processor evolves the probability density p over time according to $$\frac{\partial \rho}{\partial t} = -p \cdot \nabla_q \rho + \nabla_p \cdot (D \nabla_p \rho),$$

wherein D is as defined above. The processor uses a moving grid, wherein the general location of the vehicle is only known up to a certain accuracy (e.g., 100 m) and the grid is only applied to the known area. The processor moves the grid along as the probability density evolves over time, centering the grid at the approximate center in the q space of the current probability density every couple time units. Given that momentum is constant over time, the processor uses an interval [−15, 15]×[−15, 15], corresponding to maximum speed of 15 m/s in each spatial direction. The processor uses velocity and GPS position observations to increase accuracy of approximated localization of the vehicle. Velocity measurements provide no information on position, but provide information on $p_x^2+p_y^2$, the circular probability distribution in the p space, as illustrated in FIG. 46 with |p|=10 and large uncertainty. GPS position measurements provide no direct momentum information but provides a position density. The processor further uses a road map to exclude impossible states of the vehicle. For instance, it is impossible to drive through buildings and if the velocity is high there is a higher likelihood that the vehicle is on specific roads. FIG. 47 illustrates a road map used by the processor in this example, wherein white areas 4700 indicate roads and gray areas 4701 indicate no roads and the maximum off road speed is ±5 m/s. Position 4702 is the current probability density collapsed to the $q_1$, $q_2$ space. In combining the road map information with the velocity observations, the processor determines that is highly unlikely that with an odometry measurement of |p|=10 that the vehicle is in a position off the road. In some embodiments, other types of information may be used to improve accuracy of localization. For example, a road map to correlate position and velocity, distance to and probability density of other vehicles using similar technology, Wi-Fi map to extract position, and video footage to extract position.

In some embodiments, the processor uses finite differences methods (FDM) to numerically approximate partial differential equations of the form $$\frac{\partial \rho}{\partial t} = -\{\rho, H\} + \nabla_p \cdot (D \nabla_p \rho).$$

Numerical approximation has two components, discretization in space and in time. The finite difference method relies on discretizing a function on a uniform grid. Derivatives are then approximated by difference equations. For example, a convection-diffusion equation in one dimension and u(x, t) with velocity v, diffusion coefficient a, $$\frac{\partial u}{\partial t} = a \frac{\partial^2 u}{\partial x^2} - v \frac{\partial u}{\partial x}$$

on a mesh $x_0, \ldots, x_J$, and times $t_0, \ldots, t_N$ may be approximated by a recurrence equation of the form $$\frac{u_j^{n+1} - u_j^n}{k} = a \frac{u_{j+1}^n - 2u_j^n + u_{j-1}^n}{h^2} - v \frac{u_{j+1}^n - u_{j-1}^n}{2h}$$

with space grid size h and time step k and $u_j^n \approx u(x_j, t_n)$. The left hand side of the recurrence equation is a forward difference at time $t_n$, and the right hand side is a second-order central difference and a first-order central difference for the space derivatives at $x_1$, wherein $$\frac{u_j^{n+1} - u_j^n}{k} \approx \frac{\partial u(x_j, t_n)}{\partial t}, \frac{u_{j+1}^n - 2u_j^n + u_{j-1}^n}{h^2} \approx \frac{\partial^2 u(x_j, t_n)}{\partial x^2},$$

and $$\frac{u_{j+1}^n - u_{j-1}^n}{2h} \approx \frac{\partial u(x_j, t_n)}{\partial x}.$$

This is an explicit method, since the processor may obtain the new approximation $u_j^{n+1}$ without solving any equations. This method is known to be stable for $$h < \frac{2a}{v}$$

and $$k < \frac{h^2}{2a}.$$

The stability conditions place limitations on the time step size k which may be a limitation of the explicit method scheme. If instead the processor uses a central difference at time $$t_{n+\frac{1}{2}},$$

the recurrence equation is $$\frac{u_j^{n+1} - u_j^n}{k} = \frac{1}{2}\left(a\frac{u_{j+1}^{n+1} - 2u_j^{n+1} + u_{j-1}^{n+1}}{h^2} - \right.$$
$$\left. v\frac{u_{j+1}^{n+1} - u_{j-1}^{n+1}}{2h} + a\frac{u_{j+1}^n - 2u_j^n + u_{j-1}^n}{h^2} - v\frac{u_{j+1}^n - u_{j-1}^n}{2h}\right),$$

know as the Crank-Nicolson method. The processor obtains the new approximation $u_j^{n+1}$ by solving a system of linear equations, thus, the method is implicit and is numerically stable if $$k < \frac{h^2}{a}.$$

In a similar manner, the processor may use a backward difference in time, obtaining a different implicit method $$\frac{u_j^{n+1} - u_j^n}{k} = a \frac{u_{j+1}^{n+1} - 2u_j^{n+1} + u_{j-1}^{n+1}}{h^2} - v \frac{u_{j+1}^{n+1} - u_{j-1}^{n+1}}{2h},$$

which is unconditionally stable for an time step, however, the truncation error may be large. While both implicit methods are less restrictive in terms of time step size, they usually require more computational power as they require solving a system of linear equations at each time step. Further, since the difference equations are based on a uniform grid, the finite difference method places limitations on the shape of the domain.

In some embodiments, the processor uses finite element methods (FEM) to numerically approximate partial differential equations of the form $$\frac{\partial \rho}{\partial t} = -\{\rho, H\} + \nabla_p \cdot (D \nabla_p \rho).$$

In general, the finite element method formulation of the problem results in a system of algebraic equations. This yields approximate values of the unknowns at discrete number of points over the domain. To solve the problem, it subdivides a large problem into smaller, simpler parts that are called finite elements. The simple equations that model these finite elements are then assembled into a larger system of equations that models the entire problem. The method involves constructing a mesh or triangulation of the domain, finding a weak formulation of the partial differential equation (i.e., integration by parts and Green's identity), and deciding for solution space (e.g., piecewise linear on mesh elements). This leads to a discretized version in form of a linear equation. Some advantages over finite differences method includes complicated geometries, more choice in approximation leads, and, in general, to a higher quality of approximation. For example, the processor uses the partial differential equation $$\frac{\partial \rho}{\partial t} = L\rho,$$

with differential operator, e.g., $$L = -\{\cdot, H\} + \nabla_p \cdot (D \nabla_p).$$

The processor discretizes the abstract equation in space (e.g., by FEM or FDM)

$$\frac{\partial \bar{\rho}}{\partial t} = \bar{L}\bar{\rho},$$

wherein $\bar{\rho}$, $\bar{L}$ are the projections of $\rho$, $L$ on the discretized space. The processor discretizes the equation in time using a numerical time integrator (e.g., Crank-Nicolson)

$$\frac{\bar{\rho}^{n+1} - \bar{\rho}^n}{h} = \frac{1}{2}(\bar{L}\bar{\rho}^{n+1} + \bar{L}\bar{\rho}^n),$$

leading to the equation $$\left(I - \frac{h}{2}\bar{L}\right)\bar{\rho}^{n+1} = \left(I + \frac{h}{2}\bar{L}\right)\bar{\rho}^n,$$

which the processor solves. In a fully discretized system, this is a linear equation. Depending on the space and discretization, this will be a banded, sparse matrix. In some embodiments, the processor employs alternating direction implicit (ADI) splitting to ease the solving process. In FEM, the processor may discretize the space using a mesh, construct a weak formulation involving a test space, and solve its variational form. In FDM, the processor discretizes the derivatives using differences on a lattice grid of the domain. In some instances, the processor may implement FEM/FDM with backward differential formulation (BDF)/Radau (Marlis recommendation), for example mesh generation then construct and solve variational problem with backwards Euler. In other instances, the processor implements FDM with ADI, resulting in a banded, tri-diagonal, symmetric, linear system. The processor may use an upwind scheme if Peclet number (i.e., ratio advection to diffusion) is larger than 2 or smaller than −2.

Boundary conditions are essential in solving the partial differential equations. Boundary conditions are a set of constraints that determine what happens at the boundary of the domain while the partial differential equation describe the behaviour within the domain. In some embodiments, the processor uses one or more the following boundary conditions: reflecting, zero-flux (i.e., homogenous Neumann boundary conditions)

$$\frac{\partial \rho}{\partial \vec{n}} = 0$$

for p, q∈D, $\vec{n}$ unit normal vector on boundary; absorbing boundary conditions (i.e., homogenous Dirichlet boundary conditions) $\rho=0$ for p, q∈∂D; and constant concentration boundary conditions (i.e., Dirichlet) $\rho=\rho_0$ for p, q∈∂D. To integrate the boundary conditions into FDM, the processor modifies the difference equations on the boundary, and when using FEM, they become part of the weak form (i.e., integration by parts) or are integrated in the solution space. In some embodiments, the processor uses Fenics for an efficient solution to partial differential equations.

In some embodiments, the processor uses quantum mechanics to localize the robotic device. In some embodiments, the processor of the robotic device may determine a probability density over all possible states of the robotic device using a complex-valued wave function for a single-particle system $\Psi(\vec{r}, t)$, wherein $\vec{r}$ may be a vector of space coordinates. In some embodiments, the wave function $\Psi(\vec{r}, t)$ is proportional to the probability density that the particle will be found at a position $\vec{r}$, i.e. $\rho(\vec{r}, t) = |\Psi(\vec{r}, t)|^2$. In some embodiments, the processor of the robotic device normalizes the wave function which is equal to the total probability of finding the particle, or in this case the robotic device, somewhere. The total probability of finding the robotic device somewhere adds up to unity $\int |\Psi(\vec{r}, t)|^2 \, dr = 1$. In some embodiments, the processor of the robotic device may apply Fourier transform to the wave function $\Psi(\vec{r}, t)$ to yield the wave function $\Phi(\vec{p}, t)$ in the momentum space, with associated momentum probability distribution $\sigma(\vec{p}, t) = \phi |(\vec{p}, t)|^2$. In some embodiments, the processor may evolve the wave function $\Psi(\vec{r}, t)$ using Schrödinger equation $$i\hbar \frac{\partial}{\partial t} \Psi(\vec{r}, t) = \left[ -\frac{\hbar^2}{2m} \nabla^2 + V(\vec{r}) \right] \Psi(\vec{r}, t),$$

wherein the bracketed object is the Hamilton operator $$\hat{H} = -\frac{\hbar^2}{2m} \nabla^2 + V(\vec{r}),$$

i is the imaginary unit, $\hbar$ is the reduced Planck constant, $\nabla^2$ is the Laplacian, and $V(\vec{r})$ is the potential. An operator is a generalization of the concept of a function and transforms one function into another function. For example, the momentum operator $\hat{p} = -i\hbar \nabla$ and that is why $$-\frac{\hbar^2}{2m} \nabla^2$$

corresponds to kinetic energy. The Hamiltonian function $$H = \frac{p^2}{2m} + V(\vec{r})$$

has corresponding Hamilton operator $$\hat{H} = -\frac{\hbar^2}{2m} \nabla^2 + V(\vec{r}).$$

For conservative systems (constant energy), the time-dependent factor may be separated from the wave function $$\left( e.g., \Psi(\vec{r}, t) = \Phi(\vec{r}) e^{-\frac{iEt}{\hbar}}, \right)$$

giving the time-independent Schrodinger equation $$\left[ -\frac{\hbar^2}{2m} \nabla^2 + V(\vec{r}) \right] \Phi(\vec{r}) = E\Phi(\vec{r}),$$

or otherwise $\hat{H}\phi = E\phi$, an eigenvalue equation with eigenfunctions and eigenvalues. The eigenvalue equation provides a basis given by the eigenfunctions $\{\phi\}$ of the Hamiltonian. Therefore, in some embodiments, the wave function is given by $\Psi(\vec{r}, t) = \Sigma_k c_k(t) \phi_k(\vec{r})$, corresponding to expressing the wave function in the basis given by energy eigenfunctions. Substituting this equation into the Schrodinger equation, $$c_k(t) = c_k(0) e^{-\frac{iE_k t}{\hbar}}$$

wherein $E_k$ is the eigen-energy to the eigenfunction $\phi_k$. For example, the probability of measuring a certain energy $E_k$ at time t is given by the coefficient of the eigenfunction $$\varphi_k, |c_k(t)|^2 = \left| c_k(0) e^{-\frac{iE_k t}{\hbar}} \right|^2 = |c_k(0)|^2.$$

Thus, the probability for measuring the given energy is constant over time. However, this is only true for the energy eigenvalues, not for other observables. Instead, the probability of finding the system at a certain position $\rho(\vec{r}) = |\Psi(\vec{r}, t)|^2$ may be used.

The wave function $\psi$ is an element of a complex Hilbert space H, which is a complete inner product space. Every physical property is associated with a linear, Hermitian operator acting on that Hilbert space. A wave function, or quantum state, may text use be regarded as an abstract vector in a Hilbert space. In some embodiments, $\psi$ is denoted by the symbol $|\psi\rangle$ (i.e., ket), and correspondingly, the complex conjugate $\phi^*$ is denoted by $\langle\phi|$ (i.e., bra). The integral over the product of two functions is analogous to an inner product of abstract vectors, $\int \phi^* \psi d\tau = \langle\phi|\cdot|\phi\rangle \equiv \langle\phi|\psi\rangle$. In some embodiments, $\langle\phi|$ and $|\psi\rangle$ are state vectors of a system and the processor determines the probability of finding $\langle\phi|$ in state $|\psi\rangle$ using $p(\langle\phi|, |\psi\rangle) = |\langle\phi|\cdot|\psi\rangle|^2$. For a Hermitian operator $\hat{A}$ eigenkets and eigenvalues are denoted $A|n\rangle = a_n|n\rangle$, wherein $|n\rangle$ is the eigenket associated with the eigenvalue $a_n$. For a Hermitian operator, eigenvalues are real numbers, eigenkets corresponding to different eigenvalues are orthogonal, eigenvalues associated with eigenkets are the same as the eigenvalues associated with eigenbras, i.e. $\langle n|A = \langle n|a_n$. For every physical property (energy, position, momentum, angular momentum, etc.) there exists an associated linear, Hermitian operator $\hat{A}$ (called am observable) which acts on the Hilbert space H. Given A has eigenvalues an and eigenvectors $|n\rangle$, and a system in state $|\phi\rangle$, the processor determines the probability of obtaining an as an outcome of a measurement of A using $p(a_n) = |\langle n|\phi\rangle|^2$. In some embodiments, the processor evolves the time-dependent Schrodinger equation using $i\hbar = \partial|\psi\rangle/\partial t = \hat{H}|\psi\rangle$. Given a state $|\phi\rangle$ and a measurement of the observable A, the processor determines the expectation value of A using $\langle A \rangle = \langle\phi|A|\phi\rangle$, corresponding to $$\langle A \rangle = \frac{\int \phi^* \hat{A} \phi \, d\tau}{\int \phi^* \phi \, d\tau}$$

for observation operator $\hat{A}$ and wave function $\phi$. In some embodiments, the processor updates the wave function when observing some observable by collapsing the wave function to the eigenfunctions, or eigenspace, corresponding to the observed eigenvalue.

As described above, for localization of the robotic device, the processor evolves the wave function $\Psi(\vec{r}, t)$ using the Schrodinger equation $$i\hbar \frac{\partial}{\partial t} \Psi(\vec{r}, t) = \left[ -\frac{\hbar^2}{2m} \nabla^2 + V(\vec{r}) \right] \Psi(\vec{r}, t).$$

In some embodiments, a solution is written in terms of eigenfunctions $\psi_n$ with eigenvalues $E_n$ of the time-independent Schrödinger equation $H\psi_n = E_n \psi_n$, wherein $\Psi(\vec{r}, t) = \Sigma_{c_n} c_n e^{-iE_n t/\hbar} \psi_n$ and $c_n = \int \Psi(\vec{r}, 0) \psi_n^* dr$. In some embodiments, the time evolution is expressed as a time evolution via a unitary operator U(t), $\Psi(\vec{r}, t) = U(t) \Psi(\vec{r}, 0)$ wherein $U(t) = e^{-iHt/\hbar}$. In some embodiments, the probability density of the Hilbert space may be updated by the processor of the robotic device each time an observation or measurement is received by the processor of the robotic device. For each observation with observation operator A the processor of the robotic device may perform an eigen-decomposition $A\omega_n = a_n \omega_n$, wherein the eigenvalue corresponds to the observed quantity. In some embodiments, the processor observes a value a with probability $0 \leq p \leq 1$. In some embodiments, wherein the operator has a finite spectrum or a single eigenvalue is observed, the processor of the robotic device may collapse to the eigenfunction(s) with corresponding probability $$\Psi(\vec{r}, t) \to \gamma \sum_{n=1}^{N} p(a_n) d_n \omega_n,$$

wherein $d_n = \int \omega_n^* \Psi dr$, p(a) is the probability of observing value a, and $\gamma$ is a normalization constant. In some embodiments, wherein the operator has continuous spectrum, the summation may be replaced by an integration $\Psi(\vec{r}, t) \to \gamma \int p(a) d_a \omega_a da$, wherein $d_a = \int \omega_a^* \Psi dr$.

For example, consider a robotic device confined to move within an interval $$\left[ -\frac{1}{2}, \frac{1}{2} \right].$$

For simplicity, the processor sets $\hbar = m = 1$, and an infinite well potential and the regular kinetic energy term are assumed. The processor solves the time-independent Schrodinger equations, resulting in wave functions $$\psi_n = \begin{cases} \sqrt{2} \sin\left(k_n \left(x - \frac{1}{2}\right)\right) e^{-i\omega_n t}, & -\frac{1}{2} < x < \frac{1}{2} \\ 0, & \text{otherwise} \end{cases}$$

wherein $k_n = n\pi$ and $E_n = \omega_n = n^2 \pi^2$. In the momentum space this corresponds to the wave functions $$\phi_n(p, t) = \frac{1}{\sqrt{2\pi}} \int_{-\infty}^{\infty} \psi_n(x, t) e^{-ipx} dx = \frac{1}{\sqrt{\pi}} \frac{n\pi}{n\pi + p} \operatorname{sinc}\left(\frac{1}{2}(n\pi - p)\right).$$

The processor takes suitable functions and computes an expansion in eigenfunctions. Given a vector of coefficients, the processor computes the time evolution of that wave function in eigenbasis. In another example, consider a robotic device free to move on an x-axis. For simplicity, the processor sets $\hbar = m = 1$. The processor solves the time-independent Schrodinger equations, resulting in wave functions $$\psi_E(x, t) = A e^{\frac{i(px - Et)}{\hbar}},$$

wherein energy $$E = \frac{\hbar^2 k^2}{2m}$$

and momentum $p = \hbar k$. For energy E there are two independent, valid functions with $\pm p$. Given the wave function in the position space, in the momentum space, the corresponding wave functions are $$\phi_E(p, t) = e^{\frac{i(px - Et)}{\hbar}},$$

which are the same as the energy eigenfunctions. For a given initial wave function $\psi(x, 0)$, the processor expands the wave function into momentum/energy eigenfunctions $$\phi(p) = \frac{1}{\sqrt{2\pi\hbar}} \int \psi(x, 0) e^{-\frac{ipx}{\hbar}} dx,$$

then the processor gets time dependence by taking the inverse Fourier resulting in $$\psi(x, t) = \frac{1}{\sqrt{2\pi\hbar}} \int \phi(p) e^{\frac{ipx}{\hbar}} e^{-\frac{iEt}{\hbar}} dp.$$

An example of a common type of initial wave function is a Gaussian wave packet, consisting of a momentum eigenfunctions multiplied by a Gaussian in position space $$\psi(x) = A e^{-\left(\frac{x}{a}\right)^2} e^{\frac{ip_0 x}{\hbar}},$$

wherein $p_0$ is the wave function's average momentum value and a is a rough measure of the width of the packet. In the momentum space, this wave function has the form $$\phi(p) = B e^{-\left(\frac{a(p-p_0)}{2\hbar}\right)^2},$$

which is a Gaussian function of momentum, centered on $p_0$ with approximate width $$\frac{2\hbar}{a}.$$

Figure 48A:
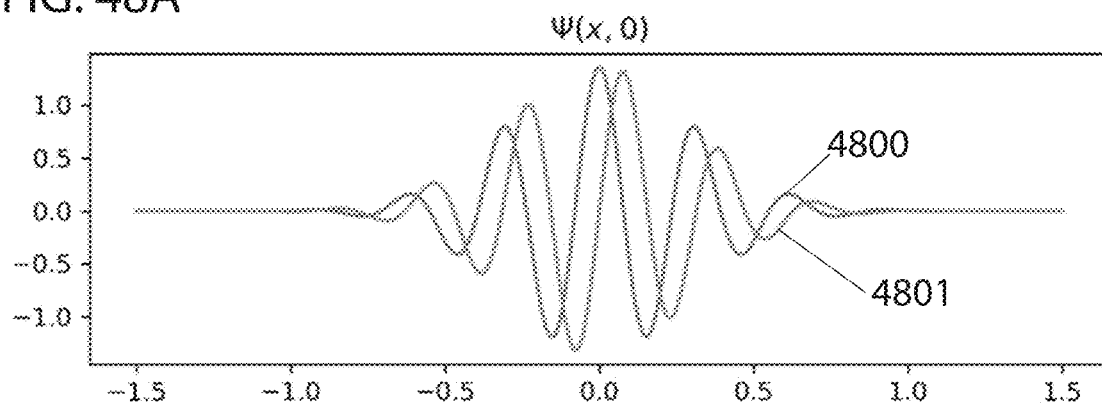
FIGS. 48A-48D illustrate an example of a wave packet, according to some embodiments.
Figure 48B:
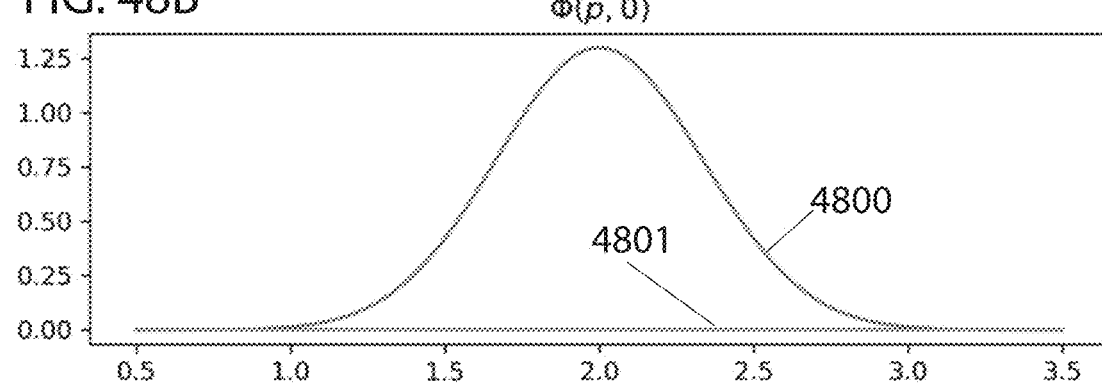
Figure 48C:
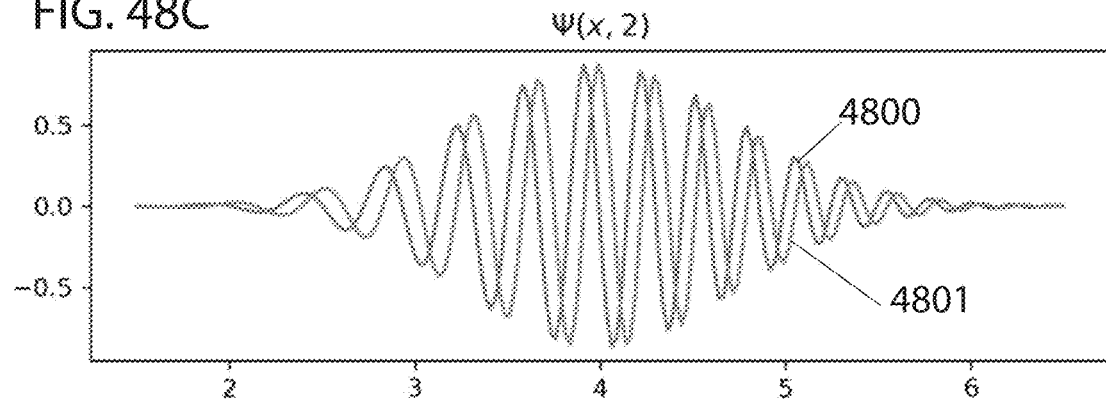
Figure 48D:
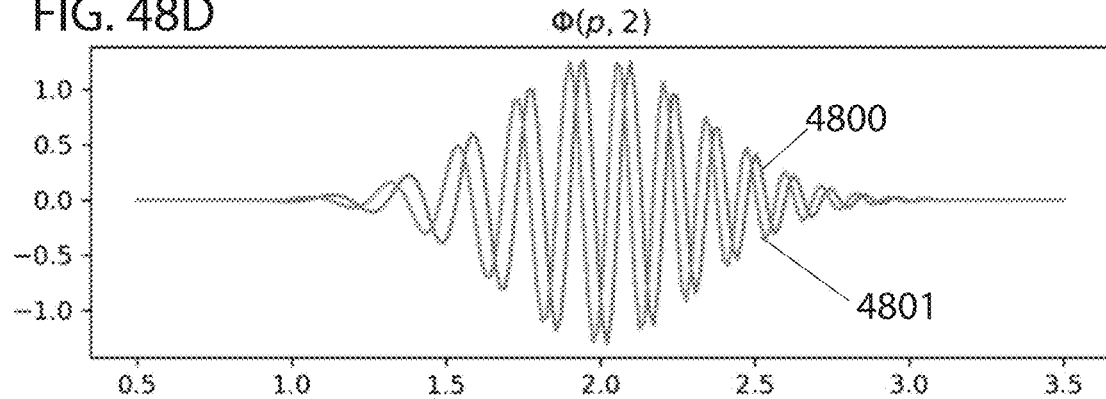

Note Heisenberg's uncertainty principle wherein in the position space width is ~a, and in the momentum space is ~1/a. FIGS. 48A and 48B illustrate an example of a wave packet at a first time point for $\psi(x)$ and $\phi(p)$, respectively, with $x_0$, $p_0 = 0, 2$, $\hbar = 0.1$, m=1, and a=3. 4800 and 4800 are real parts and 4801 are imaginary parts. As time passes, the peak moves with constant velocity $$\frac{p_0}{m}$$

and the width of the wave packet in the position space increases. This happens because the different momentum components of the packet move with different velocities. In the momentum space, the probability density $|\phi(p, t)|^2$ stays constant over time. See FIGS. 48C and 48D for the same wave packet at time t=2.

Figure 49A:
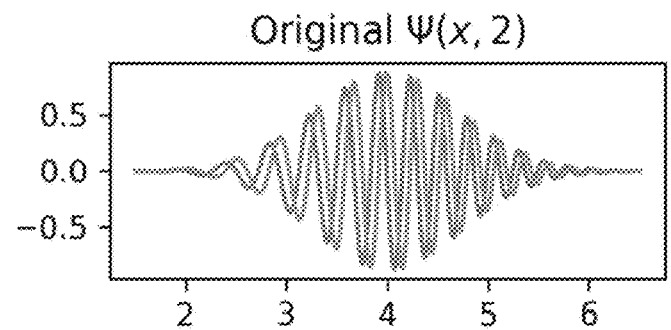
FIGS. 49A-49E illustrate an example of evolution of a wave function in a position and momentum space with observed momentum, according to some embodiments.
Figure 49B:
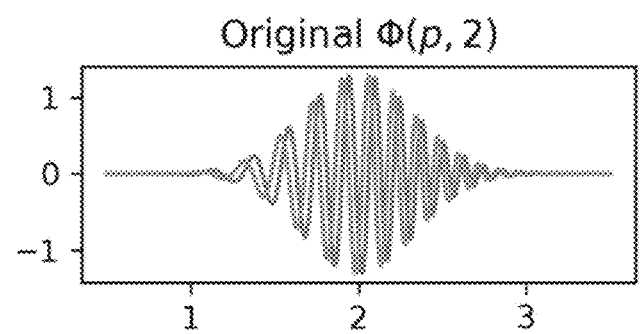
Figure 49C:
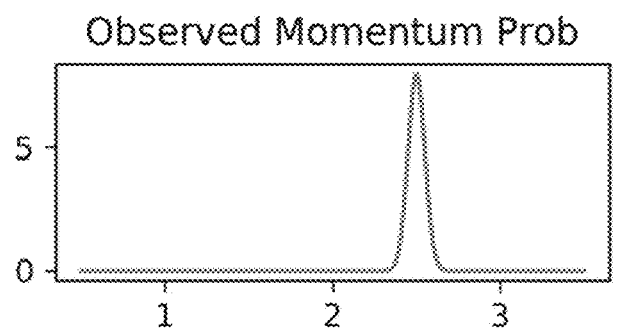
Figure 49D:
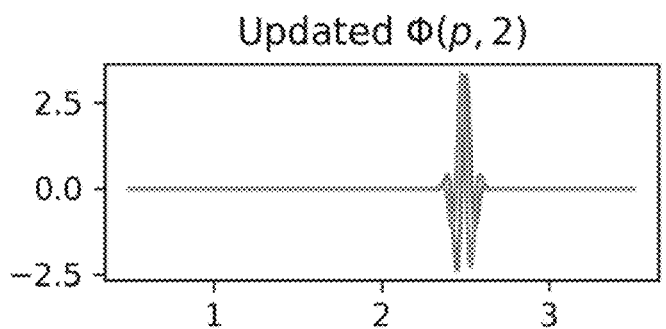
Figure 49E:
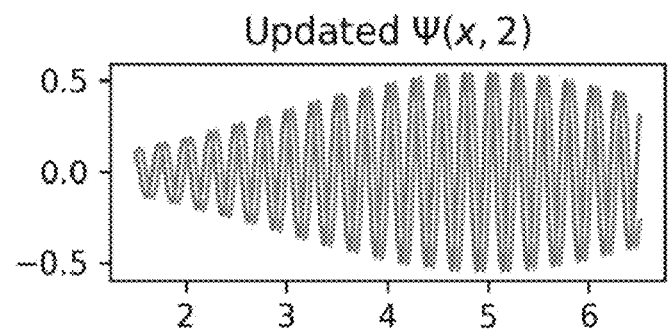
Figure 50A:
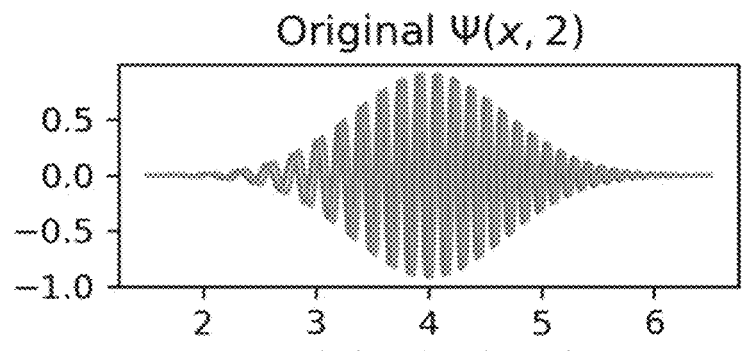
FIGS. 50A-50E illustrate an example of evolution of a wave function in a position and momentum space with observed momentum, according to some embodiments.
Figure 50B:
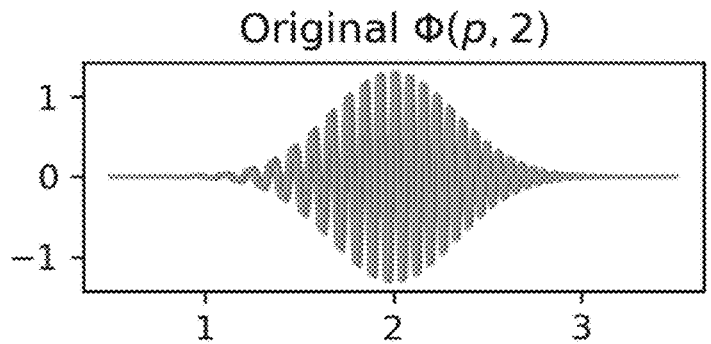
Figure 50C:
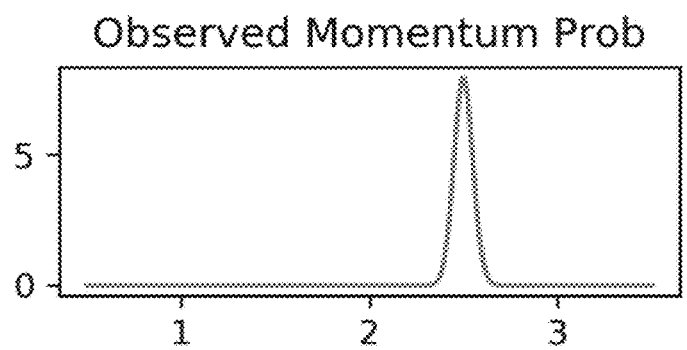
Figure 50D:
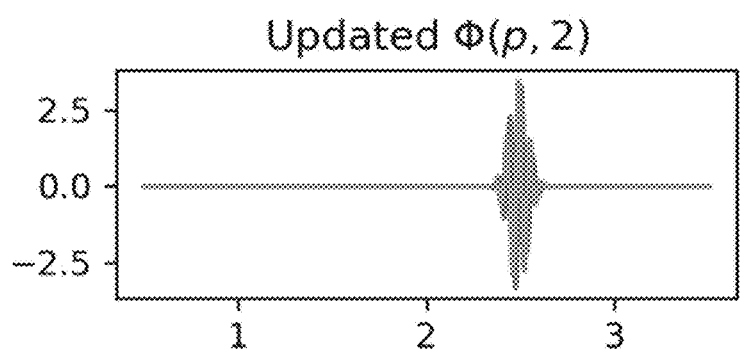
Figure 50E:
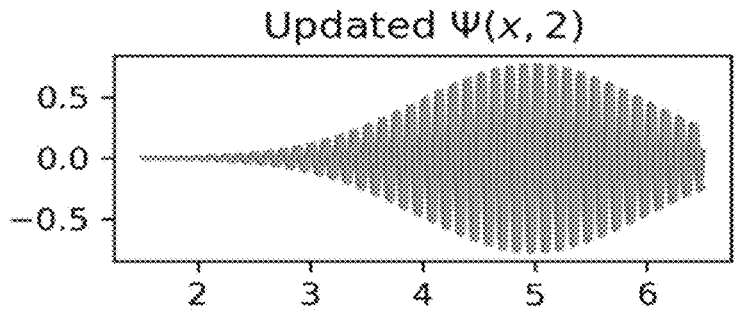
Figure 51A:
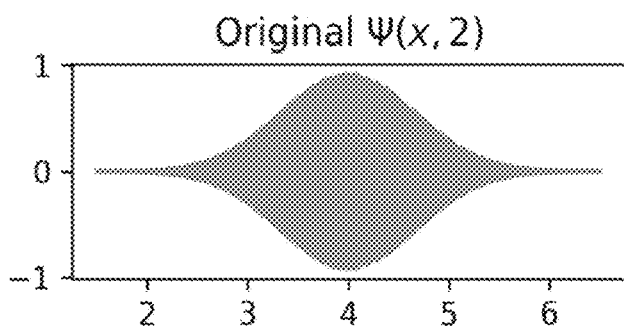
FIGS. 51A-51E illustrate an example of evolution of a wave function in a position and momentum space with observed momentum, according to some embodiments.
Figure 51B:
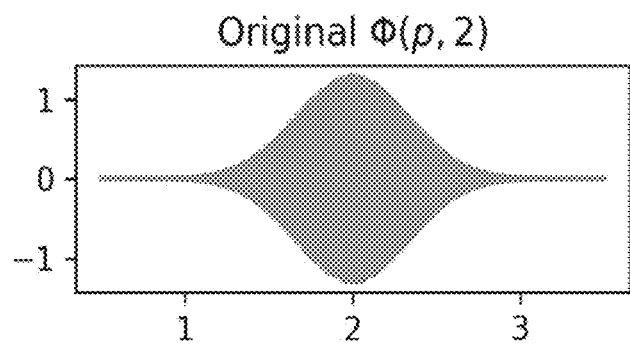
Figure 51C:
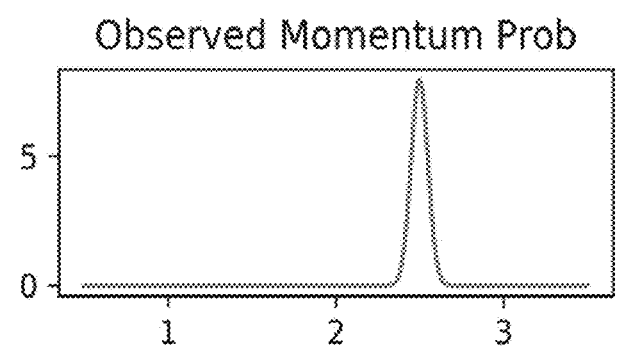
Figure 51D:
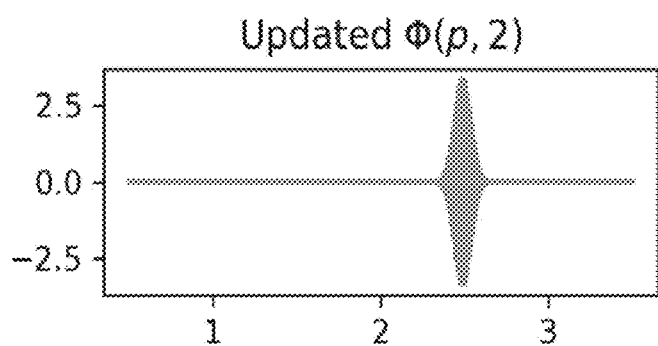
Figure 51E:
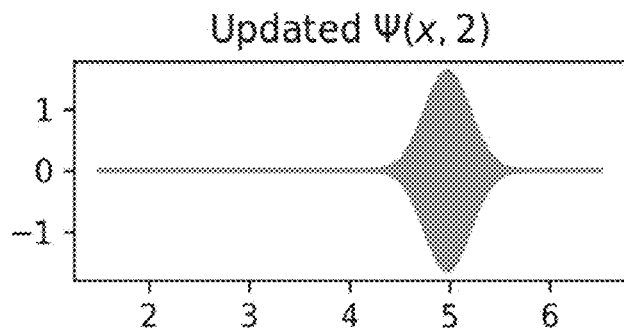
Figure 52A:
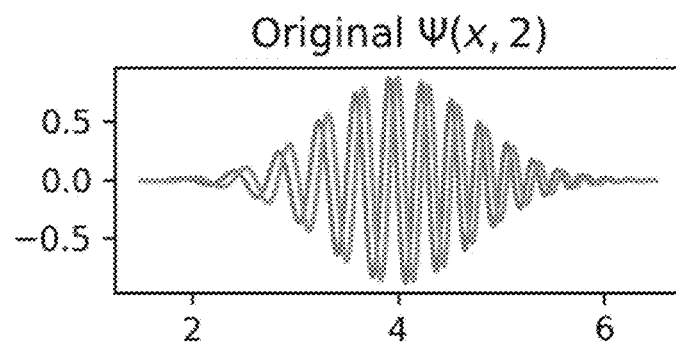
FIGS. 52A-52E illustrate an example of evolution of a wave function in a position and momentum space with observed momentum, according to some embodiments.
Figure 52B:
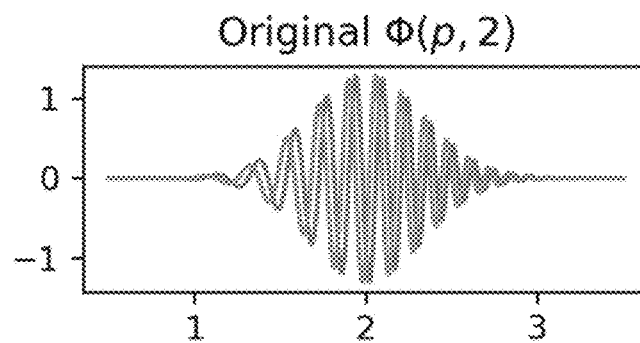
Figure 52C:
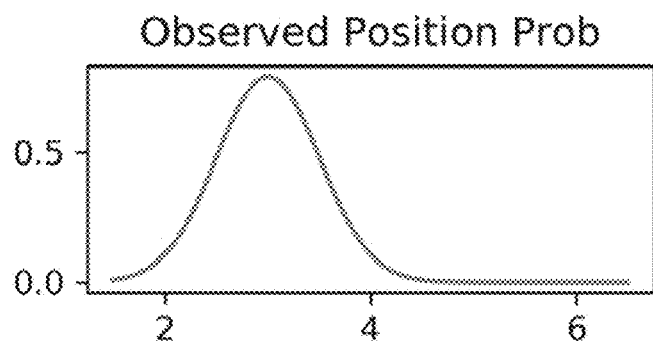
Figure 52D:
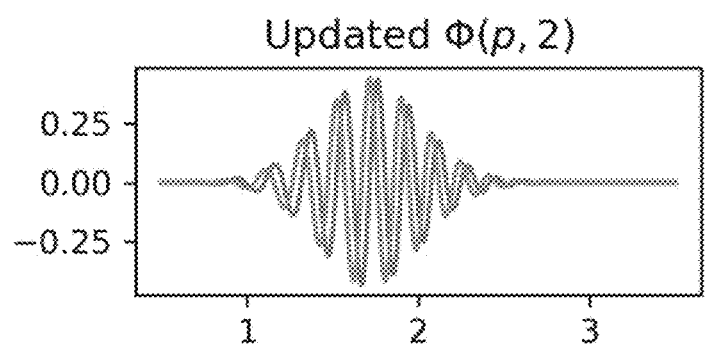
Figure 52E:
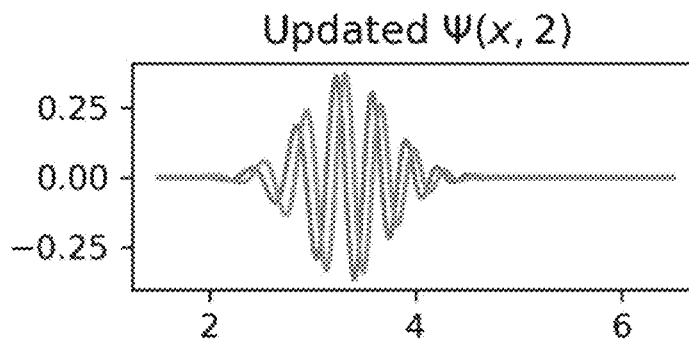

When modeling the robotic device using quantum physics, and the processor observes some observable, the processor collapses the wave function to the subspace of the observation. For example, consider the case wherein the processor observes the momentum of a wave packet. The processor expresses the uncertainty of the measurement by a function $f(p)$ (i.e., the probability that the system has momentum p), wherein $f$ is normalized. The probability distribution of momentum in this example is given by a Gaussian distribution centered around p=2.5 with σ=0.05, a strong assumption that the momentum is 2.5. Since the observation operator is the momentum operators, the wave function expressed in terms of the eigenfunctions of the observation operator is $\phi(p, t)$. The processor projects $\phi(p, t)$ into the observation space with probability $f$ by determining $\tilde{\phi}(p, t) = f(p)\phi(p, t)$. The processor normalizes the updated $\tilde{\phi}$ and takes the inverse Fourier transform to obtain the wave function in the position space. FIGS. 49A, 49B, 49C, 49D, and 49E illustrate the initial wave function in the position space ψ(x), the initial wave function in the momentum space $\phi(p)$, the observation density in the momentum space, the updated wave function in the momentum space $\tilde{\phi}(p, t)$ after the observation, and the wave function in the position space ψ(x) after observing the momentum, respectively, at time t=2, with $x_0$, $p_0$=0, 2, $\hbar$=0.1, m=1, and a=3. Note that in each figure the darker plots are the real parts while the lighter plots are the imaginary parts. The resulting wave function in the position space (FIG. 49D) may be unexpected after observing a very narrow momentum density (FIG. 49C) as it concludes that the position must have spread further out from the original wave function in the position space (FIG. 49A). This effect is due to Heisenberg's uncertainty principle. With decreasing h this effect diminishes, as can be seen in FIGS. 50A-50E and FIGS. 51A-51E, illustrating the same as FIGS. 49A-49E but with $\hbar$=0.05 and $\hbar$=0.001, respectively. Similar to observing momentum, position may also be observed and incorporated as illustrated in FIGS. 52A-52E which illustrate the initial wave function in the position space ψ(x), the initial wave function in the momentum space $\phi(p)$, the observation density in the position space, the updated wave function in the momentum space (x, t) after the observation, and the wave function in the position space ψ(p) after observing the position, respectively, at time t=2, with $x_0$, $p_0$=0, 2, h=0.1, m=1, and a=3.

Figure 53A:
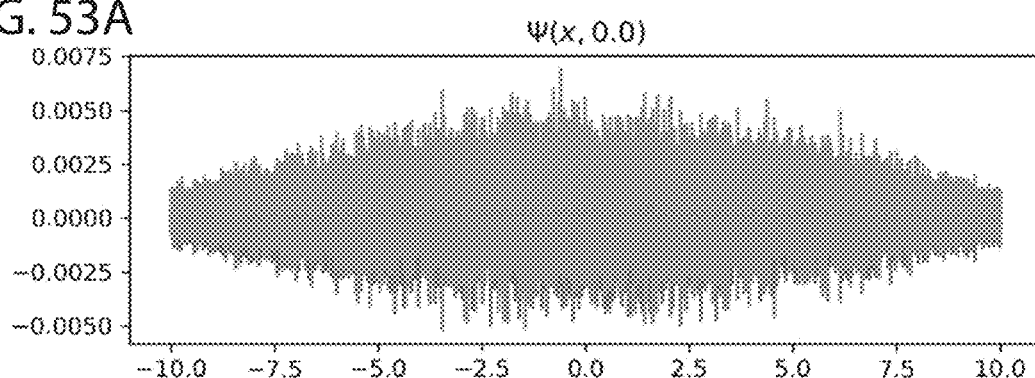
FIGS. 53A and 53B illustrate an example of an initial wave function of a state of a robotic device, according to some embodiments.
Figure 53B:
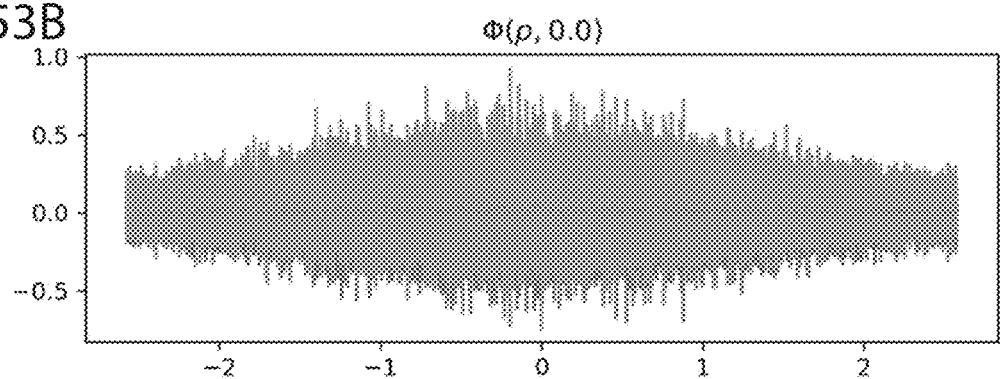
Figure 54A:
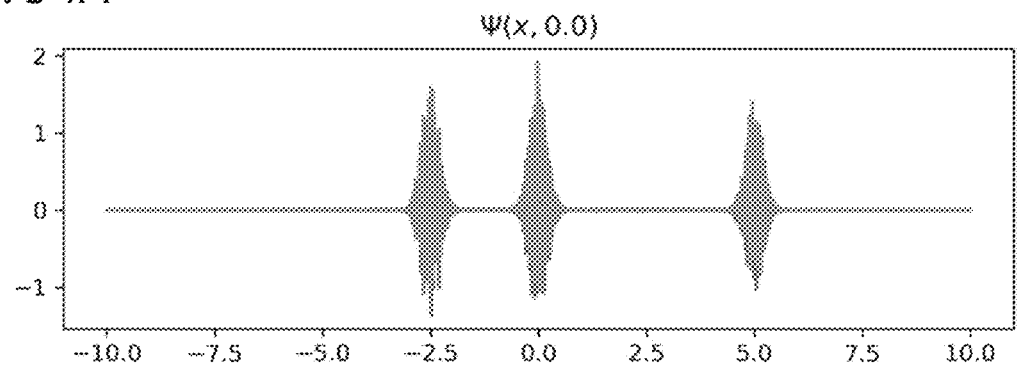
FIGS. 54A and 54B illustrate an example of a wave function of a state of a robotic device after observations, according to some embodiments.
Figure 54B:
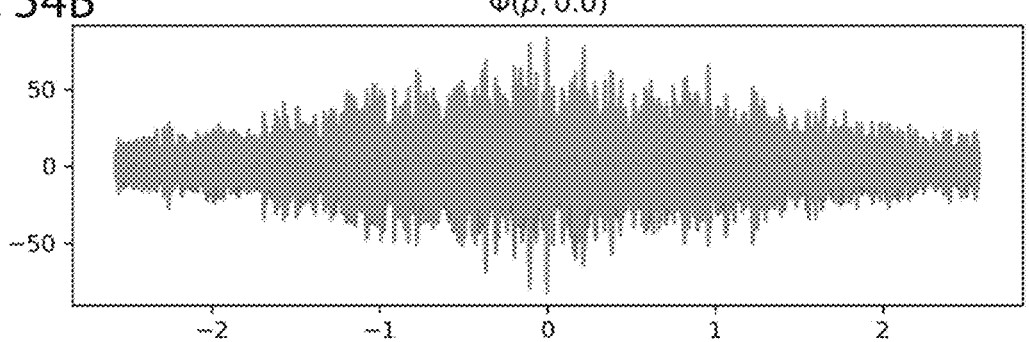
Figure 55A:
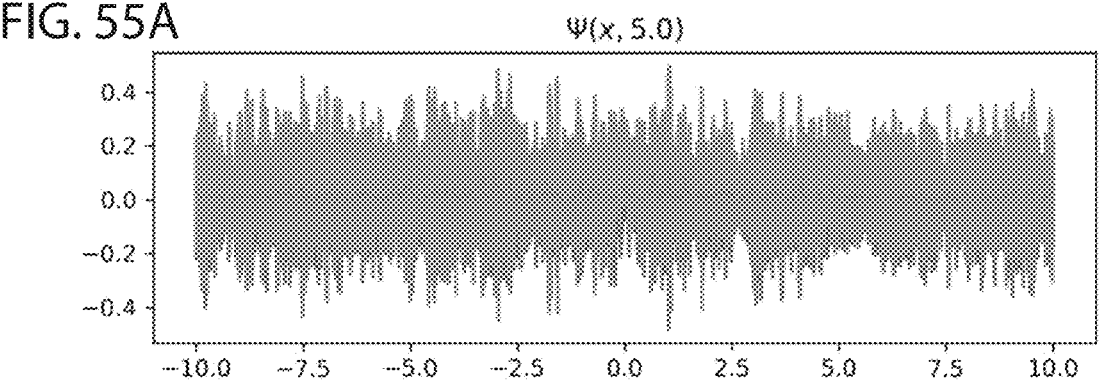
FIGS. 55A and 55B illustrate an example of an evolved wave function of a state of a robotic device, according to some embodiments.
Figure 55B:
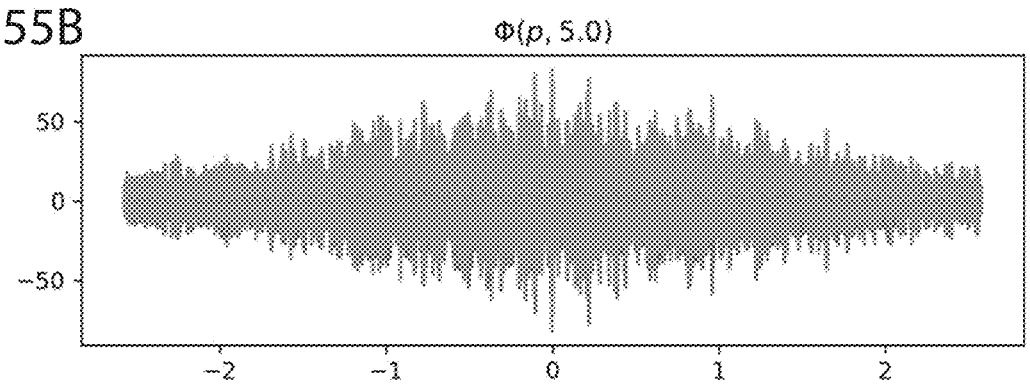
Figure 56A:
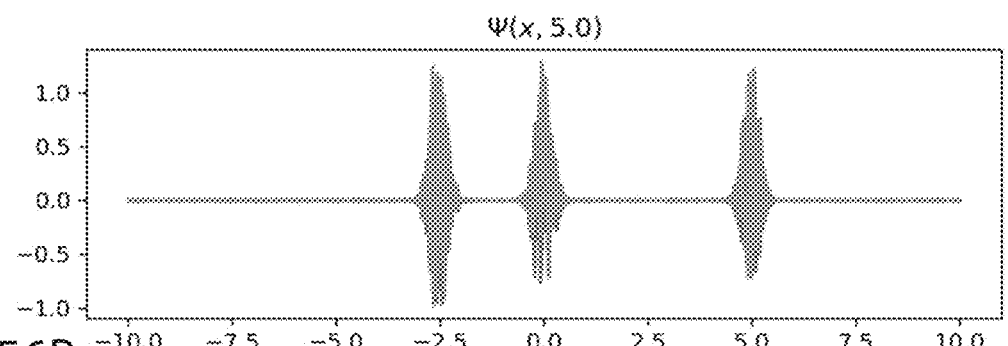
FIGS. 56A, 56B, 57A-57H, and 58A-58F illustrate an example of a wave function of a state of a robotic device after observations, according to some embodiments.
Figure 56B:
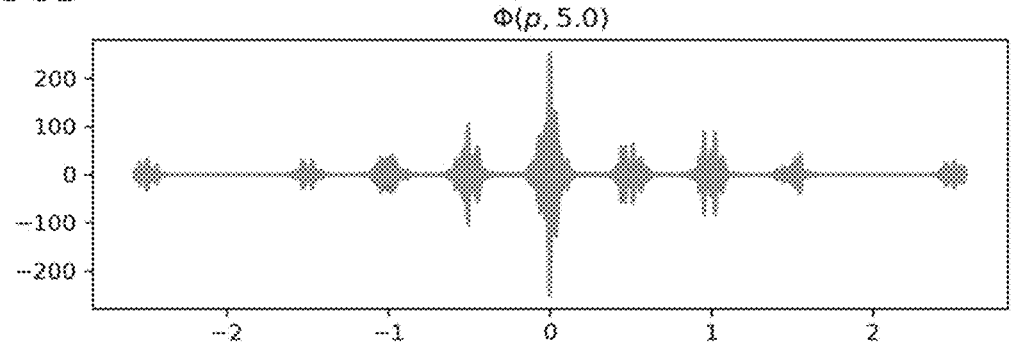
Figure 57A:
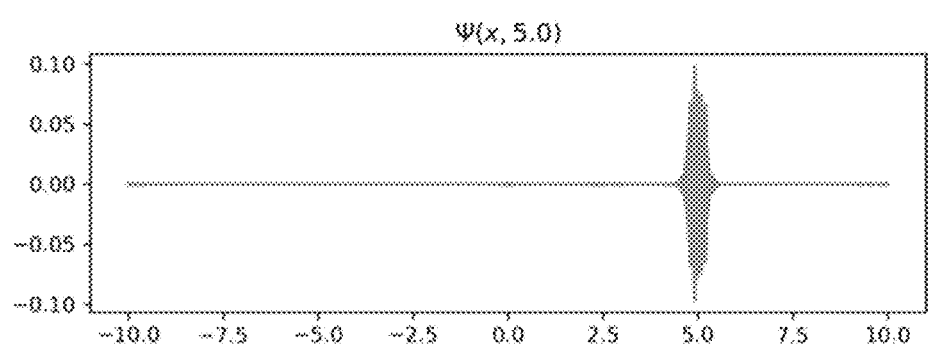
Figure 57B:
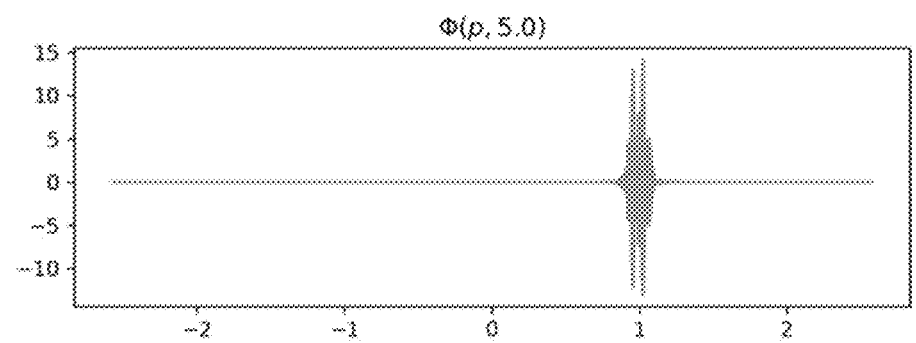
Figure 57C:
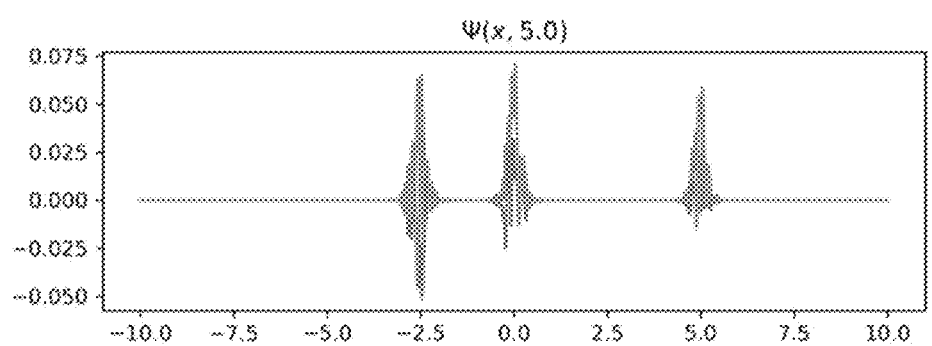
Figure 57D:
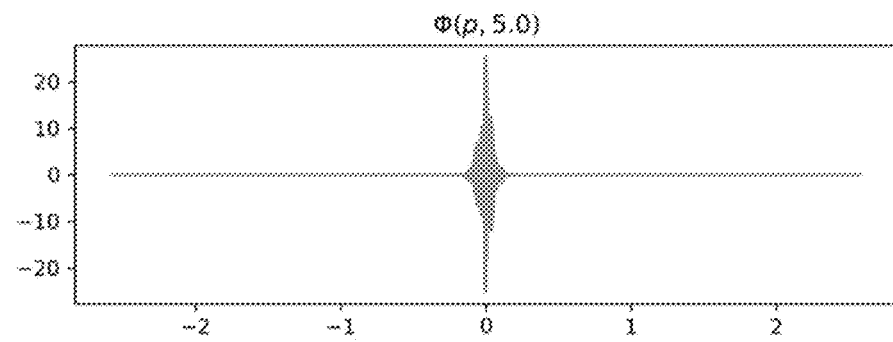
Figure 57E:
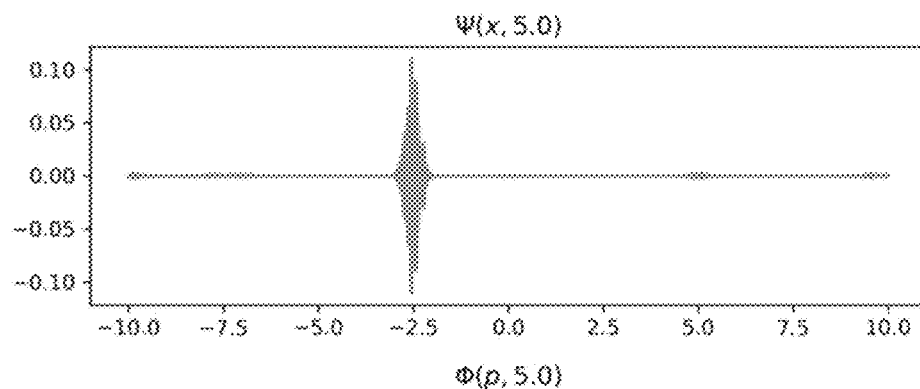
Figure 57F:
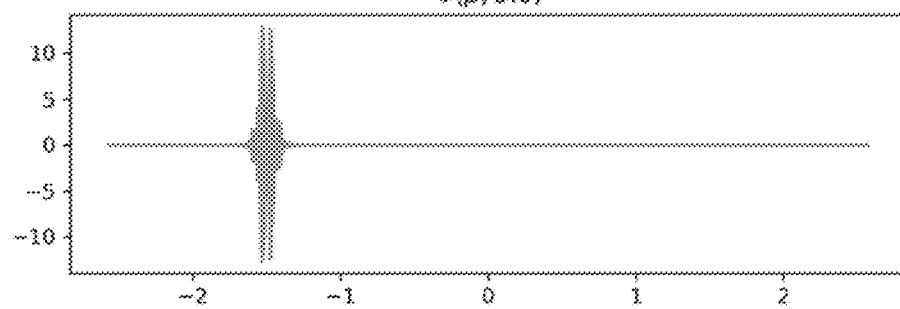
Figure 57G:
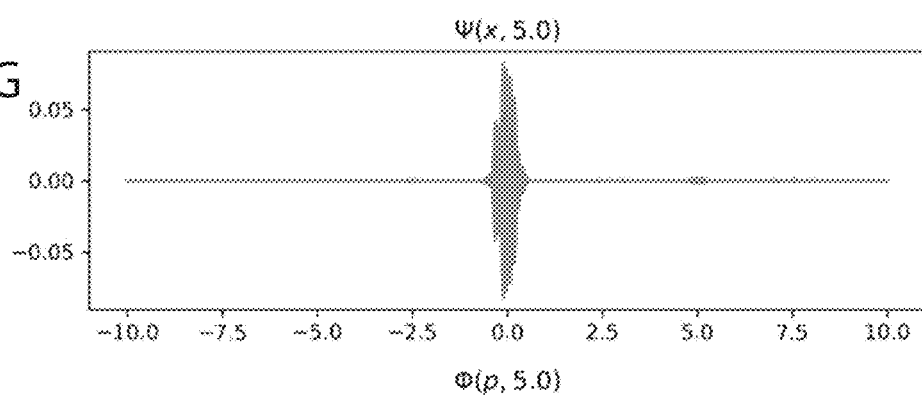
Figure 57H:
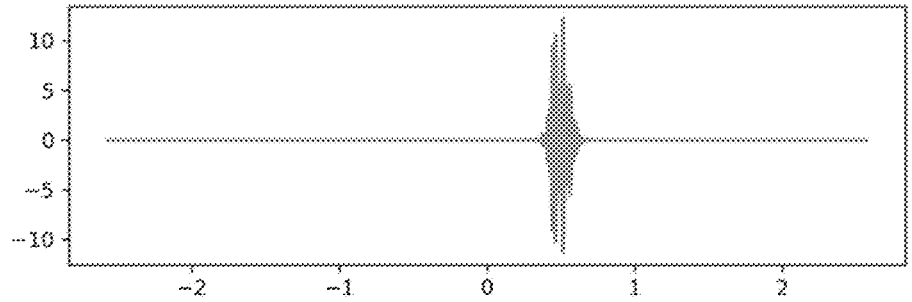
Figure 58A:
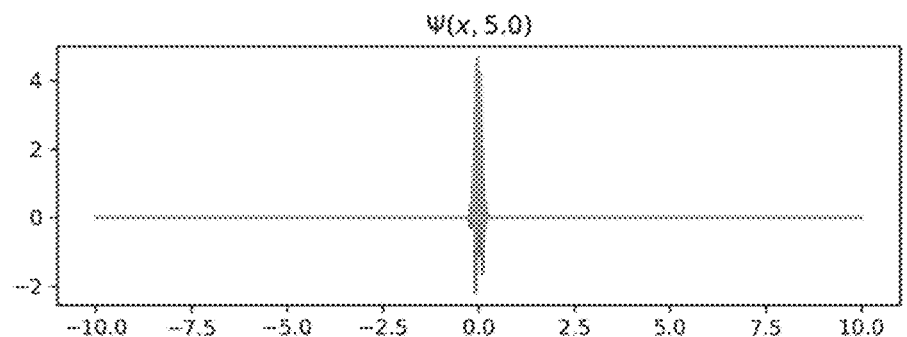
Figure 58B:
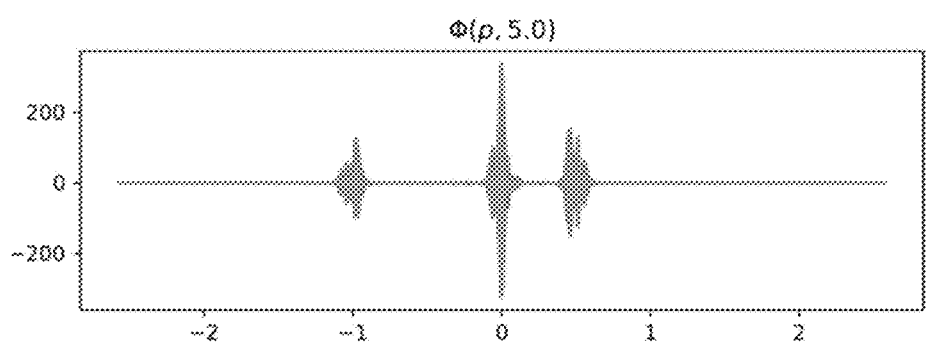
Figure 58C:
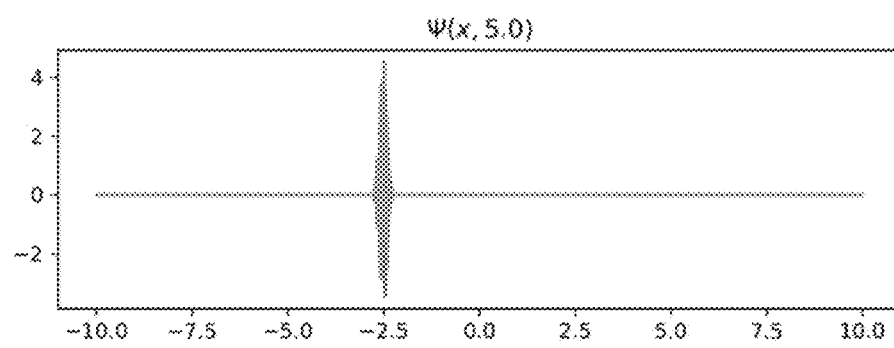
Figure 58D:
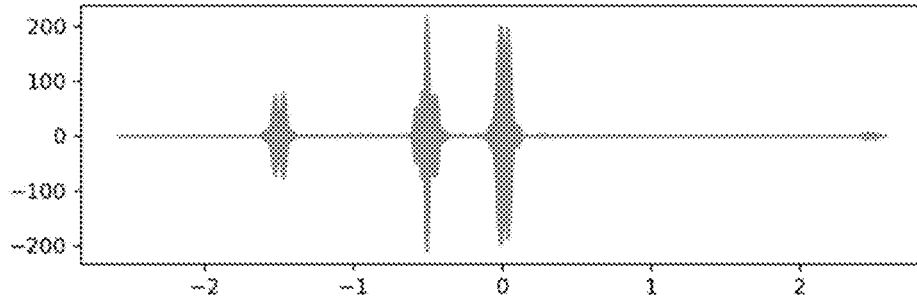
Figure 58E:
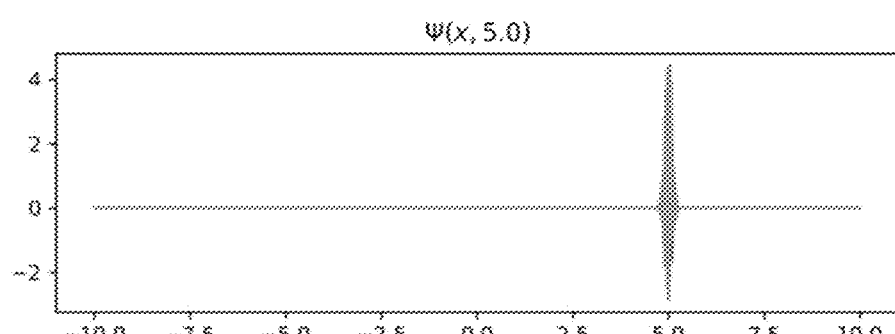
Figure 58F:
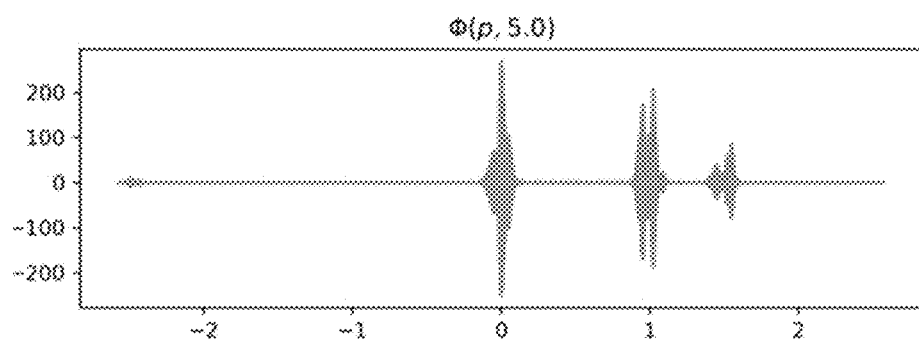

In quantum mechanics, wave functions represent probability amplitude of finding the system in some state. Physical pure states in quantum mechanics are represented as unit-norm vectors in a special complex Hilbert space and time evolution in this vector space is given by application of the evolution operator. Further, in quantum mechanics, any observable should be associated with a self-adjoint linear operator which must yield real eigenvalues, e.g. they must be Hermitian. The probability of each eigenvalue is related to the projection of the physical state on the subspace related to that eigenvalue and observables are differential operators. For example, a robotic device navigates along a one-dimensional floor that includes three doors at doors at $x_0$=−2.5, $x_1$=0, and $x_2$=5.0 and the processor of the robotic device is capable of determining when it is located at a door based on sensor data observed and the momentum of the robotic device is constant, but unknown. Initially the location of the robotic device is unknown, therefore the processor generates initial wave functions of the state shown in FIGS. 53A and 53B. When the processor determines the robotic device is in front of a door, the possible position of the robotic device is narrowed down to three possible positions, but not the momentum, resulting in wave functions shown in FIGS. 54A and 54B. The processor evolves the wave functions with a Hamiltonian operator, and after five seconds the wave functions are as shown in FIGS. 55A and 55B, wherein the position space has spread out again given that the momentum is unknown. However, the evolved probability density keeps track of the correlation between position and momentum. When the processor determines the robotic device is in front of a door again, the wave functions are updated to FIGS. 56A and 56B, wherein the wave functions have significantly narrowed down, indicating a number of peaks representing possible position and momentum combinations of the robotic device. And in fact, if the processor observes another observation, such as momentum p=1.0 at t=5.0, the wave function in the position space also collapses to the only remaining possible combination, the location near x=5.0, as shown in FIGS. 57A and 57B. It can be seen that the processor collapsed the momentum wave function accordingly. Also, the processor reduced the position wave function to a peak at x=5.0. Given constant momentum, the momentum observation of p=1.0, and that the two door observations were 5 seconds apart, the position x=5.0 is the only remaining valid position hypothesis. FIGS. 57C and 57D illustrate the resulting wave function for a momentum observation of p=0.0 at t=5.0 instead. FIGS. 57E and 57F illustrate the resulting wave function for a momentum observation of p=−1.5 at t=5.0 instead. FIGS. 57G and 57H illustrate the resulting wave function for a momentum observation of p=0.5 at t=5.0 instead. Similarly, the processor collapses the momentum wave function when position is observed instead of momentum. FIGS. 58A and 58B illustrate the resulting wave function for a position observation of x=0.0 at t=5.0 instead. FIGS. 58C and 58D illustrate the resulting wave function for a position observation of x=−2.5 at t=5.0 instead. FIGS. 58E and 58F illustrate the resulting wave function for a position observation of x=5.0 at t=5.0 instead.

In embodiments, wherein the state of the robotic dump truck or robotic excavator within the space is initially unknown, the processor of the robotic device may generate a uniform probability distribution over the space. In other instances, any other probability distribution may be generated depending on the information known about the state of the robotic device and the certainty of the information. Over time and as more measurements and observations are received by the processor of the robotic device, the probability distribution over all possible states of the robotic device in the space evolves.

In some embodiments, the processor of the robotic device considers multiple possible scenarios wherein the robotic device is located in other likely locations in addition to the location estimated by the processor. As the robotic device moves within the environment, the processor gains information of its surroundings from sensory devices which it uses to eliminate less likely scenarios. For example, consider a processor of a robotic dump truck estimating itself to be 100 cm away from a wall. To account for measurement noise the processor considers additional likely scenarios wherein the robot is, for example, 102, 101, 99 and 98 cm away from the wall. The processor considers these scenarios as possibly being the actual true distance from the wall and therefore reduces its speed after traveling 98 cm towards the wall. If the robot does not bump into the wall after traveling 98 cm towards the wall it eliminates the possibility of it having been 98 cm away from the wall and the likelihood of the robot being 99, 100, 101 and 102 cm away from the wall increases. This way as the robotic dump truck travels within the environment, the processor adjusts its confidence of its location with respect to other robotic devices and the environment based on observations and information gained of the surroundings. In some cases, such a method reduces collisions. In an alternative visualization of this approach the processor inflates the surface area occupied by the robotic dump truck such that it is hypothesized that the robotic dump truck occupies all state spaces falling within the borders of the inflated surface area. Since the error of perceived position of the robot increases with movement, the processor inflates the surface area occupied by the robot with every movement. The processor deflates the surface area occupied by the robot when occupancy of a hypothesized state space falling within the borders of the surface area is proven to be false, thereby reducing the number of state spaces and hence area occupied by the robotic dump truck. In this example, wherein the surface area occupied by the robotic dump truck is equivalent to the integral of all state spaces falling within the borders of the surface area, the occupancy of all state spaces is uniformly distributed. In some embodiments, the inflation and deflation is not the same in all directions. In some embodiments, the amounts of inflation and deflation in different directions depends on the type of motion, noise, sensors, etc. Further methods of localization are described in U.S. patent application Ser. Nos. 16/297,508, 62/740,573, 67/740,580, 62/746,688, 62/674,994, and 62/688,497 the entire contents of which are hereby incorporated by reference.

In some embodiments, the processors of robotic devices collaborating have an action queue for each robotic device that stores a sequence of actions to be executed (e.g., drive to a particular location, charge battery or refuel, execute a particular action, e.g., load/unload excavated soil, etc.). In some embodiments, the processors iterate in a time step manner. In some embodiments, the time step structure, in the particular case of a processors managing robotic dump trucks and robotic excavators, includes: checking, for running tasks, if corresponding robots are at their final destination, and if so, removing the tasks, and finding suitable robots corresponding to new tasks, and adding the required actions to the suitable robot's action queues (e.g., drive to excavation site, excavate soil, drive to robotic dump truck, unload soil into robotic dump truck); checking the top of the action queue for all robots and if the action is to load/unload soil, executing the action; handling special cases such as, robotic device with low battery level, critical battery level, or idle; computing a next action for robotic devices that have a driving action at the top of their queue; and, checking the top of the action queue for all robotic devices and if the action is to load/unload soil, executing the action. In some embodiments, similar time step structure is used for robotic devices customized for other functions.

In some embodiments, the processors use a graph G=(V, E) consisting of a set of nodes V and a set of edges E to compute the next action for a robotic device that has a driving action at the top of their queue. Nodes represent locations within the environment and are connected by edges, the edges representing a possible driving movement path from one node to another. In some embodiments, the processor uses an undirected graph wherein edges have no orientation (i.e., the edge (x, y) is identical to the edge (y, x)), particularly in cases where all roads in the environment are two-way. In some cases, not all roads are two-way (e.g. one-ways), therefore, in some embodiments, the processor uses a directed graph where directed edges indicate travel in one direction (i.e. edge (x, y) allows travel from node x to y but not vice versa). In some embodiments, the processor assigns each edge a weight corresponding to the length of the edge. In some embodiments, the processor computes the next driving action of a robotic device navigating from a first location to a second location by determining the shortest path in the directed, weighted graph. In other embodiments, the weight assigned to an edge depends on one or more other variables such as, traffic within close proximity of the edge, obstacle density within close proximity of the edge, road conditions, number of available charged robotic devices within close proximity of the edge, number of robotic devices with whom linking is possible within close proximity of the edge, etc.

In some embodiments, the processors use the number of robotic devices with whom linking is possible in determining the next driving action of a robotic device as linking multiple robots together reduces battery consumption and travel time (e.g., linking multiple robotic dump trucks together that are transporting excavated soil to the same location). Further, reduced battery consumption increases the range of the linked robotic device and the availability of robotic device. Thus, in some situations a slightly longer (time and distance) movement path is preferable. In some embodiments, the processor estimates battery consumption. For example, the processor may use a discount factor a(n), wherein n represents the number of robotic devices linked. The discount factor for different numbers of linked robotic devices may be provided as $$\alpha(n) = \begin{cases} 1, & \text{if } n = 1 \\ 0.8, & \text{if } n = 2 \\ 0.6, & \text{if } n = 3 \end{cases}.$$

Therefore, for two robotic devices linked together (n=2), the battery consumption of each robot is only 80% the normal battery discharge. In some embodiments, the processor solves the optimal movement path for reducing battery consumption using the strong product of graph G. In other embodiments, the processor checks the vicinity of the robotic device for other robotic devices navigating in a similar direction. In some embodiments, the processor links two robotic devices if the two are located close to one another and either their destinations are located close to one another, or the destination of one robotic device lies close to the travel path of the other robotic device. In some embodiments, the processor selects the next driving action of the robotic device to be along the edge that results in the minimum of the sum of distances to the destination from all edges of the current node. In some embodiments, the processor instructs the robotic device to unlink if the next action increases the distance to the destination for either robotic device.

In some embodiments, the processors compute a distance table including distances between all nodes of the graph and the processors choose moving a robotic device to a neighbour node of the current node that minimizes the distance to the destination as the next driving action of the robotic device. In some embodiments, assuming all edge lengths are equal, the processors determine if the first robotic device waits for the second robotic device to form a link if they are within a predetermined distance from one another by: checking, when the distance between the robotic devices is zero, if there is a neighbor node for which the distances to respective destinations of both robotic devices decreases, and if so, linking the two robotic devices; checking, when the distance between the two robotic devices is one edge length, if the final destination of the first robotic device is roughly in the same direction as the final destination of the second robotic device by checking if the first robotic device has a neighbor node towards its final destination which also decreases the distance to the destination of the second robot, and if so, instructing the first robotic device to wait for the second robotic device to arrive at its node, the second robotic device to travel to the node of the first robotic device and both robotic devices to link; and, checking, when the distance between the two robotic devices is two edge lengths, if the first robotic device is located along a path of the second robotic device, and if so, instructing the first robotic device to wait for the second robotic device to arrive at its node and both robotic device to link.

Figure 59:
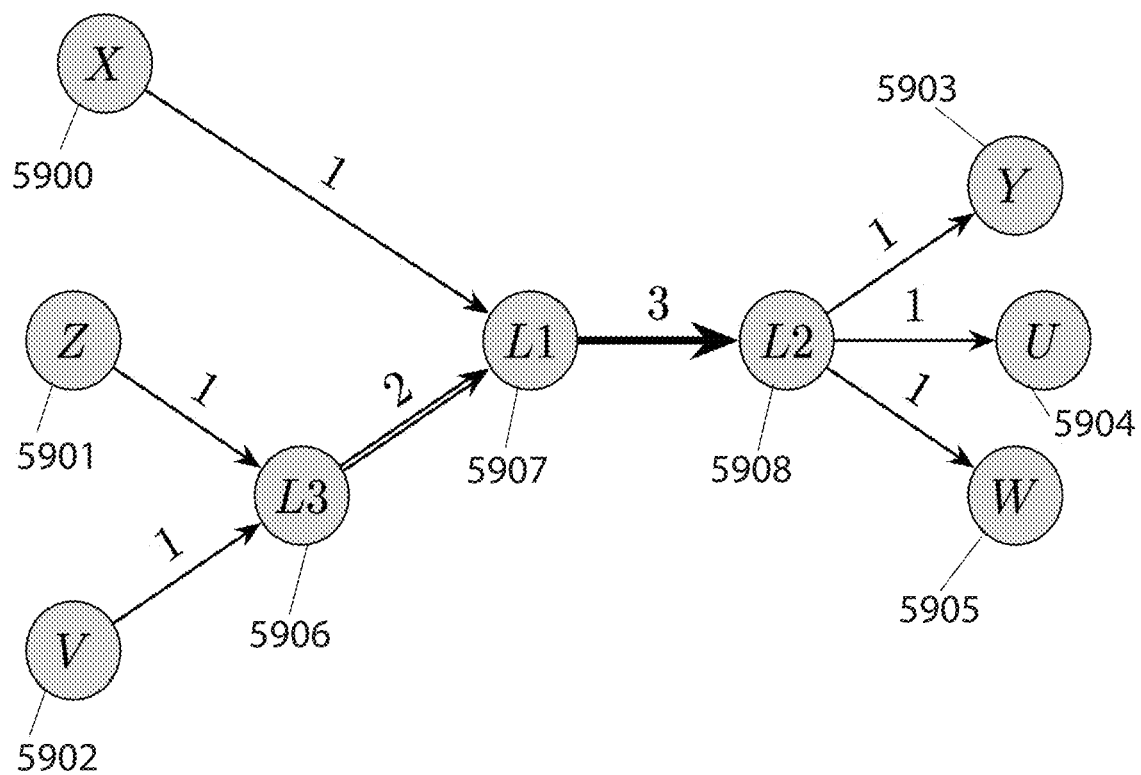
FIG. 59 illustrates an example of movement paths of robotic devices when linking and unlinking together, according to some embodiments.

In some embodiments, the processor specifies the movement path of a robotic device by a list of nodes that each robotic device passes to reach its final destination. In some embodiments, the processor chooses edges between nodes with shortest length as the driving path of the robotic device. In some embodiments, the processors compose movement path plans of robotic devices such that they share as many edges as possible and therefore may link for travelling along shared driving paths to save battery and reduce operation time. For example, a first robotic device drives from node X to node Y via nodes L1 and L2 and a second robotic device drives from node Z to node U via nodes L1 and L2. In this example, the first and second robotic device link at node L1, drive linked along the edge linking nodes L1 and L2, then unlink at node L2 and the first robotic device drives to node Y while the second robotic device drives to node U. FIG. 59 illustrates paths of three robotic devices initially located at nodes 5900 (X), 5901(Z), and 5902 (V) (e.g., robotic dump trucks at different excavation sites) with final destination at nodes 5903 (Y), 5904 (U), and 5905 (W) (e.g., different excavated soil dump sites), respectively. The robotic device initially located at nodes 5901 (Z) and 5902 (V) link at node 5906 (L3) and travel linked to node 5907 (L1). At node 5907 (L1), the robotic device initially located at node 5900 (X) links with them as well. All three linked robotic devices travel together to node 5908 (L2), at which point the three robotic devices become unlinked and travel to their respective final destinations.

In some embodiments, the processor (or processors) minimize a cost function to determine a movement path of a robotic device. In some embodiments, the cost function accounts for battery consumption and time to reach a final destination. In some embodiments, the processor may determine the cost $C(S)$ of travelling along movement path S using $C(S)=\Sigma_{(x \rightarrow y) \in S} c(x \rightarrow y)+\beta \Sigma_i \ _{chassis} \Delta t_i$, wherein $c(x \rightarrow y)=n\ a(n)d(x, y)\gamma$ and $c(x \rightarrow y)$ is the cost of travelling along an edge from a first node x to a second node y, n is the number of chassis linked together, $\alpha(n)$ is the discount factor for battery discharge, $d(x, y)$ is the length of the edge, $\gamma$ is a constant for battery discharge per distance unit, $\beta$ is a weight, $\Delta t_i$ is the time difference between the time to destination for linked chassis and the individual chassis i. In some embodiments, the processor uses individual weights $\beta_i$ with values that, in some instances, are based on travel distance. In some embodiments, the processor uses non-linear terms in the cost function. In some embodiments, the processor minimizes the cost function $C(S)$.

In some embodiments, the processor initially chooses a movement path and identifies it as a current movement path. In some embodiments, the processor evolves the current movement path, and if the evolved movement path has a smaller cost than the current movement path, the evolved movement path becomes the current movement path and the previous current movement path is discarded. In some embodiments, the evolution of a movement path includes: merging driving segments of robotic devices by finding overlaps in driving segments in a current movement path graph and identifying nodes where robotic devices may link and drive the overlapping segment together and unlink; unlinking segments when, for example, a new robotic device begins a task nearby and splitting the robotic devices into two groups provides more efficient routing; and, considering neighbouring nodes of start and end nodes of segments as the start and end nodes of the segments to determine if the cost lowers. In some embodiments, the processor iterates through different evolved routes until a movement path with a cost below a predetermined threshold is found or for a predetermined amount of time. In some embodiments, the processor randomly chooses a movement path with higher cost to avoid getting stuck in a local minimum.

Figure 60A:
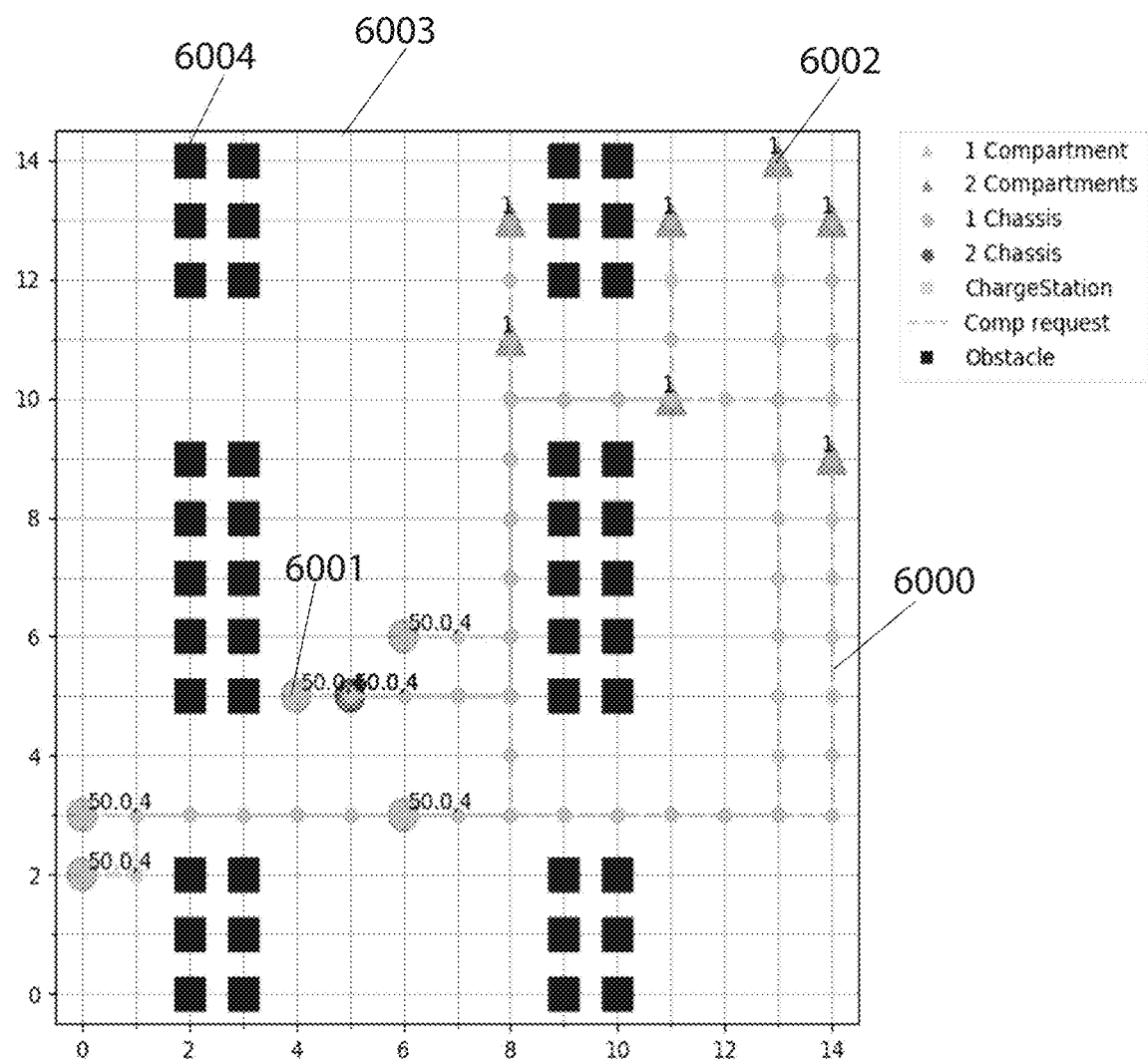
FIGS. 60A and 60B illustrate results of a method for finding matching route segments between two robotic devices, according to some embodiments.
Figure 60B:
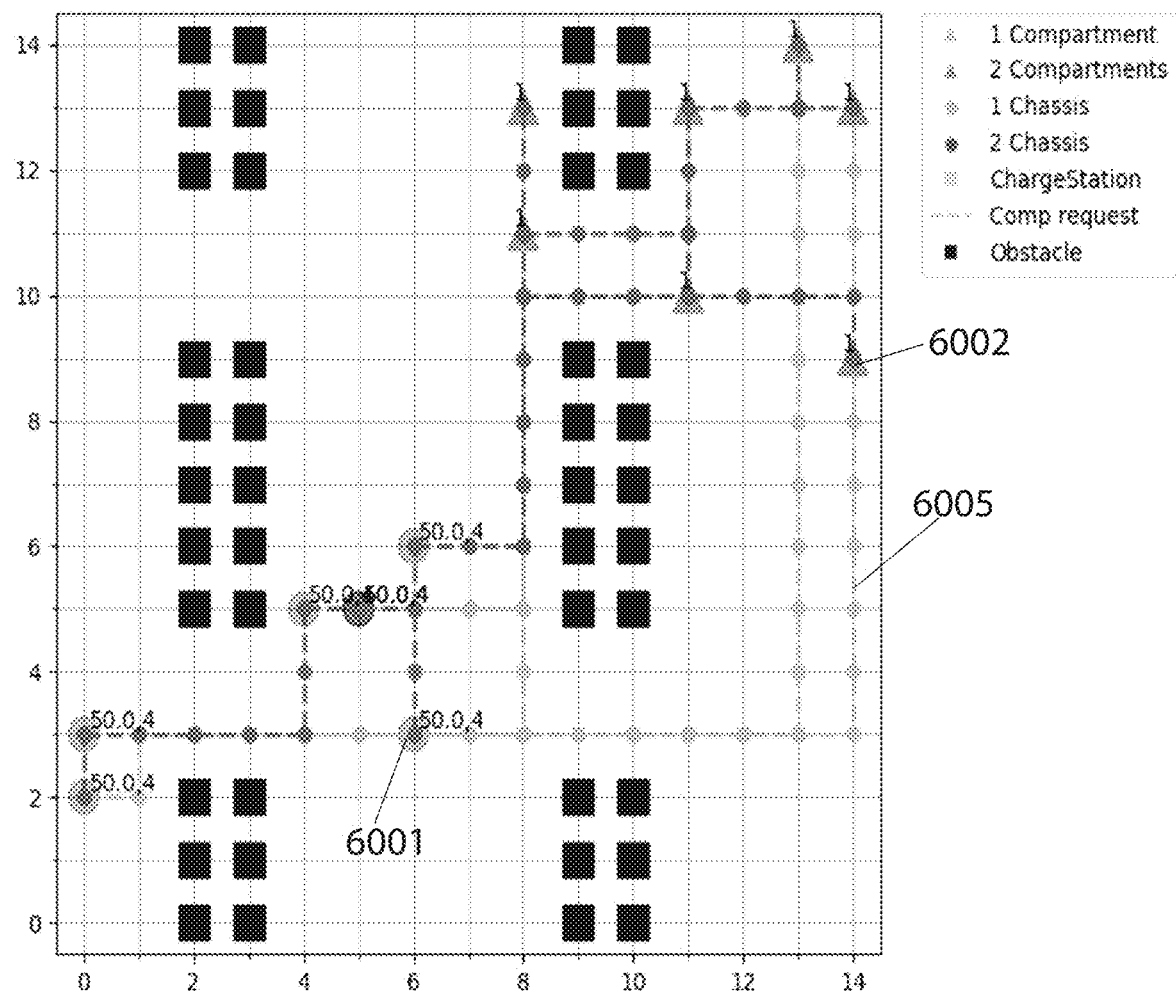

In some embodiments, the processor identifies if a pair of movement path segments (e.g., X→U, Y→V) match by computing an estimated cost of combined routing, and subtracting it from the cost of individual routing. The larger the difference, the more likely that the segments overlap. In some embodiments, the processors of the robotic devices executing the two movement paths merge the movement path segments if the difference in combined routing and individual routing cost is greater than a predetermined threshold. In some embodiments, the estimated cost of combined routing is calculated as the minimum cost of four routing paths (e.g., X→Y→U→V; X→Y→V→U; Y→X→U→V; Y→X→V→U). FIGS. 13A and 13B illustrate an example of the implementation of the described method for matching movement path segments. FIG. 60A illustrates individual routes 6000 of seven robotic devices 6001 from their current position to seven soil dump sites 6002 within environment 6003 with obstacles 6004 while FIG. 60B illustrates the updated routes 6005 to soil dump sites 6002 of robotic devices 6001 including segments where robotic devices are linked based on matching movement path segments identified using the approach described. In some embodiments, the processors identify matching movement path segments of robotic devices and evaluate stacking those robotic devices (if applicable) during navigation along matching movement path segments to minimize occupied space. In some embodiments, the processor uses a cost function to evaluate whether to stack robotic devices. In some embodiments, the processor evaluates stacking idle robotic devices. In some embodiments, robotic devices navigate to a stacking station to be stacked on top of one another. In some embodiments, the stacking station chosen is the stacking station that minimizes the total distance to be driven by all robotic devices to reach the stacking station.

Figure 61:
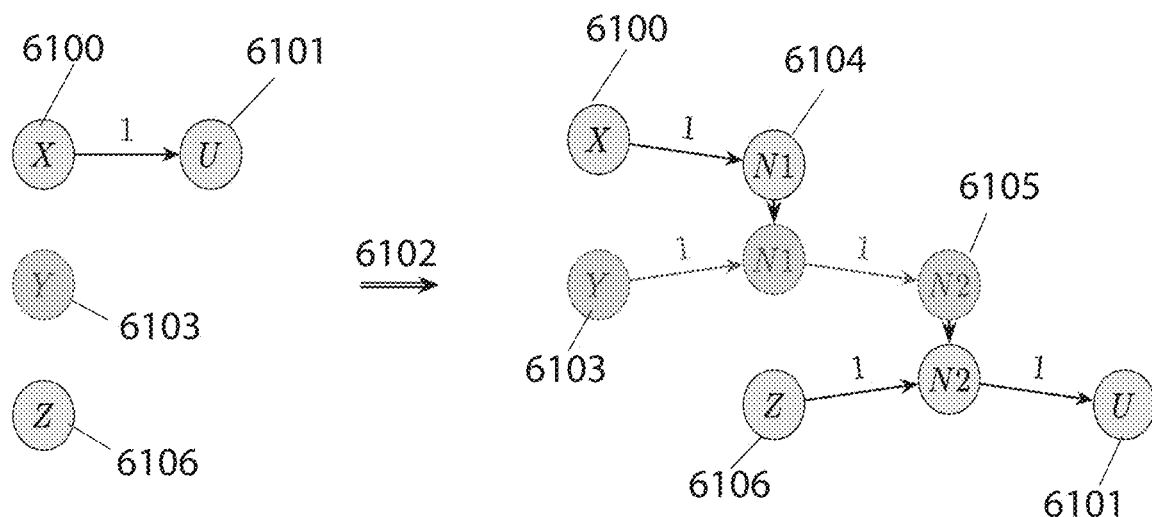
FIG. 61 illustrates an example of movement paths of robotic devices when transferring tasks between one another, according to some embodiments.

In some embodiments, the processor evaluates switching a robotic device performing a particular task by transferring the task from one robotic device to another during execution of a movement path as different robotic devices may have different routing graphs, different nodes and edges (e.g., highways that may only be entered by certain robotic device), etc. that may result in reducing the overall movement path cost (e.g., transferring excavated soil from one dump truck to another dump truck to complete the task of dumping the soil at a particular location). In some embodiments, the processor evaluates switching robotic devices during the movement path evolution step described above. For example, a first set of slower robotic devices operate using routing graph G1=(V1, E1) and a second set of fast highway robotic devices operate using routing graph G2=(V2, E2). In this example, at least the edge weights of G1 and G2 are different, otherwise there is no advantage in choosing a robotic device from either set of robotic devices. Also, there is a subset N=V1 ∩ V2 of nodes which are in both G1 and G2 and are accessible to both types of robotic devices. These nodes serve as locations where the task may switch from one type of robotic device to the other. In FIG. 61, a slower robotic device from the first set of robotic device transports excavated soil from a location 6100 (X) to a location 6101 (U). During the movement path evolution step 6102, the processor identifies a close by faster robotic device from the second set of robotic devices located at 6103 (Y) and a nearby transfer node 6104 (N1∈N) (e.g., by the two robotic devices collaborating with one another as described above). The processor evolves 6102 the movement path such that at 6104 (N1), the excavated soil is transferred from the slower robotic device to the faster robotic device. The faster robotic device drives the excavated soil from 6104 (N1) to 6105 (N2∈N), then the excavated soil is transferred to another slower robotic device coming from a location 6106 (Z) that transports the excavated soil to its final destination 6101 (U).

In some embodiments, collaborating processors of robotic devices choose two or more robotic devices to complete a task during the first step of the time step structure described above wherein the processors check, for running tasks, if corresponding robots are at their final destination, and if so, removes the tasks, and finds suitable robotic devices for new tasks, and adds the required actions to the suitable robots' action queue (e.g. drive to excavation site, excavate soil and unload into dump truck, drive back to excavation site). In some embodiments, the processor uses other methods for choosing two or more robots to complete a task such as Multi-Modal Bellmann-Ford or Multi-Modal Dijkstra algorithms. In some embodiments, the processor chooses the best robotic device for a task by evaluating a battery level of the robotic device, a required driving distance of the task, and a distance of the robotic device to the starting location. In some embodiments, the processor assigns an idle robot to a task by: determining a score for each robotic device in the environment having at least 50% battery power by calculating the distance of the robotic device to the starting location; determining for each of the robotic devices if their battery level is sufficient enough to complete the full task (e.g., driving the distance to the starting location, then from the starting location to the final destination), and, if so, subtracting three (or another reasonable number) from their score; and, choosing the robotic device with the lowest score. In this way, a closer robotic device scores better than a further robotic device, and a robotic device with enough charge to complete the task scores higher than a robotic device without enough charge. In other embodiments, the processor evaluates other variables in determining the best robotic device for a task. In some embodiments, the processor chooses the best robotic device for a task during the first step and/or the movement path evolution step of the time step structure described above. Further methods related to the collaboration of robotic devices in completing a task are described in U.S. patent application Ser. No. 16/230,805, the entire contents of which is hereby incorporated by reference.

Figure 62:
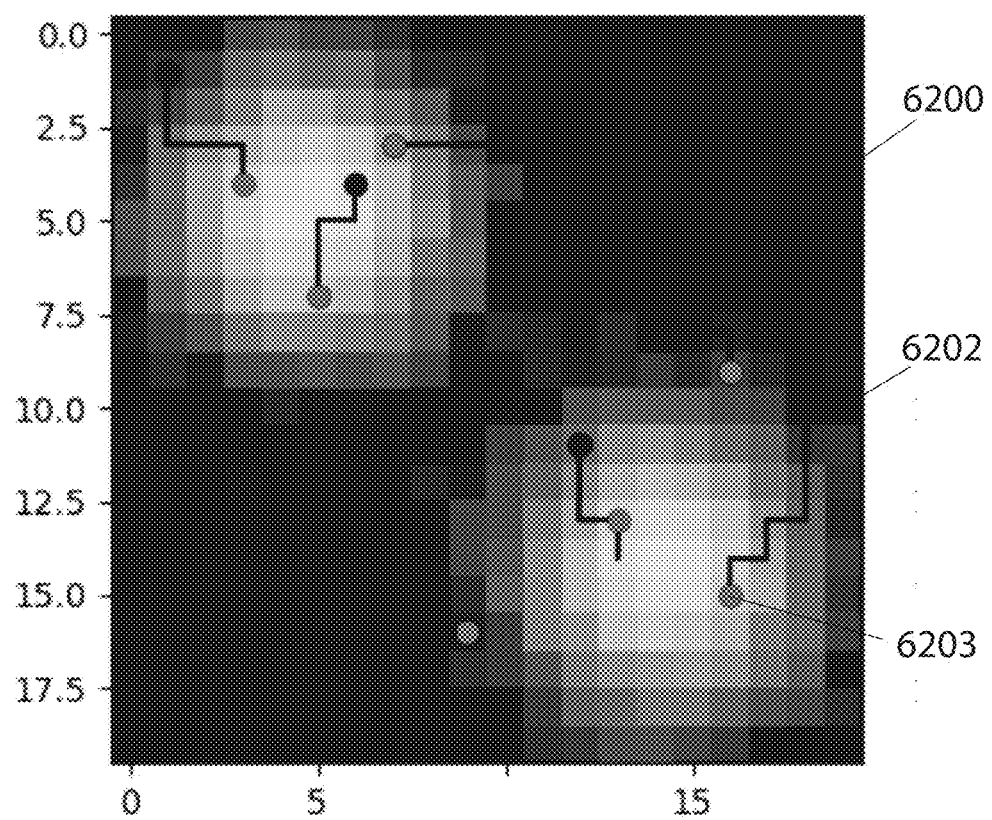
FIG. 62 illustrates how robotic device distribution changes after minimization of a cost function, according to some embodiments.
Figure 62:
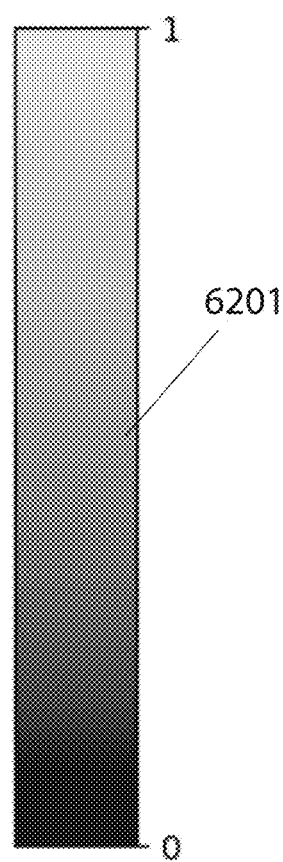

In some embodiments, the processor distributes robotic devices throughout the environment based on, for example, demand within different areas of the environment. In some embodiments, wherein an abundance of robotic device exists, the processor positions a robotic device close to every starting location (e.g., excavation site in the case of robotic excavators), has excess robotic devices that are fully charged distributed throughout the environment, and immediately transfers tasks from low battery robotic devices to fully charged robotic devices. In some embodiments, the processor may distribute robotic devices throughout the environment using the cost function $C(x, p) = \Sigma N_i \, p_i \, \min d(N_i, x_i)$, wherein $N_i$ is a node in the routing graph, $p_i$ is the probability that a task will start from node Ni at the next time frame, and $d(N_i, x_i)$ is the distance of the closest available robotic device from the node $N_i$, assuming there are n idle robotic devices at positions $x_i$. The processors of collaborating robots determine distribution of the robotic devices by minimizing the cost function. For example, FIG. 62 illustrates results of minimizing the cost function to determine optimal distribution of seven idle robotic devices within environment 6200. The color of the graph corresponds to the probability that a task will start from the particular node of the graph at the next time frame indicated by the colors on scale 6201. Darker dots 6202 represent initial positions of idle robotic devices and lighter dots 6203 represent their positions after minimization of the cost function. After optimization, idle robotic devices are closer to areas with nodes having a higher probability of a tasks starting.

Figure 63:
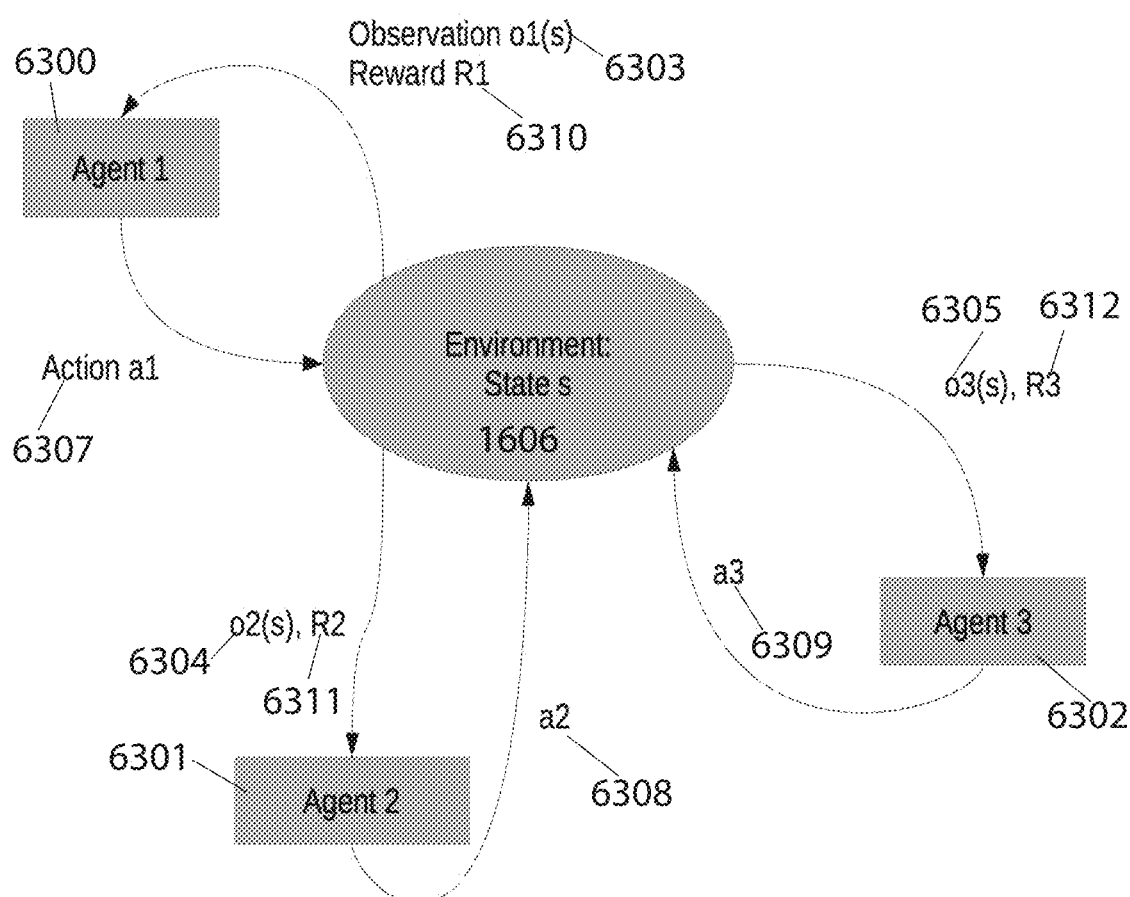
FIG. 63 illustrates an example of a multi-robot partially observable MDP, according to some embodiments.

In some embodiments, robotic devices retreat to a designated parking area until requested for a particular function or task or after completing a particular function or task. For example, a robotic device requested for excavation at a particular excavation site autonomously traverses an environment from a parking area to the excavation site. After completing the service, the robotic device traverses the environment to the nearest parking area or to a designated parking area or to another excavation site. The robotic device enters a parking area and autonomously parks in the parking area. Some embodiments provide a method for autonomous parking of robotic devices. In some embodiments, the processors of robotic devices each partially observe an environment (e.g., parking area, excavation site, etc.). In some embodiments, the processors of robotic devices collaborate to achieve a common goal of maximizing their performance in parking by, for example, reducing time to exit from a parking area and reducing the amount of driving within the parking area before exiting. In some embodiments, the processors of robotic devices may use a multi-agent partially observable Markov Decision Process (MDP) to maximize their performance in autonomously parking. In some embodiments, the processors represent their respective partial observation of the environment by $o^{(i)} = o^{(i)}(S)$ wherein S is the full state of the environment. FIG. 63 illustrates an example of a multi-agent partially observable MDP wherein each robotic device 6300, 6301, and 6302 with partial observation 6303, 6304, and 6305, respectively, interacts with environment 6306 represented by full state S by performing actions 6307, 6308, and 6309 and receiving rewards 6310, 6311, and 6312, respectively. Environment 6306 transitions from one state S to another given an action, such as actions 6307, 6308, and 6309. In this example, the full state S comprises the combined states s of each robotic device in the parking area at a given time, and a new state of the environment is determined based on the action of each robotic device.

Figure 64:
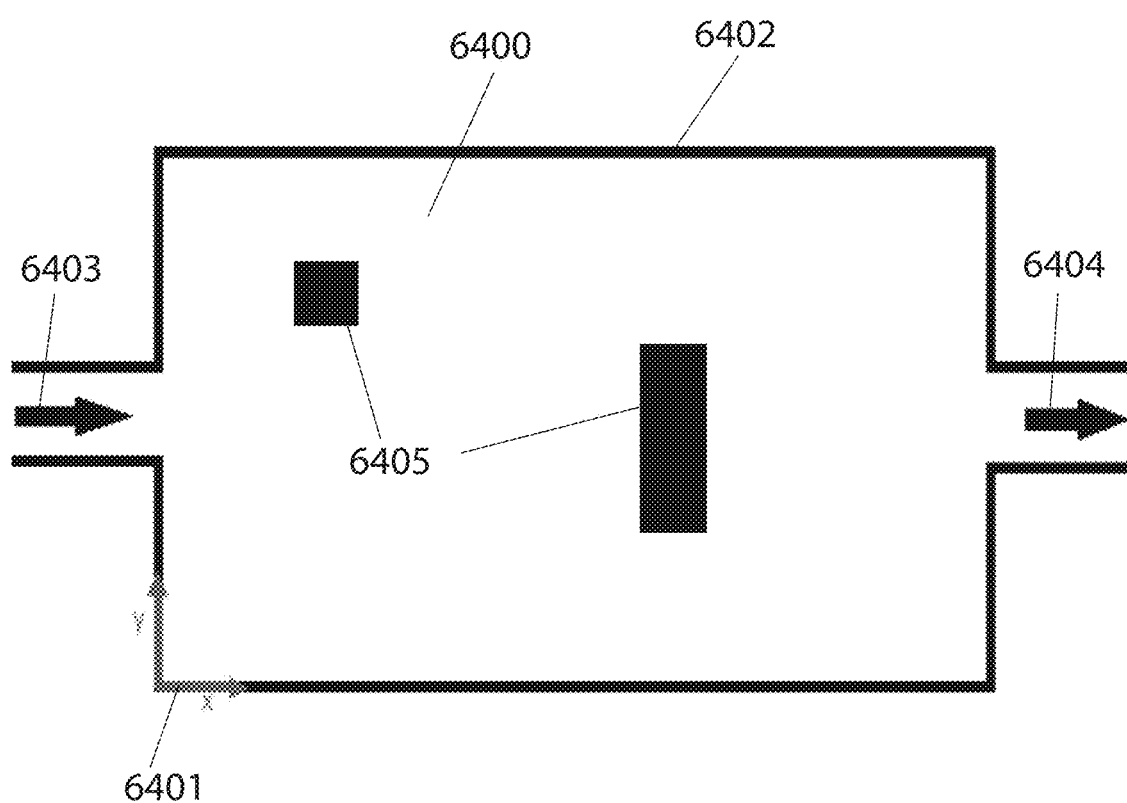
FIG. 64 illustrates an example of a parking area, according to some embodiments.

In some embodiments, a map of the parking area is stored in the memories of the robotic devices. In some embodiments, the processors of robotic devices collaboratively or independently build and update a map of the parking area, as described above. In some embodiments, the map of the parking area includes at least a global coordinate system such that positions of robotic devices with respect to the global coordinate system is known, the boundaries (e.g., walls), entry and exit points, and any obstacles present within the parking area. In some embodiments, processors of robotic devices determine the total space available for driving within the parking area using the map. FIG. 64 provides an example of a map of parking area 6400 with coordinate system 6401, boundaries 6402, entry point 6403, exit point 6404, and obstacles 6405.

Figure 65:
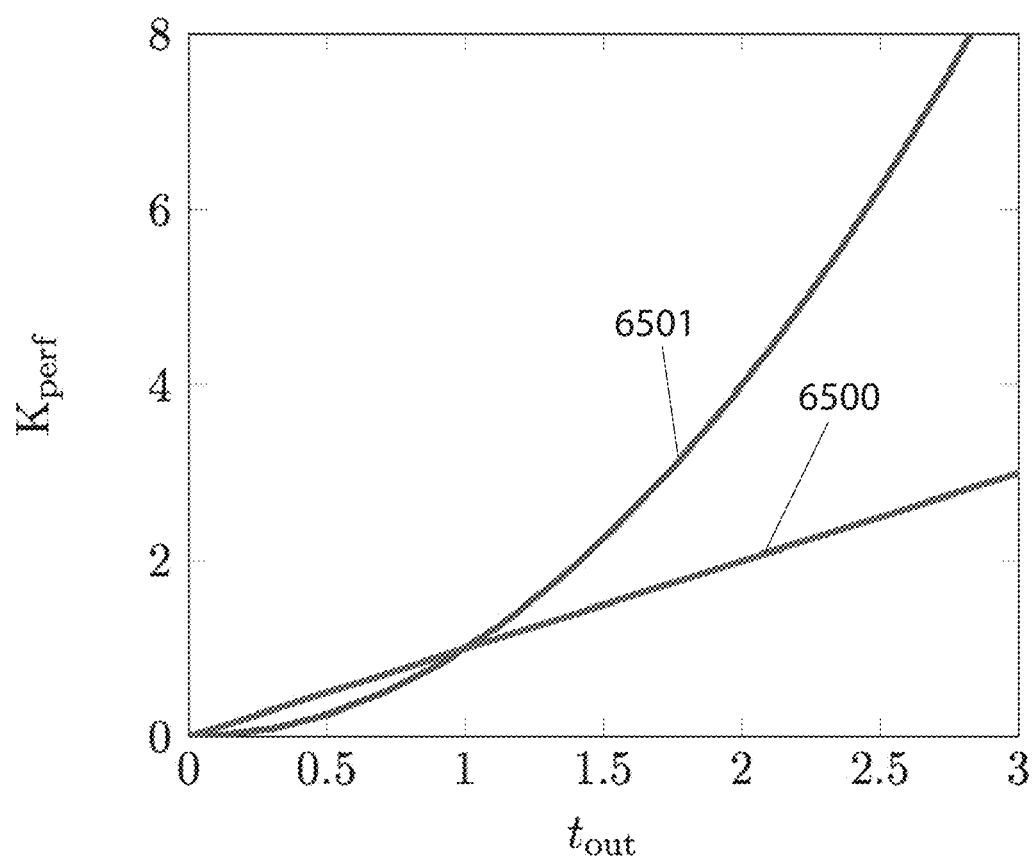
FIG. 65 illustrates an example of how a performance metric changes with increasing time to exit a parking area, according to some embodiments.

In some embodiments, the processors represent the state of all robotic devices and the full state of the environment using $S=[s^{(1)}, s^{(2)}, \ldots, s^{(N)}]$ wherein N is the number of robotic devices and $s^{(i)}$ denotes the state of robotic device i (e.g., position, velocity, etc.). S identifies the situation in the parking area at any point in time. In some embodiments, the processors of robotic devices measure parking performance $K_{perf}$ using a linear metric wherein variables affecting performance (e.g., distance driven to exit, total time to exit, time to receive notification to exit, time to exit after receiving notification to exit, etc.) are linearly combined and are each weighted based on their importance to parking performance. For example, in some embodiments, processors calculate their parking performance $K_{perf}$ by summating $K_{perf}^{(i)}$ of each robotic device and dividing it by the number of robotic devices. In some embodiments, processors determine their parking performance using non-linear metrics wherein the function $K_{perf}^{(i)}$ includes non-linear terms. For example, processors square time to exit such that time contributes quadratically and penalizes large exit times more severely. FIG. 65 illustrates $K_{perf}$ plotted against linear measure $t_{out}$ 6500 and quadratic measure $t_{out}$ 6501. For $t_{out}<1$, the difference in $K_{perf}$ is minimal, however, for $t_{out}>1$, $K_{perf}$ grows a lot faster for the quadratic measure and, as time increases, the penalty incurred becomes larger and larger whereas the penalty for the linear measure grows as a constant rate. In other embodiments, parking performance may be calculated using the worst metric recorded among all vehicles. For example, $K_{perf}$ may be calculated by summating worst recorded time to exit and distance driven to exit.

In some embodiments, processors of robotic device assign a reward incrementally over time or at the end of the parking session (e.g., when the robotic device exits the parking area). In some embodiments, the total reward for all robotic devices may be the sum of all the individual rewards of the robotic devices. For example, processors each assign a reward to their respective robotic device for each time step using $r^{(i)}(s^{(i)}, a^{(i)}) = \omega_1 \Delta_{dist} + \omega_2(t_n^{(i)} - t_{exitcall}^{(i)})$, wherein $t_{exitcell}^{(i)}$ is time of a user requesting the car to exit, and $A_{dist}$ is the distance that the car has driven due to action $a^{(i)}$. The total reward of all robotic may then be $$R_{sum}(S, A) = \sum_{i=1}^{N} r^{(i)}(s^{(i)}, a^{(i)}).$$

In some embodiments, processors of robotic device train themselves on making decisions that maximize the reward using deep reinforcement learning. In some embodiments, processors used a deep Q-network with either a convolutional neural network or standard neural network. In some embodiments, processors of robotic devices collaborate to decide on the next actions to execute. In some embodiments, the collaboration process includes processors communicating with one another to gain intelligence, processors computing their current estimated action-value function, processors managing conflicting actions with one another (e.g., by choosing the actions that maximize reward), robotic devices executing actions, processors observing their respective new state and assigning a reward, and processors updating their action-value function.

In some embodiments, managing conflicting actions includes processors selecting a conflict-free action vector, processors creating a sorted list where robotic devices are ordered based on their maximum potential gain in reward, and processors iterating through the list and choosing, for each robotic device, the action that maximizes its individual reward. In some embodiments, processors manage conflicting actions by negotiating with their respective current estimated action-value function. In embodiments wherein actions result in conflict (e.g., a robot wants to move to a location occupied by another robot intending to remain in the location, actions of two robotic devices resulting in a frontal crash, etc.), processors attempt to resolve the conflicts without creating new conflicts. In some embodiments, processors individually attempt to optimize their action-value function until there are no processors with larger potential gain in their respective field of view. In some embodiments, processors choose a sequence of actions resulting in greatest reward by considering action-value function of all or a portion of other robotic devices. In some embodiments, processors determine all allowed action sequences that do not result in conflict for a portion of robotic devices (e.g., four, six, or ten) within their respective field of view. In some embodiments, processors choose the sequence of actions by, for example, maximizing the combined q-values using $$\operatorname*{argmax}_{I \in \mathcal{I}} \sum_{(i, a_i) \in I} q_i(s_i, a_i),$$

wherein $I \in \mathcal{I}$ is an allowed action sequence of the set $\mathcal{I}$ of all allowed action sequences; minimizing the combined q-value difference of each involved robotic device $$\operatorname*{argmax}_{I \in \mathcal{I}} \sum_{(i, a_i), (j, a_j) \in I} q_i(s_i, a_i) - q_j(s_j, a_j);$$

value $$\operatorname*{argmax}_{I \in \mathcal{I}} \sum_{(i, a_i) \in I} q_i(s_i, a_i) \omega_i$$

wherein $\omega_i$ is the weight of robotic device i. In some embodiments, processors introduce a level of randomness in choosing actions to execute in order to promote some exploration.

Figure 66A:
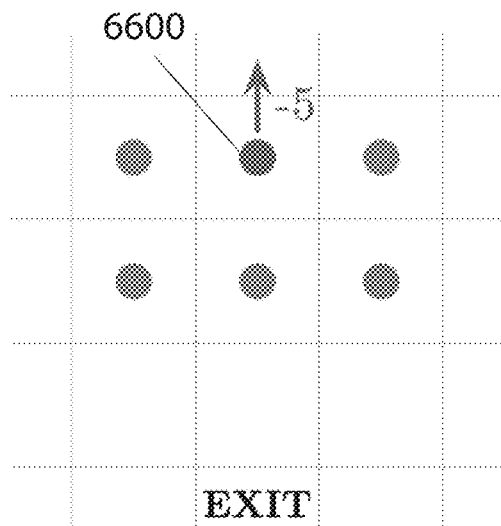
FIG. 66A-66C illustrate examples of different action sequences of robotic devices, according to some embodiments.
Figure 66B:
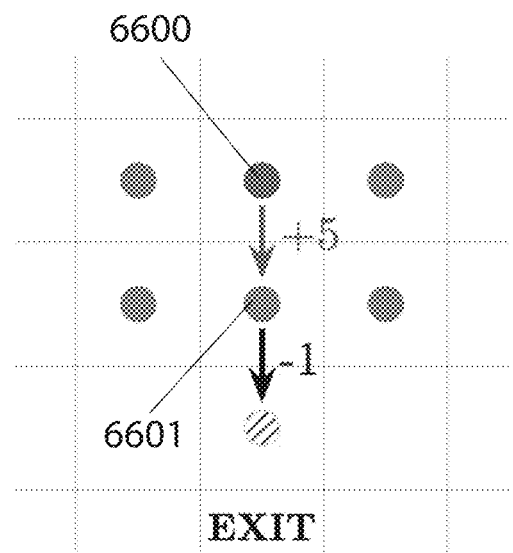
Figure 66C:
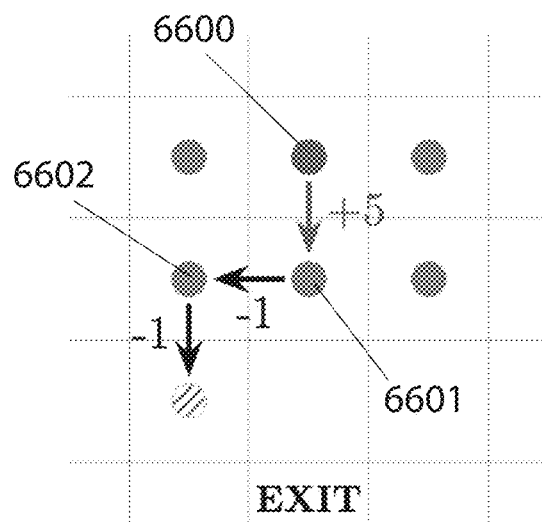

In some embodiments, processors may compute their maximum gain in q-value and list robotic devices in descending order. In some embodiments, processors iterate, starting at the top of the list and for each robotic device the best action sequence may be determined (e.g., no conflict and greatest gain in q-value). For example, FIG. 66 illustrates a simple grid representing a parking area with dots representing robotic dump trucks. FIGS. 66A-66C illustrate different action sequences assuming that robotic device 6600 wants to exit. In FIG. 66A robotic device 6600 does not negotiate with other robotic device and only has the option of moving away, which decreases the reward by a certain value, for illustrative purposes, 5 (time and driving penalty), resulting in an overall reward of −5 for the action sequence. In FIG. 66B robotic device 6600 negotiates with other robotic devices and moves towards the exit, increasing its reward by 5. However, for robotic device 6600 to move, robotic device 6601 must move, decreasing its reward by 1 (only driving penalty). The overall reward of the action sequence is therefore 4, higher than the previous case. In FIG. 66C, robotic device 6600 moves towards the exit, increasing its reward by 5. However, for robotic device 6600 to move, robotic device 6601 must move, decreasing its reward by 1 (only driving penalty). For robotic device 6601 to move, robotic device 6602 must also move, also decreasing its reward by 1. Therefore, the overall reward of the action sequence is 3, lower than the previous case but higher than the first case. The processors negotiate and choose the best valued sequence of actions involving up to four cars. In this particular example, the action sequence illustrated in FIG. 66B is chosen. In some embodiments, processors only consider a portion of possible sequence actions and choose the first sequence action that results in a reward above a predetermined threshold. In some embodiments, the processors only save the action vector executed while discarding other action sequence combinations considered.

In some embodiments, processors represent the parking area using a logical matrix, wherein each entry corresponds with a location within the map of the parking area. A matrix element with a value of '1' indicates obstacles, while an element with a value of '0' indicates an empty space. Each grid cell may be identified as a two-dimensional coordinate. In some embodiments, robotic devices only occupy a single grid cell and have five possible actions: up, down, left, right, and idle. In some embodiments, each time step may include: processors computing their action-values given their respective observation $o_n$ of state $s_n$ to find most optimal action; collaborating to manage conflicts if they occur by choosing the strategy that maximizes the overall reward of all robotic devices; executing chosen actions; and, observing new local observations $o_{n+1}$ of new states $s_{n+1}$ and receiving individual rewards $r_{n+1}$. In some embodiments, processors compute an action-value table where for each possible action the estimated q-value may be determined in order to determine most optimal action. In some embodiments, processors compute the value of a state of a robotic device by determining the minimum distance to an exit and taking the negative of it. In some embodiments, processors multiply the reward by a predetermined value for robotic devices attempting to exit the parking area in order to give them higher priority (i.e. placed higher in the ordered list, as described above) in the negotiation phase. In some embodiments, processors use more complex functions for calculating the value of a state, such as functions considering additional variables (e.g., time to exit, number of actions to exit, privacy of location, traffic of location, distance to obstacles, proximity to entry/exit points, etc.). For example, processors use a q-function that considers the distance to exit, privacy of a location, and proximity to entry/exit points. For a robotic device attempting to exit the processor uses the q-function $q_{out}=5(q_{distance}-0.25q_{privacy})$ and for a robotic device parked the q-function $q_{in}=q_{privacy}-0.1q_{distance}+$entry/exit penalty. For a robotic device attempting to exit, the distance to exit is more important than the privacy of the location, while the opposite is true for a parked robotic device. A parked robotic device may additionally be penalized for proximity to entry/exit points in order to reduce likelihood of parked robotic devices blocking them. The q-value of a robotic device attempting to exit is multiplied by five to provide priority to robotic devices attempting to exit. In some embodiments, processors compute probability to exit in the next step (pi) (i.e., probability to get instruction to exit the parking area). In some embodiments, processors implement the probability to exit in computing q-values wherein the q-function is computed as a linear combination $q_{comb}^{(i)}=p^{(i)}q_{out}+(1-p(i))q_{in}$.

In some embodiments, processors use stochastic gradient ascent to choose the best actions to execute where a combined q-value is computed by linearly combining n different q-tables $q_i$ corresponding with different parameters considered (e.g., distance to exit, privacy of locations, distance to entry, density of surrounding area, etc.) using $$q_{comb}(\vec{\omega}) = \sum_{i=1}^{n} \omega_i q_i.$$

Processors may learn a mapping F from state s to these n parameters maximizing individual reward wherein $\vec{\omega}=F(s)$ such that $$(\vec{\omega}) = \underset{\omega}{\arg\max} G(q_{comb}(\omega), s).$$

$G(q_{comb}(\omega), s)$ is the return when in state s and following policy implied by $q_{comb}(\omega)$. In embodiments, processors attempt to find the best fit using $$\hat{\omega} = \underset{\omega}{\arg\min} \sum_s \|V(s) - q_{comb}(s, \omega)\|^2,$$

wherein V(s) is the state value function, then update ω slightly in direction of $\hat{\omega}$. In some embodiments, processors may use q-learning to choose the best possible action. Processors being with preset q-values for exiting robotic device $q_{out}$ and parked robotic device $q_{in}$. With each step, the processors update their respective current action-value function $q(s_n)=(1-\alpha)q(s_n)+\alpha(q(s_{n+1})+r_{n+1})$. In some embodiments, q-tables are updated in real time. In some embodiments, processors account for current experience in the q-function by adding $q_{current}$ to the calculated q-value. In some embodiments, processors decay $q_{current}$ to provide dynamic behaviour. For example, in each time step processors decay $q_{current}$ by $(1-\alpha)$, $\alpha<<0$ or if another robotic device moves into position s, the particular position is discouraged by subtracting a factor β, β>0 from $q_{current}$.

Figure 67A:
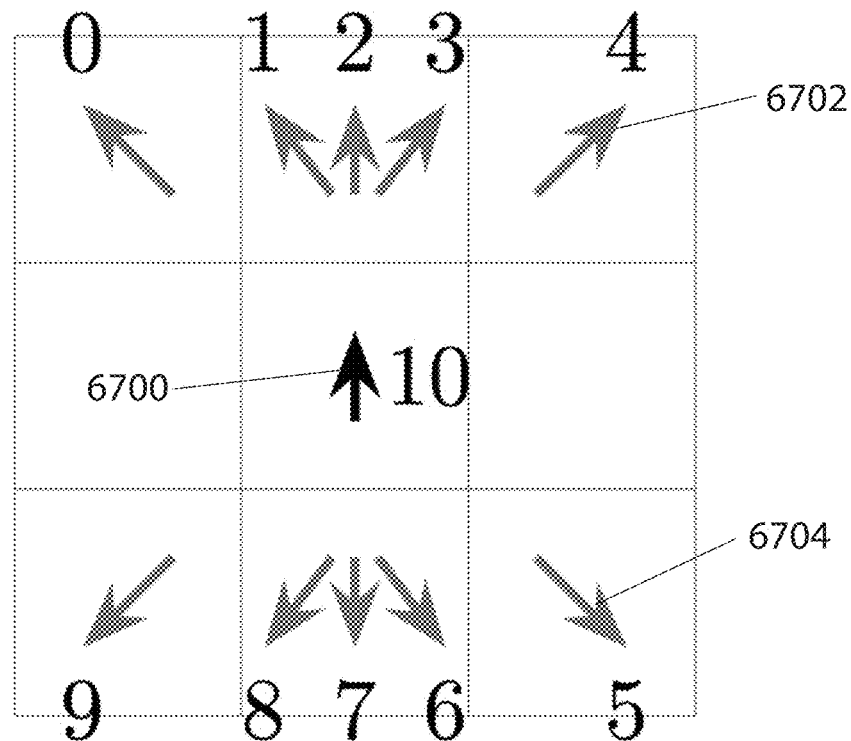
FIGS. 67A and 67B illustrate possible actions of a robotic device in a parking area, according to some embodiments.
Figure 67B:
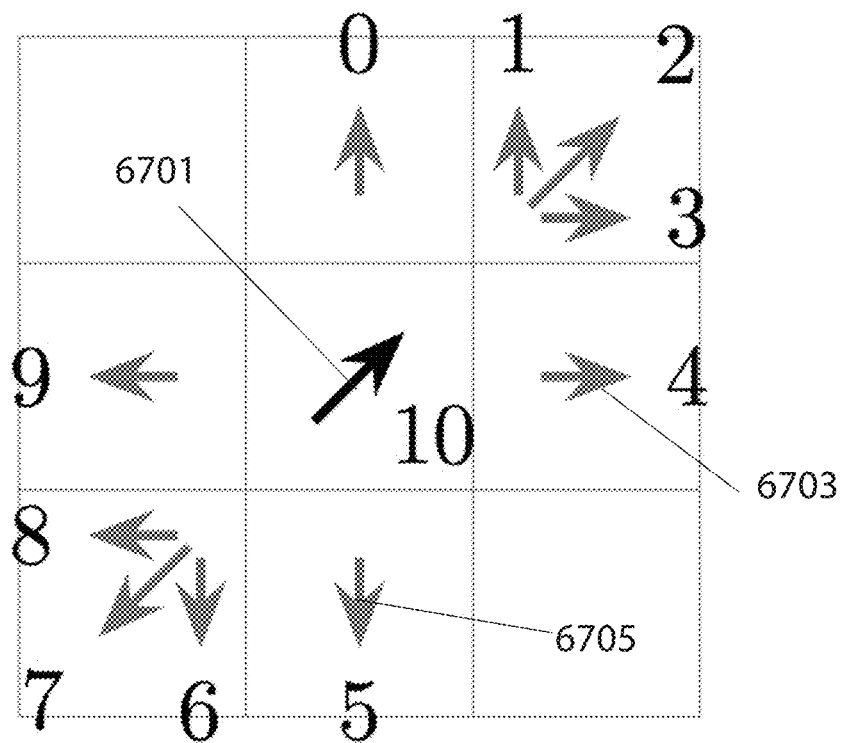

In some embodiments, processors of robotic devices use higher resolution grids to represent the parking area, where vehicles occupy more than a single grid cell. In some embodiments, processors consider various possible actions, such as move upward, upward-right, right, downward-right, downward, downward-left, left, and upward-left. In other embodiments, other possible actions are used. For example, FIGS. 67A and 67B illustrate allowed actions in two starting directions indicated by black arrows 6700 and 6701. Grey arrows 6702 and 6703 numbered 0-4 are actions directed forwards and grey arrows 6704 and 6705 numbered 5-9 are actions directed backwards while black arrows 6700 and 6701 numbered 10 indicate idling.

Figure 68:
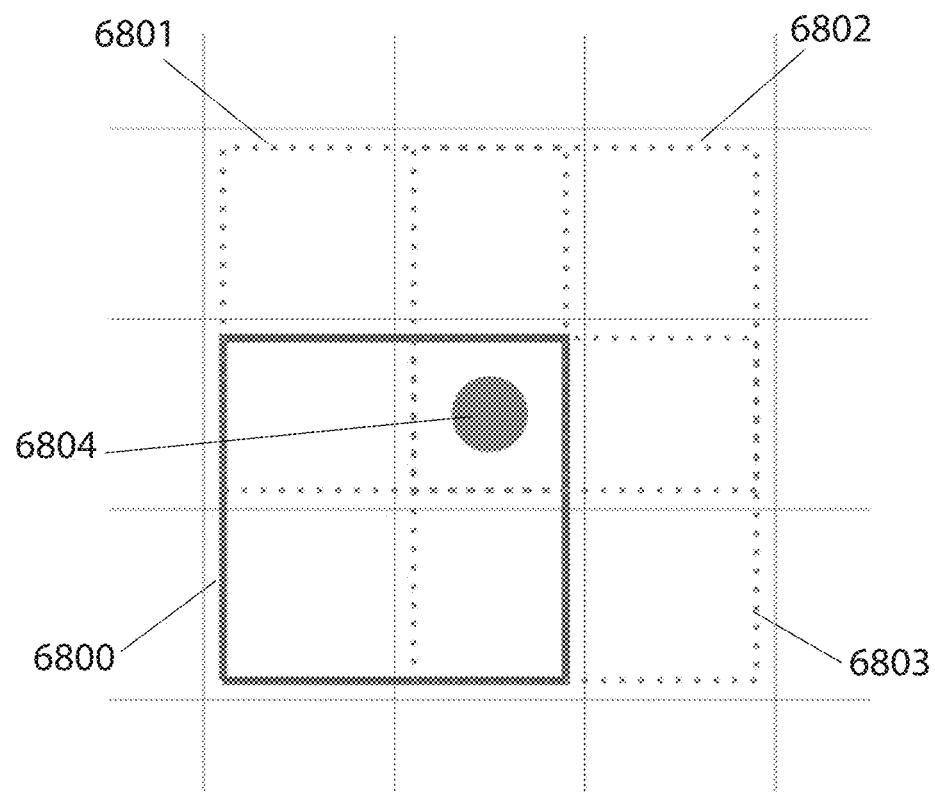
FIG. 68 illustrates four 2-by-2 blocks of a particular parking spot, according to some embodiments.

In some embodiments, processors use an event driven approach wherein a mapping based on events is used to map a parking space to a reward value. In some embodiments, processors use the events, enter, exit, and optimize. The event enter describes the robotic device entering the parking area and finding the best valued parking spot, finding an efficient movement path, and driving there. In some embodiments, processors may use an algorithm, such as Dijkstra's algorithm, to determine the most efficient movement path. In some embodiments, processors determine the best valued parking spot upon entering the parking area based on the distance from entry to the parking spot, distance to exit from the parking spot, and the amount of driving while instructed to remain parked (e.g., due to collaboration). In some embodiments, processors estimate the amount of driving while instructed to remain parked using, for example, $$d_{parked} = \left(\frac{1}{p} - t_{exit} - t_{spot}\right) e_{parked},$$

given an approximation for the expected amount of driving per time step $e_{parked}$ for each parking spot, where p is the exit probability and $t_{exit}$ and $t_{spot}$ refer to the time required to exit from the parking spot and the time to get to the parking spot, respectively. In some embodiments, processors may use Dijkstra's algorithm to estimate distance and times. The event exit describes a robotic device getting instruction to exit, finding an efficient exit movement path, and driving there. In some embodiments, processors used Dijkstra's algorithm to approximate exit time and driving cost. In some embodiments, processors assign edges weights that correspond to the expected driving impact of moving from one space to another (e.g., for an empty space processors use a weight of −1 as only vehicle needs to move one space). If a tile is not empty other robotic devices must move. An estimate of the weight is adjusted by, for example, subtracting $$\left(\max\left(\frac{\text{number of robotic chassis}}{\text{number of obstacles}}\right) - 1\right),$$

wherein the maximum is taken over four 2-by-2 cells surrounding the cell corresponding with the parking spot of the robotic device. FIG. 68 illustrates an example of four possible 2-by-2 blocks 6800, 6801, 6802, and 6803 of a robotic device in parking spot 6804. The event optimize describes processors revaluating their current location and choosing to execute an action based on current known information. In some embodiments, processors of robotic devices negotiate to determine best actions to execute. In some embodiments, processors use q-learning to adaptively learn parking spot values.

In some embodiments, the processors may represent the parking area and robotic device using a graph with nodes connected by edges, the nodes representing parking spots and edges representing a possible path from one parking spot to another. In some embodiments, processors assign nodes additional information (e.g., occupied/unoccupied, entry or exit, etc.). In some embodiments, processors assign edges weights that correspond with the cost of a robotic device moving along those edges.

In some embodiments, processors represent the parking area and robotic devices using a fully continuous model, such as a classical mechanics particle model. In some embodiments, the parking area may be represented as a unit square $[0,1]\times[0,1]$ with walls at $x=0,1$ and $y=0,1$ with any position within the parking area is indicated by (x, y) coordinates. In some embodiments, each robotic device has a position $\vec{x}=(x, y) \in [0,1]\times[0,1]$, velocity $\vec{v}=(v_x, v_y)$ and force acting on the robotic device $\vec{f}=(f_x, f_y)$. In some embodiments, processors may update the position, velocity, and force according to Newton's equations of motion. In some embodiments, processors derive the force from a potential function $\vec{f}=-\Box U(\vec{x})$. The potential function U models an energy surface and the force points in the direction of steepest descent, thus trying to minimize the current energy state. In some embodiments, the processors determine the potential function as the sum over different types of interactions. For example, the potential function for robot-to-robot interaction is $$\frac{1}{r},$$

wherein r is the distance between robotic devices. The function pushes the two robotic devices away from one another, the effect becoming stronger the closer the chassis are. The potential function for chassis-to-wall interaction is $$\frac{1}{r},$$

wherein r is the distance between the robotic device and wall. The function pushes the robotic device away from the wall, the effect becoming stronger the closer the chassis is to the wall. The potential function for chassis-to-exit interaction is r, wherein r is the distance between the robotic device and the exit. The function constantly pulls the robotic device in the direction of the exit. In some embodiments, processors incorporate friction into the computation of using $\vec{f}= -\nabla U(\vec{x})=\gamma \vec{v}$, wherein $\gamma$ is a friction constant. In some embodiments, processors assign a direction to their respective robotic device, are limited to accelerating and steering, and are prohibited from moving in a sideways direction in the above described continuous model for determining most optimal actions to execute. In some embodiments, processors use similar variables as described above to measure performance (e.g., time to exit, distance to exit, privacy of location, etc.).

While the disclosure describes particular types of robotic devices, such as robotic dump trucks and robotic excavators, the methods and techniques described herein may be applied to various different types of robotic devices. For example, luggage robots, vacuum robots, mopping robots, robotic towing devices, robotic refuse container, robotic trash can, robotic food delivery device, robotic platform for transporting items, robotic hospital bed, first aid robots, robotic fire extinguisher, autonomous taxis, autonomous vehicles, surface cleaning robots, robotic commercial cleaners, lawn mowing robots, pizza delivery robots with an oven for baking pizza, grocery delivery robots, shopping cart robots with a freezer compartment for frozen food, fire proof first aid robots including first aid supplies, defibrillator robots, hospital bed robots, pressure cleaner robots, dog walking robots, marketing and advertisement robots, ATM machine robots, snow plowing and salt spreading robots, car washing robots, and passenger transporting robots.

Figure 69A:
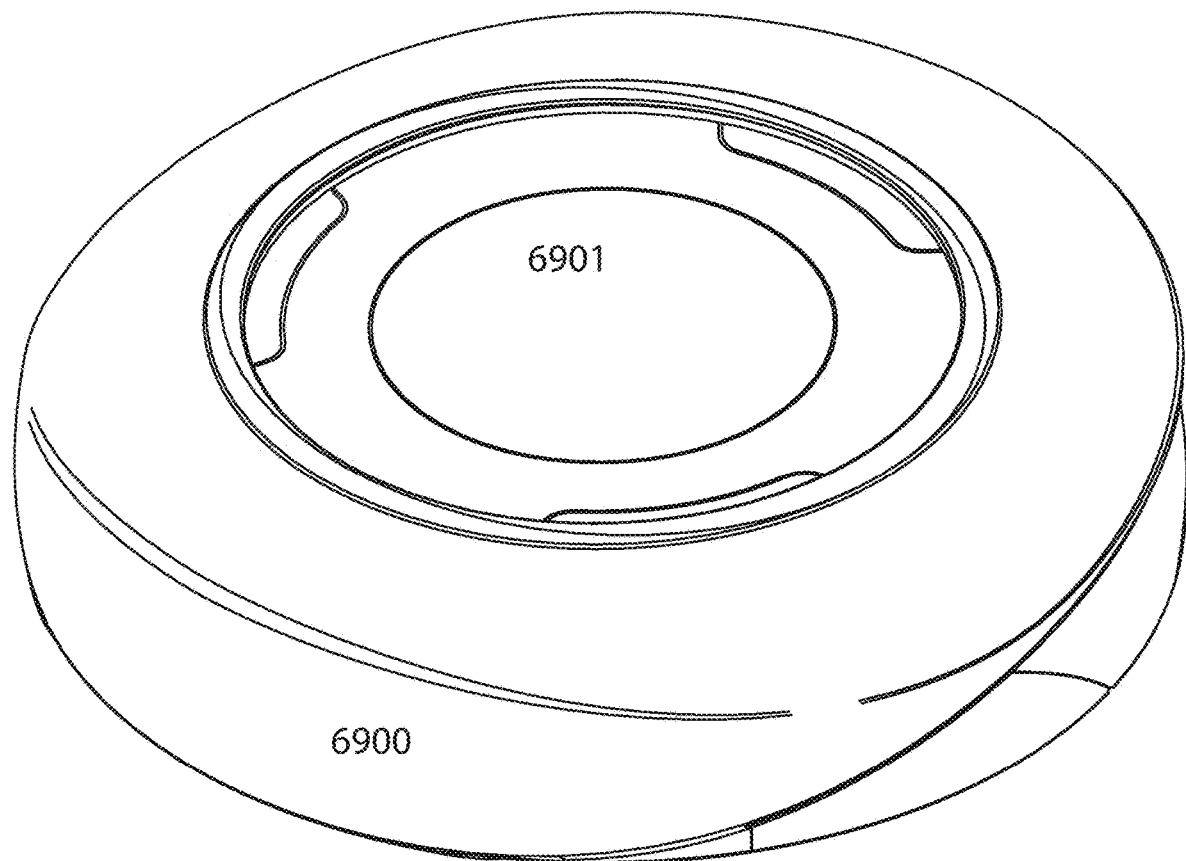
FIGS. 69A-69E illustrate an example of a robotic surface cleaner, according to some embodiments.
Figure 69B:
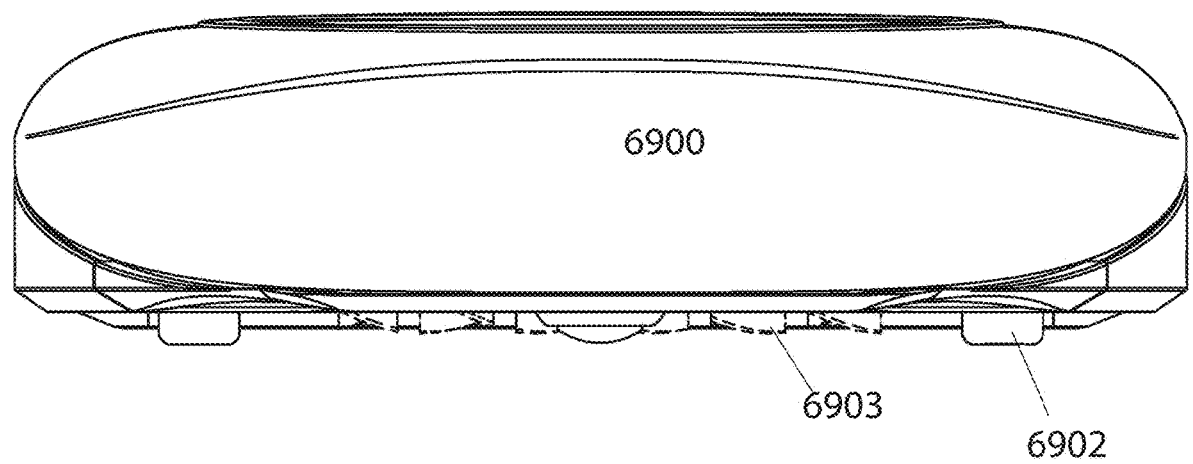
Figure 69C:
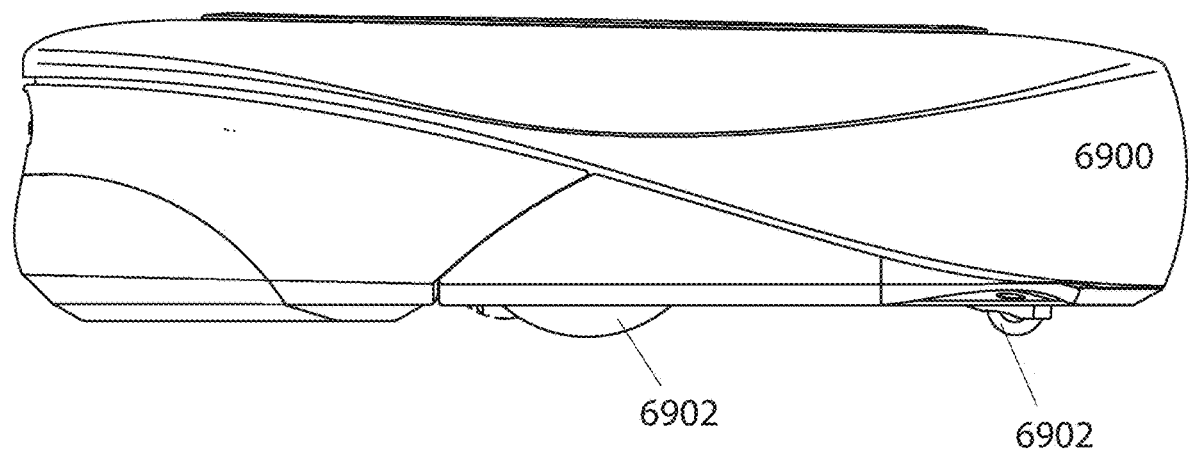
Figure 69D:
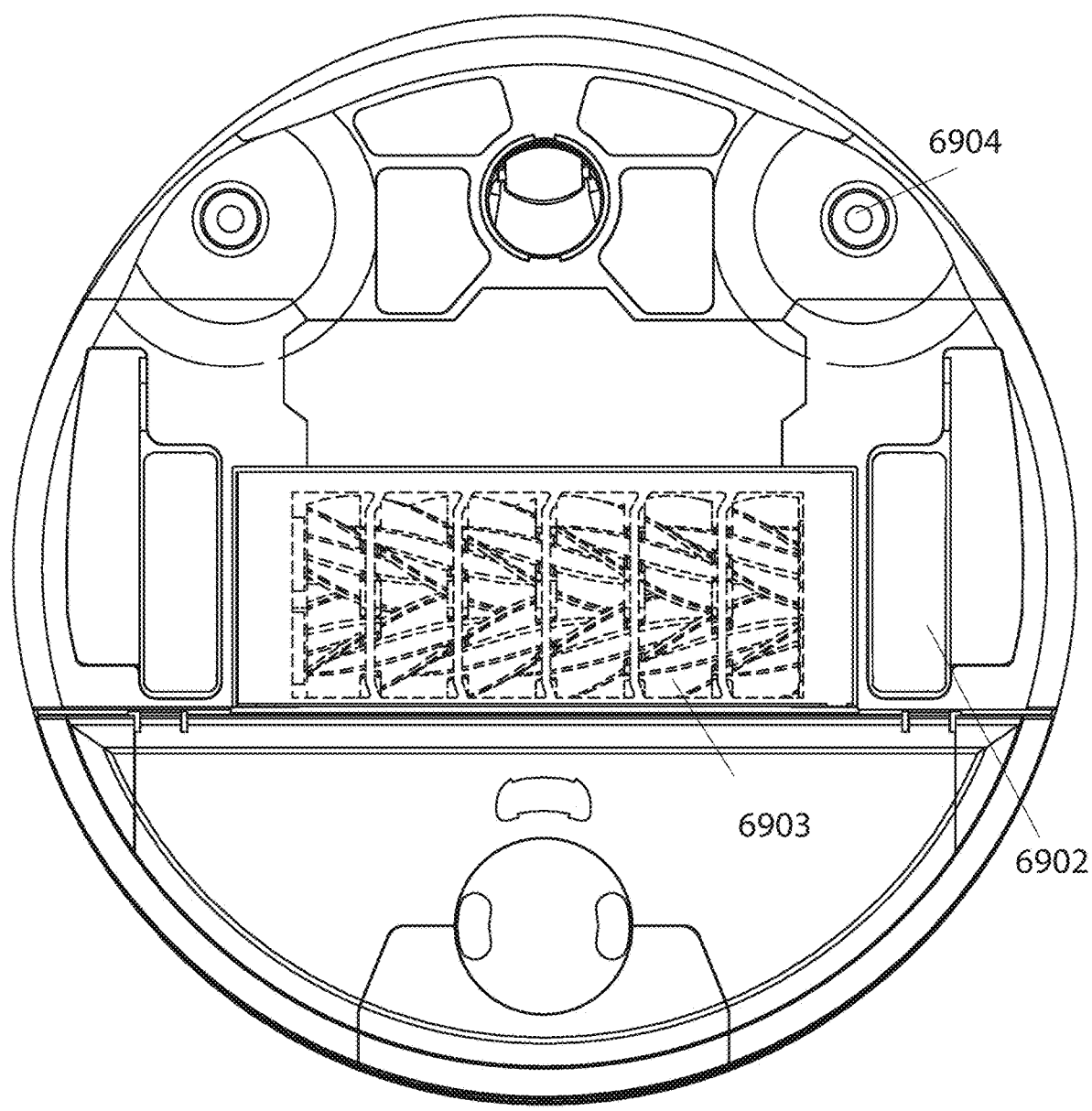
Figure 69E:
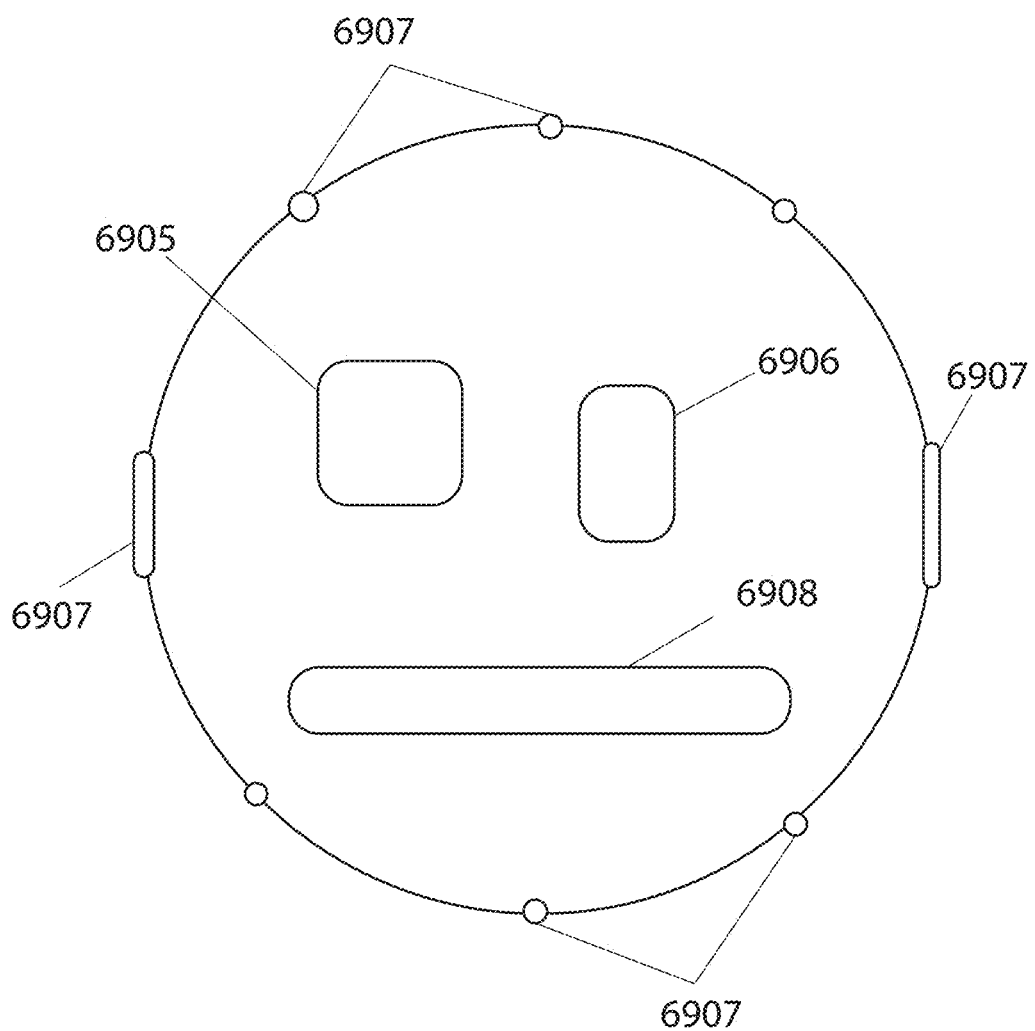
Figure 70A:
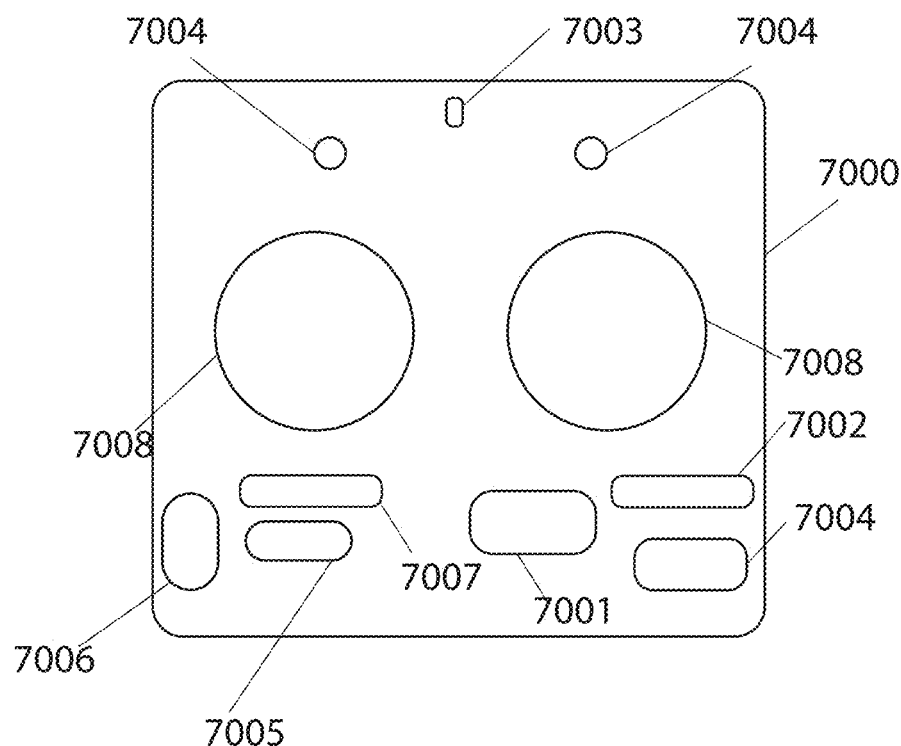
FIGS. 70A and 70B illustrate an example of an industrial robotic cleaner, according to some embodiments.
Figure 70B:
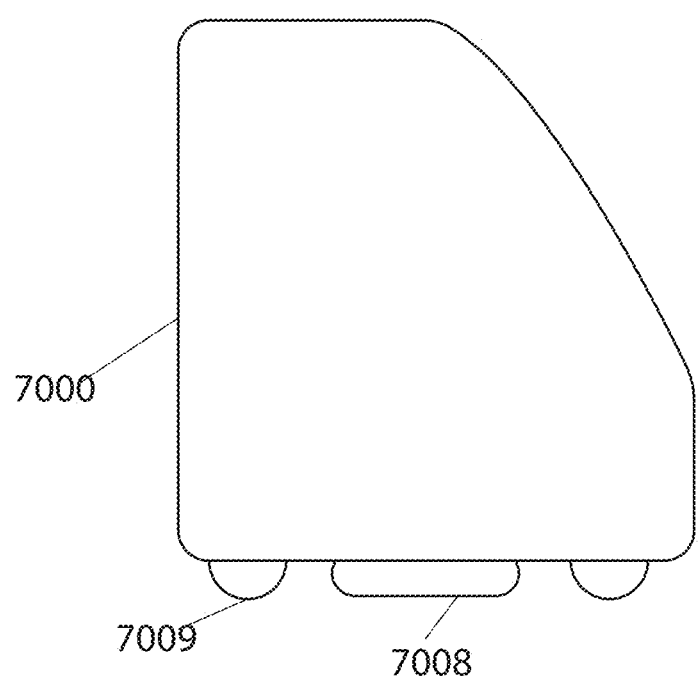

FIGS. 69A-69D illustrate an example of a robotic surface cleaner including bumper 6900, graphical user interface 6901, wheels 6902, cleaning tool 6903, and sensors 6904. FIG. 69E illustrates components within the robotic surface cleaner including a processor 6905, a memory 6906, sensors 6907, and battery 6908, that may implement the methods and techniques described herein. For example, the processor 6905 of the robotic surface cleaner may individually or collaboratively with the processors of other robotic surface cleaners operating within the same environment, capture depth measurements of objects within the environment and form a map by stitching overlapping readings together, as described in the disclosure above. The processor 6905 may further divide the map into zones by minimizing a cost function dependent on travel distance between zones and coverage, or may use one of the various methods and techniques described above, to more efficiently clean. The processor 6905 may also generate a movement path in real-time based on real-time observations of the environment. The movement path may be generated in a taxicab coordinate system as described above and may be devised based on a MDP. The processor of the robotic surface cleaner may optimize zone division and movement path collaboratively with other processors of robotic surface cleaners with whom a DTC link has been established. Further the processors collaborate to determine work and operational decisions, such that a task is completed most efficiently, as described above. FIG. 70 illustrates an industrial robotic cleaner that may similarly implement the methods and techniques described herein. FIG. 70A illustrates a top view of an example of an industrial robotic cleaner 7000 with processor 7001, memory 7002, a measurement device 7003, a pair of sensors 7004, network communication 7005, movement driver 7006, timer 7007, and circular brush cleaning tools 7008. The first and second set of sensors 7003 and 7004 may include depth measuring devices, movement measuring devices, and the like. In some embodiments, the robotic cleaner may include the features of a robotic cleaner described herein. In some embodiments, program code stored in the memory 7002 and executed by the processor 801 may effectuate the operations described herein. FIG. 70B illustrates a side view of the robotic cleaner 7000 with wheels 7009 and circular brush cleaning tool 7008. In some embodiments, the robotic cleaner includes a customizable versatile mobile robotic chassis customized to function as a robotic cleaner.

In some embodiments, robotic devices are wirelessly connected to an application of a computing device or communication device (e.g., mobile phone, laptop, tablet, desktop computer, etc.) and the application of the communication device is used to communicate with the robotic device. For example, the application displays a map of the environment and a graphical user interface of the application may be used to receive commands to make adjustments to the map or adjust settings of the robotic device and its tools. In some embodiments, after selecting all or a portion of the boundary line, a user is provided by embodiments with various options, such as deleting, trimming, rotating, elongating, shortening, redrawing, moving (in four or more directions), flipping, or curving, the selected boundary line. In some embodiments, the user interface includes inputs by which the user adjusts or corrects the map boundaries displayed on the screen or applies one or more of the various options to the boundary line using their finger or by providing verbal instructions, or in some embodiments, an input device, such as a cursor, pointer, stylus, mouse, button or buttons, or other input methods may serve as a user-interface element by which input is received. In some embodiments, the user interface presents drawing tools available through the application of the communication device. In some embodiments, the application of the communication device sends the updated map to the processor of the robotic device using a wireless communication channel, such as Wi-Fi or Bluetooth. In some embodiments, via the user interface (which may be a single screen, or a sequence of displays that unfold over time), the user creates different zones within the environment. In some embodiments, the user selects different settings, such as tool, operation and scheduling settings, for different zones of the environment using the user interface. For example, for a robotic surface cleaner, tools may include a suction tool (e.g., a vacuum), a mopping tool (e.g., a mop), a sweeping tool (e.g., a rotating brush), a main brush tool, a side brush tool, and an ultraviolet (UV) light capable of killing bacteria. In some embodiments, robotic floor-cleaning devices may also have various settings, such as a deep cleaning setting, a regular cleaning setting, speed settings, movement pattern settings, cleaning frequency settings, etc. In some embodiments, a user is enabled to adjust all of these settings through the user interface. The particular functions and settings available may be dependent on the capabilities of the particular robotic floor-cleaning device in question. For example, in some embodiments, a user may select any of: cleaning modes, frequency of cleaning, intensity of cleaning, navigation methods, driving speed, etc. Additionally, in some embodiments, a real-time robotic floor-cleaning device manager may be provided on the user interface to allow a user to instruct the real-time operation of the robotic floor-cleaning device regardless of the device's location within the two-dimensional map. In some embodiments, instructions may include any of turning on or off a mop tool, turning on or off a UV light tool, turning on or off a suction tool, turning on or off an automatic shutoff timer, increasing speed, decreasing speed, driving to a user-identified location, turning in a left or right direction, driving forward, driving backward, stopping movement, commencing one or a series of movement patterns, or any other preprogrammed action. In some embodiments, the user may create a movement path of a robotic device. For example, a user uses drawings tools of the user interface to draw the perimeter of a swimming pool. The application transmits the drawn perimeter of the swimming pool (e.g., an oval shape) to a processor of a robotic digger, with which the application is wirelessly connected. The processor of the robotic digger instructs the robotic digger to move in a boustrophedon pattern, moving back and forth along straight lines within the perimeter of the swimming pool while digging, similar to the boustrophedon pattern shown in FIG. 9. Further details of a graphical user interface that may be used with the methods and technique described herein are provided in U.S. patent application Ser. Nos. 15/272,752 and 15/949,708, the entire contents of which are hereby incorporated by reference.

While many of the computational acts herein are described as being performed by the processor of the robotic device, it should be emphasized that embodiments are also consistent with use cases in which some or all of these computations are offloaded to a base station computing device on a local area network with which the robot communicates via a wireless local area network or a remote data center accessed via such networks and the public internet.

Embodiments of the Quantum SLAM (simultaneous collaboration, localization, and mapping) techniques and methods described herein may be advantageous as they are light weight and are processed on an ARM Cortex M7 MCU, which may save computational power. Saving computational power may improve the efficiency of collaboration among autonomous robotic devices as sending large sets of data back and forth between robotic devices can be difficult. Further, some embodiments of Quantum SLAM use a phase space rather than a position space which may save processing power because of the light weight. Furthermore, the light weight aspect makes it possible to consider dynamics, in addition to kinematics.

In some embodiments, robotic devices described herein use rotating LIDAR sensors for distance measurement and implementation of SLAM. However, in some instances, LIDAR sensors are susceptible to losing calibration and generating deteriorated readings as LIDAR sensors are mechanical devices operated with a motor that wear over time. Further LIDAR sensors may be aesthetically unpleasing. In other instances, a camera may be used in perceiving an environment. However, images captured by cameras are lossy and represent a two-dimensional image of a three-dimensional environment, therefore depth information may be lost in the image if only the image is decoded to retrieve depth. There are many ways to compensate for this issue. In some cases, an additional utility may be used to facilitate inference of depth information from an image. In some embodiments, a combination of computer vision and laser technology may be used to calculate the distance to surrounding objects. In some embodiments the distance measurements described herein are captured using one or more distance measurement devices described below. For example, one method includes a laser diode emitting a line laser onto a surface of a boundary, such as a wall or obstacle, and using a camera to capture an image of the line laser projected onto the boundary. An indentation pattern appears in the image capturing the line laser, which an image processor uses to relate the two-dimensional image with the real environment. The image processor may use the indentation pattern to infer depth from the captured image. In some embodiments, wherein the laser diode is angled downwards, the laser line appears at a lower position in the image for surfaces closer to the laser diode than those further away, and the image processor may use this relation to infer depth. In other embodiments, the laser diode is angled upwards, and the laser line appears at a higher position in the image for surfaces closer to the laser diode than those further away. In some embodiments, the laser diode is not positioned at an angle, but the camera is positioned at an angle. The arrangement of the laser diode and camera may be built in a frame to create a depth camera or the laser diode and camera may be directly installed in a robotic device without a physical frame. In some embodiments, the emitted laser line captured in an image may be detected by the image processor by identifying pixels with high brightness, as the area on which the laser light is emitted has increased brightness. In such cases for example, the image processor may simply output a string of pixel intensity values for each captured image which may be compared to the string of pixel intensity values of the image capturing the laser line projected onto the boundary. However, since indentation appears differently from varying perspectives, rather than comparing pixel intensities directly, the rate of change of pixel values may be compared by the image processor. In another embodiment, entropy may be used by the image processor in detecting the laser lines forming the indentation pattern. Since areas of the image containing the laser line are brighter than surrounding areas, large changes in pixel intensity are expected between areas of the image containing the laser line and the remaining areas of the image. These large changes in intensity may be mathematically represented by entropy where high entropy signifies large changes in pixel intensity within a particular area. Entropy may be determined by the image processor using $$H(X) = -\sum_{i=1}^{n} P(x_i) \log P(x_i),$$

wherein $X=(x_1, x_2, \ldots, x_n)$ is a collection of possible pixel intensities, each pixel intensity represented by a digital number. $P(x_i)$ is the probability of a pixel having pixel intensity value $x_i$. $P(x_i)$ may be determined by, for example, counting the number of pixels within a specified area of interest with pixel intensity value $x_i$ and dividing that number by the total number of pixels within the area considered. In some instances, image entropy of captured images may be compared to the image entropy of the image capturing the laser line projected onto the boundary by the image processor in order to detect the boundary.

Figure 71A:
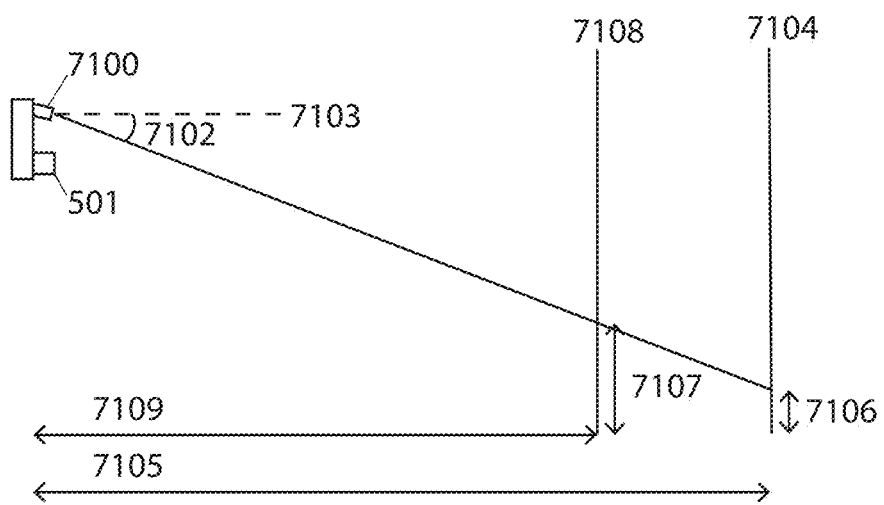
FIGS. 71A and 71B illustrate an example of a method for estimating distance using a line laser, imaging sensor, and imaging processor, according to some embodiments.
Figure 71B:
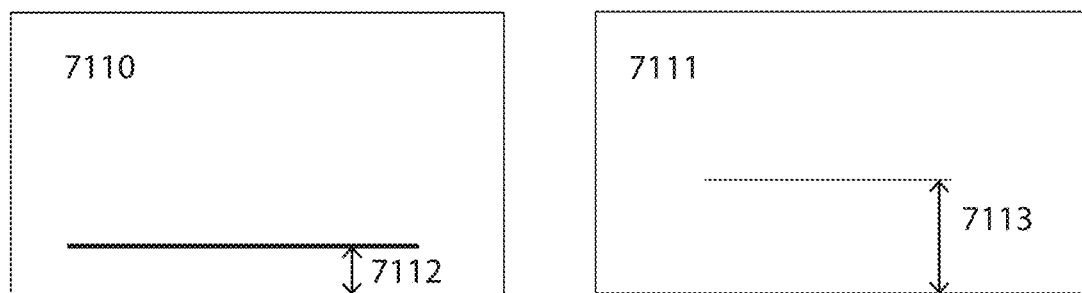

FIG. 71A demonstrates a side view of a distance estimation system comprising laser light emitter 7100, image sensor 7101 and image processor (not shown). Laser light emitter 7100 is positioned at downward angle 7102 relative to horizontal plane 7103 and projects a horizontal laser line onto object surface 7104 located a distance 7105 from the distance estimation system. The projected horizontal laser line appears at a height 7106 from the bottom surface. It can be seen that the projected horizontal line appears higher at height 7107 on object surface 7108, at a closer distance 7109 to laser light emitter 7100, as compared to object 7104 located a further distance away. Image sensor 7101 captures images of the projected laser line on object surfaces 7104 and 7108 and sends the images to the image processor. The laser line and its position may be extracted by the image processor using computer vision technology or any other type of technology known in the art. FIG. 71B demonstrates that in captured image 7110 of the projected horizontal laser line on object surface 7104 the position of the line appears lower than in captured image 7111 of the projected horizontal laser line on object surface 7108. The position of the projected laser line captured in the image may be quantified by the image processor by measuring the distance of the projected laser line from the bottom edge of the image, such as distances 7112 and 7113. The control system may compare the position of the laser line to figures in a table that relates laser line position with distances between the image sensor and projection surfaces to find an estimated distance between the image sensor and the projection surface at the time that the image was captured. FIG. 71B further illustrates that the projected horizontal laser line captured in image 7110 appears larger in size than the projected horizontal laser line captured in image 7111, as object surface 7104 is further away from laser light emitter 7100 than object surface 7108. The width, length or any other geometrical measure of the laser lines captured in images 7110 and 7111 may be correlated with distance to the object surface onto which the laser line is projected and therefore used to estimate distance of objects.

Since the laser line in the example described is captured with the camera and the camera is pixelated, the laser line is processed as a collection of bright points arranged in a line. However, the arrangement does not necessarily have to be a line. Any arrangement is acceptable as long as algorithm knows how to interpret the light points based on the physical configuration. A line is used as an example herein for simplicity. The points can be generated in a grid or any other geometrical arrangement, such as a triangle, square, or other geometrical shapes. Further, since the laser line in the example described is a collection of bright points, in some embodiments multiple points generated by two or more laser diodes may be used to generate the laser line or a geometrical shape.

Figure 72:
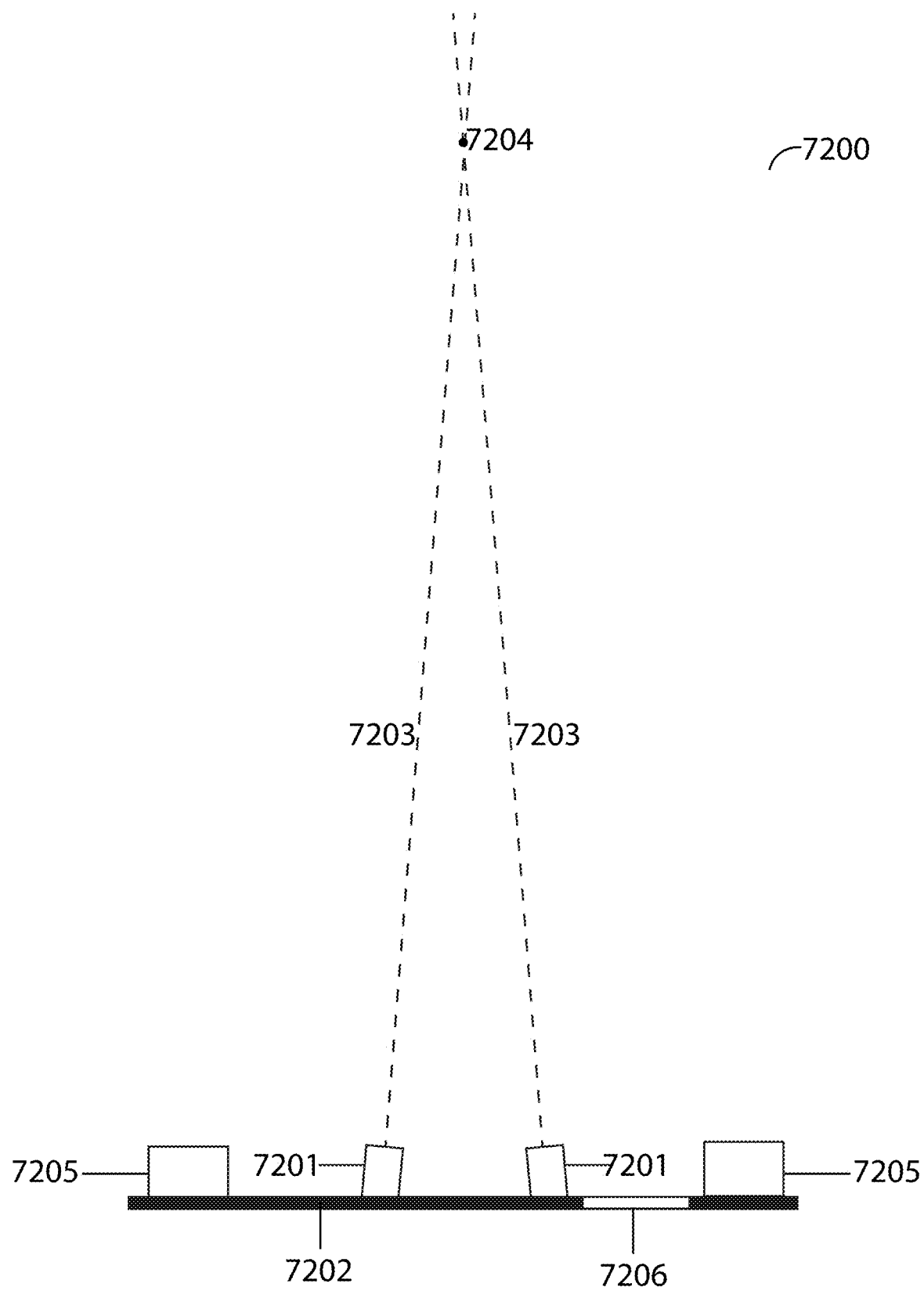
FIG. 72 illustrates an overhead view of an example of a distance estimation device, according to some embodiments.
Figure 73:
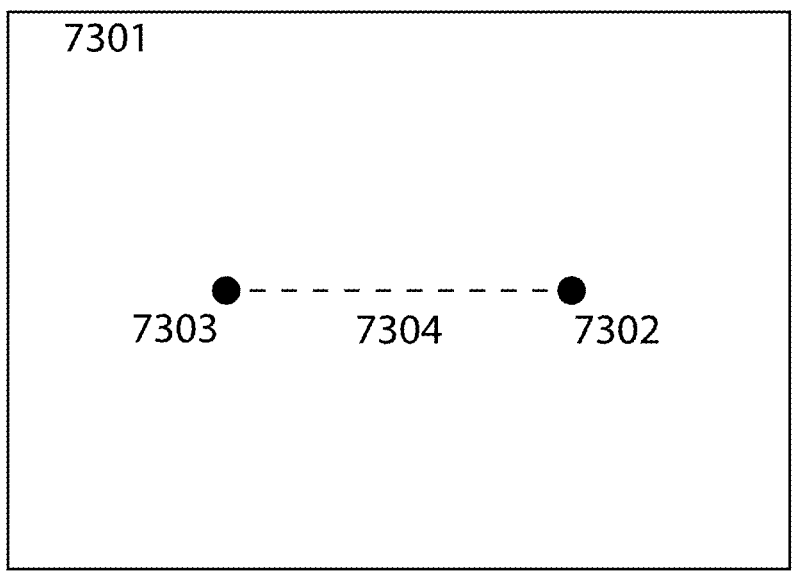
FIG. 73 illustrates an example of an image captured by an image sensor, according to some embodiments.

In some embodiments, two or more laser diodes are used to generate a geometrical pattern from which the image processor may infer depth. In some embodiments, a distance measurement system includes an image sensor and at least two laser diodes installed on a base in an advantageous configuration. In some embodiments, the image sensor captures an image of two light points projected onto a surface by the two laser diodes. The two light points form a line in the captured image when connected. In other embodiments, three or more laser diodes may emit light, forming a geometrical shape (e.g., a triangle, a quadrilateral, and so on). In some embodiments, the laser diodes may be positioned advantageously to have slight convergence or divergence with respect to one another such that the laser emissions coincide at a predetermined distance from the base. In some embodiments, the laser diodes may be positioned such that the emissions coincide at or before the maximum effective distance of the distance sensor, which is determined by the strength and type of laser diodes and the specifications of the image sensor used. In some embodiments, the laser diodes continuously project a laser light which appear as light points on objects or surfaces in front of the laser diodes and the image sensor captures an image of the projected light points within a predetermined field of view in front of the distance measurement system. Captured images are sent to an image processor, which uses computer vision technology to extract the vertices of the polygon projected. The image processor then measures the distance between the vertices in the captured image and, in some instances, calculates the area of the projected polygon. The distance between vertices or the surface area within vertices in the captured image may be used to extract depth of the surface on which the light is projected. For example, FIG. 72 illustrates an overhead view of distance estimation device 7200. Laser light emitters 7201 are disposed on baseplate 7202 and emit collimated laser light beams 7203, which converge at point 7204. Image sensors 7205 are located on either side of the laser light emitters. Image processor 7206 is located within baseplate 7202. In some embodiments, the maximum effective distance of the estimation device is at the point where the laser beams coincide. In other embodiments, using different wavelengths in each laser light emitter will allow the image processor to recognize the distances between the light points after the point of convergence as being further from the baseplate than the identical distances between the light points that will occur before the point of convergence. In distances beyond point 201, the laser beam from the right-most laser emitter will appear on the left side, and the laser beam from the left-most laser emitter will appear on the right side. Upon identifying the switch in locations of the laser beams, the image processor will determine that the extracted distance is occurring after the point of convergence. The one or more image sensors simultaneously and iteratively capture images at discrete time intervals. FIG. 73 illustrates an image 7300 captured by image sensor 7205 (in FIG. 72). Rectangle 7301 represents the field of view of image sensor 7205. Points 7302 and 7303 represent the light points projected by the laser light emitters 7201 (in FIG. 72). As the distance of the baseplate to projection surfaces increases, the light points 7302 and 7303 will appear closer and closer together until the distance between them is null, after which point the light points will diverge from each other. Thus, the distance 7304 between the two points may be analyzed to determine the distance to the projection surface at the time that an image is captured. The image 7300 is sent to the image processor, which extracts the distance 7304 between the two points (if any). The distance 7304 is then compared to figures in a preconfigured table that co-relates distances between light points in the system with distances between the baseplate and projection surfaces to find an estimate of the actual distance from the baseplate to the projection surface at the time the image of the laser light projections was captured. In other embodiments, the two or more laser diodes may generate other patterns such as a triangle, square, hexagon, or other pattern or shape.

Figure 74A:
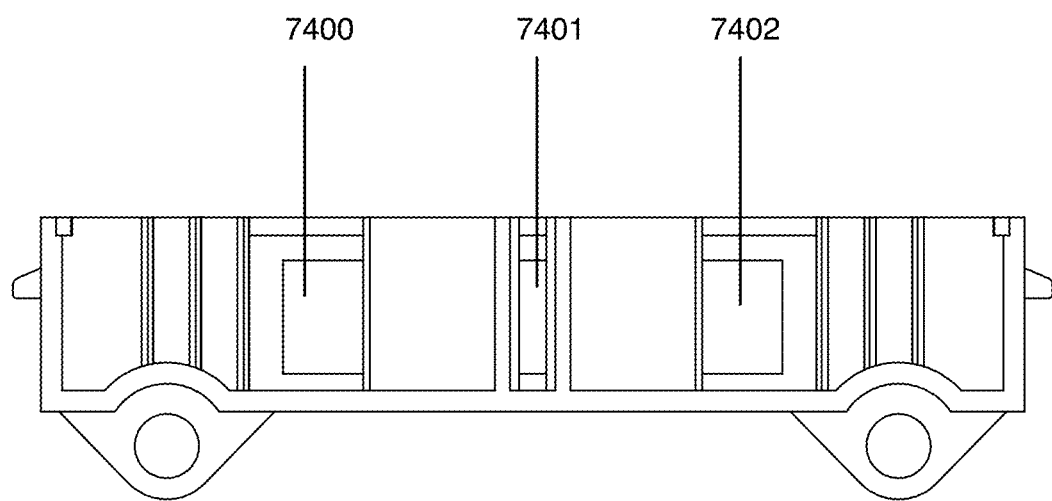
Figure 74B:
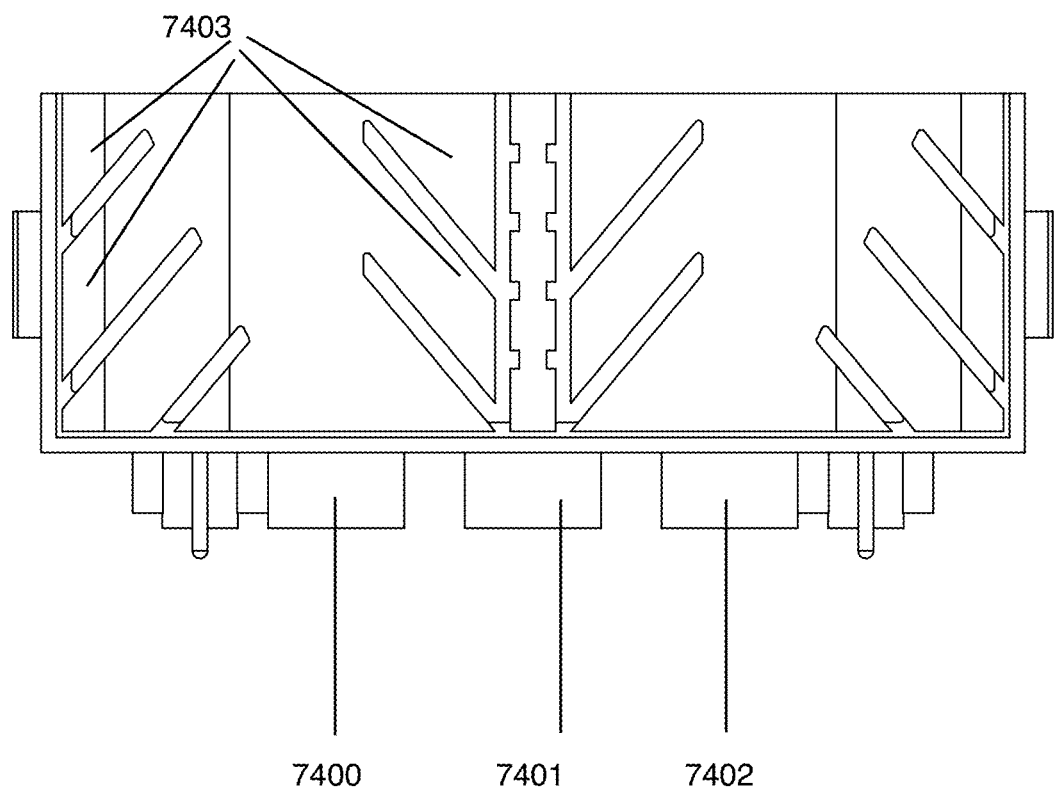
Figure 74C:
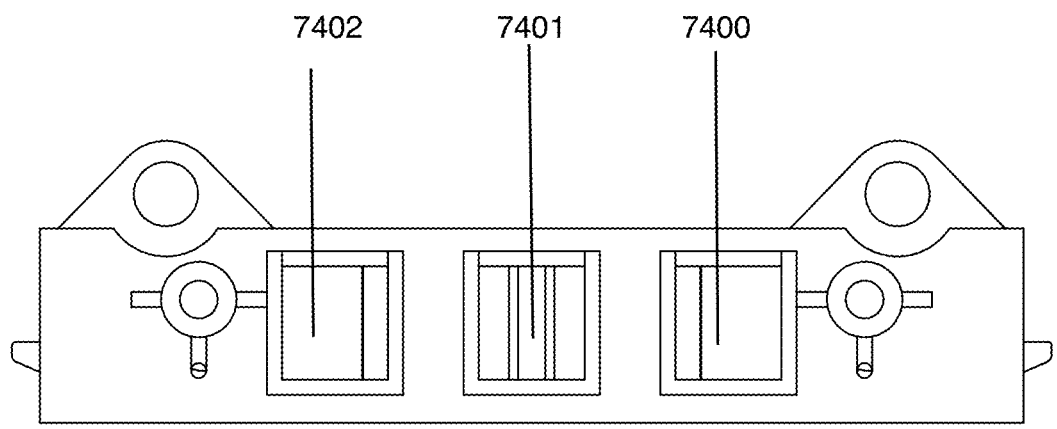
Figure 74D:
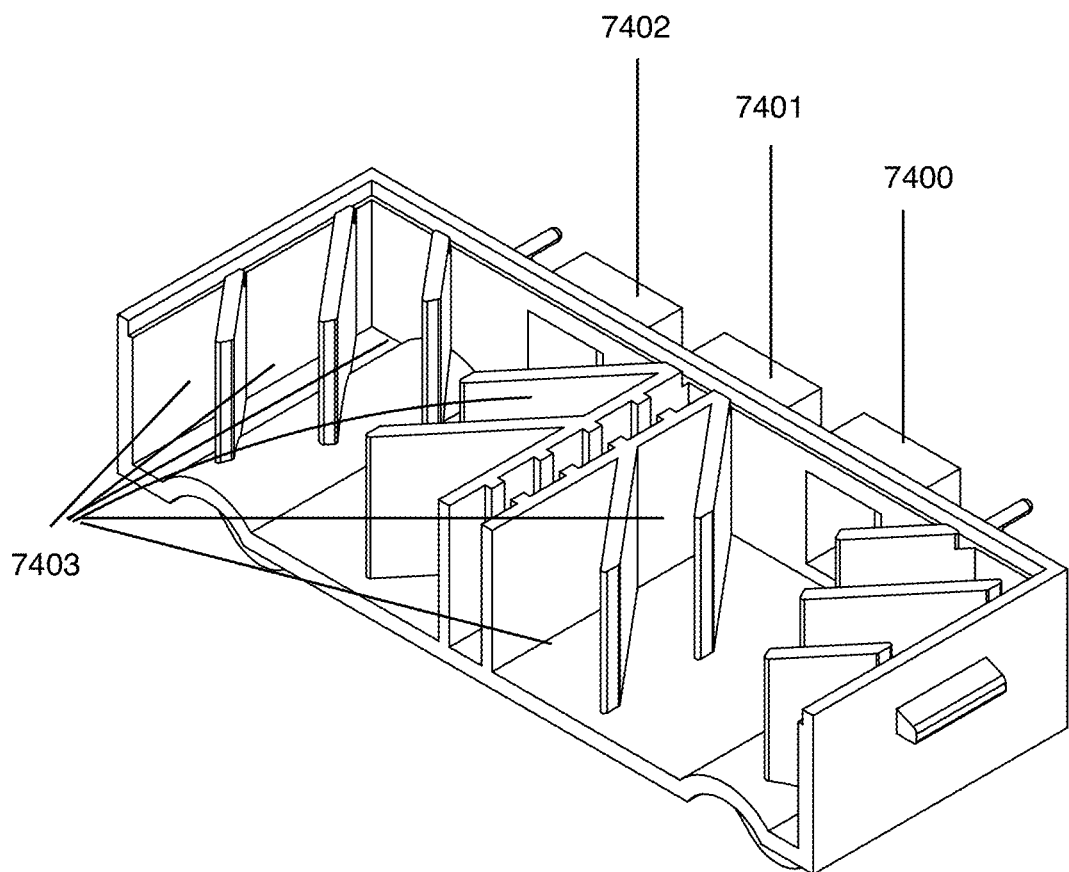
Figure 74E:
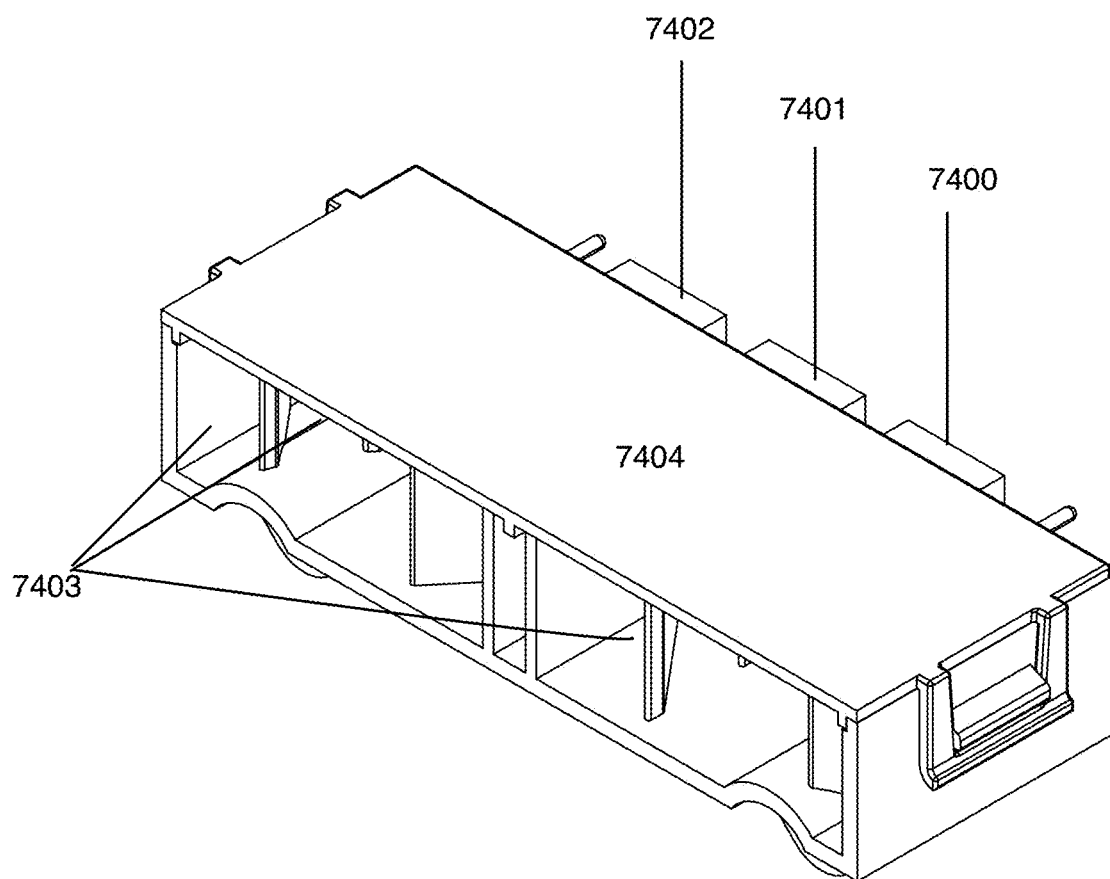
Figure 75A:
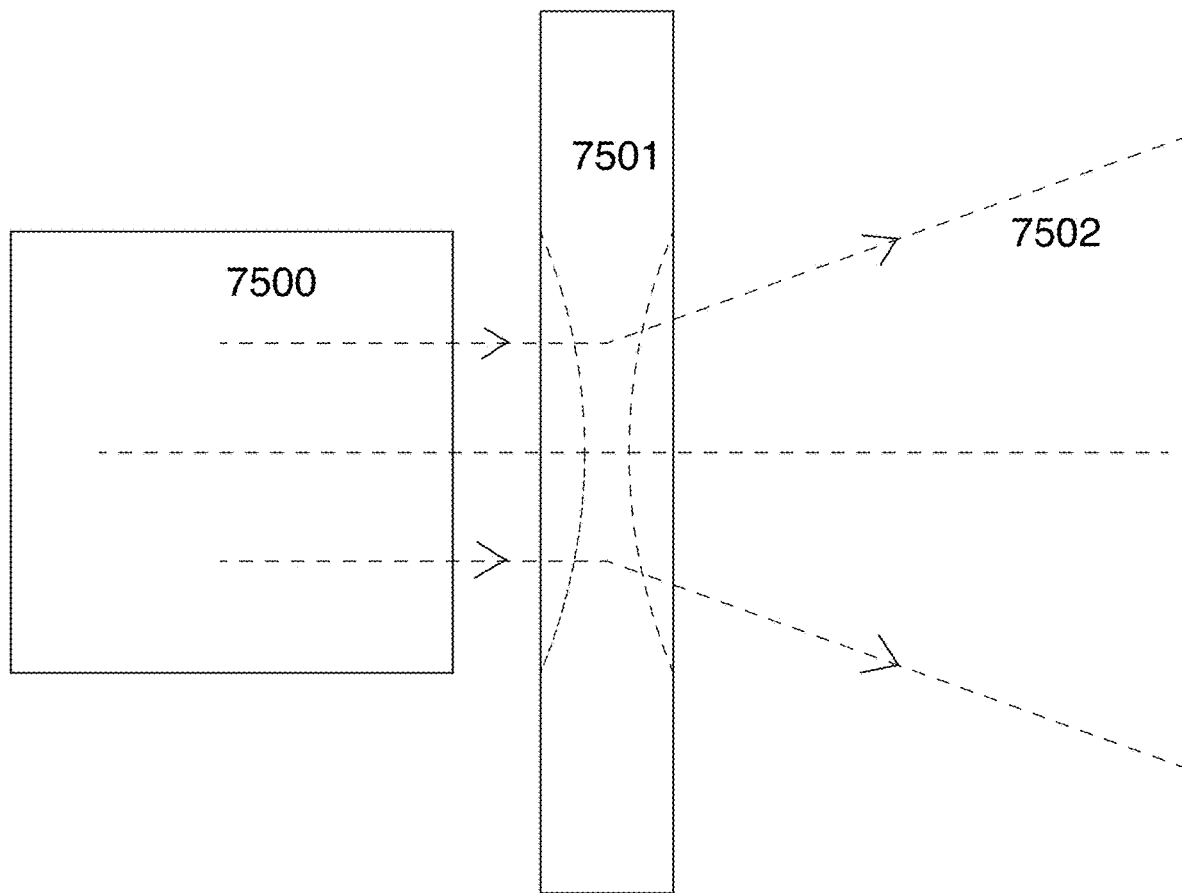
FIGS. 75A-75E illustrate examples of a lens used to converge and diverge light emitted by a light emitter, according to some embodiments.
Figure 75B:
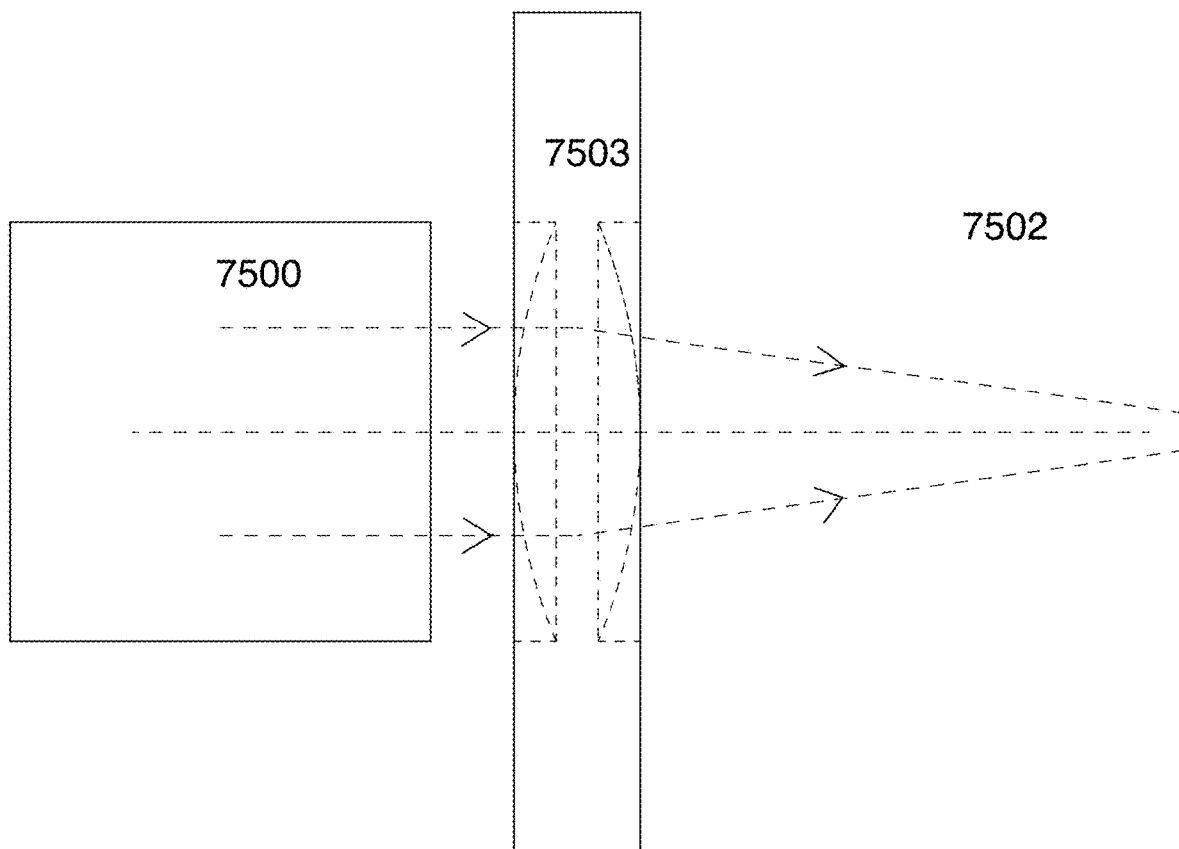
Figure 75C:
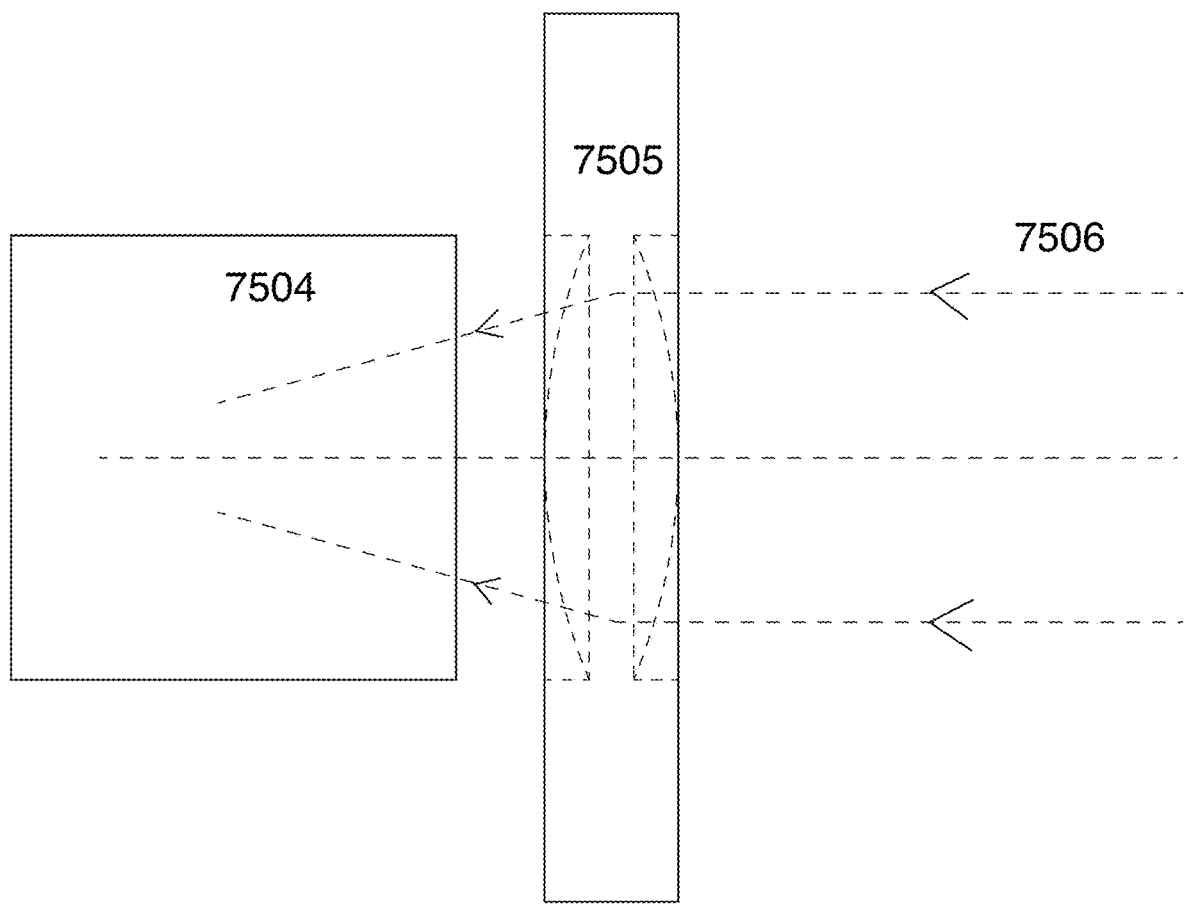
Figure 75D:
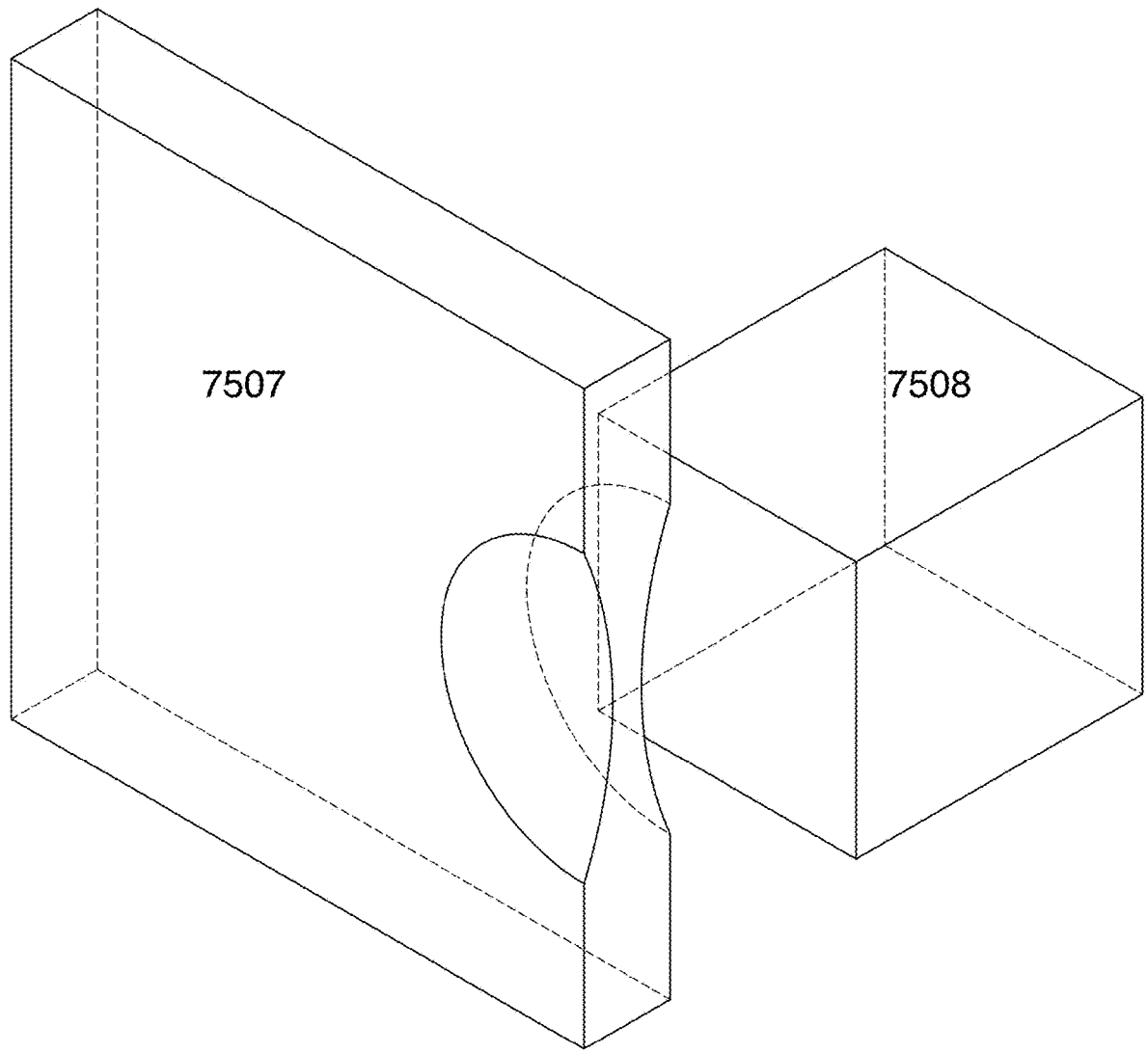
Figure 75E:
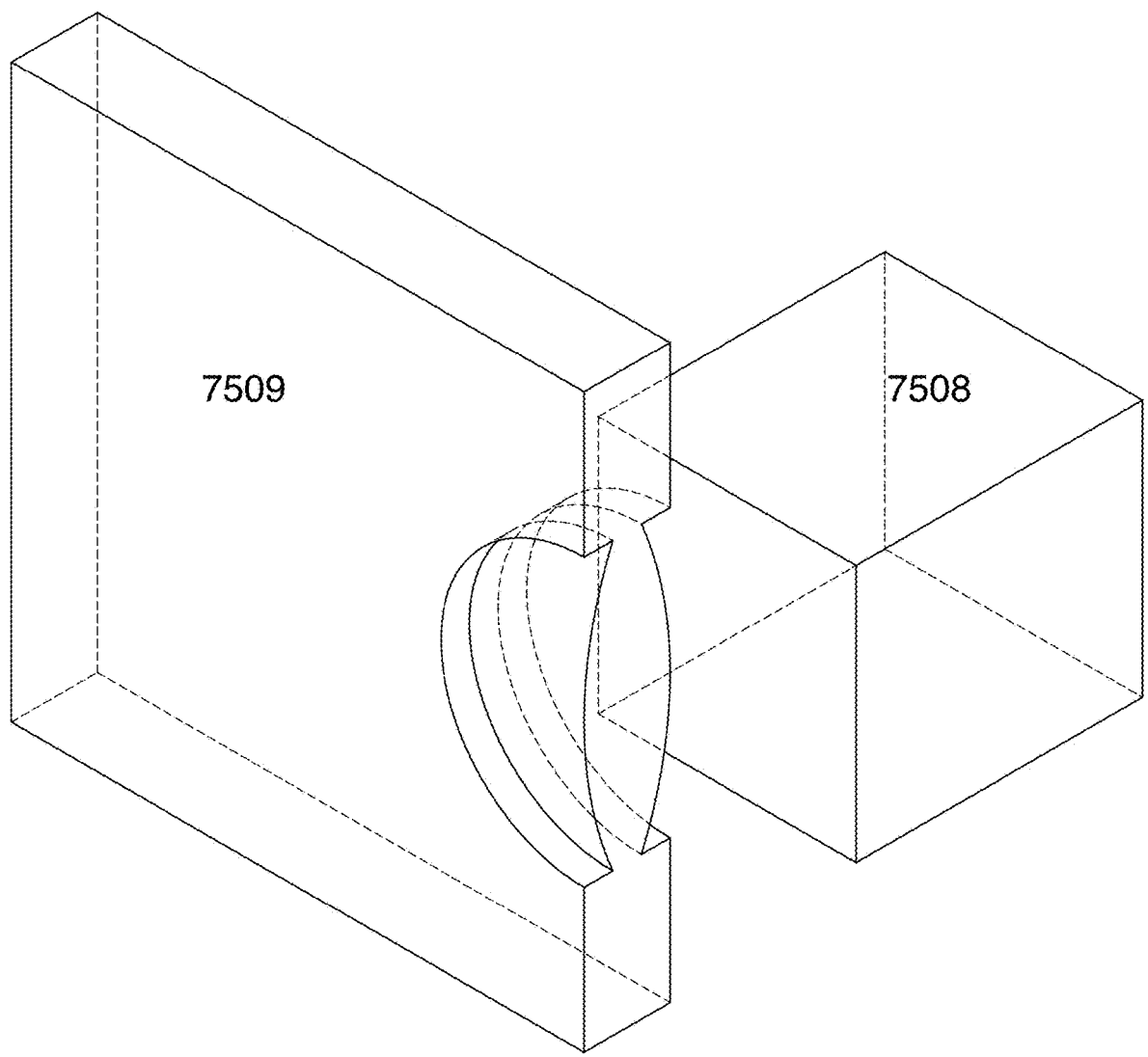

In some embodiments, a single laser diode with an optical lens arrangement may be used to generate two or more points. The arrangement of the lens may create a plurality of disconnected points instead of a line. The arrangement may control the distance and divergence or convergence of the points. In some embodiments, there may be a physical barrier with perforation arranged in front the lens or emitted laser line to create points. In some embodiments, mirrors may be used to generate two or more points. In some embodiments, the single light source may be used to generate an arrangement of points using a mechanical filter such as that shown in FIGS. 74A-74E. In some embodiments, multiple laser diodes are used to create light points. FIGS. 74A and 74C illustrate a front and rear view, respectively, of the mechanical filter with openings 7400, 7401, and 7402 through which light passes. FIGS. 74B and 74D illustrate a top plan and top perspective view of the mechanical filter with openings 7400, 7401, and 7402, and reflection absorbers 7403. FIG. 74E illustrates the constructed mechanical filter with top cover 7404. FIG. 74F illustrates the mechanical filter and light source 7405. Light beams 7406 are absorbed by reflection absorbers 7403, while light beams 7407 pass through openings 7400, 7401, and 7402 (light beam not shown for clarity of figure). The mechanical filter generates three light points from single light source 7405. The mechanical filter is designed such that light receiving angle is 52 degrees and light reflector walls are 40 degrees with respect to a vertical. In some embodiments, lenses are used to diverge or converge light emitted by a light emitter. For example, FIG. 75A illustrates a light emitter 7500 with diverging lens 7501, causing light 7502 to diverge. FIG. 75B illustrates a light emitter 7500 with converging lens 7503, causing light 7502 to converge. FIG. 75C illustrates a light receiver 7504 with converging lens 7505, causing light 7506 to converge. FIG. 75D illustrates a concave lens 7507 positioned on a sensor window of sensor 7508. FIG. 75E illustrates a convex lens 7509 positioned on a sensor window of sensor 7508.

Figure 76A:
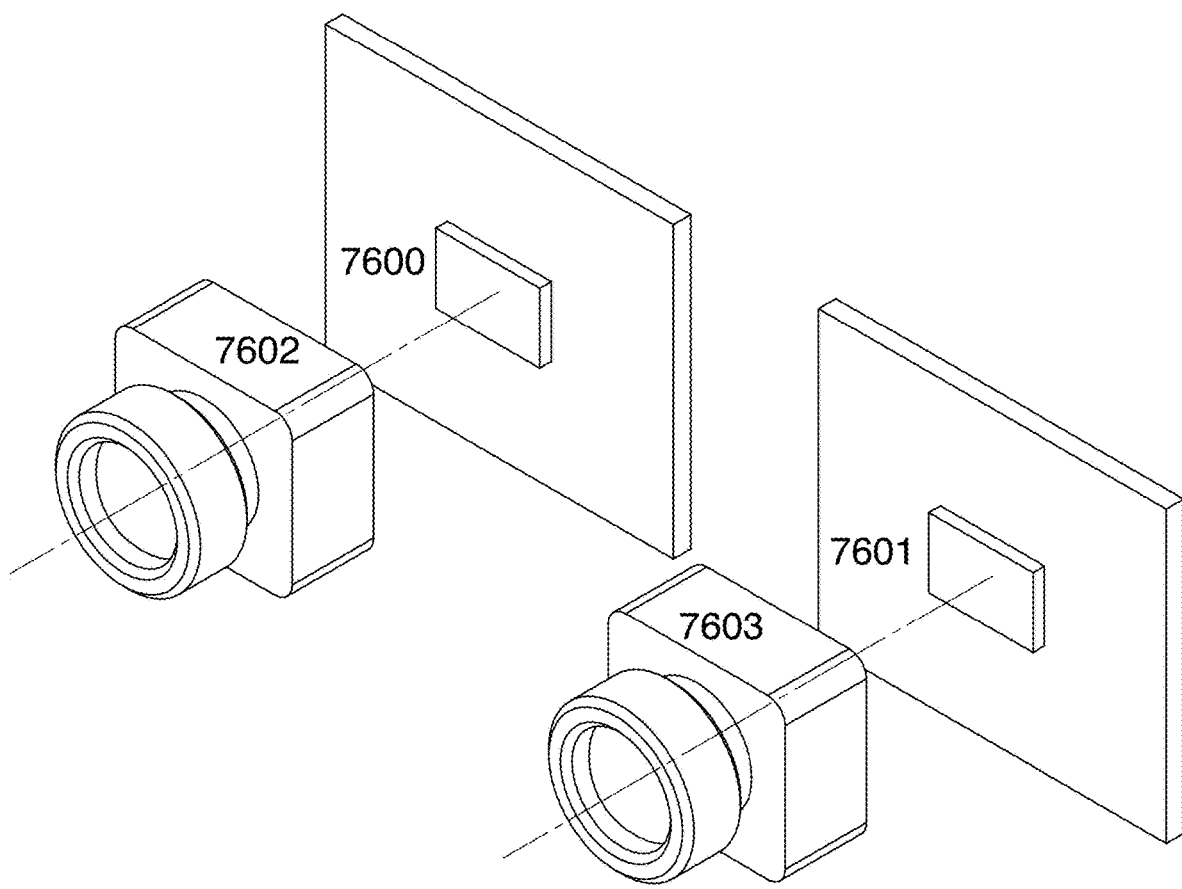
FIGS. 76A-76C illustrate examples of arrangements of image sensors and lenses, according to some embodiments.
Figure 76B:
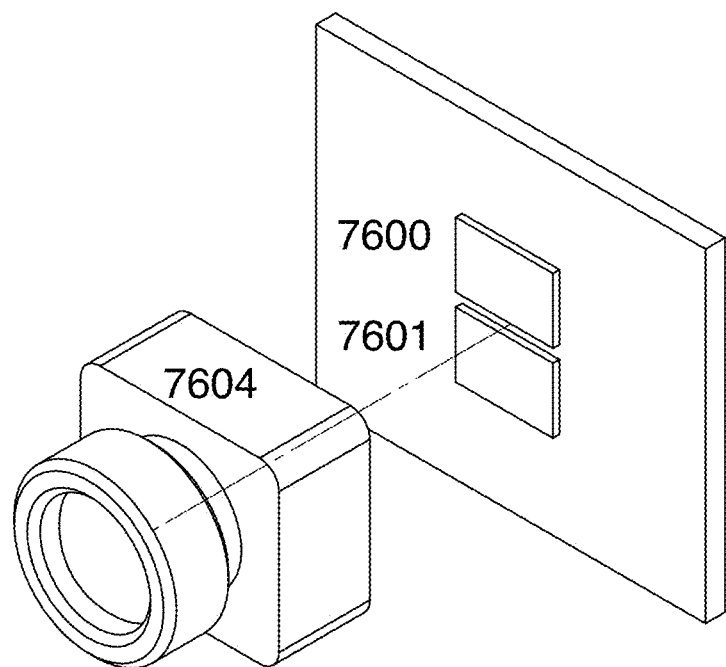
Figure 76C:
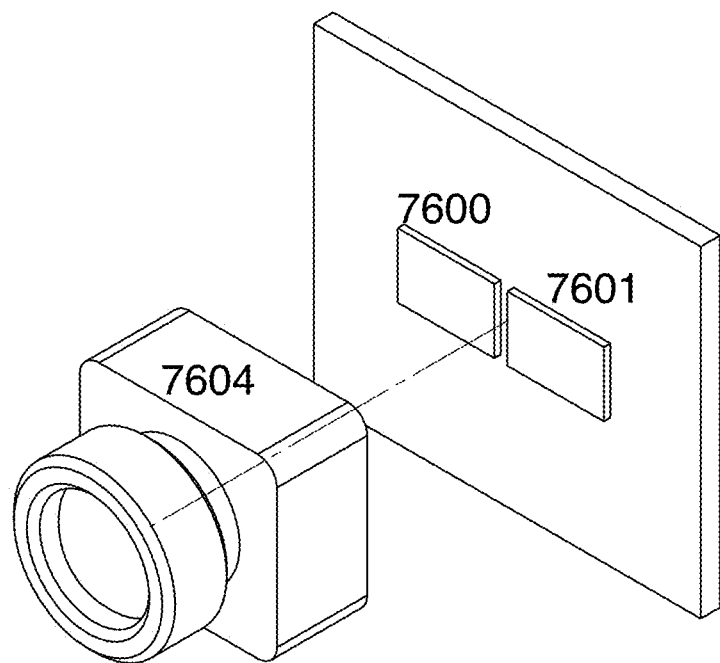

In some embodiments, a second image sensor is provided on the baseplate. In some embodiments, the second image sensor may be positioned behind the same lens or may have its own lens. For example, FIG. 76A illustrates two cameras 7600 and 7601 each behind their own respective lens 7602 and 7603, respectively. FIGS. 76B and 76C illustrate the two cameras 7600 and 7601 behind a single lens 7604. The process of iteratively capturing images of the two or more laser light points and analyzing the distance between light points (or the surface area within light points) is repeated with images captured by the second image sensor. The two image sensors (or more image sensors in other cases) are configured to capture images simultaneously such that the distance between the baseplate and projection surface is the same in the images captured by both image sensors. In some embodiments, the image sensor determines the mean of the distances between light points (or the mean surface area within light points) in the images of each image sensor and compares the value to figures in a preconfigured table that relates distances between light points with distances between the baseplate and projection surfaces to find an estimated distance between the baseplate and the projection surface at the time of the capture of the images. A second image sensor, therefore, serves to improve the accuracy of the estimation.

Figure 77A:
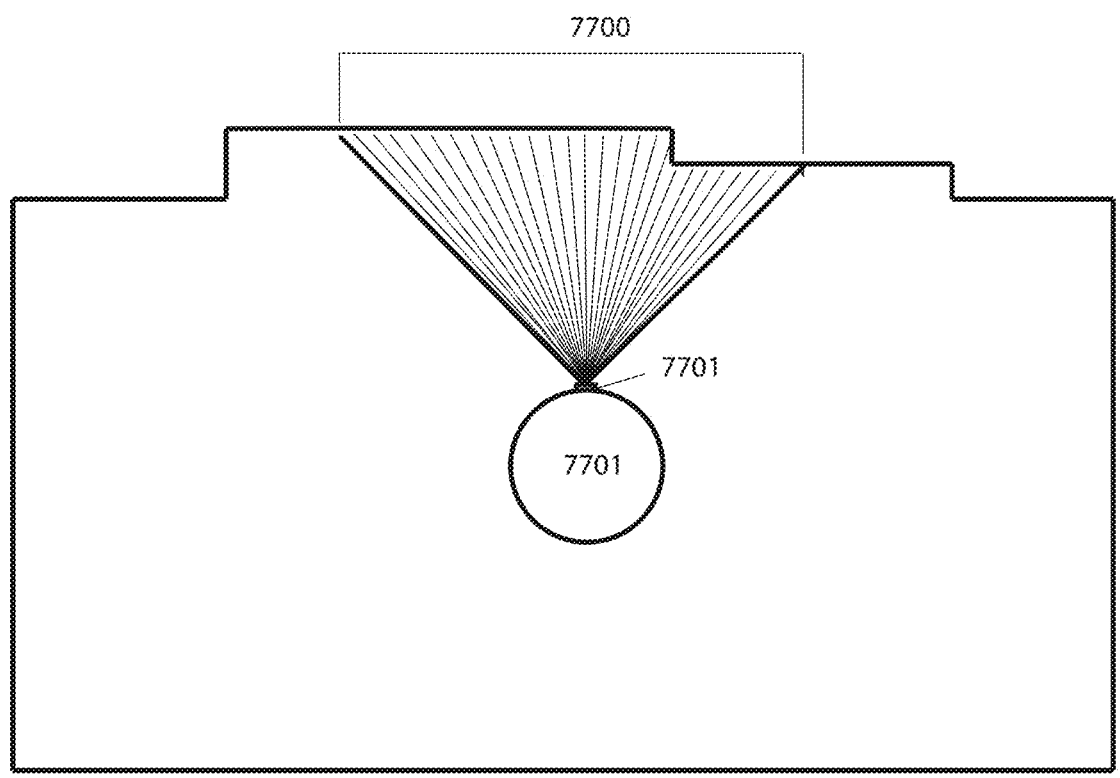
FIGS. 77A and 77B illustrate an expanded field of view using two image sensors, according to some embodiments.
Figure 77B:
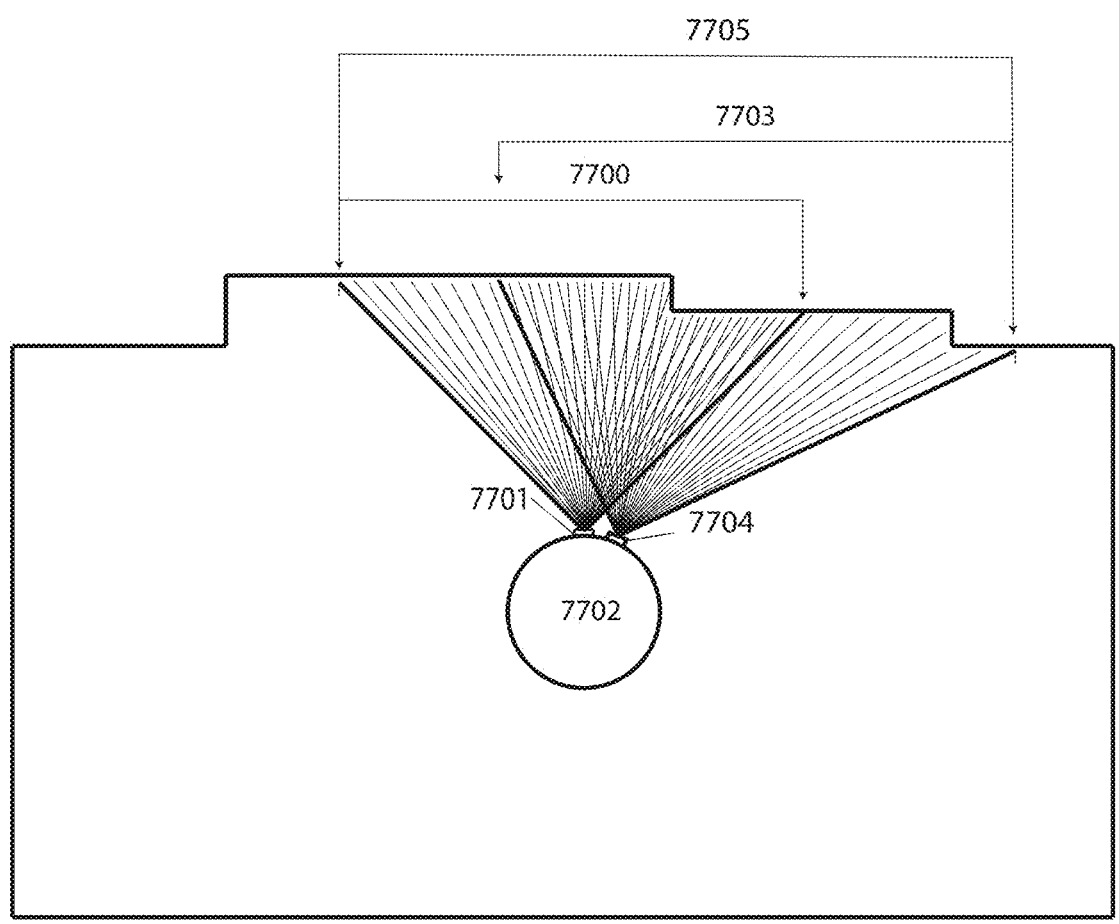

Depending on the arrangement and when done advantageously, in addition to providing accuracy, the second camera can increase the field of view of the distance readings. For example, the first camera may be a blind to a range of short distances when the projected light does not fall within the field of view (FOV) of the first camera, however, the projected light may be seen with the field of view of the second camera because of difference in the position between the two cameras. Also, when implemented advantageously, the FOV of the cameras may combined to provide double the FOV or provide less than double FOV with some overlap which serves for high accuracy. The arrangement of cameras (e.g., CMOS), image sensors, laser diodes, LEDs used in a distance measurement device do not have to be in any particular arrangement so long as the arrangement of each component and geometry of the arrangement of the components are known in the software estimating the distance. Based on knowing the physical arrangement of components, the software may estimate depth of objects as described above. In some embodiments, the movement of the camera may be used to increase the FOV. For example, FIG. 77A illustrates a FOV 7700 of a single image sensor 7701 of a robot 7702. FIG. 77B illustrates the FOV 7700 of image sensor 7701 and FOV 7703 of image sensor 7704, producing increased FOV 7705. An increased FOV may similarly be achieved by movement of the camera. In some embodiments, the camera or a separate software increases the FOV.

Another technique for associating an external measurement with an image includes taking a measurement for a single point with a single point range finder such as Flight-Sense from STMicro and using the measurement of the single point to extrapolate the measurement to the whole FOV of the image. In some embodiments, a sensor such as VL6180 or VL 53 from ST Micro is used to capture one measurement to a point in the FOV of the camera and the measurement is extrapolated based on the image processing techniques described to infer depth measurements to all obstacles in the FOV. For example, in some embodiments, two laser rangefinders, a camera, and an image processing unit are disposed on a main housing. In some embodiments, the camera and two laser rangefinders are positioned such that the laser rangefinders analyze predetermined lines of sight within the camera's image frame. In some embodiments, the laser rangefinders measure the distance to the first encountered obstacle in their respective lines of sight. Each line of sight intersects with an obstacle at an arbitrary point, which shall be referred to herein as the first and second points. In some embodiments, the camera captures an image of the area. In a next step, the image processing unit calculates the color depths at the first and second points. In a next step, the image processing unit calculates the color depth of the pixels that form a straight line between the first and second points (referred to herein as the Connecting Line) and compares the color depth of these pixels with the color depths of the first and second points. In some embodiments, if the color depth of all the pixels in the Connecting Line is consistent with (or within a preset range of) the color depths of the first and second points, the system determines that the distances of all the pixels in that region are within a threshold from the distances measured by the laser rangefinder at the first and second points. In some embodiments, when the color depth of the Connecting Line is within a preset range of the color depths of the first and second points, the system determines that the surface or obstacle being analyzed is a substantially flat surface. Further description of this method is provided in U.S. patent application Ser. Nos. 15/447,122 and 16/393,921, the entire contents of which are hereby incorporated by reference.

Figure 78:
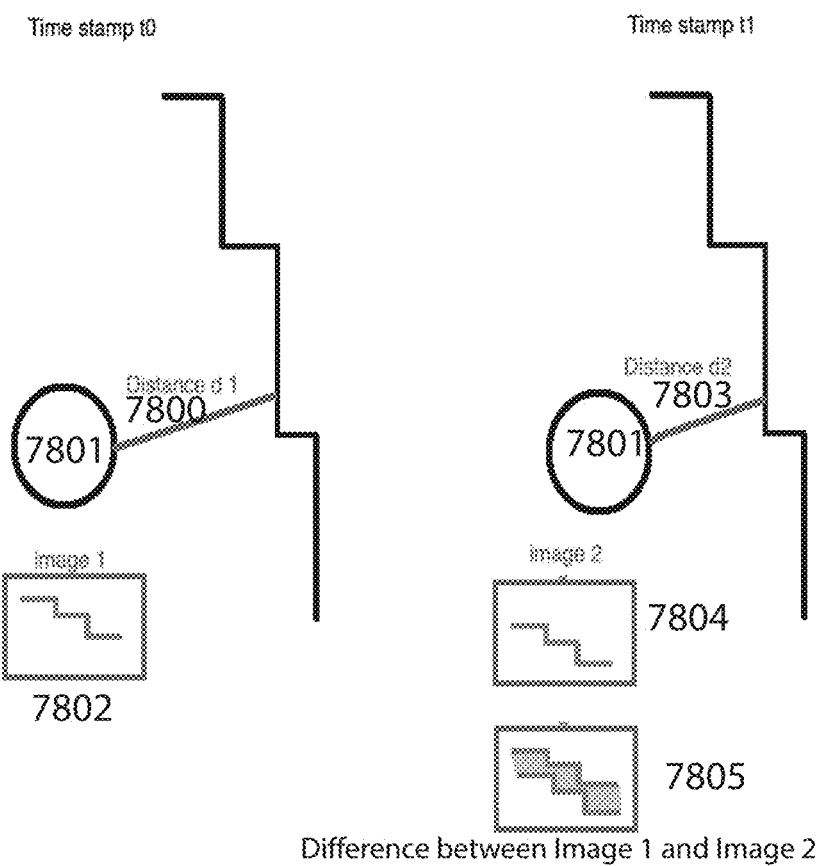
FIG. 78 illustrates a difference between two images captured from two different positions of a sensor, according to some embodiments.
Figure 79:
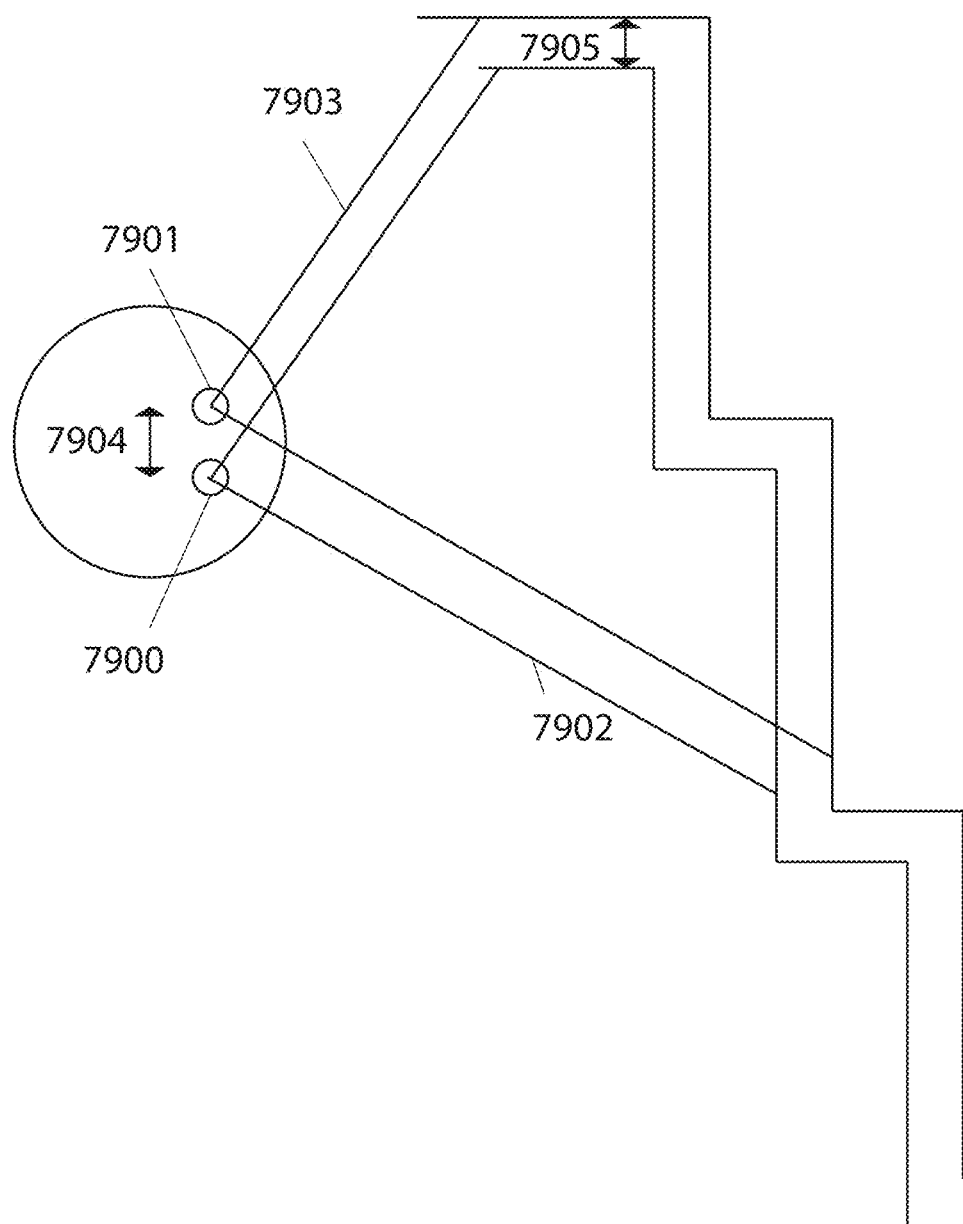
FIG. 79 illustrates a difference between two images captured from two different sensors positioned a distance apart, according to some embodiments.

In some embodiments accuracy of depth measurement is increased when the robotic device moves from a first location to a second location causing a second reading of a time-of-flight (TOF) camera or distance measurement device to provide a second reading which is different from the first reading at the first location. Due to the movement of the robotic device the distances to obstacles and perimeters of the environment changes, and hence the two readings differ. Concurrently, a second image is captured with slight difference with the first image. In some embodiments, the processor compares the difference in the two images, with the differentiations between the TOF readings of both images providing the changed position of the robotic device within the environment. For example, FIG. 78 illustrates a measured distance 7800 by a sensor of robot 7801 and resulting image 7802 in a first position and a second measured distance 7803 measured by the same sensor of robot 7801 and resulting image 7804 after moving to a second position. Image 7802 from the first position and image 7804 from the second position can be used to determine a difference between the two positions 7805. FIG. 78 may also be represented in a space-time coordinate system, wherein there is no difference in the time the images were captured, the two images taken simultaneously with the cameras being a distance apart from one another. This is shown in FIG. 79, wherein camera 7900 in a first position and camera 7901 in a second position on a robot each capture an image in respective fields of view 7902 and 7903. Because of distance 7904 between cameras 7900 and 7901, the same difference 7905 between the two images as that shown in 7805 of FIG. 78 is found. In some embodiments, this may be similar to a stereo vision apparatus. Using exteroceptive sensors, such as VL6180 or VL 53 from ST Micro, are not the only option for accomplishing the distance measuring methods described. A person of the art may identify equivalent sensors, whether they be light based, sonar based, radio based, or optical based, for example, that can provide similar effect. Any sensor, exteroceptive or proprioceptive, capable of providing the difference in position when the first image and the second image are taken, as illustrated above, may be used to accomplish the same technique. In embodiments, proprioceptive sensors (e.g., optical encoders, gyroscopes, etc.) measure values internal to the robotic device (e.g. battery level, wheel position, etc.) and exteroceptive sensors (e.g., sonar sensors, distance sensors, IR sensors, etc.) observe the environment. For example, in some embodiments, proprioceptive sensors may be used in determining the displacement of the robotic device using methods described in U.S. patent application Ser. Nos. 15/425,130, 15/955,480, and 15/955,344, the entire contents of which are hereby incorporated by reference. For example, at least two optoelectronic sensors and a light emitting diode (LED) are positioned on the underside of the robotic device such that they face the surface upon which the device drives. The at least two optoelectronic sensors may be positioned at some distance from one another on the underside of the robotic device. The LED illuminates the surface upon which the robotic device drives and the optoelectronic sensors capture images of the driving surface as the robotic device moves through the environment. The images captured are sent to the processor and a technique such as, digital image correlation (DIC), may be used to determine the linear movement of each of the optoelectronic sensors in the x and y directions. Each optoelectronic sensor has an initial starting location that can be identified with a pair of x and y coordinates and using a technique such as DIC, a second location of each optoelectronic sensor can be identified by a second pair of x and y coordinates. In some embodiments, the processor detects patterns in images and is able to determine by how much the patterns have moved from one image to another, thereby providing the movement of each optoelectronic sensor in the x and y directions over a time from a first image being captured to a second image being captured. To detect these patterns and movement of each sensor in the x and y directions the processor mathematically processes these images using a technique such as cross correlation to calculate how much each successive image is offset from the previous one. In some embodiments, finding the maximum of the correlation array between pixel intensities of two images may be used to determine the translational shift in the x-y plane or in the case of a robotic device, its driving surface plane. Cross correlation may be defined in various ways. For example, two-dimensional discrete cross correlation $r_{ij}$ can be determined using $$r_{ij} = \frac{\sum_k \sum_l [s(k+i, l+j) - \bar{s}][q(k, l) - \bar{q}]}{\sqrt{\sum_k \sum_l [s(k, l) - \bar{s}]^2 \sum_k \sum_l [q(k, l) - \bar{q}]^2}},$$

wherein s(k, l) is the pixel intensity at a point (k, l) in a first image and q(k, l) is the pixel intensity of a corresponding point in the translated image. $\bar{s}$ and $\bar{q}$ are the mean values of respective pixel intensity matrices s and q. The coordinates of the maximum $r_{ij}$ gives the pixel integer shift $$(\Delta x, \Delta y) = \underset{(i,j)}{\mathrm{argmax}}\{r\}.$$

Given the movement of each optoelectronic sensor in the x and y directions, the linear and rotational movement of the robotic device may be known.

In some embodiments, distance or depth or other readings are processed and combined with one another at overlapping points using similar processing and combination methods described above, including methods for aligning readings, detecting overlap, and calculating new readings for readings within the area of overlap. Further, distance or depth or other readings are filtered to remove outliers using methods described above as well. Outliers caused by a situational factor are also removed, such as readings caused by light reflection from a specific angle. In some embodiments, outlier readings do not repeat in consequent readings within the overlapping areas.

Figure 80A:
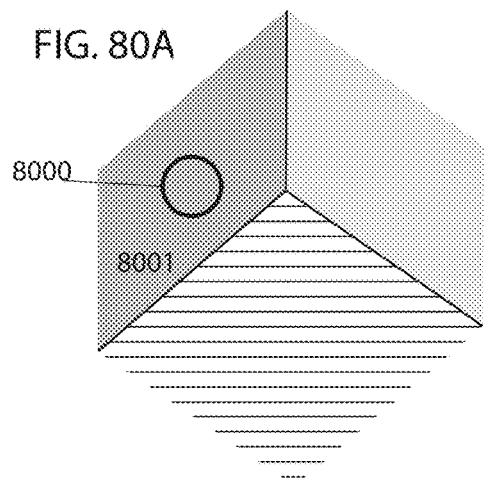
FIGS. 80A-80F illustrate an embodiment of a camera detecting a corner, according to some embodiments.
Figure 80B:
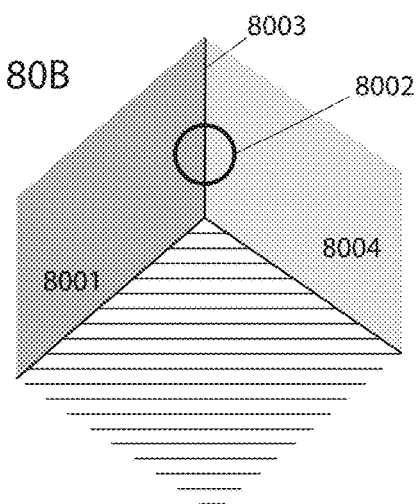
Figure 80C:
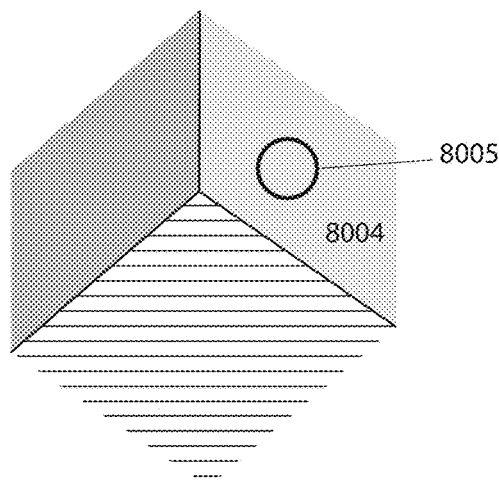
Figure 80D:
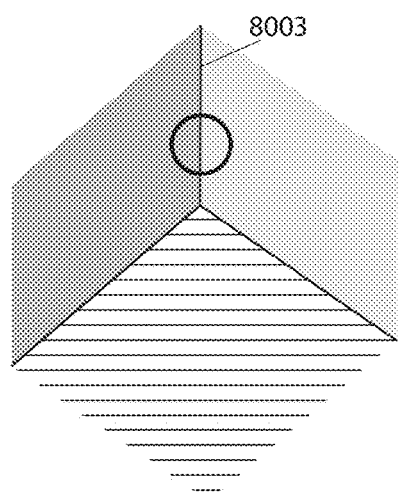
Figure 80E:
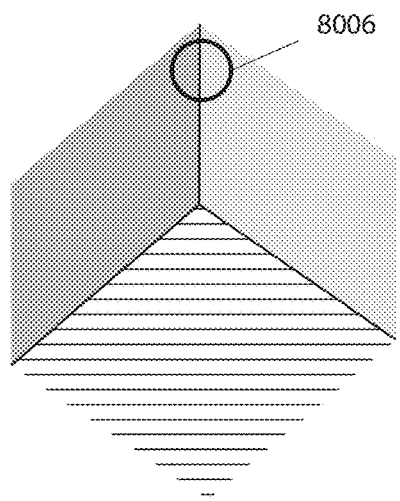
Figure 80F:
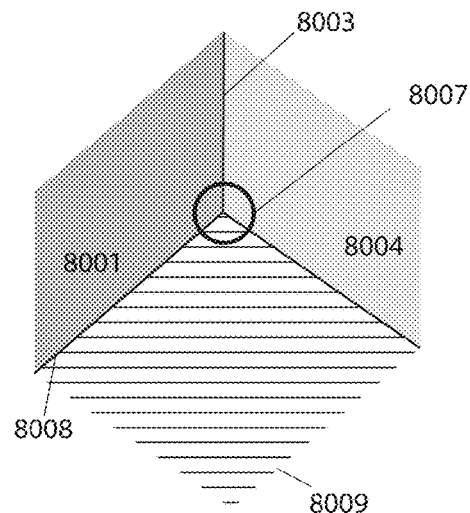

In some embodiments, the cameras can be used to process additional information. In embodiments, the camera or image sensor used may provide additional information in addition to being used in the process of estimating distance to objects. For example, pixel intensity and color depth may be used to detect an edge or corner of a wall or flatness of a surface using methods such as those described in Ser. No. 15/954,410 and 16/393,921, the entire contents of which are hereby incorporated by reference. In embodiments, the camera or image sensor used may provide additional features in addition to being used in the process of estimating distance to objects. For example, pixel intensity used in inferring distance may also be used for detecting corners as changes in intensity are usually observable at corners. FIG. 80 illustrates an example of how a corner may be detected by a camera. The process begins with the camera considering area 8000 on wall 8001 and observing the changes in color intensity as shown in FIG. 80A. After observing insignificant changes in color intensity, the camera moves on and considers area 8002 with edge 8003 joining walls 8001 and 8004 and observes large changes in color intensity along edge 8003 as illustrated in FIG. 80B. In FIG. 80C the camera moves to the right to consider another area 8005 on wall 8004 and observes no changes in color intensity. In FIG. 80D it returns back to edge 8003 then moves upward to consider area 8006 as shown in FIG. 80E and observes changes in color intensity along edge 8003. Finally, in FIG. 80F the camera moves down to consider area 8007 with edges 8003 and 8008 joining walls 8001 and 8004 and floor 8009. Changes in color intensity are observed along edge 8003 and along edge 8007. Upon discovering changes in color intensity in two directions by a processor of the camera, a corner is identified. In other instances, changes in pixel intensities may be identified by a processor of a robotic device or an image processor to which the camera is coupled or other similar processing devices. These large changes in intensity may be mathematically represented by entropy where high entropy signifies large changes in pixel intensity within a particular area. The processor may determine the entropy using $$H(X) = -\sum_{i=1}^{n} P(x_i) \log P(x_i),$$

wherein $X = (x_1, x_2, \ldots, x_n)$ is a collection of possible pixel intensities, each pixel intensity represented by a digital number. $P(x_i)$ is the probability of a pixel having pixel intensity value $x_i$. $P(x_i)$ may be determined by counting the number of pixels within a specified area of interest with pixel intensity value $x_i$ and dividing that number by the total number of pixels within the area considered. If there are no changes or very small changes in pixel intensity in an area then H(X) will be very close to a value of zero. Alternatively, the pixel values of one reading (such as those with 90 numbers) may be mapped to a continuous function and the derivative of that function considered to find areas with large changes in pixel values. With the derivative being the slope, a derivative of zero would be indicative of no change in pixel value while a derivative approaching 1 would be indicative of a large change in pixel values. In some embodiments depth from de-focus technique may be used to estimate the depths of objects captured in images.

Figure 81A:
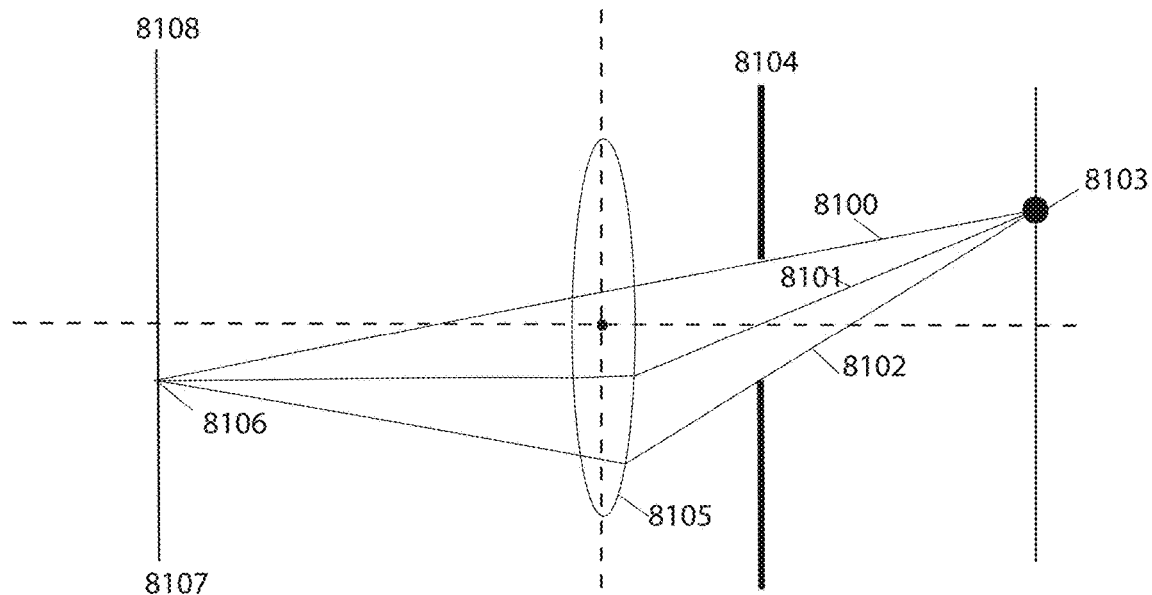
FIGS. 81A and 81B illustrate an embodiment of measured depth using de-focus technique, according to some embodiments.
Figure 81B:
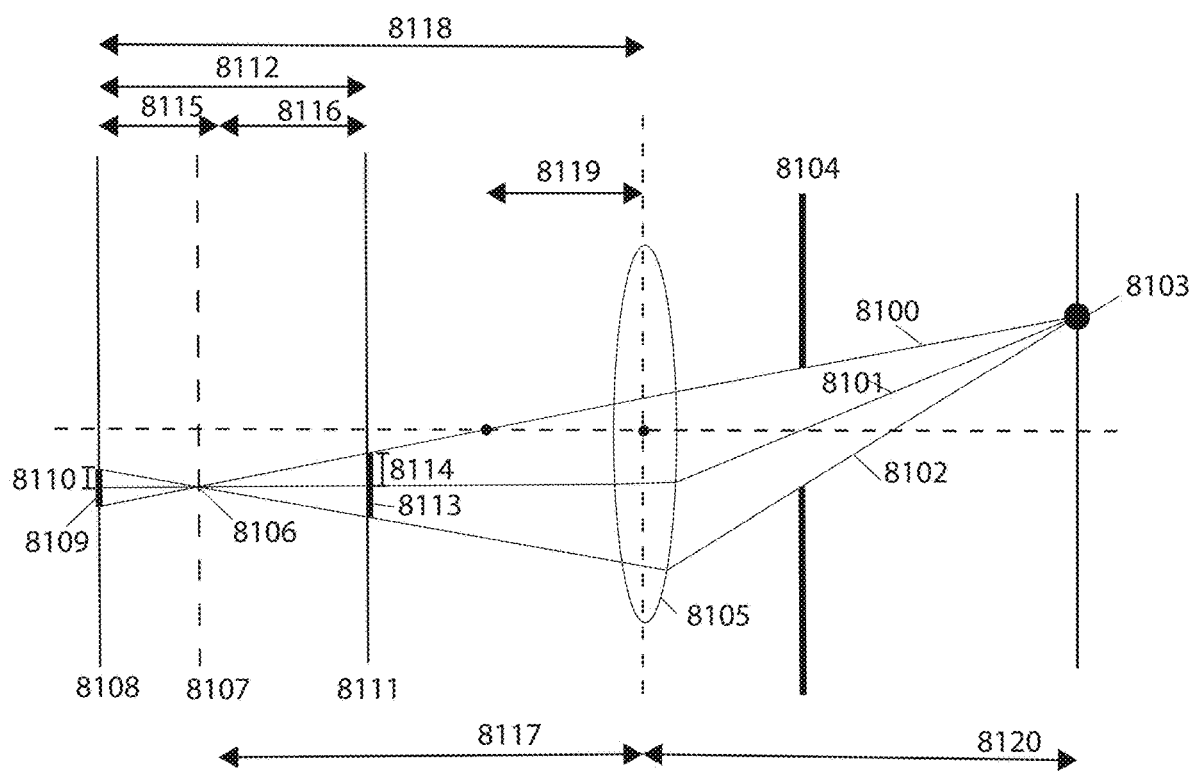

FIG. 81 illustrates an embodiment using this technique. In FIG. 81A, light rays 8100, 8101, and 8102 are radiated by object point 8103. As light rays 8100, 8101 and 8102 pass aperture 8104, they are refracted by lens 8105 and converge at point 8106 on image plane 8107. Since image sensor plane 8108 coincides with image plane 8107, a clear focused image is formed on image plane 8107 as each point on the object is clearly projected onto image plane 8107. However, if image sensor plane 8108 does not coincide with image plane 8107 as is shown in FIG. 81B, the radiated energy from object point 8103 is not concentrated at a single point, as is shown at point 8106 in FIG. 81A, but is rather distributed over area 8109 thereby creating a blur of object point 8103 with radius 8110 on displaced image sensor plane 8108. In embodiments, two de-focused image sensors may use the generated blur to estimate depth of an object, known as depth from de-focus technique. For example, with two image sensor planes 8108 and 8111 separated by known physical distance 8112 and with blurred areas 8109 having radii 8110 and 8113 having radii 8114, distances 8115 and 8116 from image sensor planes 8108 and 8111, respectively, to image plane 8107 may be determined using $$R_1 = \frac{L\delta_1}{2v}, R_2 = \frac{L\delta_2}{2v},$$

and $\beta=\delta_1+\delta_2$, wherein $R_1$ and $R_2$ are blur radii 8110 and 8114 determined from formed images on sensor planes 8108 and 8111, respectively. $\delta_1$ and $\delta_2$ are distances 8115 and 8116 from image sensor planes 8108 and 8111, respectively, to image plane 8107. L is the known diameter of aperture 8104, v is distance 8117 from lens 8105 to image plane 8107 and $\beta$ is known physical distance 8112 separating image sensor planes 8108 and 8111. Since the value of v is the same in both radii equations ($R_1$ and $R_2$), the two equations may be rearranged and equated and using $\beta=\delta_1+\delta_2$, both $\delta_1$ and $\delta_2$ may be determined. Given y, known distance 8118 from image sensor plane 8108 to lens 8105, v may be determined using v=$\gamma$−$\delta_1$. For a thin lens, v may be related to $f$, focal length 8119 of lens 8105 and u, distance 8120 from lens 8105 to object point 8103 using $$\frac{1}{f} = \frac{1}{v} + \frac{1}{u}.$$

Given that $f$ and v are known, the depth of the object u may be determined.

Further descriptions of other depth measurement devices are described in U.S. patent application Ser. Nos. 15/243,783, 15/954,335, 15/954,410, 15/257,798, 15/674,310, 15/224,442, and 15/683,255, the entire contents of which are hereby incorporated by reference. In embodiments, all or some of the tasks of the image processor of the different variations of distance estimation systems described herein may be performed by the processor of the robotic device or any other processor coupled to the imaging sensor.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or"

is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described or illustrated in figures with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

The invention claimed is:
1. A first wheeled device, comprising:
a chassis;
a set of wheels coupled to the chassis;
one or more electric motors to rotate the set of wheels;
a wireless card for wirelessly connecting to internet;
a plurality of sensors;
a processor electronically coupled to the plurality of sensors; and
a tangible, non-transitory, machine readable medium storing instructions that when executed by the processor of the first wheeled device effectuates operations comprising:
  capturing, with at least one exteroceptive sensor disposed on the first wheeled device, sensor readings of an environment of the first wheeled device;
  obtaining, with the processor of the first wheeled device, the sensor readings;
  finding, with the processor of the first wheeled device, a position of the first wheeled device within a map of the environment based on at least some of the sensor readings;
  capturing, with a debris sensor disposed on the first wheeled device, debris data;
  associating, with the processor of the first wheeled device, a location with each debris data, the location comprising a location of the first wheeled device when the respective debris data was captured;
  inferring, with the processor of the first wheeled device, debris accumulation in locations within the environment;
  marking, with the processor of the first wheeled device, the debris accumulation of the locations within the map, wherein an application of a communication device paired with the first wheeled device is configured to display the debris accumulation within the map;
  generating, with the processor of the first wheeled device, a new map of the environment when the processor is unable to load the previously generated map or when the processor cannot find the position of the first wheeled device within the previously generated map; and
wherein:
  the map is previously generated with the processor of the first wheeled device during a previous work session or with a processor of a second wheeled device configured to collaborate with the first wheeled device;
  the second wheeled device comprises:
    a chassis;
    a set of wheels coupled to the chassis;
    one or more electric motors to rotate the set of wheels;
    a wireless card for wirelessly connecting to internet;
    a plurality of sensors;
    a processor electronically coupled to the plurality of sensors; and
    a tangible, non-transitory, machine readable medium storing instructions that when executed by the processor of the second wheeled device effectuates operations comprising:
      generating, with the processor of the second wheeled device, the map of the environment;
  the map is loaded into a memory of the first wheeled device at a beginning of each work session; and the processor of the first wheeled device iteratively tracks the position of the first wheeled device while performing at least one task.

2. The first wheeled device of claim 1, wherein the operations further comprise:
transmitting, with the processor of the first wheeled device, a signal indicating the completion of the at least one task to the processor of the second wheeled device or an application of a communication device paired with the first wheeled device and the second wheeled device, wherein the second wheeled device is actuated to execute a task upon receiving the signal or another signal indicating completion of the at least one task by the first wheeled device.

3. The first wheeled device of claim 1, wherein the operations further comprise:
learning, with the processor of the first wheeled device, a preferred cleaning schedule of the first wheeled device based on actions of a user in operating the first wheeled device.

4. The first wheeled device of claim 3, wherein the preferred cleaning schedule is suggested to the user.

5. The first wheeled device of claim 1, wherein the first wheeled device is wirelessly connected to an application of a communication device configured to:
display the map and debris accumulation within the map; and
receive the at least one input designating an addition, a deletion, or a modification of a perimeter line within the map; an addition, a deletion, or a modification of a zone within the map; a schedule of the first wheeled device; a cleaning intensity; an instruction to navigate to a user-identified location; a label of a zone within the map; and an addition, a deletion, or a modification of a virtual boundary the first wheeled device is to avoid crossing.

6. The first wheeled device of claim 1, wherein the operations further comprise:
receiving, with the processor of the first wheeled device, an instruction to clean a zone, wherein a label associated with the zone is used in providing the instruction.

7. The first wheeled device of claim 1, wherein the first wheeled device comprises a robotic vacuum and the second wheeled device comprises a robotic mop.

8. The first wheeled device of claim 1, wherein the at least one task comprises surface coverage.

9. The first wheeled device of claim 1, wherein the operations further comprise:
generating, with the processor of the first wheeled device, a path of the first wheeled device, wherein:
at least a portion of the path comprises parallel lines;
adjacent parallel lines are separated by a maximum distance equivalent to a width of a cleaning tool of the first wheeled device;
a driving direction of the first wheeled device along each parallel line is opposite to a driving direction of the first wheeled device along lines adjacent to the respective parallel line; and
the first wheeled device rotates 180 degrees in between a terminal end of each parallel line and a beginning of a next adjacent parallel line of the path.

10. The first wheeled device of claim 1, wherein the operations further comprise:
segmenting, with the processor of the first wheeled device, the map into a plurality of zones based on a layout of the mapped environment.

11. The first wheeled device of claim 1, wherein the operations further comprise:
capturing, with at least one sensor disposed on the first wheeled device, sensor readings of debris;
determining, with the processor of the first wheeled device, a type of the debris detected based on at least some of the sensor readings;
determining, with the processor of the first wheeled device, whether the debris can be cleaned by the first wheeled device based on the type of the debris; and
adjusting, with the processor of the first wheeled device, a path of the first wheeled device to avoid the debris when it is determined that the first wheeled device cannot clean the debris.

12. The first wheeled device of claim 1, wherein the operations further comprise:
determining, with the processor of the first wheeled device, coverage of the locations based on the debris accumulation in locations within the environment.

13. The first wheeled device of claim 1, wherein at least some of the operation of the first wheeled device or the second wheeled device is determined based on at least a presence or an absence of a user within the environment, wherein the first wheeled device or the second wheeled device operate during absence of the user.

14. A tangible, non-transitory, machine readable medium storing instructions that when executed by a processor of a first wheeled device effectuates operations comprising:
capturing, with at least one exteroceptive sensor disposed on the first wheeled device, sensor readings of an environment of the first wheeled device;
obtaining, with the processor of the first wheeled device, the sensor readings;
finding, with the processor of the first wheeled device, a position of the first wheeled device within a map of the environment based on at least some of the sensor readings;
capturing, with a debris sensor disposed on the first wheeled device, debris data;
associating, with the processor of the first wheeled device, a location with each debris data, the location comprising a location of the first wheeled device when the respective debris data was captured;
inferring, with the processor of the first wheeled device, debris accumulation in locations within the environment;
marking, with the processor of the first wheeled device, the debris accumulation of the locations within the map, wherein an application of a communication device paired with the first wheeled device is configured to display the debris accumulation within the map;
generating, with the processor of the first wheeled device, a new map of the environment when the processor is unable to load the previously generated map or when the processor cannot find the position of the first wheeled device in the previously generated map; and
wherein:
the map is previously generated with the processor of the first wheeled device during a previous work session or with a processor of a second wheeled device configured to collaborate with the first wheeled device;
the second wheeled device comprises:
a chassis;
a set of wheels coupled to the chassis;
one or more electric motors to rotate the set of wheels;

a wireless card for wirelessly connecting to internet;
a plurality of sensors;
a processor electronically coupled to the plurality of sensors; and
a tangible, non-transitory, machine readable medium storing instructions that when executed by the processor of the second wheeled device effectuates operations comprising:
generating, with the processor of the second wheeled device, the map of the environment;
the map is loaded into a memory of the first wheeled device at a beginning of each work session; and
the processor of the first wheeled device iteratively tracks the position of the first wheeled device while performing at least one task.

15. A method for operating a first wheeled device, comprising:
capturing, with at least one exteroceptive sensor disposed on the first wheeled device, sensor readings of an environment of the first wheeled device;
obtaining, with a processor of the first wheeled device, the sensor readings;
finding, with the processor of the first wheeled device, a position of the first wheeled device within a map of the environment based on at least some of the sensor readings;
capturing, with a debris sensor disposed on the first wheeled device, debris data;
associating, with the processor of the first wheeled device, a location with each debris data, the location comprising a location of the first wheeled device when the respective debris data was captured;
inferring, with the processor of the first wheeled device, debris accumulation in locations within the environment;
marking, with the processor of the first wheeled device, the debris accumulation of the locations within the map, wherein an application of a communication device paired with the first wheeled device is configured to display the debris accumulation within the map;
generating, with the processor of the first wheeled device, a new map of the environment when the processor is unable to load the previously generated map or when the processor cannot find the position of the first wheeled device in the previously generated map; and
wherein:
the map is previously generated with the processor of the first wheeled device during a previous work session or with a processor of a second wheeled device configured to collaborate with the first wheeled device;
the second wheeled device comprises:
a chassis;
a set of wheels coupled to the chassis;
one or more electric motors to rotate the set of wheels;
a wireless card for wirelessly connecting to internet;
a plurality of sensors;
a processor electronically coupled to the plurality of sensors; and
a tangible, non-transitory, machine readable medium storing instructions that when executed by the processor of the second wheeled device effectuates operations comprising:
generating, with the processor of the second wheeled device, the map of the environment;
the map is loaded into a memory of the first wheeled device at a beginning of each work session;
the processor of the first wheeled device iteratively tracks the position of the first wheeled device while performing at least one task;
the first wheeled device is wirelessly connected to an application of a communication device configured to:
display the map and debris accumulation within the map; and
receive the at least one input designating an addition, a deletion, or a modification of a perimeter line within the map; an addition, a deletion, or a modification of a zone within the map; a schedule of the first wheeled device; a cleaning intensity; an instruction to navigate to a user-identified location; a label of a zone within the map; and an addition, a deletion, or a modification of a virtual boundary the first wheeled device is to avoid crossing; and
at least some of the operation of the first wheeled device is determined based on a presence or an absence of a user within the environment, wherein the first wheeled device operates during absence of the user.

16. The method of claim 15, further comprising:
transmitting, with the processor of the first wheeled device, a signal indicating the completion of the at least one task to the processor of the second wheeled device or an application of a communication device paired with the first wheeled device and the second wheeled device, wherein:
the second wheeled device is actuated to execute a task upon receiving the signal or another signal indicating completion of the at least one task by the first wheeled device;
the first wheeled device comprises a robotic vacuum and the second wheeled device comprises a robotic mop; and
the at least one task comprises surface coverage.

17. The method of claim 15, further comprising:
learning, with the processor of the first wheeled device, a preferred cleaning schedule of the first wheeled device based on actions of a user in operating the first wheeled device, wherein the preferred cleaning schedule is suggested to the user.

18. The method of claim 15, wherein the operations further comprise:
generating, with the processor of the first wheeled device, a path of the first wheeled device, wherein:
at least a portion of the path comprises parallel lines;
adjacent parallel lines are separated by a maximum distance equivalent to a width of a cleaning tool of the first wheeled device;
a driving direction of the first wheeled device along each parallel line is opposite to a driving direction of the first wheeled device along lines adjacent to the respective parallel line; and
the first wheeled device rotates 180 degrees in between a terminal end of each parallel line and a beginning of a next adjacent parallel line of the path; and
segmenting, with the processor of the first wheeled device, the map into a plurality of zones based on a layout of the mapped environment.

19. The method of claim 16, further comprising:
determining, with the processor of the first wheeled device, coverage of the locations based on the debris accumulation in locations within the environment;
capturing, with at least one sensor disposed on the first wheeled device, sensor readings of debris;
determining, with the processor of the first wheeled device, a type of the debris detected based on at least some of the sensor readings;
determining, with the processor of the first wheeled device, whether the debris can be cleaned by the first wheeled device based on the type of the debris; and
adjusting, with the processor of the first wheeled device, a path of the first wheeled device to avoid the debris when it is determined that the first wheeled device cannot clean the debris.

\* \* \* \* \*